US012746725B2

(12) United States Patent

Milshtein et al.

(10) Patent No.: US 12,746,725 B2
(45) Date of Patent: Sep. 29, 2026

(54) OPTICS IN THREE-DIMENSIONAL PRINTING

(71) Applicant: Velo3D, Inc., Campbell, CA (US)

(72) Inventors: Erel Milshtein, Cupertino, CA (US); Benyamin Buller, Cupertino, CA (US); Alexander Brudny, San Jose, CA (US)

(73) Assignee: Velo3D, Inc., Campbell, CA (US)

( * ) Notice: Subject to any disclaimer, the term of this patent is extended or adjusted under 35 U.S.C. 154(b) by 540 days.

(21) Appl. No.: 18/221,471

(22) Filed: Jul. 13, 2023

(65) Prior Publication Data

US 2024/0059019 A1 Feb. 22, 2024

Related U.S. Application Data

(63) Continuation of application No. 18/120,523, filed on Mar. 13, 2023, now abandoned, which is a
(Continued)

(51) Int. Cl.
*B29C 64/393* (2017.01)
*B22F 10/28* (2021.01)
(Continued)

(52) U.S. Cl.
CPC ............ *B29C 64/393* (2017.08); *B22F 10/28* (2021.01); *B22F 10/31* (2021.01); *B22F 10/36* (2021.01); *B22F 12/44* (2021.01); *B22F 12/90* (2021.01); *B23K 26/032* (2013.01); *B23K 26/0604* (2013.01); *B23K 26/0608* (2013.01); *B23K 26/062* (2015.10); *B23K 26/125* (2013.01); *B23K 26/127* (2013.01); *B23K 26/34* (2013.01); *B23K 26/342* (2015.10); *B23K 26/354* (2015.10); *B23K 26/703* (2015.10); *B28B 1/001* (2013.01); *B28B 17/0081* (2013.01); *B29C 64/135* (2017.08); *B29C 64/153* (2017.08); *B29C 64/268* (2017.08); *B29C 64/35* (2017.08); *B33Y 10/00* (2014.12); *B33Y 30/00* (2014.12);
(Continued)

(58) Field of Classification Search
CPC ..... B29C 64/245; B29C 64/106; B29C 70/78; B29C 64/379; B29C 64/393; B33Y 70/10; B33Y 10/00; B33Y 50/02
See application file for complete search history.

(56) References Cited

U.S. PATENT DOCUMENTS

2011/0293771 A1* 12/2011 Oberhofer ............. B29C 64/364 425/182
2016/0114535 A1* 4/2016 Kritchman ............ B29C 64/106 425/135

OTHER PUBLICATIONS

Liang, et al., High-Precision laser beam shaping using a binary-amplitude spatial light modulator, Feb. 17, 2010, Applied Optics , vol. 49, Issue 8, pp. 1323-1330 (Year: 2010).*
(Continued)

*Primary Examiner* — Christina A Johnson
*Assistant Examiner* — Kelsey C Grace
(74) *Attorney, Agent, or Firm* — Bryan L. Baysinger; Nicholas P. Stadnyk; Maynard Nexsen PC

(57) ABSTRACT

The present disclosure provides various apparatuses, systems, software, and methods for three-dimensional (3D) printing. The disclosure delineates various optical components of the 3D printing system, their usage, and their optional calibration. The disclosure delineates calibration of one or more components of the 3D printer (e.g., the energy beam).

20 Claims, 39 Drawing Sheets

Related U.S. Application Data continuation of application No. 17/989,789, filed on Nov. 18, 2022, now abandoned, which is a continuation of application No. 17/874,447, filed on Jul. 27, 2022, now abandoned, which is a continuation of application No. 17/725,662, filed on Apr. 21, 2022, now abandoned, which is a continuation of application No. 17/571,742, filed on Jan. 10, 2022, now abandoned, which is a continuation of application No. 17/485,913, filed on Sep. 27, 2021, now abandoned, which is a continuation of application No. 17/346,515, filed on Jun. 14, 2021, now abandoned, which is a continuation of application No. 17/189,626, filed on Mar. 2, 2021, now abandoned, which is a continuation of application No. 16/952,408, filed on Nov. 19, 2020, now abandoned, which is a continuation of application No. 16/991,328, filed on Aug. 12, 2020, now abandoned, which is a continuation of application No. 16/866,949, filed on May 5, 2020, now abandoned, which is a continuation of application No. 16/749,430, filed on Jan. 22, 2020, now abandoned, which is a continuation of application No. 16/578,190, filed on Sep. 20, 2019, now abandoned, which is a continuation of application No. 16/439,614, filed on Jun. 12, 2019, now abandoned, which is a continuation of application No. 15/861,553, filed on Jan. 3, 2018, now abandoned.

(60) Provisional application No. 62/442,896, filed on Jan. 5, 2017.

(51) Int. Cl.

| | |
|---|---|
| ***B22F 10/31*** | (2021.01) |
| ***B22F 10/36*** | (2021.01) |
| ***B22F 12/44*** | (2021.01) |
| ***B22F 12/90*** | (2021.01) |
| ***B23K 26/03*** | (2006.01) |
| ***B23K 26/06*** | (2014.01) |
| ***B23K 26/062*** | (2014.01) |
| ***B23K 26/12*** | (2014.01) |
| ***B23K 26/34*** | (2014.01) |
| ***B23K 26/342*** | (2014.01) |
| ***B23K 26/354*** | (2014.01) |
| ***B23K 26/70*** | (2014.01) |
| ***B28B 1/00*** | (2006.01) |
| ***B28B 17/00*** | (2006.01) |
| ***B29C 64/135*** | (2017.01) |
| ***B29C 64/153*** | (2017.01) |
| ***B29C 64/268*** | (2017.01) |
| ***B29C 64/35*** | (2017.01) |
| ***B33Y 10/00*** | (2015.01) |
| ***B33Y 30/00*** | (2015.01) |
| ***B33Y 50/02*** | (2015.01) |
| *B22F 10/32* | (2021.01) |
| *B22F 10/366* | (2021.01) |
| *B22F 10/77* | (2021.01) |
| *B22F 12/41* | (2021.01) |
| *B22F 12/45* | (2021.01) |

(52) U.S. Cl.

CPC ............... *B33Y 50/02* (2014.12); *B22F 10/32* (2021.01); *B22F 10/366* (2021.01); *B22F 10/77* (2021.01); *B22F 12/41* (2021.01); *B22F 12/45* (2021.01); *B22F 2999/00* (2013.01)

(56) References Cited

OTHER PUBLICATIONS

Mah, et al. 3D laser imaging for surface roughness analysis, Feb. 2013, International Journal of Rock Mechanics and Mining Sciences, vol. 58, pp. 111-117 (Year: 2012).*

* cited by examiner

Fig. 34A
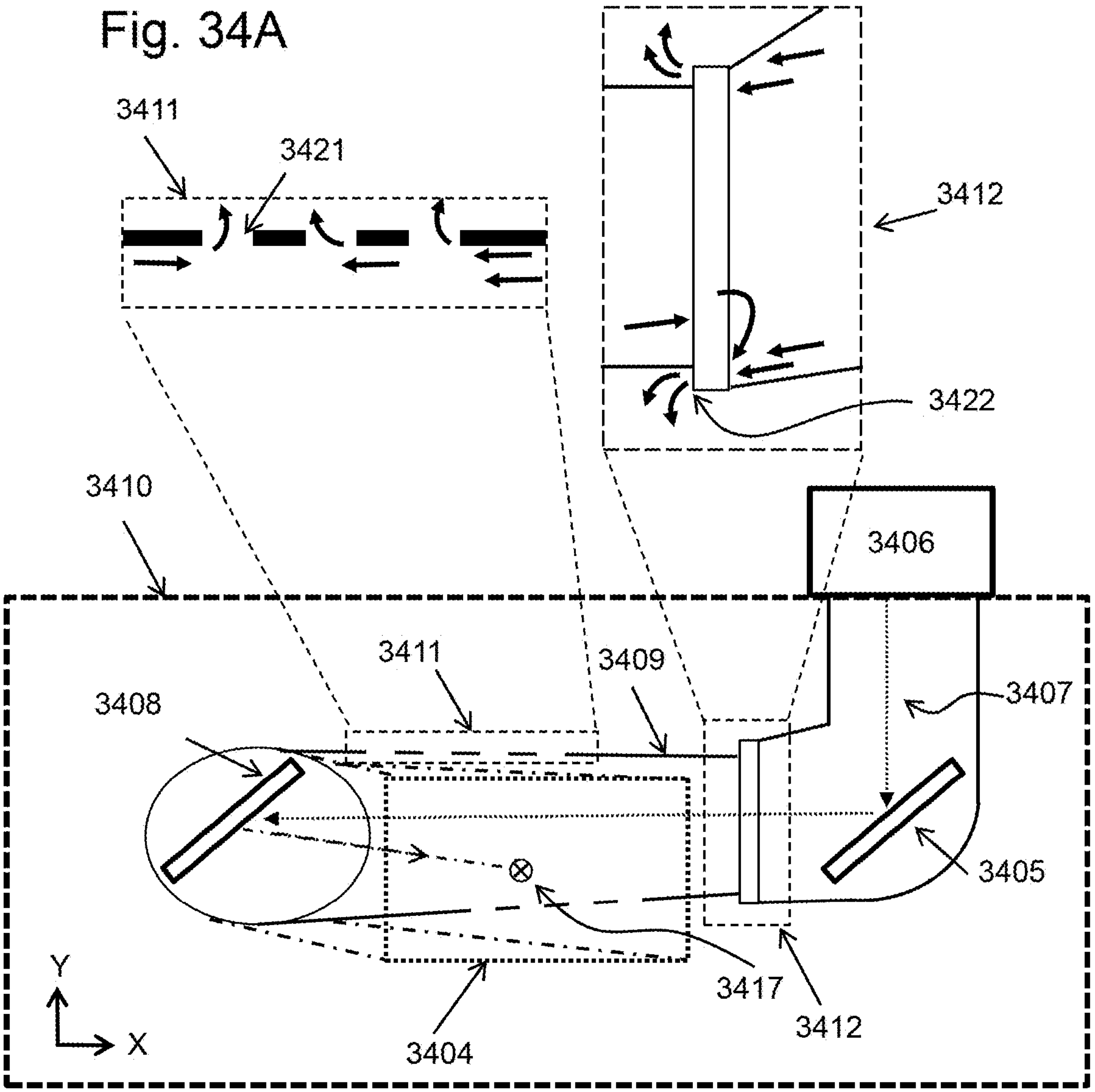
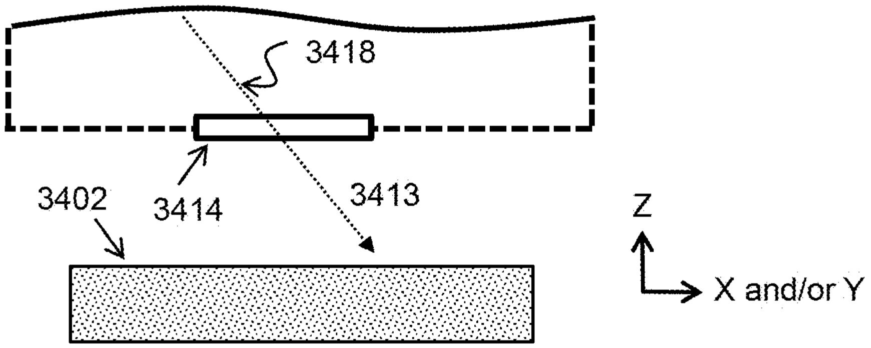
Fig. 34B

OPTICS IN THREE-DIMENSIONAL PRINTING

CROSS-REFERENCE

This application is a continuation of U.S. patent application Ser. No. 18/120,523 filed Mar. 13, 2023, which is a continuation of U.S. patent application Ser. No. 17/989,789 filed Nov. 18, 2022, which is a continuation of U.S. patent application Ser. No. 17/874,447 filed Jul. 27, 2022, which is a continuation of U.S. patent application Ser. No. 17/725,622 filed Apr. 21, 2022, which is a continuation of U.S. patent application Ser. No. 17/571,742 filed Jan. 10, 2022, which is a continuation of U.S. patent application Ser. No. 17/485,913 filed Sep. 27, 2021, which is a continuation of U.S. patent application Ser. No. 17/346,515 filed Jun. 14, 2021, which is a continuation of U.S. patent application Ser. No. 17/189,626 filed Mar. 2, 2021, which is a continuation of U.S. patent application Ser. No. 16/952,408 filed Nov. 19, 2020, which is a continuation of U.S. patent application Ser. No. 16/991,328 filed Aug. 12, 2020, which is a continuation of U.S. patent application Ser. No. 16/866,949, filed May 5, 2020, which is a continuation of U.S. patent application Ser. No. 16/749,430, filed Jan. 22, 2020, which is a continuation of U.S. patent application Ser. No. 16/578,190, filed Sep. 20, 2019, which is a continuation of U.S. patent application Ser. No. 16/439,614, filed Jun. 12, 2019, which is continuation of U.S. patent application Ser. No. 15/861,553, filed Jan. 3, 2018, which claims benefit of prior-filed U.S. Patent Application Ser. No. 62/442,896, filed Jan. 5, 2017, each of which is entirely incorporated herein by reference.

BACKGROUND

Three-dimensional (3D) printing (e.g., additive manufacturing) is a process for making a three-dimensional (3D) object of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of each other. This process may be controlled (e.g., computer controlled, manually controlled, or both). A 3D printer can be an industrial robot.

3D printing can generate custom parts quickly and efficiently. A variety of materials can be used in a 3D printing process including elemental metal, metal alloy, ceramic, elemental carbon, or polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is materialized.

3D models may be created utilizing a computer aided design package or via 3D scanner. The manual modeling process of preparing geometric data for 3D computer graphics may be similar to plastic arts, such as sculpting or animating. 3D scanning is a process of analyzing and collecting digital data on the shape and appearance of a real object. Based on this data, 3D models of the scanned object can be produced. The 3D models may include computer-aided design (CAD).

Many additive processes are currently available. They may differ in the manner layers are deposited to create the materialized structure. They may vary in the material or materials that are used to generate the designed structure. Some methods melt or soften material to produce the layers. Examples for 3D printing methods include selective laser melting (SLM), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (made inter alia of paper, polymer, metal) are cut to shape and joined together.

SUMMARY

In some instances, it may be desirable to calibrate at least one characteristic of the energy beam that facilitates formation of the three-dimensional object. For example, it may be desirable to calibrate its location with respect to at least one component of the 3D printer (e.g., target surface, a load lock shutter, and/or a calibration mark). It may be desirable to calibrate the speed, power density distribution, and/or focal point. The present disclosure facilitates the calibration of the at least one characteristic of the energy beam.

In some instances, it may be desirable to detect one or more characteristics of the forming 3D object and/or its vicinity (e.g., in real-time during at least a portion of the 3D printing). For example, it may be desirable to include a detection system that facilitates contemporaneous focusing of a first energy beam on a target surface, and a second (related) energy beam on the detector. For example, it may be desirable to include a detection system that facilitates contemporaneous focusing of an energy beam on a target surface, and on the detector. For example, the detection system may use achromatic optics.

At times, an optical system (e.g., comprising a detection system) of the 3D printer may deviate from one or more of its calibrated properties. It may be desirable to include a calibration system that facilitates calibration of one or more elements of an optical system. Calibrating the one or more elements of the optical system may result in (e.g., substantially) accurate operation of the optical system. For example, the one or more energy beams within the optical system may require (e.g., periodical) calibration. For example, the one or more lenses and/or one or more detectors within the optical system may require (e.g., periodical) calibration.

At times, detection speed and/or accuracy are important. The present disclosure delineates various systems, apparatuses, and methodologies of this regard. For example, the present disclosure describes usage of at least one optical fiber that is connected to a detector. For example, an optical fiber bundle having fibers of identical and/or different cross sections. The present disclosure delineates apparatuses, systems, software, and methods that facilitates accomplishing these.

In an aspect described herein are methods, systems, and/or apparatuses for detecting one or more characteristics of the forming 3D object and/or its vicinity. Another aspect of the present disclosure describes methods, systems, and/or apparatuses for facilitating irradiation of an elongated energy beam. Another aspect of the present disclosure describes methods, systems, and/or apparatuses for facilitating contemporaneous focusing of the energy beam.

In another aspect, a system for printing a three-dimensional object comprises: a target surface; an energy source configured to generate an energy beam that is directed towards the target surface to print the three-dimensional object; at least one calibration mark comprises at least one identifiable border, which at least one calibration mark is disposed at or adjacent to the target surface; and at least one controller that is operatively coupled to the energy beam and to the at least one calibration mark and is configured to direct the energy beam to travel from a first side of the at least one identifiable border to a second side of the at least one identifiable border, wherein the second side opposes the first side.

In some embodiments, the target surface comprises an exposed surface of a material bed. In some embodiments, the material bed comprises a particulate material. In some embodiments, the particulate material is a powder material. In some embodiments, the powder material comprises at least one member from the group consisting of an elemental metal, a metal alloy, a ceramic, an allotrope of elemental carbon, a polymer, and a resin. In some embodiments, the powder material comprises at least one member from the group consisting of an elemental metal, a metal alloy, a ceramic, and an allotrope of elemental carbon. In some embodiments, the energy source comprises an electromagnetic energy source or a charged particle energy source. In some embodiments, the electromagnetic energy source comprises a laser. In some embodiments, the at least one calibration mark comprises a first calibration mark and a second calibration mark. In some embodiments, the first calibration mark and the second calibration mark are separated by the at least one identifiable border. In some embodiments, the first calibration mark and the second calibration mark are substantially similar. In some embodiments, the first calibration mark and the second calibration mark are different by at least one identifiable property. In some embodiments, the at least one calibration mark comprises a first calibration mark type and a second calibration mark type that is different by at least one identifiable property from the first calibration mark type, and wherein the first calibration mark type is arranged interchangeably with the second calibration mark type. In some embodiments, arranged interchangeably comprises a space filling polygon arrangement in at least one direction. In some embodiments, the at least one direction comprises a longitudinal direction. In some embodiments, the space filling polygon arrangement is planar. In some embodiments, the space filling polygon arrangement is substantially horizontal. In some embodiments, the space filling polygon arrangement comprises a tessellation. In some embodiments, the tessellation comprises a symmetric polygon. In some embodiments, the tessellation comprises an equilateral polygon. In some embodiments, the tessellation comprises a triangle, a tetragon, or a hexagon. In some embodiments, the tetragon comprises a concave or a convex tetragon. In some embodiments, the tetragon comprises a rectangle. In some embodiments, the rectangle comprises a square. In some embodiments, the at least one calibration mark comprises an oval. In some embodiments, the oval comprises a circle. In some embodiments, adjacent to the target surface comprises from a position that is separated from the target surface by a gap comprising an atmosphere. In some embodiments, the at least one calibration mark forms at least a portion of a calibration structure. In some embodiments, the calibration structure is configured for lateral movement. In some embodiments, the at least one calibration mark forms at least a portion of a calibration structure. In some embodiments, the calibration structure is configured for horizontal movement. In some embodiments, the at least one calibration mark forms at least a portion of a calibration structure. In some embodiments, the calibration structure is configured for vertical movement. In some embodiments, the at least one calibration mark forms at least a portion of a calibration structure. In some embodiments, the calibration structure is configured for engagement with a stopper. In some embodiments, the calibration structure is mounted on or comprises a stage. In some embodiments, the stage is configured for movement. In some embodiments, movement comprises horizontal or vertical movement. In some embodiments, the stage is configured to move towards a stopper. In some embodiments, the stopper is disposed in a processing chamber, through at least a portion of which the energy beam travels therethrough to the target surface to print the three-dimensional object. In some embodiments, the stopper is configured to reversibly engage with the stage. In some embodiments, to reversibly engage comprises a complementary engagement. In some embodiments, to reversibly engage comprises a dove-tail engagement. In some embodiments, to reversibly engage comprises fitting together. In some embodiments, to reversibly engage comprises at least one protrusion that is adapted to fit at least one complementary indentation. In some embodiments, the stage comprises the at least one indentation or at least one protrusion. In some embodiments, the at least one protrusion is a part of the stage and its at least one complementary indentation is a part of the stopper. In some embodiments, the at least one protrusion is a part of the stopper and its at least one complementary indentation is a part of the stage. In some embodiments, the stage is positioned against a stopper. In some embodiments, at least one of the stage and the stopper comprises a kinematic support. In some embodiments, at least one of the stage and stopper comprises a plurality of kinematic supports. In some embodiments, the stopper is mounted on a wall of a processing chamber. In some embodiments, the stopper is mounted on a floor of a processing chamber. In some embodiments, the kinematic support includes one or more shafts. In some embodiments, a chamber comprises a load lock shutter configured to separate the processing chamber from a load lock chamber. In some embodiments, the stopper is disposed in the load lock chamber. In some embodiments, the stopper is mounted on a wall of the load lock chamber. In some embodiments, the stopper is mounted on a floor of the load lock chamber. In some embodiments, a chamber comprises a load lock shutter configured to separate the processing chamber from a build module. In some embodiments, the stopper is disposed in the build module. In some embodiments, the stopper is mounted on a wall of the build module. In some embodiments, the stopper is mounted on a floor of the build module. In some embodiments, the at least one calibration mark comprises a border of a detector or a sensor that is configured to detect at least one signal associated with the energy beam, from the at least one calibration mark. In some embodiments, the at least one calibration mark comprises a camera. In some embodiments, the at least one mark is connected to an optical fiber. In some embodiments, the at least one calibration mark comprises an array of detectors or sensors. In some embodiments, the array of detectors is connected to an optical fiber bundle. In some embodiments, adjacent to the target surface comprises to a side of the target surface. In some embodiments, to the side of the target surface comprises on a floor of a processing chamber. In some embodiments, the energy beam travels through at least a portion of the processing chamber to the target surface to print the three-dimensional object. In some embodiments, adjacent to the target surface comprises below the target surface. In some embodiments, below the target surface comprises on a platform, above which platform the three-dimensional object is printed. In some embodiments, below the target surface comprises below a shutter that is configured to reversibly separate the target surface from a processing chamber. In some embodiments, the energy beam travels through at least a portion of the processing chamber to the target surface to print the three-dimensional object. In some embodiments, below the shutter is outside of the processing chamber. In some embodiments, below the target surface comprises a part of a shutter that is configured to reversibly separate the target surface from a processing chamber. In some embodiments, the energy beam travels through at least a portion of the processing chamber to the target surface to print the three-dimensional object. In some embodiments, the at least one controller is further configured to direct measurement of at least one characteristic of the energy beam to receive a measurement value during its travel from the first side of the at least one identifiable border to the second side of the at least one identifiable border. In some embodiments, the energy beam has a footprint which comprises a projection of the energy beam at least onto the at least one calibration mark. In some embodiments, the at least one characteristic comprises (i) a center position of the footprint, (ii) a fundamental length scale of the footprint, (iii) a measure of a power density distribution within the footprint, (iv) a focal position of the footprint, or (v) a velocity of the footprint. In some embodiments, the at least one controller is configured to further direct calibration of the at least one characteristic of the energy beam by using the measurement value. In some embodiments, two or more of (i)-(v) are directed by different controllers. In some embodiments, two or more of (i)-(v) are directed by the same controller. In some embodiments, the measure of the power density distribution within the footprint comprises an integral of the power density distribution within the footprint. In some embodiments, the center position is with respect to the at least one identifiable border.

In another aspect, a system for printing a three-dimensional object comprises: a target surface that comprises a particulate material; an energy source configured to generate an energy beam that is directed towards the target surface and to form a footprint on the target surface that emits an associated signal; and at least one controller that is operatively coupled to the energy beam, the target surface, and the associated signal, which at least one controller is configured to direct (i) the energy beam to irradiate at least a portion of the target surface, (ii) separation of a signal that is related to the target surface from the associated signal to receive a cleaned signal, and (iii) processing of the cleaned signal to obtain the at least one characteristic of the energy beam that comprises (a) a center position of the footprint, (b) a fundamental length scale of the footprint, (c) a measure of a power density distribution within the footprint, (d) a focal position of the footprint, or (e) a velocity of the footprint.

In some embodiments, the associated signal comprises an optical signal. In some embodiments, separation of the signal comprises optical filtering. In some embodiments, separation of the signal comprises signal processing. In some embodiments, separation of the signal comprises image processing. In some embodiments, the signal processing utilizes a processor. In some embodiments, the processing in (iii) utilizes a processor. In some embodiments, the processing in (iii) comprises image processing. In some embodiments, at least two of (i), (ii), and (iii) are directed by different controllers. In some embodiments, at least two of (i), (ii), and (iii) are directed by the same controller. In some embodiments, the center position of the footprint is with respect to the target surface.

In another aspect, a system for printing a three-dimensional object comprises: a processing chamber; a platform above which the three-dimensional object is printed, which platform is disposed adjacent to the processing chamber; a load lock mechanism that is configured to facilitate engagement of the platform with the processing chamber by use of a shutter that is configured to reversibly separate the processing chamber from the platform, wherein the shutter (i) is configured for movement, and (ii) comprises a top surface having at least one identifiable calibration mark; an energy source configured to generate an energy beam that travels in a first direction through at least a portion of the processing chamber towards at least one of the platform and the shutter, wherein above is in a second direction opposite to the first direction, wherein top is towards the second direction opposite to the first direction; and one or more controllers that are operatively coupled to the energy beam and to the shutter and are configured to direct: (a) the shutter to move to a position that facilitates irradiation of the at least one identifiable calibration mark by the energy beam, and (b) the energy beam to irradiate the least one identifiable calibration mark.

In some embodiments, the shutter is configured for lateral movement. In some embodiments, the shutter is configured for substantially horizontal movement. In some embodiments, the load lock mechanism is disposed below the processing chamber. In some embodiments, below is in the first direction. In some embodiments, (a) and (b) are directed by different controllers. In some embodiments, (a) and (b) are directed by the same controller.

In another aspect, an apparatus for printing a three-dimensional object comprises: a processing chamber; a platform above which the three-dimensional object is printed, which platform is engaged with the processing chamber, which platform is disposed adjacent to the processing chamber; a load lock mechanism that is configured to facilitate engagement of the platform with the processing chamber by use of a shutter that is configured to reversibly separate the processing chamber from the platform, wherein the shutter (i) is configured for movement, and (ii) comprises a top surface having at least one identifiable calibration mark; and an energy source configured to generate an energy beam that is directed through at least a portion of the processing chamber in a first direction towards at least one of the platform and the shutter, wherein above is in a second position that is opposite to the first direction, wherein top is towards a second direction.

In some embodiments, the platform is disposed below or at a floor of the processing chamber. In some embodiments, below is in the first direction. In some embodiments, the at least one calibration mark comprises a first calibration mark and a second calibration mark. In some embodiments, the first calibration mark and the second calibration mark are separated by at least one identifiable border. In some embodiments, the first calibration mark and the second calibration mark are substantially similar. In some embodiments, the first calibration mark and the second calibration mark are different by at least one identifiable property. In some embodiments, the at least one identifiable calibration mark comprises a first calibration mark type and a second calibration mark type that is different by at least one identifiable property from the first calibration mark type, and wherein the first calibration mark type is arranged interchangeably with the second calibration mark type. In some embodiments, arranged interchangeably comprises a space-filling polygon arrangement in at least one direction. In some embodiments, the at least one direction comprises a longitudinal direction. In some embodiments, the space-filling polygon arrangement is planar. In some embodiments, the space-filling polygon arrangement is substantially horizontal. In some embodiments, the space-filling polygon arrangement comprises a tessellation. In some embodiments, the tessellation comprises a symmetric polygon. In some embodiments, the tessellation comprises an equilateral polygon. In some embodiments, the tessellation comprises a triangle, a tetragon, or a hexagon. In some embodiments, the tetragon comprises a concave or a convex tetragon. In some embodiments, the tetragon comprises a rectangle. In some embodiments, the rectangle comprises a square. In some embodiments, the at least one calibration mark comprises an oval. In some embodiments, the oval comprises a circle.

In another aspect, a method for printing a three-dimensional object comprises: irradiating an energy beam on a first calibration mark that is disposed on a shutter that separates a processing chamber from a target surface above which the three-dimensional object is printing; measuring at least one characteristic of the energy beam during the irradiating to receive a measurement value, wherein the energy beam has a footprint which comprises a projection of the energy beam onto the shutter, wherein the at least one characteristic comprises (i) a center position of the footprint, (ii) a fundamental length scale of the footprint, (iii) a measure of a power density distribution within the footprint, (iv) a focal position of the footprint, or (v) a velocity of the footprint; and calibrating the at least one characteristic of the energy beam by using the measurement value.

In some embodiments, the method further comprises measuring the fundamental length scale of the footprint. In some embodiments, the fundamental length scale comprises a radius, a radius equivalent, a diameter, a full width at half maximum of an intensity, or a cross section. In some embodiments, the center position of the footprint is with respect to a position on the shutter. In some embodiments, the method further comprises before (b), altering the focal position of the footprint. In some embodiments, the altering comprises altering a position of at least one optical element through which the energy beam travels to the shutter. In some embodiments, the at least one optical element comprises a lens. In some embodiments, the method further comprises before (b) moving the energy beam with respect to the shutter. In some embodiments, the method further comprises measuring the velocity of the moving. In some embodiments, the method further comprises moving the energy beam from a first side of a first border to a second side of the first border. In some embodiments, the first border is of the first calibration mark. In some embodiments, the moving comprises circularly moving. In some embodiments, the method further comprises before (b), moving the energy beam from a first side of a second border to a second side of the second border. In some embodiments, the second border is of the first calibration mark. In some embodiments, the first border opposes the second border. In some embodiments, the first border contacts the second border. In some embodiments, the method further comprises before (b), moving the energy beam from a first side of a third border to a second side of the third border. In some embodiments, the third border is of a second calibration mark that borders the first calibration mark by the second border. In some embodiments, the first border contacts the third border. In some embodiments, the second border contacts the third border. In some embodiments, the method further comprises before (b), moving the energy beam from a first side of a fourth border to a second side of the fourth border. In some embodiments, the third border is of a third calibration mark that borders the second calibration mark by the third border. In some embodiments, the first border contacts the fourth border. In some embodiments, the second border contacts the fourth border. In some embodiments, the third border contacts the fourth border.

In another aspect, a method for printing a three-dimensional object comprises: moving an energy beam across at least a portion of a target surface that comprises a particulate material, wherein the energy beam has a footprint which comprises a projection of the energy beam onto the target surface; measuring a reflection of the footprint from the at least a portion of the target surface during the moving; separating a target surface signal from the reflection of the footprint to obtain a clean reflection footprint signal; extracting at least one characteristic of the energy beam from the clean reflection footprint signal to obtain an extracted value, wherein the at least one characteristic comprises (i) a center position of the footprint, (ii) a fundamental length scale of the footprint, (iii) a measure of a power density distribution within the footprint, (iv) a focal position of the footprint, or (v) a velocity of the footprint; and calibrating the at least one characteristic of the energy beam by using the extracted value.

In some embodiments, the separating considers at least one property of the particulate material. In some embodiments, the at least one property comprises a material type. In some embodiments, the at least one property comprises a fundamental length scale of the particulate material. In some embodiments, the at least one property comprises an average or a mean volume of the particulate material. In some embodiments, the at least one property comprises a reflective property of the particulate material. In some embodiments, the at least one property comprises an absorptive property of the particulate material. In some embodiments, the center position of the footprint is with respect to a position on the target surface.

In another aspect, a method for forming a three-dimensional object comprises: irradiating a bitmap with an energy beam at or adjacent to a target surface, the bitmap comprising one or more bits, wherein an intersection of the bitmap with the energy beam is a footprint of the energy beam on the bitmap, wherein the energy beam is irradiating through an optical setup; detecting a position of the footprint by a detector, wherein the position is detected relative to the one or more bits of the bitmap; comparing the position of the footprint to an expected position of the footprint on the bitmap, the expected position of the footprint determined based on a calibration relative to the one or more bits of the bitmap; adjusting one or more optical elements of the optical setup to coincide the position of the footprint with the expected position of the footprint; and using the irradiating energy beam to transform a portion of a pre-transformed material adjacent to the target surface to form at least a portion of the three-dimensional object.

In some embodiments, the bitmap comprises two or more different mark types. In some embodiments, the two or more different mark types differ in at least one detectable property. In some embodiments, the at least one detectable property comprises a reflective surface. In some embodiments, the at least one detectable property comprises a diffusive and/or dispersive surface. In some embodiments, the at least one detectable property comprises an absorptive stain. In some embodiments, the at least one detectable property comprises a reflective stain. In some embodiments, the at least one detectable property comprises a depression. In some embodiments, the at least one detectable property comprises a protrusion. In some embodiments, a bit of the one or more bits comprises a mark type. In some embodiments, a mark type comprises a surface mark. In some embodiments, a mark type comprises a surface roughness. In some embodiments, a mark type comprises a surface reflectivity. In some embodiments, a mark type comprises a surface absorption. In some embodiments, a mark type comprises a surface color. In some embodiments, a mark type comprises a material density. In some embodiments, a mark type comprises a material composition. In some embodiments, adjusting comprises adjusting a converging lens. In some embodiments, adjusting comprises adjusting a diverging lens. In some embodiments, adjusting comprises adjusting a beam splitter. In some embodiments, adjusting comprises adjusting a mirror. In some embodiments, adjusting comprises adjusting one or more elements of an aberration-correcting optical setup. In some embodiments, adjusting comprises adjusting a focus of the irradiating energy beam. In some embodiments, adjusting comprises adjusting a speed of the irradiating energy beam relative to the target surface. In some embodiments, adjusting comprises adjusting a cross sectional area of the irradiating energy beam. In some embodiments, adjusting comprises adjusting a measure of a power density distribution of the irradiating energy beam. In some embodiments, the measure of the power density distribution is an integral over the footprint of the energy beam on the bitmap.

In another aspect, an apparatus for detecting a three-dimensional object comprises: (a) a platform configured to support a material bed, which material bed comprises an exposed surface having an average planarity and an average optical characteristic, which material bed comprises a transformed material; (b) an energy source configured to generate an energy beam, which energy beam is operable to transform a pre-transformed material to the transformed material as part of the three-dimensional object, which three-dimensional object is disposed in the material bed, wherein the three-dimensional object causes at least a portion of the exposed surface to deviate from (I) the average planarity and/or (II) the average optical characteristic, wherein the energy source is disposed adjacent to the platform; (c) a radiation source configured to generate a structured radiation for projection onto the exposed surface to form a detectable image, wherein the radiation source is disposed adjacent to the energy source; and (d) a detector configured to detect any deviation within the detectable image, which deviation is indicative of (i) a composition of the three-dimensional object, (ii) a position of the three-dimensional object, (iii) a shape of the three-dimensional object, (iv) an average planarity of the exposed surface, or (v) any combination of (i), (ii), (iii) and (iv), wherein the detector is disposed adjacent to the radiation source.

In some embodiments, the pre-transformed material is at least 50 percent, or at least 80 percent diffusive relative to its total reflection. In some embodiments, the transformed material is at least 80 percent specular relative to its total reflection. In some embodiments, the radiation source is configured to generate the structured radiation in real time during the printing. In some embodiments, the detector is configured to detect in real time during the printing. In some embodiments, the apparatus further comprises a filter operatively coupled with the radiation source and/or the detector, which filter is configured to alter an intensity of at least a portion of the detectable image received at the detector. In some embodiments, the filter is operatively coupled with the detector and is configured to alter a focus of the detectable image detected by the detector. In some embodiments, the filter is configured to lower the resolution of the detectable image detected by the detector. In some embodiments, the filter is a low pass filter. In some embodiments, the filter comprises a polarizer. In some embodiments, the polarizer comprises a linear polarizer. In some embodiments, the polarizer comprises a circular polarizer. In some embodiments, the structured radiation that is projected onto the exposed surface to form the detectable image comprises a polarized radiation. In some embodiments, the filter is configured to filter out at least part of the polarized radiation. In some embodiments, the filter has a field of view configured to receive a specular reflection of the structured radiation. In some embodiments, the specular reflection is polarized, and wherein the filter is configured to at least partially filter out the specular reflection that is polarized. In some embodiments, the filter is a first filter. In some embodiments, the apparatus further comprises a second filter that is configured to generate a polarized radiation of the structured radiation that is projected onto the exposed surface to form the detectable image. In some embodiments, the second filter is operatively coupled to the radiation source. In some embodiments, the second filter comprises a polarizer. In some embodiments, the polarizer comprises a linear polarizer. In some embodiments, the polarizer comprises a circular polarizer. In some embodiments, the second filter is configured to at least partially cancel out the polarized radiation transmitted by the first filter. In some embodiments, the polarized radiation comprises a specular reflection from the exposed surface. In some embodiments, the first filter and/or second filter is configured to adjust a range of canceled out polarized radiation. In some embodiments, adjustment of the range of canceled out polarized radiation varies the amount of specular reflection that reaches the detector. In some embodiments, the deviation in the average planarity of the exposed surface comprises horizontal and/or vertical deviation from planarity. In some embodiments, the deviation in the position of the three-dimensional object comprises horizontal and/or vertical position. In some embodiments, the apparatus further comprises at least one controller operatively coupled to at least one of the platform, the energy source, the radiation source, the detector, and the filter, which at least one controller is configured to: (I) direct the energy beam to generate the three-dimensional object from the at least a portion of the material bed, (II) direct the radiation source to generate the structured radiation on the exposed surface, (III) direct adjustment of the filter to alter the intensity of the detectable image received at the detector, (IV) direct evaluation of the deviation in the detectable image using image analysis of a captured image, and/or (V) use (IV) to control at least one characteristic of the energy beam to form the three-dimensional object. In some embodiments, (III) is based upon the average optical characteristic of the exposed surface. In some embodiments, the controller is configured to make an adjustment to (I), (II) and/or (III) based on the evaluation in (IV). In some embodiments, the evaluation in (IV) comprises an adjustment to (A) a power generated by the energy source, or (B) at least one characteristic of the energy beam. In some embodiments, the at least one characteristic of the energy beam comprises (a) a dwell time of the energy beam at or adjacent to the exposed surface, or (b) a speed of movement of the energy beam along a trajectory. In some embodiments, the detectable image comprises a region having a first intensity and a first shape and a region having a second intensity and a second shape, and wherein the first intensity is higher than the second intensity, which higher is detectable. In some embodiments, the detector is configured to detect the deviation over a measurement range, which measurement range is based on a dimension of the region having the first intensity and the first shape, a dimension of the region having the second intensity and the second shape, or a combination thereof. In some embodiments, the radiation source is configured to modify the structured radiation dynamically. In some embodiments, dynamically is in real time during the printing. In some embodiments, to modify comprises alteration of a first structured radiation projecting a first detectable image to a second structured radiation projecting a second detectable image. In some embodiments, to modify comprises an alteration of the first intensity and/or of the second intensity. In some embodiments, to modify comprises an alteration of a shape of the region having the first intensity and/or a shape of the region having the second intensity. In some embodiments, to modify comprises an alteration of a relative spacing between the region having the first intensity and the region having the second intensity. In some embodiments, the measurement range is modified by the alteration. In some embodiments, the measurement range comprises a vertical and/or horizontal measurement. In some embodiments, a resolution of a detection of the deviation is modified by the alteration. In some embodiments, to modify comprises an alteration of the first shape and/or of the second shape. In some embodiments, the measurement range is modified by the alteration of the first shape and/or of the second shape. In some embodiments, a resolution of a detection of the deviation is modified by the alteration of the first shape and/or of the second shape. In some embodiments, dynamically comprises during a detection of the deviation. In some embodiments, dynamically comprises between a first and a second detection of the deviation. In some embodiments, the detector is disposed at a position outside of the material bed. In some embodiments, the detector comprises an optical detector. In some embodiments, to detect is configured to capture an image by a plurality of sensors. In some embodiments, to detect is configured to capture an image by a camera. In some embodiments, the radiation source comprises a projector. In some embodiments, the radiation source comprises an additional energy beam. In some embodiments, the radiation source comprises a laser. In some embodiments, the radiation source is configured to generate the structured radiation in real time, during formation of the three-dimensional object. In some embodiments, the detectable image is a detectable pattern. In some embodiments, the pattern comprises oscillations in an intensity of the structured radiation. In some embodiments, the exposed surface comprises a kinematic support, or is operatively coupled to a kinematic support. In some embodiments, the evaluation comprises processing the detectable image captured by the detector to eliminate or average pixels in the detectable image captured by the detector, which pixels are attributed to an edge. In some embodiments, the edge is between the pre-transformed material to the transformed material. In some embodiments, the detector is configured to filter an edge feature in the detectable image. In some embodiments, the pre-transformed and/or transformed material comprises an elemental metal, metal alloy, ceramic, or an allotrope of elemental carbon.

In another aspect, a non-transitory computer-readable medium comprises machine-executable code, in which program instructions are stored, which instructions, when read by one or more computer processors, cause the one or more computer processors to perform operations for printing at least one three-dimensional object comprising: (a) receiving an input signal from a detector that corresponds to a detectable image from at least an exposed surface of a material bed by projection of a structured radiation onto the exposed surface of the material bed, wherein the non-transitory computer-readable medium is operatively coupled to the detector; and, (b) detecting any deviation within the detectable image, wherein the deviation is indicative of (i) a composition of at least a portion of the three-dimensional object that is printed in the material bed, (ii) a position of at least a portion of the three-dimensional object relative to a platform that supports the material bed, (iii) a shape of at least a portion of the three-dimensional object, (iv) an average planarity of the exposed surface, or (v) any combination of (i), (ii), (iii), and (iv).

In some embodiments, the pre-transformed material is at least 50 percent, or at least 80 percent diffusive relative to its total reflection. In some embodiments, the transformed material is at least 80 percent specular relative to its total reflection. In some embodiments, the non-transitory computer-readable medium further comprises instructions for directing an image modification process to form a modified image based on a captured image comprising the detectable image. In some embodiments, the image modification process comprises identifying a plurality of pixels in the captured image for modification. In some embodiments, identifying is based on a gradient of pixel data values of the captured image. In some embodiments, the plurality of pixels is identified by image pixels that have a gradient value at or above a threshold value. In some embodiments, the image modification process comprises filtering. In some embodiments, filtering comprises edge filtering. In some embodiments, edge filtering includes filtering by a Canny edge detector, a Prewitt operator, Sobel operator, Sobel-Feldman operator, Scharr operator, Log Gabor filter, or any combination thereof. In some embodiments, identifying the plurality of pixels comprises excluding the plurality of pixels from consideration during an image analysis of the captured image. In some embodiments, the identifying the plurality of pixels comprises averaging values of the plurality of pixels. In some embodiments, averaging the values of the plurality of pixels is with values of a neighboring plurality of pixels. In some embodiments, (b) comprises an image analysis. In some embodiments, the image analysis comprises determining an image contrast ratio. In some embodiments, the non-transitory computer-readable medium is operatively coupled to a radiation source configured to generate the structured radiation. In some embodiments, the program instructions cause the one or more computer processors to alter the structured radiation while considering the image contrast ratio. In some embodiments, the structured radiation comprises a region having a first intensity and a first shape and a region having a second intensity and a second shape, and wherein the first intensity is higher than the second intensity, which higher is detectable. In some embodiments, to alter comprises to modify the structured radiation dynamically. In some embodiments, to modify comprises an alteration of the first intensity and/or of the second intensity. In some embodiments, to modify comprises an alteration of the first shape and/or of the second shape. In some embodiments, the three-dimensional object is generated according to a computer model of a requested three-dimensional structure. In some embodiments, the computer model comprises a model of a physical process of three-dimensional printing the three-dimensional object. In some embodiments, the computer model estimates a physical parameter of the physical process of the three-dimensional printing. In some embodiments, the non-transitory computer-readable medium further comprises instructions to update the physical parameter while considering (v). In some embodiments, to update is in real time during printing of the at least one three-dimensional object. In some embodiments, to update is before and/or after the forming the at least one three-dimensional object. In some embodiments, the non-transitory computer-readable medium is operatively coupled with an energy source configured to generate an energy beam to transform a pre-transformed material to a transformed material as part of the at least one three-dimensional object. In some embodiments, operations further comprise adjusting (A) a power generated by the energy source, (B) at least one characteristic of the energy beam.

In another aspect, a method for detecting a three-dimensional object, comprises: (a) directing an energy beam to an exposed surface of a material bed comprising a pre-transformed material, the exposed surface having an average planarity and an average optical characteristic; (b) transforming the pre-transformed material to a transformed material as part of the three-dimensional object that (I) is disposed in the material bed, and (II) causes at least a portion of the exposed surface to deviate from the average planarity and/or the average optical characteristic; (c) projecting a detectable image on the exposed surface; and (d) detecting any deviation within the detectable image from the average planarity and/or from the average optical characteristic, which deviation is indicative of (i) a composition of at least a portion of the three-dimensional object, (ii) a position of at least a portion of the three-dimensional object relative to a platform supporting the material bed, (iii) a shape of at least a portion of the three-dimensional object, (iv) an average planarity of the exposed surface, or (v) any combination of (i), (ii), (iii), and (iv).

In some embodiments, the pre-transformed material is at least 50 percent, or at least 80 percent diffusive relative to its total reflection. In some embodiments, the transformed material is at least 80 percent specular relative to its total reflection. In some embodiments, detecting any deviation comprises capturing an image of the exposed surface. In some embodiments, detecting any deviation comprises performing an image modification process on the image that is captured. In some embodiments, the image modification process comprises identifying a plurality of pixels for modification. In some embodiments, identifying is based on a gradient of pixel data values of the image. In some embodiments, the plurality of pixels is identified by image pixels that have a gradient value at or above a threshold value. In some embodiments, the image modification process comprises filtering. In some embodiments, filtering comprises edge filtering. In some embodiments, edge filtering comprises filtering by a Canny edge detector, a Prewitt operator, Sobel operator, Sobel-Feldman operator, Scharr operator, Log Gabor filter, or any combination thereof. In some embodiments, identifying the plurality of pixels comprises excluding the plurality of pixels from consideration during an image analysis of the image that is captured. In some embodiments, the identifying the plurality of pixels comprises averaging values of the plurality of pixels with values of a neighboring plurality of pixels during an image analysis of the image that is captured. In some embodiments, detecting any deviation within the detectable image comprises performing an image analysis of at least a portion of the detectable image. In some embodiments, performing an image analysis of at least a portion of the detectable image comprises determining an image contrast ratio. In some embodiments, the method further comprises altering the detectable image based on the image contrast ratio. In some embodiments, the detectable image comprises a region having a first intensity and a first shape and a region having a second intensity and a second shape. In some embodiments, the first intensity is higher than the second intensity, which higher is detectable. In some embodiments, altering comprises modifying the detectable image dynamically. In some embodiments, modifying comprises altering the first intensity and/or of the second intensity. In some embodiments, modifying comprises altering the first shape and/or of the second shape. In some embodiments, the method further comprises altering an intensity of at least part of the detectable image. In some embodiments, altering at least part of the detectable image comprises filtering a radiation used in projecting the detectable image. In some embodiments, filtering comprises altering a polarity of the radiation used in projecting the detectable image. In some embodiments, altering the polarity comprises altering a linear polarization of the radiation used in the projecting the detectable image. In some embodiments, altering the polarity comprises altering a circular polarization of the radiation used in the projecting the detectable image. In some embodiments, the method further comprises generating the three-dimensional object according to a computer model of a desired three-dimensional structure. In some embodiments, the method further comprises modelling a physical process of three-dimensional printing the three-dimensional object. In some embodiments, the method further comprises estimating a physical parameter of the physical process of the three-dimensional printing. In some embodiments, the method further comprises updating the physical parameter based on (v). In some embodiments, the updating is in real time during formation of the three-dimensional object. In some embodiments, the updating is before and/or after the forming the at least one three-dimensional object. In some embodiments, the method further comprises adjusting (A) a power generated by an energy source, (B) a dwell time of the energy beam at or adjacent to the exposed surface, and/or (C) a speed of movement of the energy beam, based on considering the detecting any deviation. In some embodiments, altering at least part of the detectable image comprises filtering a radiation of the detectable image. In some embodiments, the method further comprises using a detector to detect any deviation within the detectable image, and wherein filtering comprises lowering a resolution of the detectable image detected by the detector. In some embodiments, the method further comprises using a detector to detect any deviation within the detectable image, and altering a focus of the detectable image detected by the detector to filter out an edge feature in the detectable image (e.g., using an optical detector, e.g., a camera). In some embodiments, the method further comprises using a detector to detect any deviation within the detectable image, and averaging at least part of the detectable image detected by the detector the detector.

In another aspect, an apparatus for printing of at least one three-dimensional object comprises: at least one controller that is programmed to (a) direct an energy source to generate an energy beam to irradiate a calibration structure and generate a returning radiation from the calibration structure, which calibration structure comprises an identifiable border, wherein the energy beam forms a footprint on the calibration structure, wherein the returning radiation is emanating from the footprint, which energy beam is configured to transform a pre-transformed material to a transformed material to print the three-dimensional object; (b) direct the energy beam to translate across the identifiable border; (c) direct a detector to detect the returning radiation from the calibration structure; (e) direct evaluation of a deviation between the returning radiation and a target returning radiation value; and (f) use the deviation to control at least one characteristic of the energy beam to transform the pre-transformed material to the transformed material to print the three-dimensional object.

In some embodiments, at least two of (a), (b), (c), (d), (e) and (f) are controlled by the same controller. In some embodiments, at least two of (a), (b), (c), (d), (e) and (f) are controlled by different controllers. In some embodiments, one or more of (a), (b), (c), (d), (e) and (f) are in real-time during the printing. In some embodiments, one or more of (a), (b), (c), (d), (e) and (f) is before the printing. In some embodiments, to direct in (c) comprises directing the energy beam from a first side of the identifiable border to a second side of the identifiable border. In some embodiments, the second side opposes the first side. In some embodiments, in (f) the at least one characteristic of the energy beam comprises (i) a center position of the footprint, (ii) a fundamental length scale of the footprint, (iii) a measure of a power density distribution within the footprint, (iv) a focal position of the footprint, (v) a velocity of the footprint, or (vi) a shape of the footprint. In some embodiments, the controller is operatively coupled to one or more of: the detector, an optical element configured for (b), and energy source. In some embodiments, the shape of the footprint comprises astigmatism. In some embodiments, the at least one controller is configured to direct, prior to (c), a cleaning process of at least one surface of the calibration structure. In some embodiments, the at least one surface of the calibration structure is at least partially coated by a coating material, the coating material comprising the pre-transformed material, an oxide, soot, or a combination thereof, and wherein the cleaning process is operable to substantially remove the coating material. In some embodiments, the at least one controller is configured to direct the energy beam over the at least one surface to ablate the coating material. In some embodiments, the at least one controller is configured to direct a gas flow from a gas source over the at least one surface to dislodge the coating material, the gas source disposed adjacent to the calibration structure. In some embodiments, the at least one controller is configured to direct a gas flow from a vacuum source over the at least one surface to dislodge the coating material, the vacuum source disposed adjacent to the calibration structure. In some embodiments, the at least one controller is configured to direct a movable member to move across the at least one surface to dislodge the coating material, the movable member comprising a translatable blade, a cylindrical wheel, or a combination thereof. In some embodiments, the at least one controller is configured to direct performing (e) by evaluating a deviation in an intensity of the returning radiation. In some embodiments, the deviation in intensity comprises a deviation in a slope of an intensity profile of the returning radiation from (c). In some embodiments, the deviation in the slope of the intensity profile comprises a deviation in a maximum value of the slope. In some embodiments, the identifiable border comprises an optically identifiable border. In some embodiments, the identifiable border comprises a width of at most 10 microns. In some embodiments, the calibration structure comprises a first area having a first optical characteristic and a second area having a second optical characteristic, which first area borders the second area in a defined border that is the identifiable border, which first optical characteristic is detectably different than the second optical characteristic. In some embodiments, detectably different comprises a differing reflective surface. In some embodiments, detectably different comprises a differing diffusive and/or dispersive surface. In some embodiments, one of the first area and the second area comprises a material having a high melting temperature. In some embodiments, the high melting temperature is above 2000 degrees Celsius. In some embodiments, the high melting temperature is above 3200 degrees Celsius. In some embodiments, the material comprises elemental metal, metal alloy, salt, oxide, ceramic, or an allotrope of elemental carbon. In some embodiments, one of the first area and the second area comprises tungsten. In some embodiments, another one of the first area and the second area comprises an oxide or ceramic. In some embodiments, another one of the first area and the second area comprises alumina. In some embodiments, an exposed surface of the first area differs from an exposed surface of the second area in terms of absorption the energy beam. In some embodiments, an exposed surface of the first area differs from an exposed surface of the second area in terms of dispersing the energy beam. In some embodiments, an exposed surface of the first area differs from an exposed surface of the second area in terms of diffusing the energy beam. In some embodiments, an exposed surface of the first area differs from an exposed surface of the second area in terms of reflecting the energy beam. In some embodiments, an exposed surface of the first area and/or an exposed surface of the second area comprises a stain. In some embodiments, the apparatus further comprises the at least one controller directing the energy beam to transform a portion of the pre-transformed material to form the calibration structure. In some embodiments, the portion of the pre-transformed material is transformed at a pre-determined location of a material bed disposed above a platform, the at least one controller operatively coupled with the platform, the material bed comprising the pre-transformed material. In some embodiments, the at least one controller causes at least one of the one or more optical elements of an optical arrangement to move to perform (c) and/or (f). In some embodiments, the at least one controller is configured to direct the returning radiation through a filter disposed along a radiation return path to the detector, which radiation return path is from the calibration structure to the detector. In some embodiments, the detector is disposed to have an indirect view of the returning radiation from the at least one calibration structure. In some embodiments, the at least one controller is configured to direct a calibration of the at least one characteristic of the energy beam by using a value of the returning radiation. In some embodiments, the at least one controller comprises a graphical processing unit (GPU), system-on-chip (SOC), application specific integrated circuit (ASIC), application specific instruction-set processor (ASIPs), programmable logic device (PLD), or field programmable gate array (FPGA). In some embodiments, the calibration structure is mounted on or comprises a stage configured for movement. In some embodiments, the at least one controller is configured to direct movement of the stage. In some embodiments, the stage comprises a kinematic support or is operatively coupled to a kinematic support. In some embodiments, the calibration structure comprises a kinematic support or is operatively coupled to a kinematic support. In some embodiments, the calibration structure is configured to accommodate at least a footprint of the energy beam on an exposed surface of the calibration structure. In some embodiments, the apparatus further comprises a converging lens that is configured to capture the returning radiation on its preparation to the detector. In some embodiments, the apparatus comprises a diffusive element configured to capture the returning radiation on its preparation to the detector. In some embodiments, the apparatus is configured to capture the returning radiation from multiple directions, e.g., by using a diffusing element (e.g., diffuser).

In some embodiments, the diffusing element is disposed in an optical path from the calibration structure to the detector.

In another aspect, a method of printing of a three-dimensional object, comprises: (a) directing an energy beam to irradiate a calibration structure to generate a returning radiation from the calibration structure that comprises an identifiable border, wherein the energy beam forms a footprint on the calibration structure, wherein the returning radiation is emanating from the footprint, which energy beam is transforming a pre-transformed material to a transformed material during the printing of the three-dimensional object; (b) translating the energy beam across the identifiable border; (c) detecting the returning radiation from the calibration structure during translation of the energy beam across the identifiable border; (d) evaluating a deviation between the returning radiation and a target returning radiation value; and (e) using the deviation to control at least one characteristic of the energy beam for the printing.

In some embodiments, translating comprises translating the energy beam from a first side of the identifiable border to a second side of the identifiable border. In some embodiments, the second side opposes the first side. In some embodiments, the method further comprises accommodating at least a footprint of the energy beam on an exposed surface of the calibration structure. In some embodiments, the at least one characteristic of the energy beam comprises (i) a center position of the footprint, (ii) a fundamental length scale of the footprint, (iii) a measure of a power density distribution within the footprint, (iv) a focal position of the footprint, (v) a velocity of the footprint, or (vi) a shape of the footprint. In some embodiments, the method further comprises performing a cleaning process of at least one surface of the calibration structure, prior to translating the beam across the identifiable border. In some embodiments, the at least one surface of the calibration structure is at least partially coated by a coating material, the coating material comprising the pre-transformed material, an oxide, soot, or a combination thereof, and wherein the cleaning process comprises substantially removing the coating material. In some embodiments, the method further comprises moving the energy beam over the at least one surface to ablate the coating material. In some embodiments, the method further comprises flowing a gas from a gas source over the at least one surface to dislodge the coating material. In some embodiments, the method further comprises suctioning over the at least one surface to dislodge the coating material. In some embodiments, the method further comprises moving a movable member across the at least one surface to dislodge the coating material, the movable member comprising a translatable blade, a cylindrical wheel, or a combination thereof. In some embodiments, the method further comprises evaluating a deviation in an intensity of the returning radiation. In some embodiments, the deviation in intensity comprises a deviation in a slope of an intensity profile of the returning radiation from translating the energy beam across the identifiable border. In some embodiments, the deviation in the slope of the intensity profile comprises a deviation in a maximum value of slope. In some embodiments, the method further comprises continuously detecting the returning radiation. In some embodiments, the method further comprises detecting the returning radiation at one or more time intervals. In some embodiments, the method further comprises detecting the returning radiation at predetermined times. In some embodiments, the identifiable border comprises an optically identifiable border. In some embodiments, the identifiable border comprises a width of at most 10 microns. In some embodiments, the calibration structure comprises a first area having a first optical characteristic and a second area having a second optical characteristic, which first area borders the second area in a defined border, which first optical characteristic is detectably different than the second optical characteristic. In some embodiments, detectably different comprises a differing reflective surface. In some embodiments, detectably different comprises a differing dispersive surface. In some embodiments, detectably different comprises a differing diffusive surface. In some embodiments, detectably different comprises a differing absorptive surface. In some embodiments, one of the first area and the second area comprises a material having a high melting temperature. In some embodiments, the high melting temperature is above 2000 degrees Celsius. In some embodiments, the high melting temperature is above 3200 degrees Celsius. In some embodiments, one of the first area and the second area comprises tungsten. In some embodiments, another one of the first area and the second area comprises an oxide. In some embodiments, another one of the first area and the second area comprises an elemental metal, a metal alloy, a ceramic, a salt, or an allotrope of elemental carbon. In some embodiments, another one of the first area and the second area comprises alumina. In some embodiments, one of the first area and the second area comprises an absorptive exposed surface. In some embodiments, one of the first area and the second area comprises a reflective exposed surface. In some embodiments, one of the first area and the second area comprises a dispersive exposed surface. In some embodiments, one of the first area and the second area comprises a diffusive exposed surface. In some embodiments, the method further comprises forming the calibration structure from the pre-transformed material. In some embodiments, the method further comprises forming the calibration structure from the pre-transformed material in a material bed. In some embodiments, the method further comprises filtering the returning radiation prior to the detecting. In some embodiments, the method further comprises directing a calibration of the at least one characteristic of the energy beam by using a value of the returning radiation. In some embodiments, the method further comprises capturing the returning radiation on its preparation to the detector by using at least one converging lens. In some embodiments, the method further comprises capturing the returning radiation on its preparation to the detector by using at least one diffusive element. In some embodiments, the method further comprises capturing the returning radiation from multiple directions, e.g., by using a diffusing element (e.g., diffuser). In some embodiments, the diffusing element is disposed in an optical path from the calibration structure to the detector. In some embodiments, the method further comprises capturing the returning radiation from multiple directions for detection in operation (c), which returning radiation is reflected from calibration structure.

In another aspect, an apparatus for forming a three-dimensional object, comprises: a target surface configured to support the three-dimensional object during the printing; an energy source configured to generate an energy beam, wherein the energy source is disposed adjacent to the target surface; and an optical arrangement comprising one or more optical elements, which optical arrangement is operatively coupled with the energy source and configured to direct the energy beam to irradiate a pre-transformed material at or adjacent to the target surface to form a transformed material as part of the three-dimensional object.

In some embodiments, the energy beam transforms a pre-transformed material to a transformed material to print the three-dimensional object. In some embodiments, the pre-transformed material comprises elemental metal, metal alloy, ceramic, or an allotrope of elemental carbon. In some embodiments, the one or more optical elements are configured to experience insignificant thermal lensing during formation of at least 1000 cubic centimeters of transformed material. In some embodiments, the insignificant thermal lensing comprises at least a 30 second irradiation of the energy beam through the one or more optical elements, with a power density of the energy beam (at a nominal power of the energy source) that diminishes by at most about 10 percent relative to the power density at a beginning of the 30 second irradiation, which energy density is measured at the target surface. In some embodiments, the energy beam is a laser. In some embodiments, the peak power density changes by at most 20 percent, or 10 percent. In some embodiments, the FLS of the spot size changes by at most 10%. The FLS of the spot size may comprise the diameter of the spot size. The FLS of the spot size (e.g., footprint) may be the full width at half maximum of the spot size diameter, or the diameter of about 90% of the energy irradiated to form the spot size. In some embodiments, the focal point of the one or more optical elements shifts by at most 10 mm, 1 mm or 0.2 mm, which shift is in the direction along the propagation direction of the energy beam (e.g., in a direction normal to the target surface). In some embodiments, a wave-front distortion of the energy beam at most: one tenth (1/10), one fourth (1/4) or one wavelength of the energy beam. In some embodiments, the energy beam has a selected focus. In some embodiments, an associated focal length of the one or more optical elements remains substantially constant during transformation of the pre-transformed material to the transformed material. In some embodiments, substantially constant comprises substantially free of a change in an associated index of refraction of the one or more optical elements. In some embodiments, the one or more optical elements comprise a low optical absorption coefficient. In some embodiments, the optical absorption coefficient is at most 250 parts per million (ppm) per centimeter at a wavelength of the energy beam. In some embodiments, the one or more optical elements comprise a low temperature coefficient of refractive index, at ambient pressure and at a wavelength of the energy beam, of at most 20*10-6/Kelvin. In some embodiments, the one or more optical elements comprises a Thermal Lensing Figure of Merits of at most $4*10^{-6}$ meters per Watts, at standard temperature and pressure, and at an operating wavelength of the energy beam. In some embodiments, substantially constant comprises at most a 10% change in an associated index of refraction of the one or more optical elements, with respect to the associated index of refraction at ambient pressure and temperature. In some embodiments, substantially constant comprises at most a 5% change in an associated index of refraction of the one or more optical elements, with respect to the associated index of refraction at ambient pressure and temperature. In some embodiments, substantially constant comprises at most a 2% change in an associated index of refraction of the one or more optical elements, with respect to the associated index of refraction at ambient pressure and temperature. In some embodiments, substantially constant during transformation comprises a throughput of the energy beam to form at least 1000 cubic centimeters (cm3) of transformed material. In some embodiments, substantially constant during transformation comprises a throughput of the energy beam to form at least about 50 cm3 and at most 1000 cm3 of transformed material. In some embodiments, substantially constant during transformation comprises a throughput of the energy beam to form at least 2000 cm3 of transformed material. In some embodiments, the energy source is operable to controllably generate the energy beam having an average power density of from 10000 Watts per square millimeter (W/mm2) (e.g., to 100000 Watts per square millimeter (W/mm2)) at the target surface. In some embodiments, substantially constant during transformation comprises directing the energy beam comprises energy of at least 3 kilowatt hours (kWh). In some embodiments, substantially constant during transformation comprises directing the energy beam having an energy of at least 0.5 kWh and at most 3 kWh. In some embodiments, substantially constant during transformation comprises a throughput of the energy beam comprising energy of at least 50 kWh. In some embodiments, the one or more optical elements comprises a lens, mirror, or a beam splitter. In some embodiments, the one or more optical elements is movable. In some embodiments, the optical arrangement comprises at least one high thermal conductivity optical element. In some embodiments, the at least one high thermal conductivity optical element comprises sapphire, crystal quartz, zinc selenide (ZnSe), magnesium fluoride ($MgF_2$), calcium fluoride ($CaF_2$), fused silica, borosilicate, silicon fluoride, or Pyrex®. In some embodiments, the at least one high thermal conductivity optical element comprises sapphire, zinc selenide (ZnSe), magnesium fluoride ($MgF_2$), calcium fluoride ($CaF_2$), or crystal quartz. In some embodiments, the at least one high thermal conductivity optical element comprises zinc selenide (ZnSe), or calcium fluoride ($CaF_2$). In some embodiments, the at least one high thermal conductivity optical element comprises sapphire, magnesium fluoride ($MgF_2$), or crystal quartz. In some embodiments, the at least one high thermal conductivity optical element comprises a birefringent material. In some embodiments, the one or more optical elements are disposed in an optical chamber configured to facilitate separation of the energy beam from an environment external to the optical chamber. In some embodiments, the optical chamber is configured to be maintained at a positive pressure with respect to atmospheric pressure. In some embodiments, the optical chamber is substantially sealed to prevent introduction of gases from an exterior of the optical chamber. In some embodiments, the optical chamber comprises one or more filters configured to filter an inlet and/or an outlet gas composition. In some embodiments, the apparatus further comprises one or more enclosure channels disposed to encompass an optical path comprising a portion in which the energy beam is introduced into the optical chamber, the one or more optical elements of the optical arrangement, and a portion out of which the energy beam exits the optical chamber. In some embodiments, the one or more enclosure channels are covered channels that are configured to enclose a positive pressure with respect to an ambient atmosphere. In some embodiments, the one or more enclosure channels are covered, and wherein the one or more enclosure channels comprise one or more openings configured to permit a gas flow from an interior of the one or more enclosure channels to an exterior of the one or more enclosure channels. In some embodiments, the one or more enclosure channels are covered. In some embodiments, the one or more enclosure channels comprise one or more segments joined together by at least one leaky seal, which leaky seal is configured to permit a gas flow from an interior of the one or more enclosure channels to an exterior of the one or more enclosure channels. In some embodiments, the one or more enclosure channels are one or more tubes. In some embodiments, the apparatus further comprises a detector. In some embodiments, the detector is configured to detect a temperature of a position of (a) a footprint of the energy beam on the pre-transformed material and/or the target surface, and/or a (b) vicinity of (a). In some embodiments, the vicinity of (a) extends to at most six fundamental length scales of the footprint of the energy beam in (a). In some embodiments, the detector is configured for indirect view of the target surface. In some embodiments, the detector is configured to output a result, and at least one controller is configured to direct adjusting at least one characteristic of the energy source and/or energy beam considering the result. In some embodiments, the apparatus further comprises the at least one controller operationally coupled with one or more sensors, which at least one controller is configured to direct the one or more sensors to detect a presence of a contaminant, the one or more sensors disposed at or adjacent to the target surface and/or the one or more optical elements of the optical arrangement. In some embodiments, the one or more sensors are configured to detect a presence of a contaminant comprising a hydrocarbon, a silicon-based compound, an oxide, a threshold humidity value, pre-transformed material, soot, or a combination thereof. In some embodiments, the one or more sensors are configured to detect a presence of a contaminant along an optical path of the energy beam. In some embodiments, the one or more sensors are configured to detect a presence of a contaminant along the optical arrangement. In some embodiments, the apparatus further comprises a processing chamber comprising the target surface. In some embodiments, the one or more sensors are configured to detect a presence of a contaminant. In some embodiments, the one or more sensors comprise an optical sensor, or a material sensor. In some embodiments, the optical sensor comprises an optical density sensor or an IR/visible light spectroscopy sensor. In some embodiments, the material sensor comprises a humidity, oxygen, hydrocarbon, silicon sensor, a metal sensor, or a debris sensor. In some embodiments, the material sensor comprises a sensor configured to sense oil. In some embodiments, the material sensor comprises a sensor configured to sense the pre-transformed material. In some embodiments, the apparatus further comprises a processing chamber in which the target surface is disposed, which processing chamber is operatively coupled to a gas flow system configured to generate a gas flow through the processing chamber to reduce a presence of a contaminant. In some embodiments, the one or more optical elements comprises an optical window disposed between a remaining set of the one or more optical elements and the processing chamber. In some embodiments, the gas flow is operable to reduce an amount of the contaminant within the processing chamber. In some embodiments, to reduce is with respect to a lack of the gas flow. In some embodiments, the gas flow is operable to reduce an amount of the contaminant at a surface of the optical window. In some embodiments, to reduce is with respect to a lack of the gas flow. In some embodiments, the gas flow is configured to be directed away from the surface of the optical window, which surface of the optical window faces the processing chamber. In some embodiments, the gas flow comprises an ionized gas directed toward at least one of the one or more optical elements, which ionized gas is configured to ionize a surface of the at least one or more optical elements, the contaminant, or a combination thereof. In some embodiments, an ultrasonic transducer is operatively coupled with at least one of the one or more optical elements, which ultrasonic transducer is configured to vibrate the at least one of the one or more optical elements to reduce an amount of a contaminant at a surface of the at least one of the one or more optical elements. In some embodiments, to reduce is with respect to a lack of vibration.

In some embodiments, the apparatus further comprises a calibration structure configured for calibration of the energy beam, which calibration structure is mounted on or comprises a stage disposed within the processing chamber and configured for movement. In some embodiments, the stage comprises a kinematic support.

In another aspect, an apparatus for printing a three-dimensional object comprises at least one controller that is operatively coupled to one or more of: a target surface configured to support the three-dimensional object, an energy source configured to generate an energy beam to transform a pre-transformed material to a transformed material to print the three-dimensional object, and at least one optical element of an optical arrangement, which at least one controller is programmed to: (a) direct the energy source to generate the energy beam; and (b) direct the energy beam through an optical path towards the target surface.

In some embodiments, the one or more optical elements are configured to experience insignificant thermal lensing during formation of at least 1000 cubic centimeters of transformed material. In some embodiments, the insignificant thermal lensing comprises at least a 30 second irradiation of the energy beam through the one or more optical elements, with a power density of the energy beam at a nominal power, which power density diminishes by at most about 10 percent relative to the power density at a beginning of the 30 second irradiation. In some embodiments, the energy density is measured at the target surface. In some embodiments, the peak power density changes by at most 20 percent, or 10 percent. In some embodiments, the FLS of the spot size changes by at most 10%. The FLS of the spot size may comprise the diameter of the spot size. The FLS of the spot size (e.g., footprint) may be the full width at half maximum of the spot size diameter, or the diameter of about 90% of the energy irradiated to form the spot size. In some embodiments, the focal point of the one or more optical elements shifts by at most 10 mm, 1 mm or 0.2 mm, which shift is in the direction along the propagation direction of the energy beam (e.g., in a direction normal to the target surface). In some embodiments, a wave-front distortion of the energy beam at most: one tenth (1/10), one fourth (1/4) or one wavelength of the energy beam. In some embodiments, an associated focal length of the at least one optical element with respect to the target surface remains substantially constant during transformation of the pre-transformed material to the transformed material. In some embodiments, wherein the at least one optical element alters a focus of the energy beam to have an altered focus. In some embodiments, the energy beam in (b) comprises an adjusted beam spot size defined by an intersection of the energy beam with the target surface, which adjusted beam spot size comprises an associated area. In some embodiments, remains substantially constant comprises the associated area of the adjusted beam spot size varying by at most 10% during transformation of the pre-transformed material to the transformed material at the altered focus. In some embodiments, remains substantially constant comprises the associated area of the adjusted beam spot size varying by at most 5% during transformation of the pre-transformed material to the transformed material at the altered focus. In some embodiments, remains substantially constant comprises the associated area of the adjusted beam spot size varying by at most 2% during transformation of the pre-transformed material to the transformed material at the altered focus. In some embodiments, remains substantially constant during transformation comprises the at least one controller directing to the energy beam to form at least 1000 cubic centimeters (cm3) of transformed material. In some embodiments, remains substantially constant during transformation comprises the at least one controller directing the energy beam to form at least 50 cm3 at most 1000 cm3 of transformed material. In some embodiments, remains substantially constant during transformation comprises the at least one controller directing the energy beam to form at least 2000 cm3 of transformed material. In some embodiments, in (a) the at least one controller directs the energy beam to comprise an average power density of from at least 10000 Watts per square millimeter (e.g., to at most 100000 Watts per square millimeter (W/mm2)), at the target surface. In some embodiments, remains substantially constant during transformation comprises the at least one controller directing the energy beam comprising an energy of at least 3 kilowatt hours (kWh). In some embodiments, remains substantially constant during transformation comprises the at least one controller directing the energy beam comprising an energy of at least 50 kWh. In some embodiments, the apparatus further comprises an optical chamber configured to separate a portion of an optical path from an environment external to the optical chamber. In some embodiments, the at least one controller is operatively coupled to the optical chamber. In some embodiments, the at least one controller is configured to maintain the optical chamber at a positive pressure with respect to an ambient pressure. In some embodiments, the at least one controller is configured to substantially seal the optical chamber to prevent introduction of gases and/or debris from an exterior of the optical chamber. In some embodiments, the apparatus further comprises a gas inlet and/or a gas outlet operatively coupled to the optical chamber, and a filter operatively coupled to the gas inlet and/or gas outlet, which filter is configured to filter a gas composition of the optical chamber. In some embodiments, the at least one controller is operatively coupled with one or more of the filter, gas inlet, and gas outlet. In some embodiments, the apparatus further comprises one or more enclosure channels configured to encompass the optical path that comprises a portion in which the energy beam is introduced into the optical chamber, the at least one optical element, and a portion out of which the energy beam exits the optical chamber. In some embodiments, the at least one controller is configured to maintain a positive pressure in the one or more enclosure channels with respect to an ambient atmosphere in a remainder of the optical chamber. In some embodiments, the at least one controller is configured to flow a gas from an interior of the one or more enclosure channels to an exterior of the one or more enclosure channels via one or more openings in the one or more enclosure channels. In some embodiments, the at least one controller is configured to flow a gas from an interior of the one or more enclosure channels to an exterior of the one or more enclosure channels via one or more segments joined together by at least one leaky seal. In some embodiments, the at least one controller is configured to flow a gas from an interior of the one or more enclosure channels to an exterior of the one or more enclosure channels via one or more segments thereof that are joined together by at least one leaky seal. In some embodiments, the apparatus further comprises one or more sensors, which at least one controller is configured to direct the one or more sensors to detect a presence of a contaminant at or adjacent to (i) the target surface and/or (ii) the at least one optical element. In some embodiments, the at least one controller is operatively coupled with the one or more sensors. In some embodiments, the one or more sensors are configured to detect a presence of a contaminant comprising a hydrocarbon, a silicon-based compound, an oxide, a threshold humidity value, pre-transformed material, soot, or a combination thereof. In some embodiments, the one or more sensors are configured to detect a presence of a contaminant along an optical path of the energy beam. In some embodiments, the one or more sensors are configured to detect a presence of a contaminant along the optical arrangement. In some embodiments, the one or more sensors comprise an optical sensor, or a material sensor. In some embodiments, the optical sensor comprises an optical density sensor or an IR/visible light spectroscopy sensor. In some embodiments, the material sensor comprises a humidity, oxygen, hydrocarbon, silicon sensor, a metal sensor, or a debris sensor. In some embodiments, the material sensor comprises a sensor configured to sense oil. In some embodiments, the material sensor comprises a sensor configured to sense the pre-transformed material. In some embodiments, the apparatus further comprises a processing chamber comprising the target surface. In some embodiments, the one or more sensors are configured to detect a presence of a contaminant. In some embodiments, the at least one controller is configured to direct a cleaning process based on a detection of the one or more sensors. In some embodiments, the cleaning process comprises the at least one controller configured to flow a gas to reduce an amount of the contaminant within a processing chamber that comprises the target surface. In some embodiments, to reduce is with respect to a lack of flowing the gas. In some embodiments, the apparatus further comprises a calibration structure configured for calibration of the energy beam, which calibration structure is mounted on or comprises a stage disposed within the processing chamber and configured for movement. In some embodiments, the at least one controller is configured to direct movement of the stage. In some embodiments, the stage comprises a kinematic support. In some embodiments, the cleaning process comprises the at least one controller configured to flow a gas to reduce an amount of the contaminant at a surface of an optical window, which optical window is an optical element of the at least one optical element. In some embodiments, to reduce is with respect to a lack of flowing the gas. In some embodiments, the at least one controller is configured to direct the gas away from the surface of the optical window. In some embodiments, the cleaning process comprises the at least one controller configured to direct an ionized gas toward the at least one optical element, which ionized gas is operable to ionize a surface of the at least one optical element, the contaminant, or a combination thereof. In some embodiments, the cleaning process comprises the at least one controller configured to cause an ultrasonic transducer to vibrate the at least one optical element to reduce an amount of the contaminant at a surface of the at least one optical element. In some embodiments, to reduce is with respect to a lack of vibration.

In another aspect, a method for printing a three-dimensional object, comprises: (a) directing an energy beam through an optical path towards a target surface, which optical path comprises one or more optical elements; and (b) transforming a pre-transformed material to a transformed material to print the three-dimensional object.

In some embodiments, the method further comprises using an energy source to generate the energy beam directed towards the target surface, which energy source has a nominal power. In some embodiments, the one or more optical elements are configured to experience insignificant thermal lensing during formation of at least 1000 cubic centimeters of transformed material. In some embodiments, the insignificant thermal lensing comprises at least a 30 second irradiation of the energy beam through the one or more optical elements, with a power density of the energy beam at the nominal power that diminishes by at most about 10 percent relative to the power density at a beginning of the 30 second irradiation. In some embodiments, the energy density is measured at the target surface. In some embodiments, the energy beam is directed through an optical path to alter a focus of the energy beam to have an altered focus. In some embodiments, the peak power density changes by at most 20 percent, or 10 percent. In some embodiments, the FLS of the spot size changes by at most 10%. The FLS of the spot size may comprise the diameter of the spot size. The FLS of the spot size (e.g., footprint) may be the full width at half maximum of the spot size diameter, or the diameter of about 90% of the energy irradiated to form the spot size. In some embodiments, the focal point of the one or more optical elements shifts by at most 10 mm, 1 mm or 0.2 mm, which shift is in the direction along the propagation direction of the energy beam (e.g., in a direction normal to the target surface). In some embodiments, a wave-front distortion of the energy beam at most: one tenth (1/10), one fourth (1/4) or one wavelength of the energy beam. In some embodiments, the one or more optical elements have an associated focal length with respect to the target surface (e.g., a position at a target surface). In some embodiments, the associated focal length of the one or more optical elements (e.g., at the position) remains substantially constant during transformation of the pre-transformed material to the transformed material. In some embodiments, the energy beam comprises an adjusted beam spot size defined by an intersection of the energy beam with the target surface, which adjusted beam spot size comprises an associated area. In some embodiments, remains substantially constant comprises the associated area of the adjusted beam spot size varying by at most 10% during transformation of the pre-transformed material to the transformed material at the altered focus. In some embodiments, remains substantially constant comprises the associated area of the adjusted beam spot size varying by at most 5% during transformation of the pre-transformed material to the transformed material at the altered focus. In some embodiments, remains substantially constant comprises the associated area of the adjusted beam spot size varying by at most 2% during transformation of the pre-transformed material to the transformed material at the altered focus. In some embodiments, remains substantially constant during transformation comprises directing to the energy beam to form at least 225 cubic centimeters ($cm^3$) of transformed material. In some embodiments, remains substantially constant during transformation comprises directing the energy beam to form at least 2000 $cm^3$ of transformed material. In some embodiments, the energy beam comprises an average power density of at least 10000 Watts per square millimeter ($W/mm^2$). In some embodiments, remains substantially constant during transformation comprises directing the energy beam comprising energy of at least 3 kilowatt hours (kWh). In some embodiments, remains substantially constant during transformation comprises a throughput of the energy beam comprising energy of at least 50 kWh. In some embodiments, the method further comprises separating a portion of the optical path from an environment external to an optical chamber that comprises the portion of the optical path. In some embodiments, the method further comprises maintaining the optical chamber at a positive pressure with respect to an ambient pressure. In some embodiments, above ambient pressure is at least about 0.5 pounds per square inch (PSI) above ambient pressure. In some embodiments, the method further comprises substantially sealing the optical chamber to reduce introduction of gases from an exterior of the optical chamber. In some embodiments, the method further comprises filtering an inlet and/or outlet gas composition. In some embodiments, the method further comprises encompassing the optical path in one or more enclosure channels, the optical path comprising a portion in which the energy beam is introduced into the optical chamber, the one or more optical elements, and a portion out of which the energy beam exits the optical chamber. In some embodiments, the method further comprises maintaining a positive pressure in the enclosure channels with respect to an ambient atmosphere in a remainder of the optical chamber. In some embodiments, the method further comprises flowing a gas from an interior of the one or more enclosure channels to an exterior of the one or more enclosure channels via one or more openings. In some embodiments, the method further comprises flowing a gas from an interior of the one or more enclosure channels to an exterior of the one or more enclosure channels via one or more segments thereof that are joined together by at least one leaky seal. In some embodiments, the method further comprises detecting a presence of a contaminant at or adjacent to (i) the target surface and/or (ii) the one or more optical elements. In some embodiments, the contaminant comprises a hydrocarbon, a silicon-based compound, an oxide, a threshold humidity value, pre-transformed material, soot, or a combination thereof. In some embodiments, the method further comprises performing a cleaning process based on the detecting. In some embodiments, the cleaning process comprises flowing a gas for reducing an amount of the contaminant within a processing chamber that comprises the target surface, which reducing is with respect to a lack of flowing the gas. In some embodiments, the cleaning process comprises flowing a gas for reducing an amount of the contaminant at a surface of an optical window, which optical window is an optical element of the one or more optical elements, which reducing is with respect to a lack of flowing the gas. In some embodiments, flowing the gas comprises directing the gas toward the surface of the optical window. In some embodiments, the cleaning process comprises directing an ionized gas toward at least one of the one or more optical elements, which ionized gas ionizes a surface of the at least one or more optical elements, the contaminant, or a combination thereof. In some embodiments, the cleaning process comprises vibrating the at least one of the one or more optical elements to reduce an amount of the contaminant at a surface of the at least one of the one or more optical elements. In some embodiments, to reduce is with respect to a lack of vibration.

In another aspect, an apparatus for printing at least one three-dimensional object, comprises at least one controller that is programmed to: (a) direct an energy source to generate an energy beam to a test calibration structure through an optical arrangement comprises one or more optical elements, which energy beam is configured to transform a pre-transformed material to a transformed material for printing the at least one three-dimensional object in an enclosure, which optical arrangement is configured to provide a requested footprint of the energy beam at least on an exposed surface of the test calibration structure, which test calibration structure is disposed in the enclosure, wherein the at least one controller is operatively coupled to the energy source and to the optical arrangement; (b) direct a detector to detect a returning radiation from the test calibration structure and generate an associated test signal; and (c) direct evaluation of a thermal lensing of the optical arrangement using the associated test signal.

In some embodiments, the evaluation considers a deviation between the associated test signal and an associated benchmark signal. In some embodiments, the associated benchmark signal is of a returning benchmark radiation from the test calibration structure or from a different calibration structure (e.g., having the same optical characteristic as the test calibration structure). In some embodiments, the test calibration structure or the different calibration structure comprises a benchmark calibration structure (e.g., that is at or above an ambient temperature). In some embodiments, the optical arrangement is at and/or above an ambient temperature during a generation of the benchmark returning radiation. In some embodiments, the optical arrangement is at or above an ambient pressure during a generation of the returning benchmark radiation. In some embodiments, the optical arrangement is in non-thermal lensing conditions and/or varying thermal lensing conditions during a generation of a returning benchmark radiation. In some embodiments, the at least one controller is configured to direct varying the thermal lensing conditions. In some embodiments, the at least one controller is configured to direct an energy beam to irradiate a heat sink through the optical arrangement to induce a variation in a thermal condition of the optical arrangement. In some embodiments, the at least one controller is configured to control a throughput of the energy beam for irradiating the heat sink through the optical arrangement. In some embodiments, the at least one controller is configured to control a temperature of at least one optical element of the optical arrangement resulting from the variation in the thermal condition. In some embodiments, the at least one controller is configured to direct the energy beam that is configured to transform the pre-transformed material to the transformed material for irradiating energy through the optical arrangement. In some embodiments, the at least one controller is configured to direct a different energy beam for irradiating energy through the optical arrangement. In some embodiments, the heat sink comprises the test calibration structure, a benchmark calibrations structure, or a different structure. In some embodiments, the heat sink is disposed adjacent to the test calibrations structure. In some embodiments, the heat sink is disposed adjacent to a platform that is configured to support the three-dimensional object during the printing. In some embodiments, adjacent is above and/or laterally adjacent. In some embodiments, the heat sink comprises a material having a high melting temperature. In some embodiments, the high melting temperature is above 2000 degrees Celsius. In some embodiments, the at least one controller is further programmed to direct formation of a benchmark calibration structure from a transformation of a portion of the pre-transformed material. In some embodiments, the portion of the pre-transformed material is transformed at a location of a material bed disposed above a platform, the at least one controller operatively coupled with the platform. In some embodiments, the benchmark calibration structure is printed in real time during printing of the three-dimensional object. In some embodiments, one or more of (a), (b), and (c) occur in real time during the printing of the three-dimensional object. In some embodiments, real time comprises during printing of the three-dimensional object, during printing a plurality of layers as part of the three-dimensional object, or during printing of a layer of a three-dimensional object. In some embodiments, an associated benchmark signal comprises a correlation between a set of requested footprints on a benchmark calibration structure and an associated set of benchmark signals generated from respective returning radiations from the benchmark calibration structure, at (i) a given energy throughput through the optical arrangement and/or (ii) a given focal setup of the optical arrangement. In some embodiments, the associated test signal comprises a correlation between (I) an energy throughput that is emitted through the optical arrangement by the energy beam at a focal setting and (II) the associated test signal that is generated from the returning radiation from the test calibration structure. In some embodiments, an estimated footprint of the energy beam is determined while considering a deviation between the associated test signal and the associated benchmark signal. In some embodiments, the evaluation considers a deviation between the associated test signal and the associated benchmark signal. In some embodiments, the at least one controller is further programmed to control the focal setup of the optical arrangement while considering a result of the evaluation. In some embodiments, the at least one controller is further programmed to control at least one characteristic of the energy beam considering a result of the evaluation. In some embodiments, the at least one characteristic of the energy beam comprises (i) a center position of the requested footprint, (ii) a fundamental length scale of the requested footprint, (iii) a measure of a power density distribution in the requested footprint, (iv) an average power density in the requested footprint, or (iv) a focal position of the requested footprint. In some embodiments, the at least one controller is programmed to control the at least one characteristic of the energy beam when the result of the evaluation comprises a threshold of the thermal lensing being detected. In some embodiments, the threshold is a threshold value or a threshold range. In some embodiments, the threshold of the thermal lensing comprises a threshold variation in the estimated footprint from the requested footprint. In some embodiments, the threshold comprises a change in the fundamental length scale of the requested footprint of 10% or less. In some embodiments, the threshold comprises a change in the measure of the power density distribution in the requested footprint of 20% or less. In some embodiments, the threshold comprises a change in the average power density in the requested footprint of 20% or less. In some embodiments, the threshold comprises a change in the focal position of the requested footprint of 10 millimeters or less, which change is in an energy beam propagation direction that is normal to a plane of the test calibration structure. In some embodiments, the threshold comprises a wave-front distortion of 25% or less of an energy beam wavelength. In some embodiments, the at least one controller is configured to direct (e.g., prior to (b)) a cleaning process of at least one surface of the test calibration structure. In some embodiments, the at least one surface of the test calibration structure is at least partially coated by a coating material, the coating material comprising the pre-transformed material, an oxide, soot, or a combination thereof, and wherein the cleaning process is operable to substantially remove the coating material. In some embodiments, the at least one controller is configured to direct the energy beam over the at least one surface to ablate the coating material. In some embodiments, the at least one controller is configured to direct a gas flow from a gas source over the at least one surface to dislodge the coating material, the gas source disposed adjacent to the test calibration structure. In some embodiments, the at least one controller is configured to direct a gas flow from a vacuum source over the at least one surface to dislodge the coating material, the vacuum source disposed adjacent to the test calibration structure. In some embodiments, the at least one controller is configured to direct a movable member to move across the at least one surface to dislodge the coating material, the movable member comprising a blade, or a roller. In some embodiments, the detector comprises a bore-sight view of the test calibration structure, which bore-sight view comprises a shared portion of an energy beam optical path. In some embodiments, the detector comprises a non-direct view of the test calibration structure. In some embodiments, the detector is configured to detect a temperature of the requested footprint of the energy beam on the test calibration structure, and/or a vicinity thereof. In some embodiments, the detector is configured to detect the temperature indirectly. In some embodiments, the detector is configured to detect the temperature indirectly using spectroscopy, photon count, and/or current measurement. In some embodiments, the vicinity extends to at most six fundamental length scales of the requested footprint of the energy beam. In some embodiments, the test calibration structure is mounted on or comprises a stage configured for movement. In some embodiments, the at least one controller is configured to direct movement of the stage. In some embodiments, the stage comprises a kinematic support or is operatively coupled to a kinematic support. In some embodiments, the test calibration structure is operatively coupled to a kinematic support. In some embodiments, the one or more optical elements comprises a high thermal conductivity optical element. In some embodiments, the one or more optical elements comprises sapphire, crystal quartz, Zinc sulfide (ZnS), zinc selenide (ZnSe), magnesium fluoride ($MgF_2$), calcium fluoride ($CaF_2$), fused silica, borosilicate, silicon fluoride, or Pyrex®. In some embodiments, at least two of (a), (b), and (c) are controlled by the same controller. In some embodiments, at least two of (a), (b), and (c) are controlled by different controllers. In some embodiments, one or more of (a), (b), and (c) are in real-time during the printing. In some embodiments, one or more of (a), (b), and (c) is before the printing. In some embodiments, the apparatus further comprises a platform configured to support the three-dimensional object during the printing. In some embodiments, the test calibration structure is disposed adjacent to the platform. In some embodiments, adjacent is laterally adjacent to the platform.

In another aspect, a method of printing of at least one three-dimensional object, comprises: (a) directing an energy beam to a test calibration structure through an optical arrangement comprises one or more optical elements, which energy beam is configured to transform a pre-transformed material to a transformed material for printing the at least one three-dimensional object in an enclosure, which optical arrangement is configured to provide a requested footprint of the energy beam at least on an exposed surface of the test calibration structure, which test calibration structure is disposed in the enclosure; (b) detecting a returning radiation from the test calibration structure and generating an associated test signal; and (c) evaluating a thermal lensing of the optical arrangement using the associated test signal.

In some embodiments, the method further comprises maintaining a pressure at or above ambient pressure. In some embodiments, evaluating the thermal lensing further comprises considering a deviation between the associated test signal and an associated benchmark signal of a benchmark returning radiation from the test calibration structure or a different calibration structure. In some embodiments, the test calibration structure or the different calibration structure comprises a benchmark calibration structure. In some embodiments, the optical arrangement is at or above an ambient temperature while generating the benchmark returning radiation. In some embodiments, the optical arrangement is at or above an ambient pressure while generating the benchmark returning radiation. In some embodiments, the optical arrangement is at non-thermal lensing conditions or at various thermal lensing conditions of the optical arrangement while generating the benchmark returning radiation (e.g., which various thermal lensing conditions are known and/or controlled). In some embodiments, the method further comprises varying a thermal condition of the optical arrangement by irradiating a heat sink. In some embodiments, the method further comprises controlling the irradiating the heat sink through the optical arrangement. In some embodiments, controlling comprises controlling a throughput of an energy irradiating through the optical arrangement and/or controlling a temperature of the one or more optical elements of the optical arrangement. In some embodiments, the irradiating is using the energy beam. In some embodiments, the heat sink comprises the test calibration structure, the benchmark calibration structure, or a different structure. In some embodiments, the heat sink is disposed adjacent to the test calibration structure. In some embodiments, the heat sink comprises a material having a high melting temperature. In some embodiments, the high melting temperature is above 2000 degrees Celsius. In some embodiments, the test calibration structure comprises a benchmark calibration structure (e.g., that is at an ambient temperature). In some embodiments, the at least one three-dimensional object is printed above a platform, and wherein the test calibration structure is disposed adjacent to the platform. In some embodiments, adjacent comprises laterally adjacent to the platform. In some embodiments, adjacent comprises above the platform. In some embodiments, the method further comprises forming the benchmark calibration structure by transforming a portion of the pre-transformed material. In some embodiments, transforming the portion of the pre-transformed material is in a material bed that comprises the pre-transformed material. In some embodiments, forming the test calibration structure and/or the benchmark calibration structure is performed in real time during the printing. In some embodiments, in real time comprises during printing of the three-dimensional object, during printing a plurality of layers as part of the three-dimensional object, or during printing of a layer of a three-dimensional object. In some embodiments, the associated benchmark signal comprises correlating the requested footprint on the benchmark calibration structure with the associated test signal generated from a returning benchmark radiation from the benchmark calibration structure. In some embodiments, correlating comprises a set of requested footprints on the benchmark calibration structure and an associated set of associated benchmark signals generated from respective returning benchmark radiations from the benchmark calibration structure. In some embodiments, the method further comprises determining an estimated footprint of the energy beam while considering the deviation between the associated test signal and the associated benchmark signal. In some embodiments, the method further comprises controlling at least one characteristic of the energy beam considering a result of evaluating the thermal lensing of the optical arrangement. In some embodiments, the at least one characteristic of the energy beam comprises (i) a center position of the requested footprint, (ii) a fundamental length scale of the requested footprint, (iii) a measure of a power density distribution in the requested footprint, (iv) a measure of an average power density in the requested footprint, or (iv) a focal position of the requested footprint. In some embodiments, the method further comprises controlling the at least one characteristic of the energy beam when the result of evaluating the thermal lensing of the optical arrangement comprises a threshold of the thermal lensing being detected. In some embodiments, the threshold is a threshold value or a threshold range. In some embodiments, the threshold of the thermal lensing comprises a threshold variation in the estimated footprint from the requested footprint. In some embodiments, the threshold comprises a change in (ii) of 10% or less. In some embodiments, the threshold comprises a change in (iii) of 20% or less. In some embodiments, the threshold comprises a change in (iv) of 10 millimeters or less, which change is in an energy beam propagation direction that is normal to a plane of the test calibration structure. In some embodiments, the threshold comprises a wave-front distortion of 25% or less of an energy beam wavelength. In some embodiments, the method further comprises directing a cleaning process of at least one surface of the benchmark calibration structure. In some embodiments, the cleaning is prior to directing the energy beam to the test calibration structure, and/or prior to detecting the returning radiation from the test calibration structure. In some embodiments, the at least one surface of the benchmark calibration structure is at least partially coated by a coating material, the coating material comprising the pre-transformed material, an oxide, soot, or a combination thereof, and wherein the cleaning process is operable to substantially remove the coating material. In some embodiments, the method further comprises directing the energy beam over the at least one surface to ablate the coating material. In some embodiments, the method further comprises directing a gas flow from a gas source over the at least one surface to dislodge the coating material, the gas source disposed adjacent to the benchmark calibration structure. In some embodiments, the method further comprises directing a gas flow from a vacuum source over the at least one surface to dislodge the coating material, the vacuum source disposed adjacent to the benchmark calibration structure. In some embodiments, the method further comprises directing a movable member to move across the at least one surface to dislodge the coating material, the movable member comprising a translatable blade, a cylindrical wheel, or a combination thereof. In some embodiments, detecting the returning radiation comprises using a bore-sight view of the test calibration structure, which bore-sight view comprises a shared portion of an energy beam optical path. In some embodiments, detecting the returning radiation comprises a non-direct view of the test calibration structure. In some embodiments, detecting the returning radiation detects a temperature of the requested footprint of the energy beam on the test calibration structure, and/or a vicinity thereof. In some embodiments, the vicinity extends to at most six fundamental length scales of the requested footprint of the energy beam on the test calibration structure. In some embodiments, the test calibration structure comprises kinematic mounting. In some embodiments, the one or more optical elements comprises a high thermal conductivity optical element. In some embodiments, the one or more optical elements comprises sapphire, crystal quartz, zinc selenide (ZnSe), zinc sulfide (ZnS), magnesium fluoride ($MgF_2$), calcium fluoride ($CaF_2$), fused silica, borosilicate, silicon fluoride, or Pyrex®. In some embodiments, one or more of (a), (b), and (c) are in real-time during the printing. In some embodiments, one or more of (a), (b), and (c) is before the printing.

In another aspect, an apparatus for printing of at least one three-dimensional object comprises: at least one controller that is operatively coupled to one or more of: (i) an energy source configured to generate an energy beam that transforms at least a portion of a material bed to print the three-dimensional object, which material bed has an exposed surface that has a roughness; and (ii) a detector configured to detect a reflected radiation from the exposed surface; which at least one controller is programmed to: (a) direct the energy source to generate the energy beam to irradiate at least a portion of the exposed surface and to form a footprint on the exposed surface, which footprint emits the reflected radiation from the exposed surface; (b) direct the detector to detect the reflected radiation and generate an associated signal; and (c) direct a signal analysis of the associated signal to determine an exposed surface signal component, which signal analysis comprises an optical variability of the associated signal from the reflected radiation.

In some embodiments, the optical variability comprises a spatial frequency variability. In some embodiments, the optical variability comprises a variability span. In some embodiments, the signal analysis comprises using an optical transfer function. In some embodiments, the signal analysis comprises using a modulation transfer function. In some embodiments, the at least one controller is configured to direct translation of the energy beam along the exposed surface, and direct a field of view of the detector to synchronize with a translation of the energy beam along the exposed surface. In some embodiments, the at least one controller is configured to direct a translation of the energy beam along the exposed surface. In some embodiments, the associated signal is correlated with the translation. In some embodiments, the at least one controller is programmed to direct the translation of the energy beam at a rate that operable to retain the roughness of the exposed surface and/or hinder transformation of the exposed surface by the energy beam. In some embodiments, the at least one controller is programmed to irradiate the energy beam at a power density that operable to retain the roughness of the exposed surface and/or hinder transformation of the exposed surface. In some embodiments, the at least one controller is programmed to direct the translation of the energy beam at a rate that is operable to facilitate representative roughness sampling by the reflected radiation. In some embodiments, the at least one controller is programmed to direct the translation of the energy beam at a rate that is operable to enable the detector to sample a plurality of portions from the footprint, via the reflected radiation. In some embodiments, a larger variability span in the associated signal is correlated with the energy beam that is more focused on the exposed surface, wherein larger variability span is with respect to an optical variability of an associated signal of a reflected radiation of the energy beam that is less focused on the exposed surface. In some embodiments, a higher variability in the associated signal is correlated with the energy beam that is more focused on the exposed surface, wherein higher variability is with respect to an optical variability of an associated signal of a reflected radiation of the energy beam that is less focused on the exposed surface. In some embodiments, a higher variability in the associated signal is correlated with a smaller cross section of the energy beam, wherein higher variability is with respect to an optical variability of an associated signal of a reflected radiation of the energy beam having a larger cross section. In some embodiments, the signal analysis comprises a response to a wave pattern of the energy beam emitted from the footprint, as a function of the roughness of the exposed surface. In some embodiments, the at least one controller is configured to direct translation of the energy beam along the exposed surface, and wherein the signal analysis comprises analyzing a wave pattern of the energy beam emitted from the footprint during its translation. In some embodiments, the energy beam has a first cross section after irradiation through an optical arrangement, wherein the at least one controller is configured to direct altering the first cross section of the energy beam to a second cross section of the energy beam after irradiation through the optical arrangement (e.g., by altering the focus). In some embodiments, the at least one controller is configured to alter an optical setting of the optical arrangement. In some embodiments, altering the first cross section comprises altering a focus of the energy beam on the exposed surface. In some embodiments, the at least one controller is further programmed to repeat (a) (b) and (c) for the second cross section of the energy beam, and perform a comparison of the respective signal analyses to produce a result. In some embodiments, considering the result, the at least one controller is programmed to (d) determine at least one characteristic of (i) a fundamental length scale of the cross section, (ii) the roughness of the exposed surface, and/or (iii) an optical arrangement setting that is configured to direct the energy beam onto the exposed surface. In some embodiments, the at least one controller is operatively coupled with the optical arrangement. In some embodiments, at least two of the direct the energy source in (a), direct the detector in (b), direct the signal analysis of the associated signal in (c), and determine the least one characteristic in (d), are directed by different controllers. In some embodiments, at least two of the direct the energy source in (a), direct the detector in (b), direct the signal analysis of the associated signal in (c), and determine the least one characteristic in (d), are directed by the same controller. In some embodiments, one or more of the direct the energy source in (a), direct the detector in (b), direct the signal analysis of the associated signal in (c), and determine the least one characteristic in (d), is in real time during the printing. In some embodiments, one or more of the direct the energy source in (a), direct the detector in (b), direct the signal analysis of the associated signal in (c), and determine the least one characteristic in (d), is before the printing. In some embodiments, the at least one controller is configured to determine the least one characteristic by evaluating a deviation in an intensity of the reflected radiation and/or signal variability of the reflected radiation. In some embodiments, the at least one controller is configured to direct detection of an astigmatism of the footprint and/or of a cross section of the energy beam. In some embodiments, the at least one controller is further programmed to direct the energy beam to travel in a first direction with respect to the exposed surface. In some embodiments, the at least one controller is further programmed to direct the energy beam to travel in a second direction with respect to the exposed surface. In some embodiments, the second direction is perpendicular to the first direction. In some embodiments, the at least one controller is further programmed to direct a calibration of the at least one characteristic by comparing a deviation of the optical variability at a given energy beam cross section with a benchmark optical variability value for the at least one characteristic at the given energy beam cross section. In some embodiments, the benchmark optical variability value is generated using a known roughness of the exposed surface, and (i) a focal setting of the optical arrangement and a varying height of the exposed surface or (ii) a height of the exposed surface and a varying focal setting of the optical arrangement. In some embodiments, the at least one controller is configured to vary the height of the exposed surface to alter a fundamental scale of the footprint on the exposed surface. In some embodiments, the at least one controller is configured to vary the focal setting of the optical arrangement to alter a fundamental scale of the footprint on the exposed surface. In some embodiments, the at least one controller is further programmed to use the deviation to control the cross section of the energy beam and/or an optical arrangement configuration. In some embodiments, the apparatus further comprises an optical filter disposed in an optical path comprising the detector, which optical filter is configured to generate an optically filtered reflected radiation. In some embodiments, the optically filtered reflected radiation comprises a reduced specular reflection, which reduced is relative to a specular reflection portion of the reflected radiation. In some embodiments, the at least one controller is further configured to direct a signal processing of the associated signal and/or the exposed surface signal component. In some embodiments, the signal processing of the associated signal and/or the exposed surface signal component comprises computing a mean value. In some embodiments, the signal processing of the associated signal and/or the exposed surface signal component comprises computing a standard deviation. In some embodiments, the signal processing of the associated signal and/or the exposed surface signal component comprises computing a normalized standard deviation, which normalized standard deviation comprises a quotient of a standard deviation and a mean value, which normalized deviation is of the associated signal and/or the exposed surface signal component. In some embodiments, the exposed surface is of a material bed, which material bed comprises elemental metal, metal alloy, salt, oxide, ceramic, or an allotrope of elemental carbon. In some embodiments, the material bed comprises a particulate material having a distribution. In some embodiments, the distribution is a known distribution. In some embodiments, the at least one controller comprises a graphical processing unit (GPU), system-on-chip (SOC), application specific integrated circuit (ASIC), application specific instruction-set processor (ASIPs), programmable logic device (PLD), or field programmable gate array (FPGA). In some embodiments, the exposed surface comprises a kinematic support, or is operatively coupled to a kinematic support.

In another aspect, a method for printing at least one three-dimensional object comprises: (a) irradiating at least a portion of an exposed surface of a material bed to form a footprint on the exposed surface, which exposed surface has a roughness, which footprint emits a reflected radiation from the exposed surface; (b) detecting the reflected radiation and generating an associated signal; and (c) analyzing the associated signal to determine an exposed surface signal component, which signal analysis comprises an optical variability of the associated signal from the reflected radiation.

In some embodiments, the optical variability comprises a spatial frequency variability. In some embodiments, the optical variability comprises an extend of a variability span. In some embodiments, analyzing the associated signal comprises using an optical transfer function. In some embodiments, analyzing the associated signal comprises using a modulation transfer function. In some embodiments, the irradiating further comprises translating an energy beam along the exposed surface, wherein the associated signal is correlated with the translating. In some embodiments, the method further comprises translating the energy beam at a rate, which rate enables sampling a portion of the exposed surface (e.g., over a given time), via the reflected radiation. In some embodiments, a larger variability span in the associated signal is correlated with a more focused footprint of the energy beam on the exposed surface, wherein larger variability span is with respect to an optical variability of an associated signal of a reflected radiation of a less focused footprint of the energy beam. In some embodiments, a higher variability in the associated signal is correlated with a more focused footprint of the energy beam on the exposed surface, wherein higher variability is with respect to an optical variability of an associated signal of a reflected radiation of a less focused footprint of the energy beam. In some embodiments, analyzing the signal comprises a response to a (e.g., periodic) wave pattern of an energy beam emitted from the footprint, as a function of the roughness of the exposed surface. In some embodiments, the method further comprises translating the energy beam along the exposed surface, and wherein analyzing the signal comprises analyzing the wave pattern of the energy beam emitted from the footprint during its translation. In some embodiments, analyzing the wave pattern comprises analyzing a frequency variability in the wave pattern. In some embodiments, analyzing the wave pattern comprises analyzing an amplitude variability in the wave pattern. In some embodiments, the irradiating comprises an energy beam having a first cross section, wherein the method further comprises altering the first cross section of the energy beam to a second cross section of the energy beam (e.g., by altering the focus). In some embodiments, the altering the first cross section of the energy beam comprises altering a focus of the energy beam on the exposed surface. In some embodiments, the method further comprises repeating (a), (b), and (c) for the second cross section of the energy beam, and comparing the respective signal analyses. In some embodiments, the method further comprises determining at least one characteristic of (i) a fundamental length scale of the footprint, (ii) the roughness of the exposed surface, and/or (iii) an optical arrangement configuration that is configured to direct the energy beam onto the exposed surface, considering the comparing the respective signal analyses. In some embodiments, one or more of irradiating at least the portion of the exposed surface, detecting the reflected radiation, analyzing the associated signal and determining the least one characteristic, is (e.g., continuous) during the printing. In some embodiments, one or more of irradiating at least the portion of the exposed surface, detecting the reflected radiation, analyzing the associated signal and determining the least one characteristic, is before the printing. In some embodiments, determining the least one characteristic comprises evaluating a deviation in an intensity of the reflected radiation. In some embodiments, the method further comprises evaluating a rate of variability in the deviation in the intensity of the reflected radiation. In some embodiments, the method further comprises evaluating (e.g., an extent of) a span of variability of the deviation in the intensity of the reflected radiation. In some embodiments, the method further comprises determining any astigmatism of the footprint. In some embodiments, the irradiating comprises an energy beam traveling in a first direction with respect to the exposed surface. In some embodiments, the method further comprises the energy beam traveling in a second direction with respect to the exposed surface. In some embodiments, the second direction is perpendicular to the first direction. In some embodiments, determining any astigmatism comprises comparing (i) the optical variability of the associated signal from the reflected radiation during travel of the energy beam in the first direction with (ii) the optical variability of the associated signal from the reflected radiation during travel of the energy beam in the second direction. In some embodiments, the method further comprises calibrating the at least one characteristic by comparing a deviation of the optical variability at a given energy beam cross section with a benchmark optical variability value for the at least one characteristic at the given energy beam cross section. In some embodiments, the method further comprises controlling the energy beam cross section and/or the optical arrangement configuration, considering the deviation. In some embodiments, the method further comprises optically filtering the reflected radiation. In some embodiments, the optically filtering reduces a specular reflection, which reduces is relative to a specular reflection portion of the reflected radiation. In some embodiments, the method further comprises signal processing of the associated signal and/or the exposed surface signal component. In some embodiments, the signal processing of the associated signal and/or the exposed surface signal component comprises computing a mean value. In some embodiments, the signal processing of the associated signal and/or the exposed surface signal component comprises computing a standard deviation. In some embodiments, the signal processing of the associated signal and/or the exposed surface signal component comprises computing a normalized standard deviation, which normalized standard deviation comprises a quotient of a standard deviation and a mean value, which normalized deviation is of the associated signal and/or the exposed surface signal component. In some embodiments, the exposed surface comprises a material bed, which material bed comprises elemental metal, metal alloy, salt, oxide, ceramic, or an allotrope of elemental carbon. In some embodiments, the material bed comprises a particulate material having a distribution. In some embodiments, the distribution is a known distribution. In some embodiments, the exposed surface comprises a kinematic support, or is operatively coupled to a kinematic support. In some embodiments, the irradiating comprises an energy beam having a first cross section after passing through an optical arrangement, wherein the method further comprises altering the first cross section of the energy beam to a second cross section of the energy beam after passing through the optical arrangement, further comprising repeating (a), (b), and (c) for the second cross section of the energy beam, and comparing the respective signal analyses, and generating a benchmark optical variability value from a known roughness of the exposed surface at a (e.g., vertical) position of the exposed surface. In some embodiments, altering the first cross section of the energy beam to a second cross section of the energy beam comprises altering a focal setting of the optical arrangement. In some embodiments, the exposed surface has a first position, wherein the method further comprises altering the first position of the exposed surface to a second position of the exposed surface to alter a fundamental length scale of the footprint on the exposed surface, wherein the method further comprising repeating (a), (b), and (c) for the second position of the exposed surface, and comparing the respective signal analyses, and generating a benchmark optical variability value from a known roughness of the exposed surface at a focal setup of an optical arrangement. In some embodiments, altering the first position comprises vertically altering the first position. In some embodiments, the exposed surface is horizontal. In some embodiments, the exposed surface is planar. In some embodiments, the irradiating comprises an energy beam, and wherein altering the first position comprises altering the first position in a direction normal to a direction in which the energy beam irradiates the exposed surface.

Another aspect of the present disclosure provides a system for effectuating the methods disclosed herein.

Another aspect of the present disclosure provides an apparatus for effectuating the methods disclosed herein.

Another aspect of the present disclosure provides an apparatus comprising a controller that directs effectuating one or more steps in the method disclosed herein, wherein the controller is operatively coupled to the apparatuses, systems, and/or mechanisms that it controls to effectuate the method.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods above or elsewhere herein.

Another aspect of the present disclosure provides an apparatus for printing one or more 3D objects comprises a controller that is programmed to direct a mechanism used in a 3D printing methodology to implement (e.g., effectuate) any of the method disclosed herein, wherein the controller is operatively coupled to the mechanism.

Another aspect of the present disclosure provides a computer software product, comprising a non-transitory computer-readable medium in which program instructions are stored, which instructions, when read by a computer, cause the computer to direct a mechanism used in the 3D printing process to implement (e.g., effectuate) any of the method disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 34A-34B schematically illustrate various 3D printer components;

Figure 1:
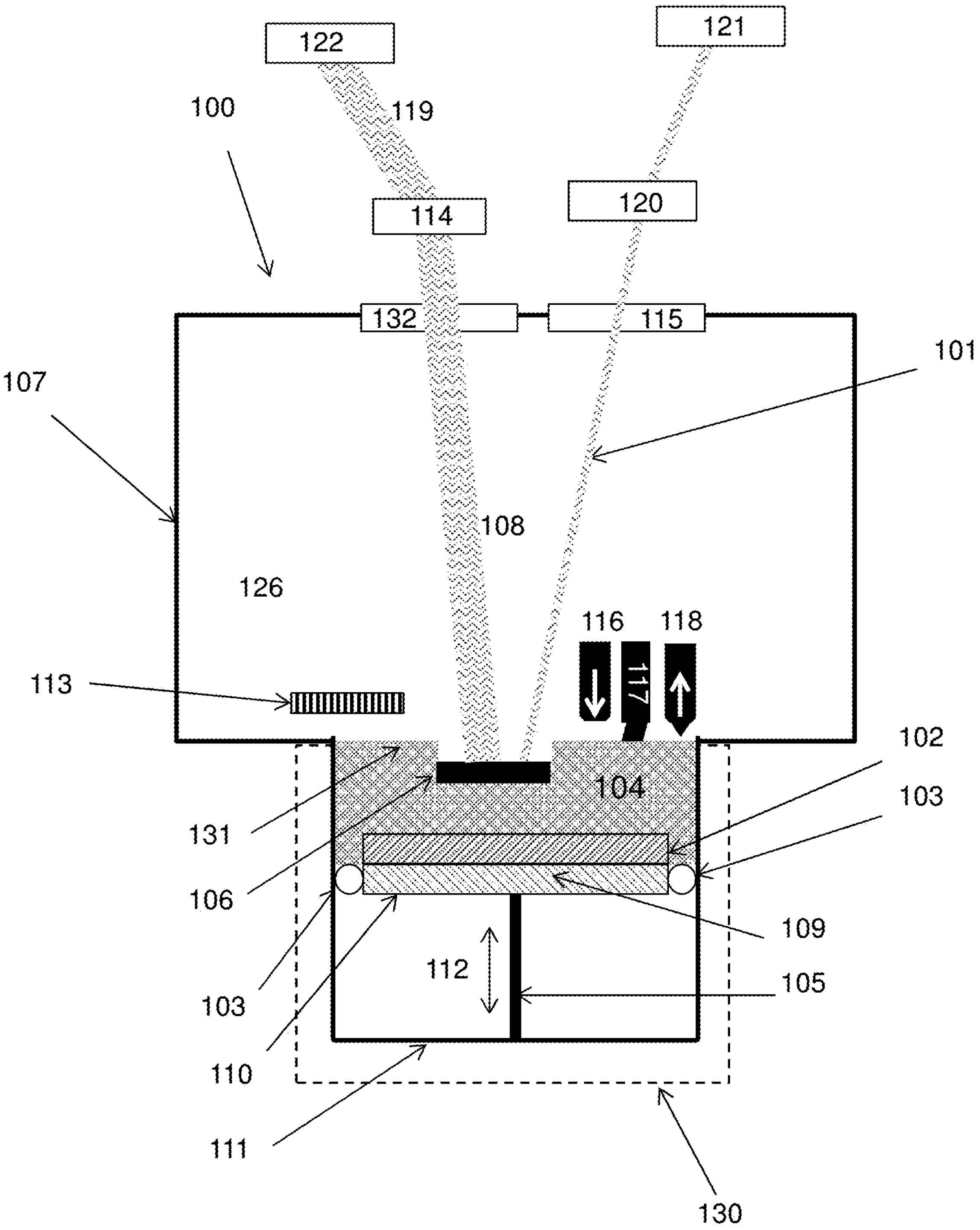
FIG. 1 shows a schematic side view of a three-dimensional (3D) printing system and its components.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an" and "the" are not intended to refer to only a singular entity, but include the general class of which a specific example may be used for illustration. The terminology herein is used to describe specific embodiments of the invention, but their usage does not delimit the invention. When ranges are mentioned, the ranges are meant to be inclusive, unless otherwise specified. For example, a range between value1 and value2 is meant to be inclusive and include value1 and value2. The inclusive range will span any value from about value1 to about value2.

The term "adjacent" or "adjacent to," as used herein, includes 'next to', 'adjoining', 'in contact with,' and 'in proximity to.' In some instances, adjacent to may be 'above' or 'below.'

The term "between" as used herein is meant to be inclusive unless otherwise specified. For example, between X and Y is understood herein to mean from X to Y.

The term "operatively coupled" or "operatively connected" refers to a first mechanism that is coupled (or connected) to a second mechanism to allow the intended operation of the second and/or first mechanism. The term "configured to" refers to an object or apparatus that is (e.g., structurally) configured to bring about an intended result.

The phrase "a three-dimensional object" used herein may refer to "one or more three-dimensional objects," as applicable.

Three-dimensional printing (also "3D printing") generally refers to a process for generating a 3D object. The apparatuses, methods, controllers, and/or software described herein pertaining to generating (e.g., forming, or printing) a 3D object, pertain also to generating one or more 3D objects. For example, 3D printing may refer to sequential addition of material layer or joining of material layers (or parts of material layers) to form a 3D structure, in a controlled manner. The controlled manner may include automated control. In the 3D printing process, the deposited material can be transformed (e.g., fused, sintered, melted, bound, or otherwise connected) to subsequently harden and form at least a part of the 3D object. Fusing (e.g., sintering or melting) binding, or otherwise connecting the material is collectively referred to herein as transforming the material (e.g., powder material). Fusing the material may include melting or sintering the material. Binding can comprise chemical bonding. Chemical bonding can comprise covalent bonding. Examples of 3D printing include additive printing (e.g., layer by layer printing, or additive manufacturing). 3D printing may include layered manufacturing. 3D printing may include rapid prototyping. 3D printing may include solid freeform fabrication. The 3D printing may further comprise subtractive printing.

3D printing methodologies can comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereolithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

3D printing methodologies may differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

The methods, apparatuses, and systems of the present disclosure can be used to form 3D objects for various uses and applications. Such uses and applications include, without limitation, electronics, components of electronics (e.g., casings), machines, parts of machines, tools, implants, prosthetics, fashion items, clothing, shoes, or jewelry. The implants may be directed (e.g., integrated) to a hard tissue, a soft tissue, or to a combination of hard and soft tissues. The implants may form adhesion with hard and/or soft tissue. The machines may include a motor or motor part. The machines may include a vehicle. The machines may comprise aerospace related machines. The machines may comprise airborne machines. The vehicle may include an airplane, drone, car, train, bicycle, boat, or shuttle (e.g., space shuttle). The machine may include a satellite or a missile. The uses and applications may include 3D objects relating to the industries and/or products listed herein.

The present disclosure provides systems, apparatuses, and/or methods for 3D printing of a desired 3D object from a pre-transformed material (e.g., powder material). The object can be pre-ordered, pre-designed, pre-modeled, or designed in real time (i.e., during the process of 3D printing). The 3D printing method can be an additive method in which a first layer is printed, and thereafter a volume of a material is added to the first layer as a separate sequential layer (or parts thereof). Each additional sequential layer (or part thereof) can be added to the previous layer by transforming (e.g., fusing (e.g., melting)) a fraction of the pre-transformed (e.g., powder) material and subsequently hardening the transformed material to form at least a portion of the 3D object. The hardening can be actively induced (e.g., by cooling) or can occur without intervention.

Pre-transformed material, as understood herein, is a material before it has been first transformed (e.g., once transformed) by an energy beam and/or flux during the 3D printing process. The pre-transformed material may be a material that was, or was not, transformed prior to its use in the 3D printing process. The pre-transformed material may be a material that was partially transformed prior to its use in the 3D printing process. The pre-transformed material may be a starting material for the 3D printing process. The pre-transformed material may be liquid, solid, or semi-solid (e.g., gel). The pre-transformed material may be a particulate material. The particulate material may be a powder material. The powder material may comprise solid particles of material. The particulate material may comprise vesicles (e.g., containing liquid or semi-solid material). The particulate material may comprise solid or semi-solid material particles.

The fundamental length scale (e.g., the diameter, spherical equivalent diameter, diameter of a bounding circle, or the largest of height, width and length; abbreviated herein as "FLS") of the printed 3D object can be at least about 50 micrometers (μm), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases, the FLS of the printed 3D object may be in between any of the afore-mentioned FLSs (e.g., from about 50 μm to about 1000 m, from about 120 m to about 1000 m, from about 120 μm to about 10 m, from about 200 μm to about 1 m, or from about 150 μm to about 10 m).

In some instances, it is desired to control the manner in which at least a portion of a layer of hardened material is formed. The layer of hardened material may comprise a multiplicity of melt pools. In some instances, it may be desired to control one or more characteristics of the melt pools that form the layer of hardened material. The characteristics may comprise the depth of a melt pool, microstructure, or the repertoire of microstructures of the melt pool. The microstructure of the melt pool may comprise the crystalline structure, or crystalline structure repertoire that is included in the melt pool.

The FLS (e.g., depth, or diameter) of the melt pool may be at least about 0.5 μm, 1 μm, 5 μm, 10 μm, 20 μm, 30 μm, 40 μm, or 50 μm. The FLS of the melt pool may be at most about 0.5 μm, 1 μm, 5 μm, 10 μm, 20 μm, 30 μm, 40 μm, or 50 μm. The FLS of the melt pool may be any value between the aforementioned values (e.g., from about 0.5 μm to about 50 μm, from about 0.5 μm to about 10 μm, from about 10 μm to about 30 μm, or from about 30 μm to about 50 μm.

Transforming (e.g., tiling) may comprise heating at least a portion of a target surface (e.g., exposed surface of a material bed), and/or a previously formed area of hardened material using at least one energy source. The energy source may generate an energy beam. The energy source may be a radiative energy source. The energy source may be a dispersive energy source (e.g., a fiber laser). The energy source may generate a substantially uniform (e.g., homogenous) energy stream. The energy source may comprise a cross section (e.g., footprint) having a substantially homogenous fluence. The energy generated for transforming a portion of material (e.g., pre-transformed or transformed), by the energy source will be referred herein as the "energy flux." The energy flux can be provided as an energy beam (e.g., tiling energy beam). The energy flux may heat a portion of a 3D object (e.g., an exposed surface of the 3D object). The energy flux may heat a portion of the target surface (e.g., an exposed surface of the material bed, and/or a deeper portion of the material bed that is not exposed). The target surface may include a pre-transformed material, a partially transformed material and/or a transformed material. The target surface may include a portion of the build platform (e.g., the base (e.g., FIG. 1, 102)). The target surface may comprise a (surface) portion of a 3D object. The heating by the energy flux may be substantially uniform.

The energy flux may irradiate (e.g., flash, flare, shine, or stream) a target surface for a period of time (e.g., predetermined period of time). The time in which the energy flux (e.g., beam) irradiates may be referred to as a dwell time of the energy flux. During this period of time (e.g., dwell time), the energy flux may be substantially stationary. During that period of time, the energy may substantially not translate (e.g., neither in a raster form nor in a vector form). During this period of time (e.g., dwell time) the energy density of the energy flux may be constant. In some embodiments, during this period of time (e.g., dwell time) the energy density of the energy flux may vary. The variation may be predetermined. The variation may be controlled (e.g., by a controller). The controller may determine the variation based on a signal received by one or more sensors. The controller may determine the variation based on an algorithm. The controlled variation may be based on closed loop or open loop control. For example, the variation may be determined based on temperature and/or imaging measurements. The variation may be determined by melt pool size evaluation. The variation may be determined based on height measurements.

The energy flux may emit energy stream towards the target surface in a step and repeat sequence. The energy flux may emit energy stream towards the target surface in a step and tiling heating or tile filling process. The energy flux may comprise a radiative heat, electromagnetic radiation, charge particle radiation (e.g., e-beam), or a plasma beam. The energy source may comprise a heater (e.g., radiator or lamp), an electromagnetic radiation generator (e.g., laser), a charge particle radiation generator (e.g., electron gun), or a plasma generator. The energy source may comprise a diode laser. The energy source may comprise light emitting diode array (LED array).

The energy flux may irradiate a pre-transformed material, a transformed material, or a hardened material (e.g., within the material bed). The energy flux may irradiate a target surface. The target surface may comprise a pre-transformed material, a transformed material, or a hardened material. The (e.g., tiling) energy source may point and irradiate an energy flux on the target surface. The energy flux may heat the target surface. The energy flux may transform the target surface (or a fraction thereof). The energy flux may preheat the target surface (e.g., to be followed by a scanning energy beam that optionally transforms at least a portion of the preheated surface). The energy flux may post-heat the target surface (e.g., following a transformation of the target surface). The energy flux may post-heat the target surface in order to reduce a cooling rate of the target surface. The heating may be at a specific location (e.g., a tile). The tile may comprise a wide exposure space (e.g., a wide footprint on the target surface). The energy flux may have a long dwell time (e.g., exposure time) that may be at least 1 millisecond, 1 minute, 1 hour, or 1 day. In principle, the energy flux may have a dwell time that is infinity. The energy flux may emit a low energy flux to control the cooling rate of a position within a layer of transformed material. The low cooling rate may control the solidification of the transformed (e.g., molten) material. The low cooling rate may allow formation of crystals (e.g., single crystals) at specified location within the layer that is included in the 3D object.

The energy flux may transform (e.g., melt) a portion of a 3D object (e.g., an exposed surface of the 3D object). The energy flux may transform (e.g., fuse) a portion of the powder bed (e.g., an exposed surface of the powder bed, a deeper portion of the powder bed that is not exposed), and/or a portion of a powder stream (e.g., directed toward a target surface). The transformation may be substantially uniform.

The irradiated energy (e.g., energy beam) may comprise a cross section having a substantially targeted projection (e.g., footprint).

Figure 9:
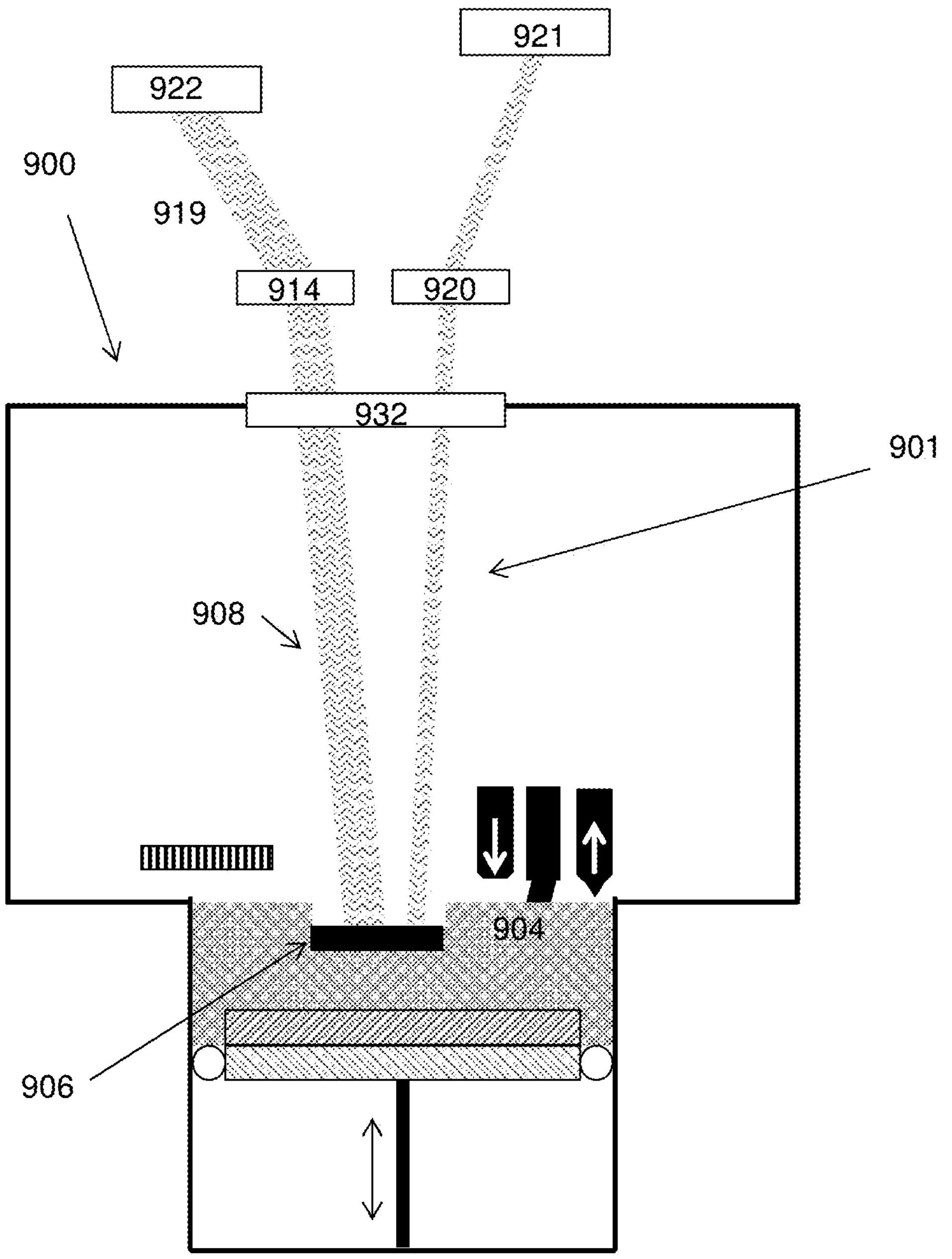
FIG. 9 shows a schematic side view of a 3D printing system and its components.

FIG. 1 shows an example of a 3D printing system 100 and apparatuses, a (e.g., first) energy source 122 (e.g., a tiling energy source) that emits a (e.g., first) energy beam 119 (which can provide an energy flux). In the example of FIG. 1 the energy flux travels through an optical system 114 (e.g., comprising an aperture, lens, mirror, or deflector) and an optical window 132, to heat a target surface 131. The target surface may be a portion of a hardened material (e.g., 106) that was formed by transforming at least a portion of a target surface (e.g., 131) by a (e.g., scanning) energy beam. In the example of FIG. 1 a (e.g., second, e.g., scanning) energy 101 is generated by a (e.g., second) energy source 121. The generated (e.g., second) energy beam may travel through an optical mechanism (e.g., 120) and/or an optical window (e.g., 115). The first energy beam (which can provide the first energy flux) and the second (e.g., scanning) energy beam may travel through the same optical window and/or through the same optical system. At times, the energy flux and the first (e.g., scanning) energy beam may travel through their respective optical systems and through the same optical window. FIG. 9 shows an example of a 3D printing system 900 where an energy flux 919 (e.g., second energy beam) is emitted from energy source 922, and a scanning energy beam 901 (e.g., first energy beam) is emitted from energy source 921. Both energy beams can travel through their respective optical mechanisms (e.g., 914, 920) and through the same optical window (e.g., 932). In the example of FIG. 9, the energy flux 919 (e.g., second energy beam), after passing through the optical window 932, forms emitted radiated energy 908. The emitted radiated energy (e.g., 908) and first (e.g., scanning) energy beam (e.g., 901) may be utilized to form a hardened material (e.g., 906) in a material bed (e.g., 904). The first energy beam and the second energy beam may have at least one characteristic that is the same. The energy flux and the scanning energy beam may have at least one characteristic that is the same. The first energy beam and the second energy beam may have at least one characteristic that is different. The energy flux and the scanning energy beam may have at least one characteristic that is different. An optical window may be a material (e.g., transparent material) that allows the irradiating energy to travel through it without (e.g., substantial) loss of radiation. The optical window can comprise a high thermal conductivity material (e.g., a crystal quartz, zinc selenide (ZnSe), magnesium fluoride ($MgF_2$), or calcium fluoride ($CaF_2$), or sapphire optical window) as described herein. Substantial may be relevant to the purpose of the radiation. In some embodiments, the energy flux, and the scanning energy beam both travel through the same optical system, albeit through different components within the optical system and/or at different instances. In some embodiments, the energy flux, and the scanning energy beam both travel through the same optical system, albeit through different configurations of the optical system and/or at different instances. The emitted radiative energy (e.g., FIG. 1, 108) may travel through an aperture, deflector, and/or other parts of an optical system (e.g., schematically represented as FIG. 1, 114). The aperture may restrict the amount of energy exerted by the (e.g., tiling) energy source. The aperture restriction may redact (e.g., cut off, block, obstruct, or discontinue) the energy beam to form a desired shape of a tile.

In the example shown in FIG. 1, a part (e.g., hardened material 106) represents a layer of transformed material in a material bed 104. The material bed may be disposed above a platform. The platform may comprise a substrate (e.g., 110) and/or a base (e.g., 102). FIG. 1 shows an example of sealants 103 that prevent the pre-transformed material from spilling from the material bed (e.g., 104) to the bottom 111 of an enclosure 107. The platform may translate (e.g., vertically, FIG. 1, 112) using a translating mechanism (e.g., an actuator, e.g., an elevator 105). The translating mechanism may travel in the direction to or away from the bottom of the enclosure (e.g., 111) (e.g., vertically). For example, the platform may decrease in height before a new layer of pre-transformed material is dispensed by the material dispensing mechanism (e.g., 116). The target surface (e.g., top surface of the material bed) (e.g., 131) may be leveled using a leveling mechanism (e.g., comprising parts 117 and/or 118). The mechanism may further include a cooling member (e.g., heat sink 113). The interior volume of the enclosure (e.g., 126) may comprise an inert gas or an oxygen and/or humidity reduced atmosphere. The atmosphere may be any atmosphere disclosed in patent application number PCT/US15/36802, titled "APPARATUSES, SYSTEMS AND METHODS FOR THREE-DIMENSIONAL PRINTING" that was filed on Jun. 19, 2015, which is incorporated herein by reference in their entirety.

In some embodiments, the build module and the processing chamber are separate. The separate build module and processing chamber may comprise separate atmospheres. The separate build module and processing chamber may (e.g., controllably) merge. For example, the atmospheres of the build module and processing chamber may merge. In the example of FIG. 1, the 3D printing system comprises a processing chamber which comprises the irradiated (e.g., irradiating) energy and the target surface (e.g., comprising the atmosphere in the interior volume of the processing chamber, e.g., 126). For example, the processing chamber may comprise a first (e.g., scanning) energy beam (e.g., FIG. 1, 101) and/or a second energy beam (e.g., energy flux) (e.g., FIG. 1, 108). The enclosure may comprise one or more build modules (e.g., enclosed in the dashed area 130). At times, at least one build module may be situated in the enclosure comprising the processing chamber. At times, at least one build module may engage with the processing chamber (e.g., FIG. 1) (e.g., 107). At times, a plurality of build modules may be coupled to the enclosure. The build module may reversibly engage with (e.g., couple to) the processing chamber. The engagement of the build module may be before or after the 3D printing. The engagement of the build module with the processing chamber may be controlled (e.g., by a controller, such as for example by a microcontroller). The controller may be any controller disclosed in: patent application serial number PCT/US17/18191, titled "ACCURATE THREE-DIMENSIONAL PRINTING" that was filed on Feb. 16, 2017; patent application serial number U.S. Ser. No. 15/435,065, titled "ACCURATE THREE-DIMENSIONAL PRINTING" that was filed on February 16; patent application serial number EP17156707, titled "ACCURATE THREE-DIMENSIONAL PRINTING" that was filed on Feb. 17, 2017; each of which is incorporated herein by reference in its entirety. The controller may direct the engagement and/or dis-engagement of the build module.

The control may be automatic and/or manual. The engagement of the build module with the processing chamber may be reversible. In some embodiments, the engagement of the build module with the processing chamber may be non-reversible (e.g., stable). The FLS (e.g., width, depth, and/or height) of the processing chamber can be at least about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m, or 5 m. The FLS of the processing chamber can be at most about 50 millimeters (mm), 60 mm, 70 mm, 80 mm, 90 mm, 100 mm, 200 mm, 250 mm, 400 mm, 500 mm, 800 mm, 900 mm, 1 meter (m), 2 m, or 5 m. The FLS of the processing chamber can be between any of the afore-mentioned values (e.g., 50 mm to about 5 m, from about 250 mm to about 500 mm, or from about 500 mm to about 5 m).

Figure 2A:
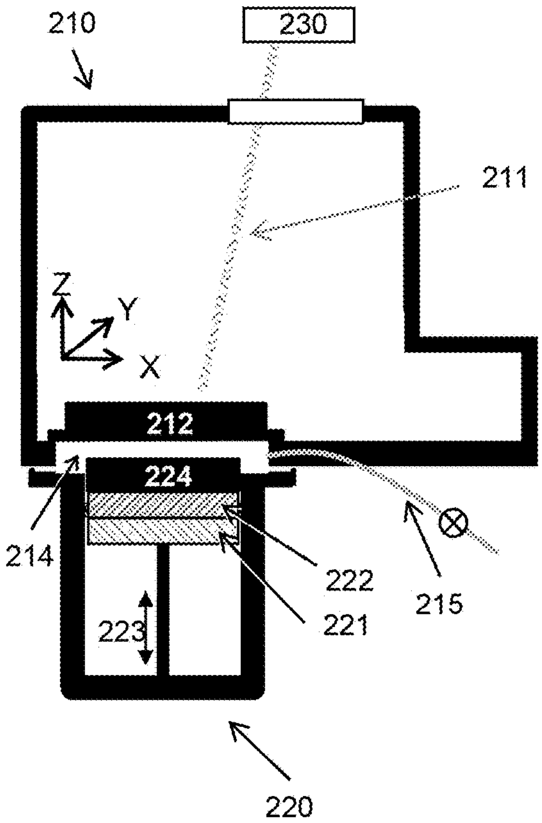
FIGS. 2A-2B schematically illustrate vertical cross sections of 3D printing systems and their components.
Figure 2B:
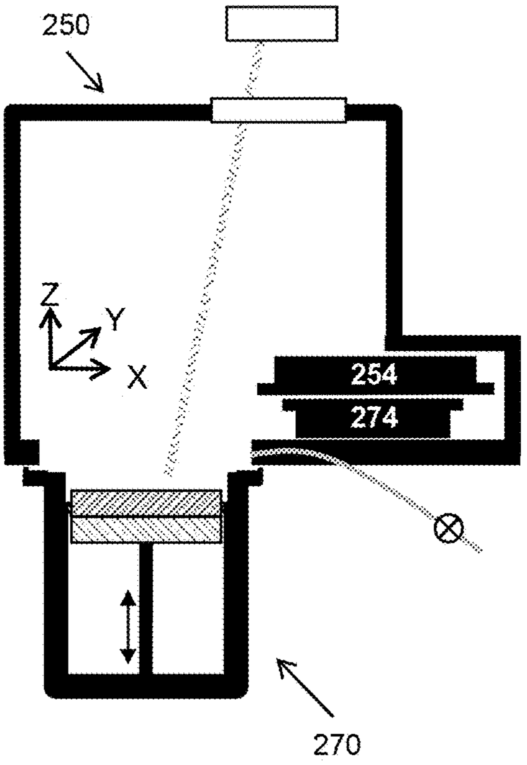
Figure 3A:
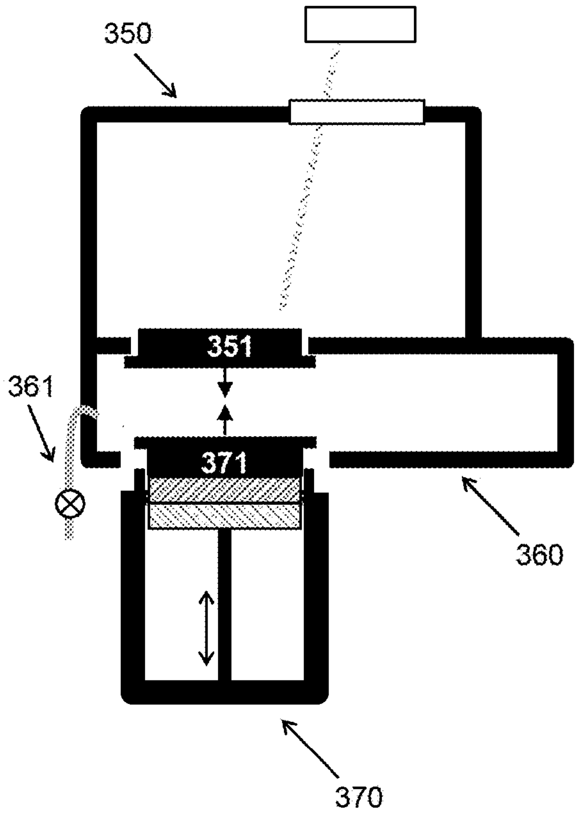
FIGS. 3A-3B schematically illustrate vertical cross sections of 3D printing systems and their components.
Figure 3B:
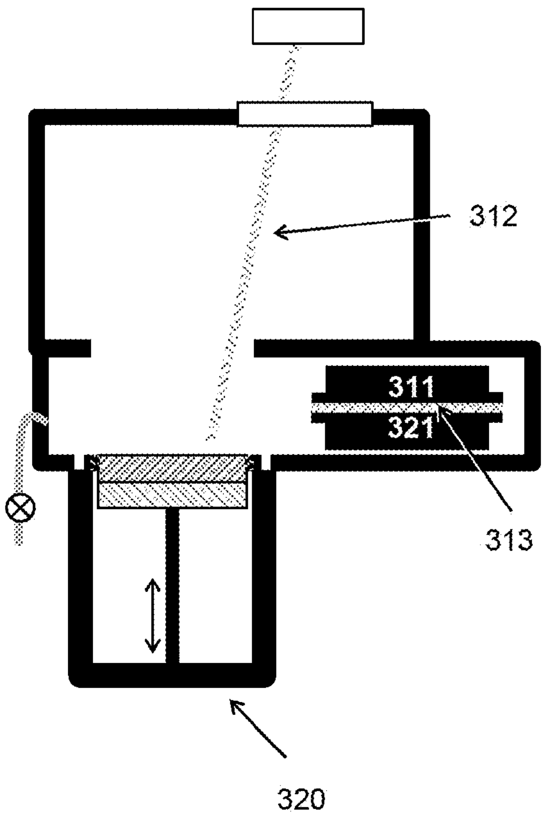

In some embodiments, the atmospheres of the build module, and enclosure (e.g., controllably) merge (e.g., during at least a portion of the 3D printing process). The merging may comprise engagement with a load lock mechanism. The merging may be through a load lock environment (e.g., FIG. 2, 214). At times, during at least a portion of the 3D printing process, the atmospheres of the chamber and enclosure may be (e.g., remain) separate. FIG. 2A shows an example of a processing chamber (e.g., FIG. 2A, 210) and a build module (e.g., FIG. 2A, 220). The processing chamber comprises an irradiating energy (e.g., FIG. 2A, 211). The build module comprises a build platform comprising a substrate (e.g., FIG. 2A, 221), a base (e.g., FIG. 2A, 222), and an elevator shaft (e.g., FIG. 2A, 223) that allows the platform to move vertically up and down. The elevator shaft may comprise a single shaft (e.g., FIG. 2A, 223). The elevator shaft may comprise a plurality of shafts. The build module (e.g., FIG. 2A, 220) may comprise a shutter (e.g., FIG. 2A, 224). The processing chamber (e.g., FIG. 2A, 210) may comprise a shutter (e.g., FIG. 2A, 212). The shutter may be openable (e.g., by the build module controller, the processing chamber controller, or the load lock controller). The shutter may be removable (e.g., by the build module controller, the processing chamber controller, or the load lock controller). The removal of the shutter may comprise manual or automatic removal. The build module shutter may be opened while being connected to the build module. The processing chamber shutter may be opened while being connected to the processing chamber (e.g., through connector). The shutter connector may comprise a hinge, chain, or a rail. In an example, the shutter may be opened in a manner similar to opening a door or a window. The shutter may be opened by swiveling (e.g., similar to opening a door or a window held on a hinge). The shutter may be opened by its removal from the opening which it blocks. The removal may be guided (e.g., by a rail, arm, pulley, crane, or conveyor). The guiding may be using a robot. The guiding may be using at least one motor and/or gear. The shutter may be opened while being disconnected from the build module. For example, the shutter may be opened similar to opening a lid. The shutter may be opened by shifting or sliding (e.g., to a side). FIG. 3B shows an example where the shutter (FIG. 2B, 274) of the build module (FIG. 2B, 270) is open in a way that is disconnected from the build module. FIG. 2B shows an example where the shutter (FIG. 2B, 254) of the processing chamber (FIG. 2B, 250) is open in a way that is disconnected from the processing chamber. The build module, processing chamber, and/or enclosure may comprise one or more seals. The seal may be a sliding seal or a top seal. For example, the build module and/or processing chamber may comprise a sliding seal that meets with the exterior of the build module upon engagement of the build module with the processing chamber. For example, the processing chamber may comprise a top seal that faces the build module and is pushed upon engagement of the processing chamber with the build module. For example, the build module may comprise a top seal that faces the processing chamber and is pushed upon engagement of the processing chamber with the build module. The seal may be a face seal, or compression seal. The seal may comprise an O-ring. The build module, processing chamber, and/or enclosure may be sealed, sealable, or open. The atmosphere of the build module, processing chamber, and/or enclosure may be regulated. The build module may be sealed, sealable, or open. The processing chamber may be sealed, sealable, or open. The enclosure may be sealed, sealable, or open.

In some embodiments, the 3D printing system comprises a load lock. The load lock may be disposed between the processing chamber and the build module. The load lock may be formed by engaging the build module with the processing chamber. The load lock may be sealable. For example, the load lock may be sealed by engaging the build module with the processing chamber (e.g., directly or indirectly). FIG. 2A shows an example of a load lock 214 that is formed when the build module 220 is engaged with the processing chamber 210. An exchange of atmosphere may take place in the load lock by evacuating gas from the load lock (e.g., through channel 215) and/or by inserting gas (e.g., through channel 215). FIG. 3A shows an example of a load lock 360 that is formed when the build module 370 is engaged with the processing chamber 350. An exchange of atmosphere may take place in the load lock by evacuating gas from the load lock (e.g., through channel 361) and/or by inserting gas (e.g., through channel 361). In some embodiments, the load lock may comprise one or more gas opening ports. At times, the load lock may comprise one or more gas transport channels. At times, the load lock may comprise one or more valves. A gas transport channel may comprise a valve. The opening and/or closing of a first valve of the 3D printing system may or may not be coordinated with the opening and/or closing of a second valve of the 3D printing system. The valve may be controlled automatically (e.g., by a controller) and/or manually. The load lock may comprise a gas entry opening port and a gas exit opening port. In some embodiments, a pressure below ambient pressure (e.g., of 1 atmosphere) is formed in the load lock. In some embodiments, a pressure exceeding ambient pressure (e.g., of 1 atmosphere) is formed in the load lock. At times, during the exchange of load lock atmosphere, a pressure below and/or above ambient pressure if formed in the load lock. At times, a pressure equal or substantially equal to ambient pressure is maintained (e.g., automatically and/or manually) in the load lock. The load lock, building module, processing chamber, and/or enclosure may comprise a valve. The valve may comprise a pressure relief, pressure release, pressure safety, safety relief, pilot-operated relief, low pressure safety, vacuum pressure safety, low and vacuum pressure safety, pressure vacuum release, snap acting, or modulating valve. The valve may comply with the legal industry standards presiding the jurisdiction. The volume of the load lock may be smaller than the volume within the build module and/or processing chamber. The total volume within the load lock may be at most about 0.1%, 0.5%, 1%, 5%, 10%, 20%, 50%, or 80% of the total volume encompassed by the build module and/or processing chamber. The total volume within the load lock may be between any of the aforementioned percentage values (e.g., from about 0.1% to about 80%, from about 0.1% to about 5%, from about 5% to about 20%, from about 20% to about 50%, or from about 50% to about 80%). The percentage may be volume per volume percentage.

In some embodiments, the atmosphere of the build module and/or the processing chamber is fluidly connected to the atmosphere of the load lock. At times, conditioning the atmosphere of the load lock will condition the atmosphere of the build module and/or the processing chamber that is fluidly connected to the load lock. The fluid connection may comprise gas flow. The fluid connection may be through a gas permeable seal and/or through a channel (e.g., a pipe). The channel may be a sealable channel (e.g., using a valve).

In some embodiments, the shutter of the build module engages with the shutter of the processing chamber. The engagement may be spatially controlled. For example, when the shutter of the build module is within a certain gap distance from the processing chamber shutter, the build module shutter engages with the processing chamber shutter. The gap distance may trigger an engagement mechanism. The gap trigger may be sufficient to allow sensing of at least one of the shutters. The engagement mechanism may comprise magnetic, electrostatic, electric, hydraulic, pneumatic, or physical force. The physical force may comprise manual force. FIG. 3A shows an example of a build module shutter 371 that is attracted upwards toward the processing chamber shutter 351, and a processing chamber shutter 351 that is attracted upwards toward the build module shutter 371. FIG. 3B shows an example of a single unit formed from the processing chamber shutter 351 and the build module shutter 371, that is transferred away from the energy beam 312. In the single unit, the processing chamber shutter 351 and the build module shutter 371 are held together by 313 by the engagement mechanism. Subsequent to the engagement, the single unit may transfer (e.g., relocate, or move) away from the energy beam. For example, the engagement may trigger the transferring (e.g., relocating) of the build module shutter and the processing chamber shutter as a single unit.

At times, removal of the shutter (e.g., of the build module and/or processing chamber) depends on reaching a certain (e.g., predetermined) level of at atmospheric characteristics comprising a gas content (e.g., relative gas content), gas pressure, oxygen level, humidity, argon level, or nitrogen level. For example, the certain level may be an equilibrium between an atmospheric characteristic in the build chamber and that atmospheric characteristics in the processing chamber.

In one example of additive manufacturing, a layer of pre-transformed material (e.g., powder material) is disposed adjacent to the platform using the pre-transformed material dispensing mechanism (e.g., FIG. 1, 116); the layer is leveled using a leveling mechanism and a material removal mechanism (e.g., FIGS. 1, 117 and 118 respectively); an energy beam (e.g., FIG. 1, 101) and/or an energy flux (e.g., FIG. 1, 108) may be directed towards the target surface to transform at least a portion of the pre-transformed material to form a transformed material; the platform is lowered; a new layer of pre-transformed material is disposed into the material bed; that new layer is leveled and subsequently irradiated. The process may be repeated sequentially until the desired 3D object is formed from a successive generation of layers of transformed material. In some examples, as the layers of transformed material harden, they may deform upon hardening (e.g., upon cooling). The methods, systems, apparatuses, and/or software disclosed herein may control at least one characteristic of the layer of hardened material (or a portion thereof). The methods, systems, apparatuses, and/or software disclosed herein may control the degree of deformation. The control may be an in-situ control. The control may be control during formation of the at least a portion of the 3D object. The control may comprise closed loop control. The portion may be a surface, layer, multiplicity of layers, portion of a layer, and/or portion of a multiplicity of layers. The layer of hardened material within the 3D object may comprise a multiplicity of melt pools. The layers' characteristics may comprise planarity, curvature, or radius of curvature of the layer (or a portion thereof). The characteristics may comprise the thickness of the layer (or a portion thereof). The characteristics may comprise the smoothness (e.g., planarity) of the layer (or a portion thereof).

The methods, systems, apparatuses, and/or software described herein may comprise providing a first layer of pre-transformed material (e.g., powder) in an enclosure (e.g., FIG. 1, 126) to form a material bed comprising a target surface (e.g., the exposed surface of the material bed). The first layer may be provided on a substrate or a base. The first layer may be provided on a previously formed material bed. At least a portion of the first layer of pre-transformed material may be transformed by using an energy beam and/or flux (collectively referred to herein as irradiating energy). For example, an irradiating energy may heat the at least a portion of the first layer of pre-transformed material to form a first transformed material. The first transformed material may comprise a fused material. The methods, systems, apparatuses, and/or software may further comprise disposing a second layer of pre-transformed material adjacent to (e.g., above) the first layer. At least a portion of the second layer may be transformed (e.g., with the aid of the energy beam) to form a second transformed material. The second transformed material may at least in part connect to the first transformed material to form a multi-layered object (e.g., a 3D object). Connect may comprise fuse, weld, bond, and/or attach. The first and/or second layer of transformed material may comprise a first and/or second layer of hardened material respectively. The first and/or second layer of transformed material may harden into a first and/or second layer of hardened material respectively.

Figure 6:
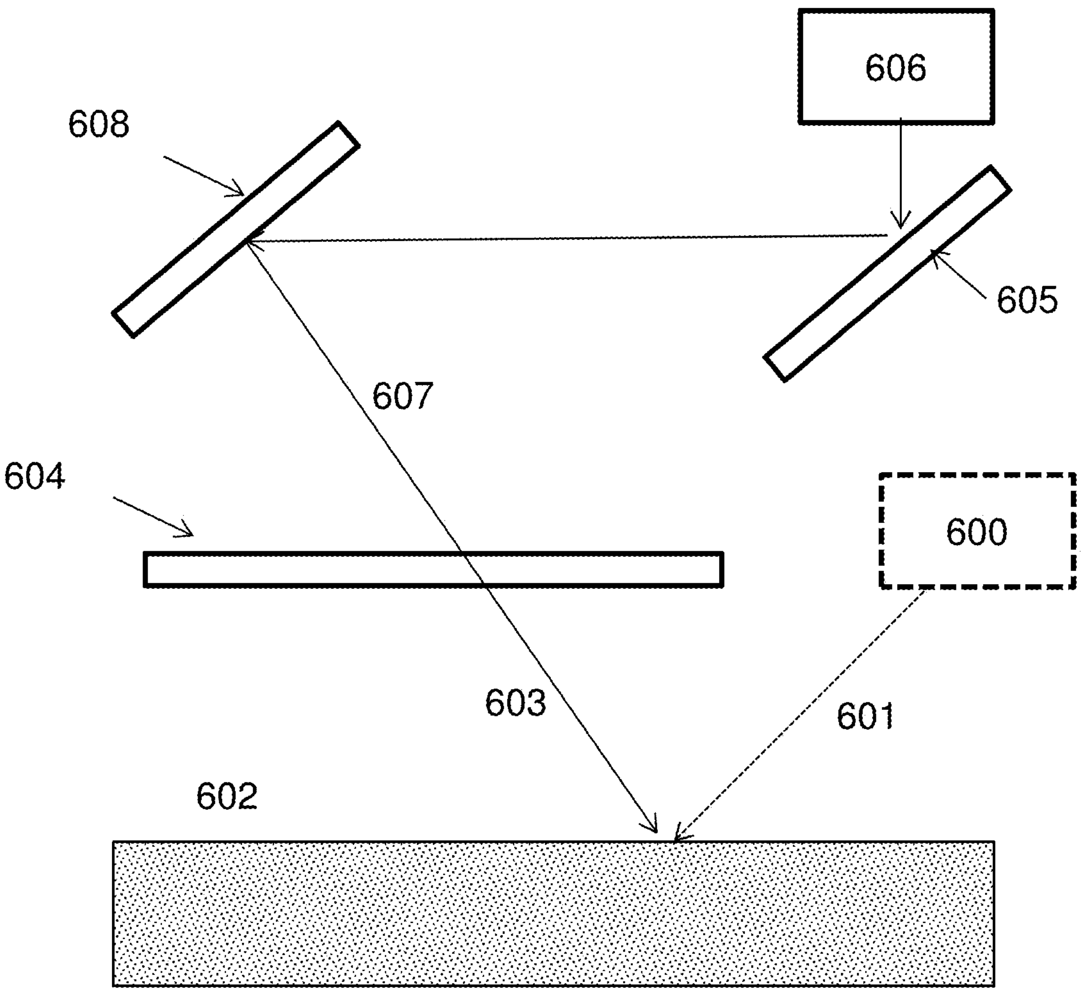
FIG. 6 schematically illustrates an optical system.

FIG. 6 shows an example of an optical mechanism in a 3D printing system: an energy source 606 irradiates energy (e.g., emits an energy beam) that travels between mirror 605 and mirror 608, that direct it along beam path 607 through an optical window 604 to a position on the exposed surface 602 of a material bed. An optical window can include a coating (e.g., an anti-reflective coating) to pass a selected portion of an incident energy source to form a modified directed energy beam (e.g., along path 603). The energy that passes through the optical window (e.g., with an anti-reflective coating) can be measured as one or more characteristics, which may comprise wavelength, power, amplitude, flux, footprint, intensity, fluence, energy, or charge. In some cases, the (e.g., anti-reflective) coating can allow (e.g., substantially) all of a selected portion of an incident energy source to pass therethrough. Substantially all can correspond to at least about 80%, 85%, 90%, 95%, or 100% of the selected portion of energy. Substantially all can correspond to between any of the afore-mentioned values (e.g., from about 80% to about 100%, from about 80% to about 90%, or from about 90% to about 100% of selected portion of energy). The energy beam may also be directly projected on the exposed surface, for example, an energy beam (e.g., 601) can be generated by an energy source (e.g., 600) (e.g., that may comprise an internal optical mechanism, such as within a laser) and be directly projected onto the target surface.

The hardened material may comprise at least a portion of one or more (e.g., a few) layers of hardened material disposed above a pre-transformed material (e.g., powder) disposed in the material bed. The one or more layers of hardened material may be susceptible to deformation during formation, or not susceptible to deformation during formation. The deformation may comprise bending, warping, arching, curving, twisting, balling, cracking, or dislocating. In some examples, the at least a portion of the one or more layers of hardened material may comprise a ledge or a ceiling of a cavity. The deformation may arise, for example, when the formed 3D object (or a portion thereof) lacks auxiliary support structure(s). The deformation may arise, for example, when the formed structure (e.g., 3D object or a portion thereof) floats anchorless in the material bed.

The energy flux may comprise (i) an extended exposure area, (ii) extended exposure time, (iii) low power density (e.g., power per unit area) or (iv) an intensity profile that can fill an area with a flat (e.g., tophead) energy profile.

The extended exposure time may be at least about 1 millisecond and at most 100 milliseconds. In some embodiments, an energy profile of the tiling energy source may exclude a Gaussian beam or round top beam. In some embodiments, an energy profile of the tiling energy source may include a Gaussian beam or round top beam. In some embodiments, the 3D printer comprises a first and/or second scanning energy beams. In some embodiments, an energy profile of the first and/or second scanning energy may comprise a Gaussian energy beam. In some embodiments, an energy profile of the first and/or second scanning energy may exclude a Gaussian energy beam. The first and/or second scanning energy may have any cross-sectional shape comprising an ellipse (e.g., circle), or a polygon (e.g., as disclosed herein). The scanning energy beam may have a cross section with a diameter of at least about 50 micrometers (μm), 100 μm, 150 μm, 200 μm, or 250 μm. The scanning energy beam may have a cross section with a diameter of at most about 60 micrometers (μm), 100 μm, 150 μm, 200 μm, or 250 μm. The scanning energy beam may have a cross section with a diameter of any value between the aforementioned values (e.g., from about 50 μm to about 25 μm, from about 50 μm to about 150 μm, or from about 150 μm to about 250 μm). The power density (e.g., power per unit area) of the scanning energy beam may at least about 10000 $W/mm^2$, 20000 $W/mm^2$, 30000 $W/mm^2$, 50000 $W/mm^2$, 60000 $W/mm^2$, 70000 $W/mm^2$, 80000 $W/mm^2$, 90000 $W/mm^2$, or 100000 $W/mm^2$. The power density of the scanning energy beam may be at most about 10000 $W/mm^2$, 20000 $W/mm^2$, 30000 $W/mm^2$, 50000 $W/mm^2$, 60000 $W/mm^2$, 70000 $W/mm^2$, 80000 $W/mm^2$, 90000 $W/mm^2$, or 100000 $W/mm^2$. The power density of the scanning energy beam may be any value between the aforementioned values (e.g., from about 10000 $W/mm^2$ to about 100000 $W/mm^2$, from about 10000 $W/mm^2$ to about 50000 $W/mm^2$, or from about 50000 $W/mm^2$ to about 100000 $W/mm^2$). The scanning speed of the scanning energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the scanning energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the scanning energy beam may any value between the aforementioned values (e.g., from about 50 mm/sec to about 50000 mm/sec, from about 50 mm/sec to about 3000 mm/sec, or from about 2000 mm/sec to about 50000 mm/sec). The second scanning energy beam may be continuous or non-continuous (e.g., pulsing). The scanning energy beam may compensate for heat loss at the edges of the target surface after the heat tiling process.

In some embodiments, the tiling energy source may be the same as the scanning energy source. The tiling energy source may be different than the scanning energy source. FIG. 1 shows an example where the tiling energy source 122 is different from the scanning energy source 121. The energy flux generated by the tiling energy source may travel through an identical, or a different optical window than the scanning energy generated by the scanning energy source. FIG. 1 shows an example where the energy flux 119 (e.g., from energy source 122) travels through one optical window 132, and the (e.g., scanning) energy 101 travels through a second optical window 115 that is different. The tiling energy source and/or scanning energy source can be disposed within the enclosure, outside of the enclosure (e.g., as in FIG. 1), or within at least one wall of the enclosure. The optical mechanism through which the energy flux and/or the scanning energy beam travel can be disposed within the enclosure, outside of the enclosure, or within at least one wall of the enclosure (e.g., as in FIGS. 1, 132 and 115). In some embodiments, the optical mechanism is disposed within its own (optical) enclosure. The optical enclosure may optionally be coupled with the processing chamber.

Figure 8:
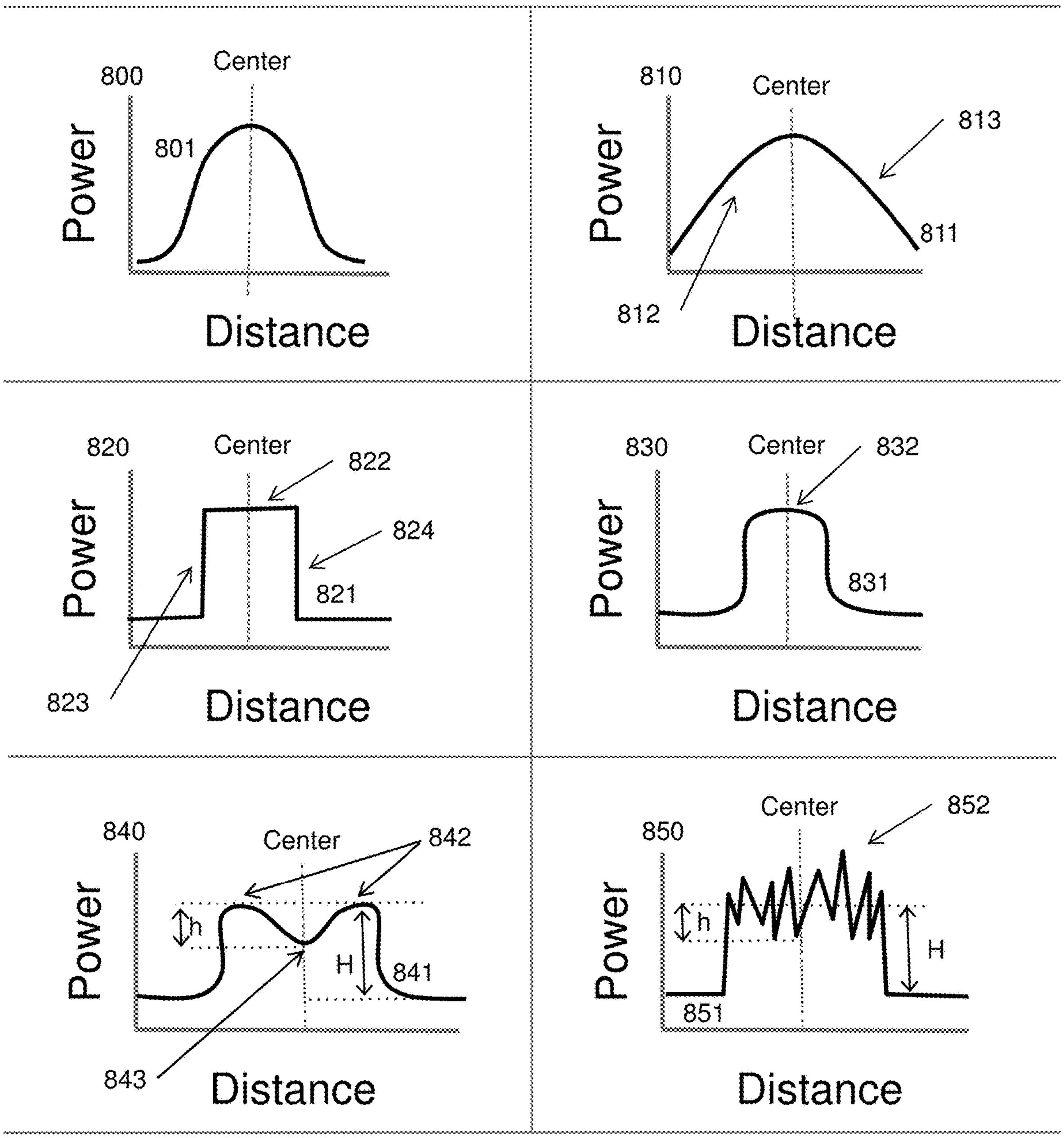
FIG. 8 schematically illustrates spatial intensity profiles of irradiating energy.

The profile of the energy flux (e.g. beam) may represent the spatial intensity profile of the energy flux (e.g., beam) at a particular plane transverse to the beam propagation path. FIG. 8 shows examples of energy flux profiles (e.g., energy as a function of distance from the center of the energy flux (e.g., beam)).

The energy flux profile (e.g., energy beam profile) may be represented as the power or energy of the energy flux plotted as a function of a distance within its cross section (e.g., that is perpendicular to its propagation path). The energy flux profile of the energy flux may be substantially uniform (e.g., homogenous). The energy flux profile may correspond to the energy flux. The energy beam profile may correspond to the first scanning energy beam and/or the second scanning energy beam.

The system and/or apparatus may comprise an energy profile alteration device that evens (e.g., is configured to smooth, planarize or flatten) out any irregularities in the energy flux profile. The system and/or apparatus may comprise an energy profile alteration device that creates a more uniform energy flux profile. The energy profile alteration device may comprise an energy flux (e.g., beam) homogenizer. The homogenizer can comprise a mirror. The mirror may be multifaceted. The mirror may comprise square facets. The mirror may reflect the energy flux at various (e.g., different) angles to create a beam with a more uniform power across at least a portion (e.g., the entire) beam profile (e.g., resulting in a "top hat" profile), as compared to the original (e.g., incoming) energy flux. The energy profile alteration device may output a substantially evenly distributed power/energy of the energy flux (e.g., energy flux profile) instead of its original energy flux profile shape (e.g., Gaussian shape). The energy profile alteration device may comprise an energy flux profile shaper (e.g., beam shaper). The energy profile alteration device may create a certain shape to the energy flux profile. The energy profile alteration device may spread the central concentrated energy within the energy flux profile among the energy flux cross section (e.g., FLS of the energy flux, or FLS of the tile (a.k.a. "stamp")). The energy profile alteration device may output a grainy energy flux profile. The energy profile alteration device may comprise a dispersive, diffusive, or partially transparent glass. The glass can be a frosted, milky, or murky glass. The energy profile alteration device may generate a blurry energy flux. The energy profile alteration device may generate a defocused energy flux, after which the energy flux that entered the energy profile alteration device will emerge as an energy flux having a more homogenized energy flux profile.

The apparatus and/or systems disclosed herein may include an optical diffuser. The optical diffuser may diffuse light substantially homogenously. The optical diffuser may remove high intensity energy (e.g., light) distribution and form a more even distribution of light across the footprint of the energy beam and/or flux. The optical diffuser may reduce the intensity of the energy beam and/or flux (e.g., act as a screen). For example, the optical diffuser may alter an energy beam with Gaussian profile, to an energy beam having a top-hat profile. The optical diffuser may comprise a diffuser wheel assembly.

The irradiating energy (e.g., energy beam) may have any of the energy flux profiles in FIG. 8, wherein the "center" designates the center of the energy beam footprint on the target surface. In some embodiments, the "center" designates the center of the energy beam cross-section. The energy beam (e.g., energy flux) profile may be substantially uniform. The energy beam profile may comprise a substantially uniform section. The energy beam profile may deviate from uniformity. The energy beam profile may be non-uniform. The energy beam profile may have a shape that facilitates substantially uniform heating of at least the horizontal cross section of a tile (e.g., substantially every point within the horizontal cross section of the tile (e.g., including its rim)). The energy beam profile may have a shape that facilitates substantially uniform heating of the melt pools within the tile (e.g., substantially every melt pool within the tile (e.g., including its rim)). The energy beam profile may have a shape that facilitates substantially uniform temperature of at least the horizontal cross section of the tile (e.g., substantially every point within the horizontal cross section of the tile (e.g., including its rim)). The energy flux profile may have a shape that facilitates substantially uniform temperature of the melt pools within the tile (e.g., substantially every melt pool within the tile (e.g., including its rim)). The energy beam profile may have a shape that facilitates formation of a substantially uniform phase (e.g., solid or liquid) of the tile (e.g., substantially every point within the tile (e.g., including its rim)). The energy beam profile may have a shape that facilitates substantially uniform phase of the melt pools within (e.g., that form the) the tile (e.g., substantially every melt pool within the tile (e.g., including its rim)). Substantially uniform may be substantially similar, even, homogenous, invariable, consistent, or equal). At times, the tile may comprise a melt pool.

The energy beam (e.g., flux) profile of the energy beam (e.g., flux) may comprise a square shaped beam. In some instances, the energy beam profile may deviate from a square shaped beam. In some examples, the energy beam profile may exclude a Gaussian shaped beam (e.g., FIG. 8, energy beam profile 800 having Gaussian profile 801). The shape of the beam may be the energy profile of the beam with respect to a distance from the center. The center can be a center of the energy footprint, cross section, and/or tile, which it projects (e.g., through an aperture) onto the target surface. The energy profile of the energy beam may comprise one or more planar sections. FIG. 8, 822 shows an example of a planar section of energy profile 821. FIG. 8, 830 shows an example of a planar section 832 of energy profile 831. FIG. 8, 840 shows an example of two planar sections 842 of energy profile 841. The energy flux profile may comprise of a gradually increasing and/or decreasing section. FIG. 8, 810 shows an example of an energy profile 811 comprising a gradually increasing section 812, and a gradually decreasing section 813. The energy flux profile may comprise an abruptly increasing and/or decreasing sections. FIG. 8, 820 shows an example of an energy profile 821 comprising an abruptly increasing section 823 and an abruptly decreasing section 824. The energy flux profile may comprise a section wherein the energy flux profile deviates from planarity. FIG. 8, 840 shows an example of an energy profile 841 comprising an energy flux profile comprising a section 843 that deviates from planarity (e.g., by a distance "h" of average flux profile 840). The energy flux profile may comprise a section of fluctuating energy flux. The fluctuation may deviate from an average planar surface of the energy flux profile. FIG. 8,850 shows an example of an energy flux profile 851 comprising a fluctuating section 852. The fluctuating section 852 deviates from the average flat surface. The average flat surface may be measured by the average power of that surface from a baseline (e.g., FIG. 8, "H" of energy flux profile 850), by a +/− distance of "h" of energy flux profile 850. The deviation (e.g., type and/or amount) from planarity of the energy flux profile may relate to the temperature of the material bed and/or the target surface. The deviation (e.g., a percentage of deviation) may be calculated with respect to an average top surface of the energy beam profile. The percentage deviation may be calculated according to the mathematical formula 100*(H−h)/H), where the symbol "*" designates the mathematical operation "multiplied by." In some examples, when the material bed is at a temperature of below 500° C., the deviation may be at most 1%, 5%, 10%, 15%, or 20%. In some examples, when the material bed is at a temperature of below 500° C., the deviation may be by any value between the aforementioned values (e.g., from about 1% to about 20%, from about 10% to about 20%, or from about 5% to about 15%). When the material bed is from about 500° C. to below about 1000° C., the deviation may be at most 10%, 15%, 20%, 25%, or 30%). When the material bed is from about 500° C. to below about 1000° C., the deviation may be by any value between the aforementioned values (e.g., from about 10% to about 30%, from about 20% to about 30%, or from about 15% to about 25%). When the material bed is above about 1000° C., the deviation may be at most 20%, 25%, 30%, 35%, or 40%). When the material bed is of above about 1000° C., the deviation may be by any value between the aforementioned values (e.g., from about 20% to about 40%, from about 30% to about 40%, or from about 25% to about 35%). Below 500° C. comprises ambient temperature, or room temperature (R.T.). Ambient refers to a condition to which people are generally accustomed. For example, ambient pressure may be 1 atmosphere. Ambient temperature may be a typical temperature to which humans are generally accustomed. For example, from about 15° C. to about 30° C., from 16° C. to about 26° C., from about 20° C. to about 25° C. "Room temperature" may be measured in a confined or in a non-confined space. For example, "room temperature" can be measured in a room, an office, a factory, a vehicle, a container, or outdoors. The vehicle may be a car, a truck, a bus, an airplane, a space shuttle, a space ship, a ship, a boat, or any other vehicle. Room temperature may represent the small range of temperatures at which the atmosphere feels neither hot nor cold, approximately 24° C. It may denote 20° C., 25° C., or any value from about 20° C. to about 25° C.

The cross section of the tiling energy flux may comprise a vector shaped scanning beam (VSB). The energy flux may comprise a variable energy flux profile shape. The energy flux may comprise a variable cross-sectional shape. The energy flux may comprise a substantially non-variable energy flux profile shape. The energy flux may comprise a substantially non-variable cross-sectional shape. The energy flux (e.g., VSB) may translate across the target surface (e.g., directly) to one or more locations specified by vector coordinates. The energy flux (e.g., VSB) may irradiate once over those one or more locations. The energy flux (e.g., VSB) may substantially not irradiate (or irradiated to a considerably lower extent) once between the locations.

In some examples, the scanning energy beam may have energy flux profile characteristics of the energy flux (e.g., as delineated herein).

The shape of the energy flux cross section may be the shape of the energy flux footprint. The shape of the energy flux footprint may (e.g., substantially) correspond to the sample of a horizontal cross section of the tile. The shape of the energy flux cross section (e.g., its circumference, also known as the edge of its cross section, or beam edge) may substantially exclude a curvature. The shape of an edge of the energy flux may substantially comprise non-curved circumference. The shape of the energy flux edge may comprise non-curved sides on its circumference. The energy flux edge can comprise a flat top beam (e.g., a top-hat beam). The energy flux may have a substantially uniform energy density within its cross section. The beam may have a substantially uniform fluence within its cross section. Substantially uniform may be nearly uniform. The beam may be formed by at least one (e.g., a multiplicity of) diffractive optical element, lens, deflector, aperture, or any combination thereof. The energy flux that reaches the target surface may originate from a Gaussian beam. The target surface may be an exposed surface of the material bed and/or an exposed surface of a 3D object (or a portion thereof). The target surface may be an exposed surface of a layer of hardened material. The energy flux may comprise a beam used in laser drilling (e.g., of holes in printed circuit boards). The energy flux may be similar to (e.g., of) the type of energy beam used in high power laser systems (e.g., which use chains of optical amplifiers to produce an intense beam). The energy flux may comprise a shaped energy beam such as a vector shaped beam (VSB). The energy flux may be similar to (e.g., of) the type used in the process of generating an electronic chip (e.g., for making the mask corresponding to the chip).

The energy source may emit energy flux that may slowly heat a tile within the exposed surface of a 3D object (e.g., FIG. 1, 106). The tile may correspond to a cross section (e.g., footprint) of the energy flux. The footprint may be on the target surface. The radiative energy source may emit radiative energy that may substantially evenly heat a tile within the target surface (e.g., of a 3D object, FIG. 1, 106). Heating may comprise transforming.

At least a portion of the material bed can be heated by the energy source (e.g., of the energy beam and/or tiling energy flux). The portion of the material bed can be heated to a temperature that is greater than or equal to a temperature wherein at least a portion of the pre-transformed material is transformed. For example, the portion of the material bed can be heated to a temperature that is greater than or equal to a temperature wherein at least a portion of the pre-transformed material is transformed to a liquid state (referred to herein as the liquefying temperature) at a given pressure (e.g., ambient pressure). The liquefying temperature can be equal to a liquidus temperature where the entire material is at a liquid state at a given pressure (e.g., ambient). The liquefying temperature of the pre-transformed material can be the temperature at or above which at least part of the pre-transformed material transitions from a solid to a liquid phase at a given pressure (e.g., ambient).

In some embodiments, the energy beam paths may be heated by a second (e.g., scanning) energy beam (e.g., an electron beam or a laser). The second scanning energy beam may the same scanning energy beam that is used to form the 3D object (e.g., first scanning energy beam). The second scanning energy beam may a different scanning energy beam from the one used to form the 3D object (e.g., first scanning energy beam). The second scanning energy beam may be generated by a second (e.g., scanning) energy source. The second scanning energy source may be the same scanning energy source that is used to generate the first scanning energy beam, or may be a different energy source. The second energy source may be the same scanning energy source that is used to generate the energy flux, or be a different energy source.

In some embodiments, the scanning energy beam is a substantially collimated beam. The scanning energy beam may not be a substantially dispersed and/or diffused beam. The scanning energy beam may follow a path. The path may form an internal path (e.g., vectorial path) within the portions. The scanning energy beam may irradiate energy on the exposed target surface after the energy flux irradiated one or more (e.g., all) of the tiles. The scanning energy beam may heat at least a portion of the heated tile (e.g., along a path). The path of the scanning energy beam within the tile is designated herein as the "internal path" within the tiles. The internal path within the tiles may be of substantially the same general shape as the shape of the path-of-tiles (e.g., both sine waves). The internal path within the tiles may be of a different general shape than the shape of the path-of-tiles (e.g., vector lines vs. a sine wave). The path may follow a spiraling shape, or a random shape (e.g., FIG. 5, 511). The path may be overlapping (e.g., FIG. 5, 516) or non-overlapping. The path may comprise at least one overlap. The path may be substantially devoid of overlap (e.g., FIG. 5, 510).

Figure 4:
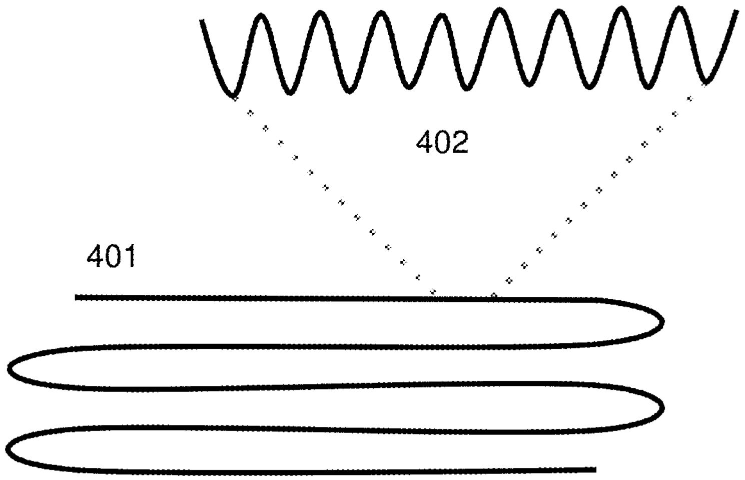
FIG. 4 schematically illustrates a path.

The path of the scanning energy beam may comprise a finer path. The finer path may be an oscillating path. FIG. 4 shows an example of a path of the scanning energy beam 401. The path 401 is composed of an oscillating sub-path 402. The oscillating sub path can be a zigzag or sinusoidal path. The finer path may include or substantially exclude a curvature.

Figure 5:
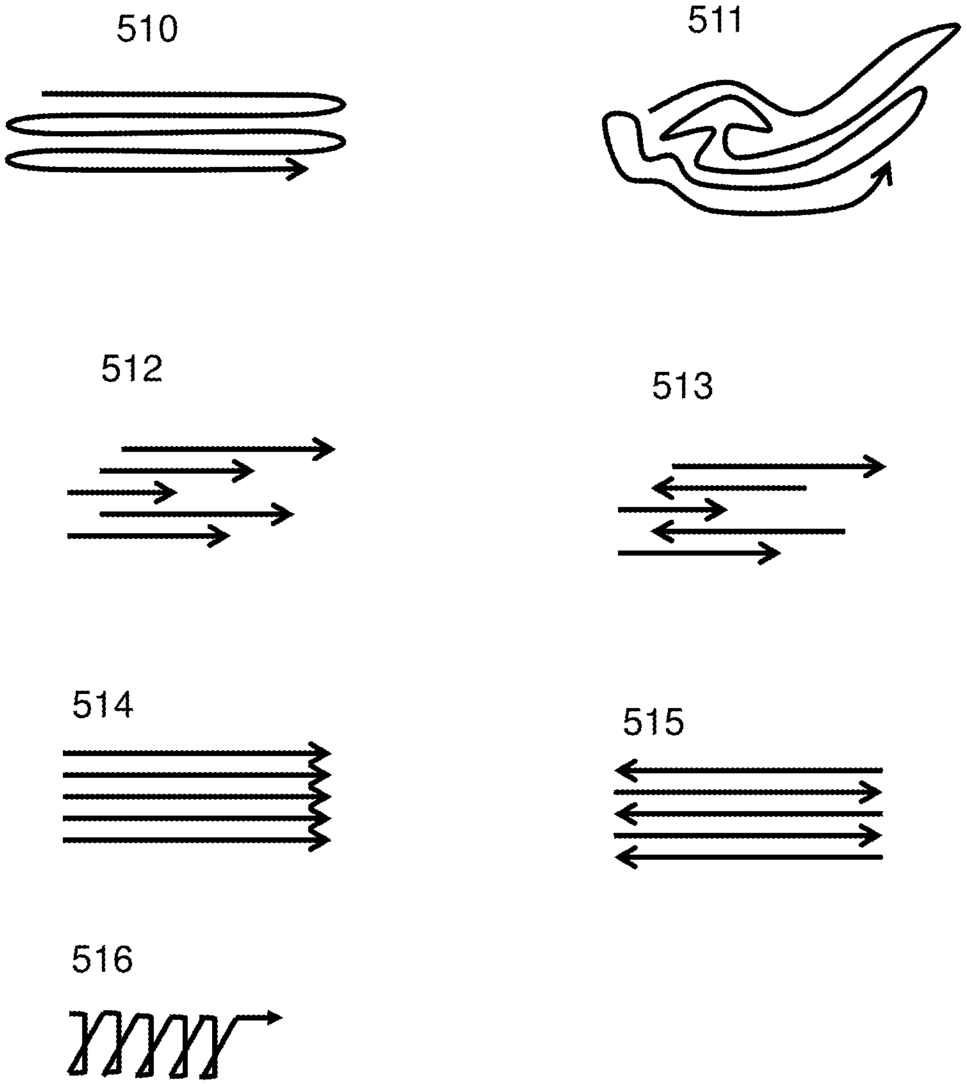
FIG. 5 schematically illustrates various paths.

The scanning energy beam may travel in a path that comprises or substantially excludes a curvature. FIG. 5 shows various examples of paths. The scanning energy beam may travel in each of these types of paths. The path may substantially exclude a curvature (e.g., 512-515). The path may include a curvature (e.g., 510-511). The path may comprise hatching (e.g., 512-515). The hatching may be directed in the same direction (e.g., 512 or 514). Every adjacent hatching may be directed in an opposite direction (e.g., 513 or 515). The hatching may have the same length (e.g., 514 or 515). The hatching may have varied length (e.g., 512 or 513). The spacing between two adjacent path sections may be substantially identical (e.g., 510) or non-identical (e.g., 511). The path may comprise a repetitive feature (e.g., 510), or be substantially non-repetitive (e.g., 511). The path may comprise non-overlapping sections (e.g., 510), or overlapping sections (e.g., 516). The tile may comprise a spiraling progression (e.g., 516). The non-tiled sections of the target surface may be irradiated by the scanning energy beam in any of the path types described herein.

The heating can be done by the one or more energy sources. At least two of the energy sources may heat the target surface (e.g., and form tiles) simultaneously, sequentially, or a combination thereof. At least two tiles can be heated sequentially. At least two tiles can be heated substantially simultaneously. The sequence of heating at least two of the tiles may overlap.

In some instances, the methods, systems and/or apparatuses may comprise measuring the temperature and/or the shape of the transformed (e.g., molten) fraction within the heated area of the target surface (e.g., a tile). The temperature measurement may comprise real time temperature measurement. The depth of the transformed fraction may be estimated (e.g., based on the temperature measurements). The temperature measurements and/or estimation of the transformed fraction depth may be used to control (e.g., regulate and/or direct) the energy irradiated at a particular portion. Controlling the irradiating energy may comprise its power, dwell time, or cross section on the exposed surface. The control may comprise reducing (e.g., halting) the irradiating energy on reaching a target depth. The dwell time (e.g., exposure time) may be at least a few tenths of millisecond (e.g., from about 0.1), or at least a few milliseconds (e.g., from about 1 msec). The exposure time (e.g., dwell time) may be as disclosed herein. The control may comprise reducing (e.g., halting) the irradiating energy while taking into account the rate at which the heated portions cool down. The rate of heating and/or cooling the portions may afford formation of desired microstructures (e.g., at particular areas). The desired microstructures may be formed at a particular area or in the entire layer of hardened material. The temperature at the heated (e.g., heat tiled) area may be measured (e.g., visually) (e.g., with a direct or indirect view of the heated area). The measurement may comprise using a detector (e.g., CCD camera, video camera, fiber array coupled to a single pixel detector, fiber array coupled to a plurality of pixel detectors, and/or a spectrometer). The visual measurements may comprise using image processing. The transformation of the heated tile may be monitored (e.g., visually, and/or spectrally). The shape of the transforming fraction of the heated area may be monitored (e.g., visually, and/or in real-time). The FLS of the transformed(ing) fraction may be used to indicate the depth and/or volume of the transformed material (e.g., melt pool). The monitoring (e.g., of the heat and/or FLS of the transformed fraction within the heated area) may be used to control one or more parameters of the energy source, energy flux, energy source, and/or scanning energy beam. The parameters may comprise (i) the power generated by the tiling energy source (e.g., energy source of the energy flux) and/or scanning energy source, (ii) the dwell time of energy flux, or (iii) the speed of the scanning energy beam.

The control of the energy (e.g., beam and/or flux) may comprise substantially ceasing (e.g., stopping) to irradiate the target area when the temperature at the bottom skin reaches a target temperature. The control of the energy (e.g., beam and/or flux) may comprise substantially reducing the energy supplied to (e.g., injected into) the target area when the temperature at the bottom skin reached a target temperature. The control of the energy (e.g., beam and/or flux) may comprise altering the energy profile of the energy beam and/or flux respectively. The control may be different (e.g., may vary) for layers that are closer to the bottom skin layer as compared to layers that are more distant from the bottom skin layer. The control may comprise turning the energy beam and/or flux on and off. The control may comprise reducing the power per unit area, cross section, focus, power, of energy beam and/or flux. The control may comprise altering a property of the energy beam and/or flux, which property may comprise the power, power per unit area, cross section, energy profile, focus, scanning speed, pulse frequency (when applicable), or dwell time of the energy beam and/or flux respectively. During the "off" times (e.g., intermission), the power and/or power per unit area of the energy beam and/or flux may be substantially reduced as compared to its value at the "on" times (e.g., dwell times). During the intermission, the energy beam and/or flux may relocate away from the area which was tiled, to a different area in the target surface that is substantially distant from area which was tiled. During the dwell times, the energy beam and/or flux may relocate back to the position adjacent to the area which was just tiled (e.g., as part of the path-of-tiles).

The very first formed layer of hardened material in a 3D object is referred to herein as the "bottom skin." In some embodiments, the bottom skin layer is the very first layer in an unsupported portion of a 3D object. The unsupported portion may not be supported by auxiliary supports. The unsupported portion may be connected to the center (e.g., core) of the 3D object and may not be otherwise supported by, or anchored to, the platform. For example, the unsupported portion may be a hanging structure (e.g., a ledge) or a cavity ceiling.

Cooling the tiles may comprise introducing a cooling member (e.g., heat sink) to the heated area. FIG. 1 shows an example of an optional cooling member (e.g., heat sink 113) that is disposed above the exposed (e.g., top) surface 131 of the target surface (e.g., material bed) 104. The cooling member may be translatable vertically, horizontally, or at an angle (e.g., planar or compound). The translation may be controlled manually and/or by a controller. The cooling member may be operatively coupled to the controller. The first energy source (e.g., for energy flux, e.g., FIG. 1, 122), the second (e.g., scanning) energy source, and/or the cooling member may be translatable vertically, horizontally, or at an angle (e.g., planar or compound). The translation may be controlled manually and/or by a controller. The energy source for energy flux, first scanning energy source, and/or second scanning energy source may be operatively coupled to the controller. The cooling member may control (e.g., prevent) accumulation of heat in certain portions of the exposed 3D object (e.g., exposed layer of hardened material). Heating a tile in a particular area of the target surface may control (e.g., regulate) accumulation of heat in certain portions of the exposed 3D object (e.g., exposed layer of hardened material).

The control may be closed loop control, or an open loop control (e.g., based on energy calculations comprising an algorithm). The closed loop control may comprise feedback or feed-forward control. The algorithm may take into account one or more temperature measurements (e.g., as disclosed herein), metrological measurements, geometry of at least part of the 3D object, heat depletion/conductance profile of at least part of the 3D object. The controller may modulate the irradiative energy and/or the energy beam. The algorithm may take into account pre-correction of an object (i.e., object pre-print correction, OPC) to compensate for any distortion of the final 3D object. The algorithm may comprise instructions to form a correctively deformed object. The algorithm may comprise modification applied to the model of a desired 3D object. Examples of modifications (e.g., corrective deformations) can be found in Patent Application Serial No. PCT/US16/34857 filed on May 27, 2016, titled "THREE-DIMENSIONAL PRINTING AND THREE-DIMENSIONAL OBJECTS FORMED USING THE SAME" or in U.S. Provisional Patent Application Ser. No. 62/239,805, titled "SYSTEMS, APPARATUSES AND METHODS FOR THREE-DIMENSIONAL PRINTING, AS WELL AS THREE-DIMENSIONAL OBJECTS" that was filed on Oct. 9, 2015, both of which are entirely incorporated herein by reference. The control may be any control disclosed in U.S. Provisional Patent Application Ser. No. 62/401,534 filed on Sep. 29, 2016, titled "ACCURATE THREE-DIMENSIONAL PRINTING", that is incorporated herein by reference in its entirety.

The methods for generating one or more 3D objects described herein may comprise: depositing a layer of pre-transformed material (e.g., powder) in an enclosure; providing energy to a portion of the layer of material (e.g., according to a path); transforming at least a section of the portion of the layer of material to form a transformed material by utilizing the energy; optionally allowing the transformed material to harden into a hardened material; and optionally repeating steps a) to d) to generate the one or more 3D objects. The enclosure may comprise a platform (e.g., a substrate and/or base). The enclosure may comprise a container. The 3D object may be printed adjacent to (e.g., above) the platform. The pre-transformed material may be deposited in the enclosure by a material dispensing system to form a layer of pre-transformed material within the enclosure. The deposited material may be leveled by a leveling mechanism. The deposition of pre-transformed material in the enclosure may form a material bed, or be deposited on a platform. The leveling mechanism may comprise a leveling step where the leveling mechanism does not contact the exposed surface of the material (e.g., powder) bed. The material dispensing system may comprise one or more dispensers. The material dispensing system may comprise at least one material (e.g., bulk) reservoir. The material may be deposited by a layer dispensing mechanism (e.g., recoater). The layer dispensing mechanism may level the dispensed material without contacting the powder bed (e.g., the top surface of the powder bed). The layer dispensing mechanism may include any layer dispensing mechanism, material removal mechanism, and/or powder dispensing mechanism that are disclosed in Patent Application Serial No. PCT/US15/36802 that is incorporated herein by reference in its entirety. The layer dispensing mechanism may comprise a material dispensing mechanism, material leveling mechanism, material removal mechanism, or any combination thereof.

The system, apparatuses and/or method may comprise a layer dispensing mechanism (e.g., recoater) that dispenses a layer of pre-transformed (e.g., powder) material comprising an exposed surface that is substantially planar. The layer dispensing mechanism can be any layer dispensing mechanism disclosed in Patent Application Serial No. PCT/US15/36802, which is incorporated herein by reference in its entirety. FIG. 1 shows an example of a layer dispensing mechanism comprising a material dispensing mechanism 116, a leveling mechanism 117, and a material removal mechanism 118 (The white arrows in 116 and 118 designate the direction in which the pre-transformed material flows into/out of the material bed (e.g., 104).

The 3D object may be subsequently cleaned and/or cooled within the enclosure, and/or exit the enclosure through an exit. The cleaning may comprise using gas pressure, vibrations, and/or surface friction (e.g., brush). The cleaning may comprise a post processing procedure as disclosed in Patent Application Serial No. PCT/US15/36802, which is incorporated herein by reference in its entirety.

The three-dimensional object can be devoid of surface features that are indicative of the use of a post printing process. The post printing process may comprise a trimming process (e.g., to trim auxiliary supports). The trimming process may be an operation conducted after the completion of the 3D printing process. The trimming process may be a separate operation from the 3D printing process. The trimming may comprise cutting (e.g., using a piercing saw). The trimming can comprise polishing or blasting. The blasting can comprise solid blasting, gas blasting, or liquid blasting. The solid blasting can comprise sand blasting. The gas blasting can comprise air blasting. The liquid blasting can comprise water blasting. The blasting can comprise mechanical blasting.

The layered structure can be a substantially repetitive layered structure. Each layer of the layered structure has an average layer thickness greater than or equal to about 5 micrometers (μm). Each layer of the layered structure has an average layer thickness less than or equal to about 1000 micrometers (μm). The layered structure can comprise individual layers of the successive solidified melt pools. A given one of the successive solidified melt pools can comprise a substantially repetitive material variation selected from the group consisting of variation in grain orientation, variation in material density, variation in the degree of compound segregation to grain boundaries, variation in the degree of element segregation to grain boundaries, variation in material phase, variation in metallurgical phase, variation in material porosity, variation in crystal phase, and variation in crystal structure. A given one of the successive solidified melt pools can comprise a crystal. The crystal can comprise a single crystal. The layered structure can comprise one or more features indicative of solidification of melt pools during the three-dimensional printing process. The layered structure can comprise a feature indicative of the use of the 3D printing process. A fundamental length scale of the three-dimensional object can be at least about 120 micrometers.

The layer of hardened material layer (or a portion thereof) can have a thickness (e.g., layer height) of at least about 50 μm, 100 μm, 150 μm, 200 μm, 300 μm, 400 μm, 500 μm, 600 μm, 700 μm, 800 μm, 900 μm, or 1000 μm. A hardened material layer (or a portion thereof) can have a thickness of at most about 1000 μm, 900 μm, 800 μm, 700 μm, 600 μm, 500 μm, 450 μm, 400 μm, 350 μm, 300 μm, 250 μm, 200 μm, 150 μm, 100 μm, 75 μm, or 50 μm. A hardened material layer (or a portion thereof) may have any value in between the aforementioned layer thickness values (e.g., from about 50 μm to about 1000 μm, from about 500 μm to about 800 μm, from about 300 μm to about 600 μm, from about 300 μm to about 900 μm, or from about 50 μm to about 200 μm).

In some instances, one, two, or more 3D objects may be generated in a material bed (e.g., a single material bed; the same material bed). The multiplicity of 3D object may be generated in the material bed simultaneously or sequentially. At least two 3D objects may be generated side by side. At least two 3D objects may be generated one on top of the other. At least two 3D objects generated in the material bed may have a gap between them (e.g., gap filled with pre-transformed material). At least two 3D objects generated in the material bed may contact (e.g., not connect to) each other. In some embodiments, the 3D objects may be independently built one above the other. The generation of a multiplicity of 3D objects in the material bed may allow continuous creation of 3D objects.

The material (e.g., pre-transformed material, transformed material, or hardened material) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The ceramic material may comprise cement. The ceramic material may comprise alumina. The material may comprise sand, glass, or stone. In some embodiments, the material may comprise an organic material, for example, a polymer or a resin. The organic material may comprise a hydrocarbon. The polymer may comprise styrene. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The solid material may comprise powder material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) or wires. The material may comprise Carbon black, or glass (e.g., a fiber thereof). The material may exclude (e.g., be devoid of) a polymer and/or resin. The material may exclude (e.g., be devoid of) a binder or a tacky material.

The material may comprise a powder material. The material may comprise a solid material. The material may comprise one or more particles or clusters. The term "powder," as used herein, generally refers to a solid having fine particles. The powder may also be referred to as "particulate material." Powders may be granular materials. The powder particles may comprise micro particles. The powder particles may comprise nanoparticles. In some examples, a powder comprising particles having an average fundamental length scale of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, or 100 μm. The particles comprising the powder may have an average fundamental length scale of at most about 100 μm, 80 μm, 75 μm, 70 μm, 65 μm, 60 μm, 55 μm, 50 μm, 45 μm, 40 μm, 35 μm, 30 μm, 25 μm, 20 μm, 15 μm, 10 μm, 5 μm, 1 μm, 500 nm, 400 nm, 300 nm, 200 nm, 100 nm, 50 nm, 40 nm, 30 nm, 20 nm, 10 nm, or 5 nm. In some cases, the powder may have an average fundamental length scale between any of the values of the average particle fundamental length scale listed above (e.g., from about 5 nm to about 100 μm, from about 1 μm to about 100 μm, from about 15 μm to about 45 μm, from about 5 μm to about 80 μm, from about 20 μm to about 80 μm, or from about 500 nm to about 50 μm).

The powder can be composed of individual particles. The individual particles can be spherical, oval, prismatic, cubic, or irregularly shaped. The particles can have a fundamental length scale. The powder can be composed of a homogenously shaped particle mixture such that all of the particles have substantially the same shape and fundamental length scale magnitude within at most 1%, 5%, 8%, 10%, 15%, 20%, 25%, 30%, 35%, 40%, 50%, 60%, or 70%, distribution of fundamental length scale. In some cases, the powder can be a heterogeneous mixture such that the particles have variable shape and/or fundamental length scale magnitude.

At least parts of the layer can be transformed to a transformed material that may subsequently form at least a fraction (also used herein "a portion," or "a part") of a hardened (e.g., solidified) 3D object. At times a layer of transformed or hardened material may comprise a cross section of a 3D object (e.g., a horizontal cross section). At times a layer of transformed or hardened material may comprise a deviation from a cross section of a 3D object. The deviation may include vertical or horizontal deviation. A pre-transformed material may be a powder material. A pre-transformed material layer (or a portion thereof) can have a thickness (e.g., layer height) of at least about 0.1 micrometer (μm), 0.5 μm, 1.0 μm, 10 μm, 50 μm, 100 μm, 150 μm, 200 μm, 300 μm, 400 μm, 500 μm, 600 μm, 700 μm, 800 μm, 900 μm, or 1000 μm. A pre-transformed material layer (or a portion thereof) can have a thickness of at most about 1000 μm, 900 μm, 800 μm, 700 μm, 600 μm, 500 μm, 450 μm, 400 μm, 350 μm, 300 μm, 250 μm, 200 μm, 150 μm, 100 μm, 75 μm, 50 μm, 40 μm, 30 μm, 20 μm, 10 μm, 5 μm, 1 μm, or 0.5 μm. A pre-transformed material layer (or a portion thereof) may have any value in between the aforementioned layer thickness values (e.g., from about 0.1 μm to about 1000 μm, from about 1 μm to about 800 μm, from about 20 μm to about 600 μm, from about 30 μm to about 300 μm, or from about 10 μm to about 1000 μm).

The material composition of at least one layer within the material bed may differ from the material composition within at least one other layer in the material bed. The difference (e.g., variation) may comprise difference in crystal or grain structure. The variation may comprise variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The microstructure of the printed object may comprise planar structure, cellular structure, columnar dendritic structure, or equiaxed dendritic structure.

The pre-transformed materials of at least one layer in the material bed may differ in the FLS of its particles (e.g., powder particles) from the FLS of the pre-transformed material within at least one other layer in the material bed. A layer may comprise two or more material types at any combination. For example, two or more elemental metals, two or more metal alloys, two or more ceramics, two or more allotropes of elemental carbon. For example, an elemental metal and a metal alloy, an elemental metal and a ceramic, an elemental metal and an allotrope of elemental carbon, a metal alloy and a ceramic, a metal alloy, and an allotrope of elemental carbon, a ceramic and an allotrope of elemental carbon. All the layers of pre-transformed material deposited during the 3D printing process may be of the same material composition. In some instances, a metal alloy is formed in situ during the process of transforming at least a portion of the material bed. In some instances, a metal alloy is not formed in situ during the process of transforming at least a portion of the material bed. In some instances, a metal alloy is formed prior to the process of transforming at least a portion of the material bed. In a multiplicity (e.g., mixture) of pre-transformed (e.g., powder) materials, one pre-transformed material may be used as support (e.g., supportive powder), as an insulator, as a cooling member (e.g., heat sink), or as any combination thereof.

In some instances, adjacent components in the material bed are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size disclosed herein.

The pre-transformed material (e.g., powder material) can be chosen such that the material is the desired and/or otherwise predetermined material for the 3D object. In some cases, a layer of the 3D object comprises a single type of material. In some examples, a layer of the 3D object may comprise a single elemental metal type, or a single metal alloy type. In some examples, a layer within the 3D object may comprise several types of material (e.g., an elemental metal and an alloy, an alloy and a ceramic, an alloy, and an allotrope of elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member (e.g., an allotrope) of elemental carbon (e.g., graphite). In some cases, a layer of the 3D object comprises more than one type of material. In some cases, a layer of the 3D object comprises more than one member of a material type.

The elemental metal can be an alkali metal, an alkaline earth metal, a transition metal, a rare earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth.

The metal alloy can be an iron based alloy, nickel based alloy, cobalt based alloy, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718, or X-750. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, tablet), air conditioning, generators, furniture, musical equipment, art, jewelry, cooking equipment, or sport gear. The metal (e.g., alloy or elemental) may comprise an alloy used for products for human or veterinary applications comprising implants, or prosthetics. The metal alloy may comprise an alloy used for applications in the fields comprising human or veterinary surgery, implants (e.g., dental), or prosthetics.

The alloy may include a superalloy. The alloy may include a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy (e.g., Haynes 282), Incoloy, MP98T, TMS alloy, MTEK (e.g., MTEK grade MAR-M-247, MAR-M-509, MAR-M-R41, or MAR-M-X-45), orcmSX (e.g., cmSX-3, orcmSX-4). The alloy can be a single crystal alloy.

In some instances, the iron alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may include cast iron, or pig iron. The steel may include Bulat steel, Chromoly, Crucible steel, Damascus steel, Hadfield steel, High speed steel, HSLA steel, Maraging steel, Maraging steel (M300), Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 317L, 2205, 409, 904L, 321, 254SMO, 316Ti, 321H, 17-4, 15-5, 420 or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316, martensitic 420, or martensitic 440). The austenitic 316 stainless steel may include 316L, or 316LVM. The steel may include 17-4 Precipitation Hardening steel (also known as type 630, a chromium-copper precipitation hardening stainless steel, 17-4PH steel).

The titanium-based alloys may include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38, or higher. In some instances, the titanium base alloy includes Ti-6Al-4V or Ti-6Al-7Nb.

The Nickel alloy may include Alnico, Alumel, Chromel, Cupronickel, Ferronickel, German silver, Hastelloy, Inconel, Monel metal, Nichrome, Nickel-carbon, Nicrosil, Nisil, Nitinol, Hastelloy-X, Cobalt-Chromium or Magnetically “soft” alloys. The magnetically “soft” alloys may comprise Mu-metal, Permalloy, Supermalloy, or Brass. The brass may include Nickel hydride, Stainless or Coin silver. The cobalt alloy may include Megallium, Stellite (e.g. Talonite), Ultimet, or Vitallium. The chromium alloy may include chromium hydroxide, or Nichrome.

The aluminum alloy may include AA-8000, Al—Li (aluminum-lithium), Alnico, Duralumin, Hiduminium, Kryron Magnalium, Nambe, Scandium-aluminum, or Y alloy. The magnesium alloy may be Elektron, Magnox, or T—Mg—Al—Zn (Bergman phase) alloy.

The copper alloy may comprise Arsenical copper, Beryllium copper, Billon, Brass, Bronze, Constantan, Copper hydride, Copper-tungsten, Corinthian bronze, Cunife, Cupronickel, Cymbal alloys, Devarda’s alloy, Electrum, Hepatizon, Heusler alloy, Manganin, Molybdochalkos, Nickel silver, Nordic gold, Shakudo, or Tumbaga. The Brass may include Calamine brass, Chinese silver, Dutch metal, Gilding metal, Muntz metal, Pinchbeck, Prince’s metal, or Tombac. The Bronze may include Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84).

The metal alloys can be Refractory Alloys. The refractory metals and alloys may be used for heat coils, heat exchangers, furnace components, or welding electrodes. The Refractory Alloys may comprise a high melting points, low coefficient of expansion, mechanically strong, low vapor pressure at elevated temperatures, high thermal conductivity, or high electrical conductivity.

In some examples the material (e.g., powder material) comprises a material wherein its constituents (e.g., atoms or molecules) readily lose their outer shell electrons, resulting in a free-flowing cloud of electrons within their otherwise solid arrangement. In some examples the material is characterized in having high electrical conductivity, low electrical resistivity, high thermal conductivity, or high density (e.g., as measured at ambient temperature (e.g., R.T., or 20° C.)). The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol “*” designates the mathematical operation “times,” or “multiplied by.” The high electrical conductivity can be any value between the aforementioned electrical conductivity values (e.g., from about $1*10^5$ S/m to about $1*10^8$ S/m). The low electrical resistivity may be at most about $1*10^{-5}$ ohm times meter (Ω*m), $5*10^{-6}$ δ/m, $1*10^{-6}$ δ/m, $5*10^{-7}$ Ωm, $1*10^{-7}$ Ωm, $5*10^{-8}$, or $1*10^{-8}$ Ωm. The low electrical resistivity can be any value between the aforementioned electrical resistivity values (e.g., from about $1\times10^{-5}$ Ωm to about $1\times10^{-8}$ Ωm). The high thermal conductivity may be at least about 20 Watts per meters times degrees Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the aforementioned thermal conductivity values (e.g., from about 20 W/mK to about 1000 W/mK). The high density may be at least about 1.5 grams per cubic centimeter (g/cm$^3$), 2 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the aforementioned density values (e.g., from about 1 g/cm$^3$ to about 25 g/cm$^3$).

A metallic material (e.g., elemental metal or metal alloy) can comprise small amounts of non-metallic materials, such as, for example, oxygen, sulfur, or nitrogen. In some cases, the metallic material can comprise the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (on the basis of weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (on the basis of weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

Figure 10:
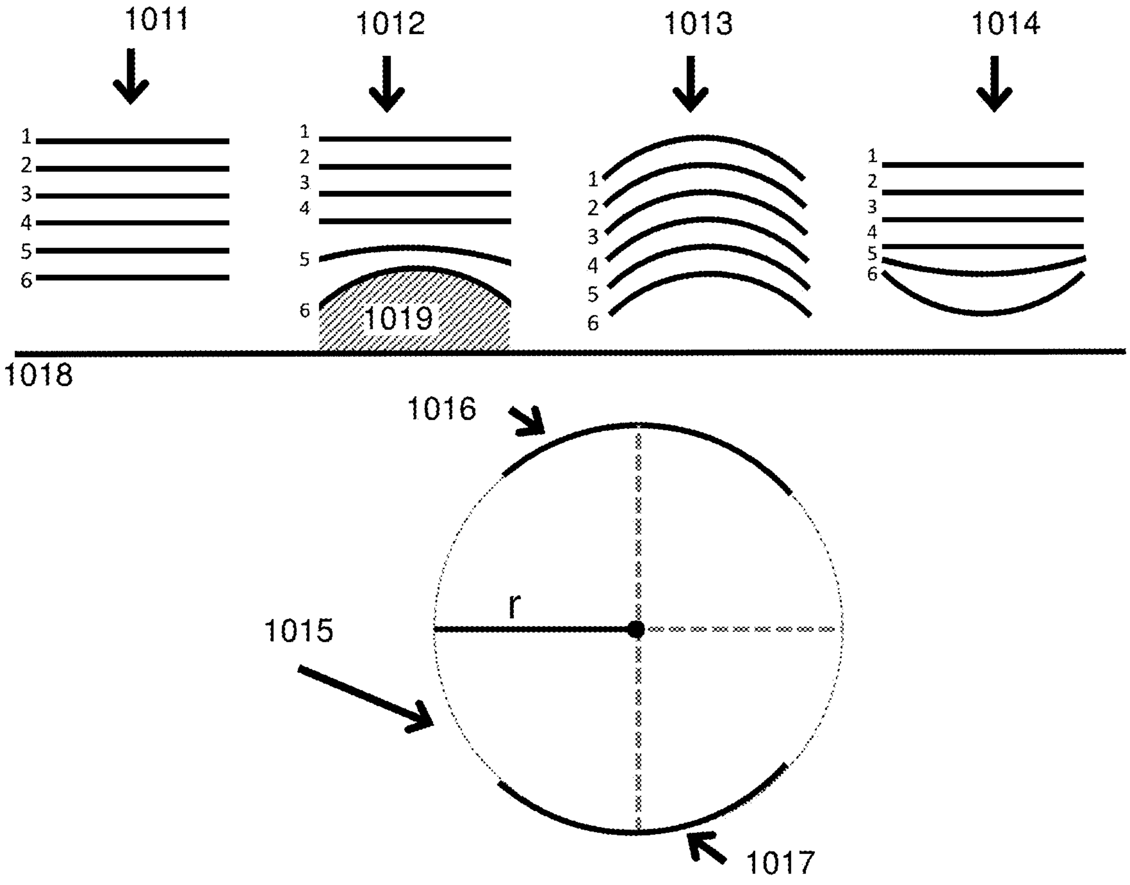
FIG. 10 shows various vertical cross-sectional views of different 3D objects.

The one or more layers within the 3D object may be substantially planar (e.g., flat). The planarity of the layer may be substantially uniform. The height of the layer at a particular position may be compared to an average plane. The average plane may be defined by a least squares planar fit of the top-most part of the surface of the layer of hardened material. The average plane may be a plane calculated by averaging the material height at each point on the top surface of the layer of hardened material. The deviation from any point at the surface of the planar layer of hardened material may be at most 20% 15%, 10%, 5%, 3%, 1%, or 0.5% of the height (e.g., thickness) of the layer of hardened material. The substantially planar one or more layers may have a large radius of curvature. FIG. 10 shows an example of a vertical cross section of a 3D object 1012 comprising planar layers (layers numbers 1-4) and non-planar layers (e.g., layers numbers 5-6) that have a radius of curvature. The curvature can be positive or negative with respect to the platform and/or the exposed surface of the material bed. For example, layered structure 1012 comprises layer number 6 that has a curvature that is negative, as the volume (e.g., area in a vertical cross section of the volume) bound from the bottom of it to the platform 1018 is a convex object 1019. Layer number 5 of 1012 has a curvature that is negative. Layer number 6 of 1012 has a curvature that is more negative (e.g., has a curvature of greater negative value) than layer number 5 of 1012. Layer number 4 of 1012 has a curvature that is (e.g., substantially) zero. Layer number 6 of 1014 has a curvature that is positive. Layer number 6 of 1012 has a curvature that is more negative than layer number 5 of 1012, layer number 4 of 1012, and layer number 6 of 1014. Layer numbers 1-6 of 1013 are of substantially uniform (e.g., negative curvature). FIGS. 10, 1016 and 1017 are superpositions of curved layer on a circle 1015 having a radius of curvature “r.” The one or more layers may have a radius of curvature equal to the radius of curvature of the layer surface. The radius of curvature may equal infinity (e.g., when the layer is flat). The radius of curvature of the layer surface (e.g., all the layers of the 3D object) may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The radius of curvature of the layer surface (e.g., all the layers of the 3D object) may have a value of at most about 0.1 centimeter (cm), 0.2 cm, 0.3 cm, 0.4 cm, 0.5 cm, 0.6 cm, 0.7 cm, 0.8 cm, 0.9 cm, 1 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, 100 m, or infinity (i.e., flat, or planar layer). The radius of curvature of the layer surface (e.g., all the layers of the 3D object) may have any value between any of the afore-mentioned values of the radius of curvature (e.g., from about 10 cm to about 90 m, from about 50 cm to about 10 m, from about 5 cm to about 1 m, from about 50 cm to about 5 m, from about 5 cm to infinity, or from about 40 cm to about 50 m). In some embodiments, a layer with an infinite radius of curvature is a layer that is planar. In some examples, the one or more layers may be included in a planar section of the 3D object, or may be a planar 3D object (e.g., a flat plane). In some instances, part of at least one layer within the 3D object has the radius of curvature mentioned herein.

Figure 11:
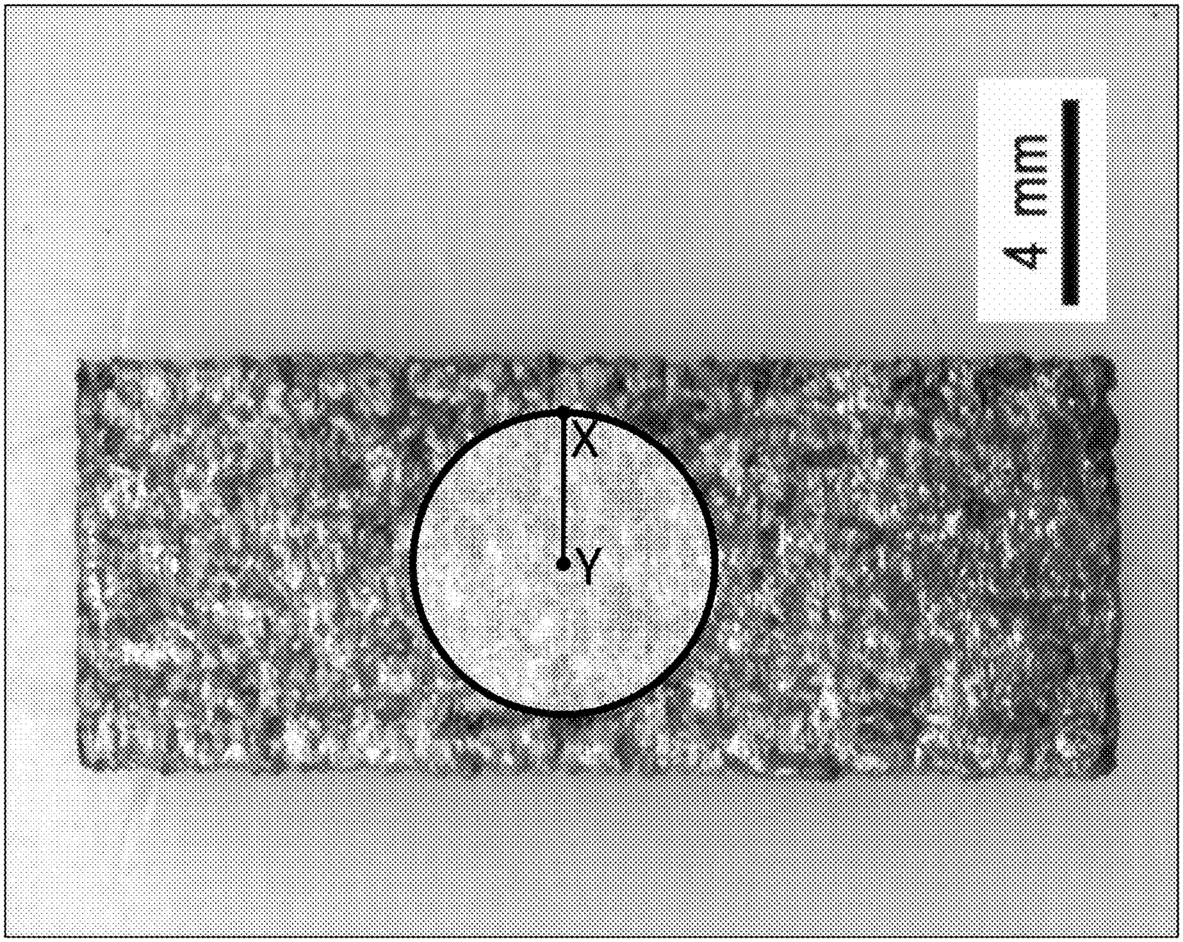
FIG. 11 shows a horizontal view of a 3D object.

The 3D object may comprise a layering plane N of the layered structure. The 3D object may comprise points X and Y, which reside on the surface of the 3D object, wherein X is spaced apart from Y by at least about 10.5 millimeters or more. FIG. 11 shows an example of points X and Y on the surface of a 3D object. In some embodiments, X is spaced apart from Y by the auxiliary feature spacing distance. A sphere of radius XY that is centered at X lacks one or more auxiliary supports or one or more auxiliary support marks that are indicative of a presence or removal of the one or more auxiliary support features. In some embodiments, Y is spaced apart from X by at least about 10.5 millimeters or more. An acute angle between the straight line XY and the direction normal to N may be from about 45 degrees to about 90 degrees. The acute angle between the straight line XY and the direction normal to the layering plane may be of the value of the acute angle alpha. When the angle between the straight line XY and the direction of normal to N is greater than 90 degrees, one can consider the complementary acute angle. The layer structure may comprise any material(s) used for 3D printing described herein. Each layer of the 3D structure can be made of a single material or of multiple materials. Sometimes one part of the layer may comprise one material, and another part may comprise a second material different than the first material. A layer of the 3D object may be composed of a composite material. The 3D object may be composed of a composite material. The 3D object may comprise a functionally graded material.

In some embodiments, the generated 3D object may be generated with the accuracy of at least about 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 400 μm, 500 μm, 600 μm, 700 μm, 800 μm, 900 μm, 1000 μm, 1100 μm, or 1500 μm as compared to a model of the 3D object (e.g., the desired 3D object). The generated 3D object may be generated with the accuracy of at most about 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 400 μm, 500 μm, 600 μm, 700 μm, 800 μm, 900 μm, 1000 μm, 1100 μm, or 1500 μm as compared to a model of the 3D object. As compared to a model of the 3D object, the generated 3D object may be generated with the accuracy of any accuracy value between the aforementioned values (e.g., from about 5 μm to about 100 μm, from about 15 μm to about 35 μm, from about 100 μm to about 1500 μm, from about 5 μm to about 1500 μm, or from about 400 μm to about 600 μm).

The hardened layer of transformed material may deform. The deformation may cause a height deviation from a uniformly planar layer of hardened material. The height uniformity (e.g., deviation from average surface height) of the planar surface of the layer of hardened material may be at least about 100 μm, 90 μm, 80 μm, 70 μm, 60 μm, 50 μm, 40 μm, 30 μm, 20 μm, 10 μm, or 5 μm. The height uniformity of the planar surface of the layer of hardened material may be at most about 100 μm, 90 μm, 80, 70 μm, 60 μm, 50 μm, 40 μm, 30 μm, 20 μm, 10 μm, or 5 μm. The height uniformity of the planar surface of the layer of hardened material may be any value between the afore-mentioned height deviation values (e.g., from about 100 μm to about 5 μm, from about 50 μm to about 5 μm, from about 30 μm to about 5 μm, or from about 20 μm to about 5 μm). The height uniformity may comprise high precision uniformity. The resolution of the 3D object may have any value of the height uniformity value mentioned herein. The resolution of the 3D object may be at least about 100 dots per inch (dpi), 300 dpi, 600 dpi, 1200 dpi, 2400 dpi, 3600 dpi, or 4800 dpi. The resolution of the 3D object may be at most about 100 dpi, 300 dpi, 600 dpi, 1200 dpi, 2400 dpi, 3600 dpi, or 4800 dip. The resolution of the 3D object may be any value between the aforementioned values (e.g., from 100 dpi to 4800 dpi, from 300 dpi to 2400 dpi, or from 600 dpi to 4800 dpi).

The height uniformity of a layer of hardened material may persist across a portion of the layer surface that has a width or a length of at least about 1 mm, 2 mm, 3 mm, 4 mm, 5 mm, or 10 mm, have a height deviation of at least about 10 mm, 9 mm, 8 mm, 7 mm, 6 mm, 5 mm, 4 mm, 3 mm, 2 mm, 1 mm, 500 μm, 400 μm, 300 μm, 200 μm, 100 μm, 90 μm, 80 μm, 70 μm, 60 μm, 50 μm, 40 μm, 30 μm, 20 μm, or 10 μm. The height uniformity of a layer of hardened material may persist across a portion of the target surface that has a width or a length of most about 10 mm, 9 mm, 8 mm, 7 mm, 6 mm, 5 mm, 4 mm, 3 mm, 2 mm, 1 mm, 500 μm, 400 μm, 300 μm, 200 μm, 100 μm, 90 μm, 80 μm, 70 μm, 60 μm, 50 μm, 40 μm, 30 μm, 20 μm, or 10 μm. The height uniformity of a layer of hardened material may persist across a portion of the target surface that has a width or a length of or of any value between the afore-mentioned width or length values (e.g., from about 10 mm to about 10 μm, from about 10 mm to about 100 μm, or from about 5 mm to about 500 μm).

Characteristics of the hardened material and/or any of its parts (e.g., layer of hardened material) can be measured by any of the following measurement methodologies. For example, the FLS values (e.g., width), height uniformity, auxiliary support space, and/or radius of curvature of the layer of the 3D object and any of its components (e.g., layer of hardened material) may be measured by any of the following measuring methodologies. The FLS of opening ports may be measured by one or more of following measurement methodologies. The measurement methodologies may comprise a microscopy method (e.g., any microscopy method described herein). The measurement methodologies may comprise a coordinate measuring machine (CMM), measuring projector, vision measuring system, and/or a gauge. The gauge can be a gauge distometer (e.g., caliper).

The gauge can be a go-no-go gauge. The measurement methodologies may comprise a caliper (e.g., Vernier caliper), positive lens, interferometer, or laser (e.g., tracker). The measurement methodologies may comprise a contact or by a non-contact method. The measurement methodologies may comprise one or more sensors (e.g., optical sensors and/or metrological sensors). The measurement methodologies may comprise a metrological measurement device (e.g., using metrological sensor(s)). The measurements may comprise a motor encoder (e.g., rotary, and/or linear). The measurement methodologies may comprise using an electromagnetic beam (e.g., visible or IR). The microscopy method may comprise ultrasound or nuclear magnetic resonance. The microscopy method may comprise optical microscopy. The microscopy method may comprise electromagnetic, electron, or proximal probe microscopy. The electron microscopy may comprise scanning, tunneling, X-ray photo-, or Auger electron microscopy. The electromagnetic microscopy may comprise confocal, stereoscope, or compound microscopy. The microscopy method may comprise an inverted and/or non-inverted microscope. The proximal probe microscopy may comprise atomic force, or scanning tunneling microscopy, or any other microscopy described herein. The microscopy measurements may comprise using an image analysis system. The measurements may be conducted at ambient temperatures (e.g., R.T.)

The microstructures (e.g., of melt pools) of the 3D object may be measured by a microscopy method (e.g., any microscopy method described herein). The microstructures may be measured by a contact or by a non-contact method. The microstructures may be measured by using an electromagnetic beam (e.g., visible or IR). The microstructure measurements may comprise evaluating the dendritic arm spacing and/or the secondary dendritic arm spacing (e.g., using microscopy). The microscopy measurements may comprise using an image analysis system. The measurements may be conducted at ambient temperatures (e.g., R.T.).

Various distances relating to the chamber can be measured using any of the following measurement techniques. Various distances within the chamber can be measured using any of the following measurement techniques. For example, the gap distance (e.g., from the cooling member to the exposed surface of the material bed) may be measured using any of the following measurement techniques. The measurements techniques may comprise interferometry and/or confocal chromatic measurements. The measurements techniques may comprise at least one motor encoder (rotary, linear). The measurement techniques may comprise one or more sensors (e.g., optical sensors and/or metrological sensors). The measurement techniques may comprise at least one inductive sensor. The measurement techniques may include an electromagnetic beam (e.g., visible or IR). The measurements may be conducted at ambient temperature (e.g., R.T.).

The methods described herein can provide surface uniformity across the exposed surface of the material bed (e.g., top of a powder bed) such that portions of the exposed surface that comprises the dispensed material, which are separated from one another by a distance of from about 1 mm to about 10 mm, have a height deviation from about 100 μm to about 5 μm. The methods described herein may achieve a deviation from a planar uniformity of the layer of pre-transformed material (e.g., powder) in at least one plane (e.g., horizontal plane) of at most about 20%, 10%, 5%, 2%, 1% or 0.5%, as compared to the average plane (e.g., horizontal plane) created at the exposed surface of the material bed (e.g., top of a powder bed). The height deviation can be measured by using one or more sensors (e.g., optical sensors).

The 3D object can have various surface roughness profiles, which may be suitable for various applications. The surface roughness may be the deviations in the direction of the normal vector of a real surface, from its ideal form. The surface roughness may be measured as the arithmetic average of the roughness profile (hereinafter "Ra"). The 3D object can have a Ra value of at least about 200 μm, 100 μm, 75 μm, 50 μm, 45 μm, 40 μm, 35 μm, 30 μm, 25 μm, 20 μm, 15 μm, 10 μm, 7 μm, 5 μm, 3 μm, 1 μm, 500 nm, 400 nm, 300 nm, 200 nm, 100 nm, 50 nm, 40 nm, or 30 nm. The formed object can have a Ra value of at most about 200 μm, 100 μm, 75 μm, 50 μm, 45 μm, 40 μm, 35 μm, 30 μm, 25 μm, 20 μm, 15 μm, 10 μm, 7 μm, 5 μm, 3 μm, 1 μm, 500 nm, 400 nm, 300 nm, 200 nm, 100 nm, 50 nm, 40 nm, or 30 nm. The 3D object can have a Ra value between any of the aforementioned Ra values (e.g., from about 30 nm to about 50 μm, from about 5 μm to about 40 μm, from about 3 μm to about 30 □μm, from about 10 nm to about 5011 m, or from about 15 nm to about 80 μm). The Ra values may be measured by a contact or by a non-contact method. The Ra values may be measured by a roughness tester and/or by a microscopy method (e.g., any microscopy method described herein). The measurements may be conducted at ambient temperatures (e.g., R.T.). The roughness may be measured by a contact or by a non-contact method. The roughness measurement may comprise one or more sensors (e.g., optical sensors). The roughness measurement may comprise a metrological measurement device (e.g., using metrological sensor(s)). The roughness may be measured using an electromagnetic beam (e.g., visible or IR).

The 3D object may be composed of successive layers (e.g., successive cross sections) of solid material that originated from a transformed material (e.g., fused, sintered, melted, bound, or otherwise connected powder material), and subsequently hardened. The transformed powder material may be connected to a hardened (e.g., solidified) material. The hardened material may reside within the same layer, or in another layer (e.g., a previous layer). In some examples, the hardened material comprises disconnected parts of the three-dimensional object, that are subsequently connected by the newly transformed material (e.g., by fusing, sintering, melting, binding or otherwise connecting a powder material).

A cross section (e.g., vertical cross section) of the generated (e.g., formed) 3D object may reveal a microstructure or a grain structure indicative of a layered deposition. Without wishing to be bound to theory, the microstructure or grain structure may arise due to the solidification of transformed powder material that is typical to and/or indicative of the 3D printing method. For example, a cross section may reveal a microstructure resembling ripples or waves that are indicative of solidified melt pools that may be formed during the 3D printing process. The repetitive layered structure of the solidified melt pools may reveal the orientation at which the part was printed. The cross section may reveal a substantially repetitive microstructure or grain structure. The microstructure or grain structure may comprise substantially repetitive variations in material composition, grain orientation, material density, degree of compound segregation or of element segregation to grain boundaries, material phase, metallurgical phase, crystal phase, crystal structure, material porosity, or any combination thereof. The microstructure or grain structure may comprise substantially repetitive solidification of layered melt pools. The substantially repetitive microstructure may have an average layer height of at least about 0.5 μm, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, or 500 μm. The substantially repetitive microstructure may have an average layer height of at most about 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, 30 μm, 20 μm, or 10 μm. The substantially repetitive microstructure may have an average layer height of any value between the aforementioned values of layer heights (e.g., from about 0.5 μm to about 500 μm, from about 15 μm to about 50 μm, from about 5 μm to about 150 μm, from about 20 μm to about 100 μm, or from about 10 μm to about 80 μm). In some cases, the layer height can refer to a distance between layers (e.g., FIG. 10, distance between layers e.g., 1 and 2).

The pre-transformed material within the material bed (e.g., powder) can be configured to provide support to the 3D object. For example, the supportive powder may be of the same type of powder from which the 3D object is generated, of a different type, or any combination thereof. In some instances, a low flowability powder can be capable of supporting a 3D object better than a high flowability powder. A low flowability powder can be achieved inter alia with a powder composed of relatively small particles, with particles of non-uniform size or with particles that attract each other. The powder may be of low, medium, or high flowability. The powder material may have compressibility of at least about 1%, 2%, 3%, 4%, 5%, 6%, 7%, 8%, 9%, or 10% in response to an applied force of 15 kilo Pascals (kPa). The powder may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The powder may have basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The powder may have basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The powder may have basic flow energy in between the above listed values of basic flow energy (e.g., from about 100 mj to about 1000 mJ, from about 100 mj to about 600 mJ, or from about 500 mj to about 1000 mJ). The powder may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0 mJ/g. The powder may have a specific energy of at most 5.0 mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The powder may have a specific energy in between any of the above values of specific energy (e.g., from about 1.0 mJ/g to about 5.0 mJ/g, from about 3.0 mJ/g to about 5 mJ/g, or from about 1.0 mJ/g to about 3.5 mJ/g).

In some embodiments, the 3D object includes one or more auxiliary features. The auxiliary feature(s) can be supported by the material (e.g., powder) bed. The term "auxiliary features," as used herein, generally refers to features that are part of a printed 3D object, but are not part of the desired, intended, designed, ordered, modeled, or final 3D object. Auxiliary features (e.g., auxiliary supports) may provide structural support during and/or subsequent to the formation of the 3D object. Auxiliary features may enable the removal or energy from the 3D object that is being formed. Examples of auxiliary features comprise heat fins, wires, anchors, handles, supports, pillars, columns, frame, footing, scaffold, flange, projection, protrusion, mold (a.k.a. mould), or other stabilization features. In some instances, the auxiliary support is a scaffold that encloses the 3D object or part thereof. The scaffold may comprise lightly sintered or lightly fused powder material. The 3D object can have auxiliary features that can be supported by the material bed (e.g., powder bed) and not touch the base, substrate, container accommodating the material bed, or the bottom of the enclosure. The 3D part (3D object) in a complete or partially formed state can be completely supported by the material bed (e.g., without touching the substrate, base, container accommodating the powder bed, or enclosure). The 3D object in a complete or partially formed state can be completely supported by the powder bed (e.g., without touching anything except the powder bed). The 3D object in a complete or partially formed state can be suspended in the powder bed without resting on any additional support structures. In some cases, the 3D object in a complete or partially formed (e.g., nascent) state can freely float (e.g., anchorless) in the material bed.

In some examples, the 3D object may not be anchored (e.g., connected) to the platform and/or walls that define the material bed (e.g., during formation). The 3D object may not touch (e.g., contact) to the platform and/or walls that define the material bed (e.g., during formation). The 3D object be suspended (e.g., float) in the material bed. The scaffold may comprise a continuously sintered (e.g., lightly sintered) structure that is at most 1 millimeter (mm), 2 mm, 5 mm or 10 mm. The scaffold may comprise a continuously sintered structure that is at least 1 millimeter (mm), 2 mm, 5 mm or 10 mm. The scaffold may comprise a continuously sintered structure having dimensions between any of the aforementioned dimensions (e.g., from about 1 mm to about 10 mm, or from about 1 mm to about 5 mm). In some examples, the 3D object may be printed without a supporting scaffold. The supporting scaffold may engulf the 3D object. The supporting scaffold may float in the material bed.

The printed 3D object may be printed without the use of auxiliary features, may be printed using a reduced number of auxiliary features, or printed using spaced apart auxiliary features. In some embodiments, the printed 3D object may be devoid of one or more auxiliary support features or auxiliary support feature marks that are indicative of a presence or removal of the auxiliary support features. The 3D object may be devoid of one or more auxiliary support features and of one or more marks of an auxiliary feature (including a base structure) that was removed (e.g., subsequent to, or contemporaneous with, the generation of the 3D object). The printed 3D object may comprise a single auxiliary support mark. The single auxiliary feature (e.g., auxiliary support or auxiliary structure) may be a platform (e.g., a building platform such as a base or substrate), or a mold. The auxiliary support may be adhered to the platform or mold. The 3D object may comprise marks belonging to one or more auxiliary structures. The 3D object may comprise two or more marks belonging to auxiliary features. The 3D object may be devoid of marks pertaining to an auxiliary support. The 3D object may be devoid of an auxiliary support. The mark may comprise variation in grain orientation, variation in layering orientation, layering thickness, material density, the degree of compound segregation to grain boundaries, material porosity, the degree of element segregation to grain boundaries, material phase, metallurgical phase, crystal phase, or crystal structure; wherein the variation may not have been created by the geometry of the 3D object alone, and may thus be indicative of a prior existing auxiliary support that was removed. The variation may be forced upon the generated 3D object by the geometry of the support. In some instances, the 3D structure of the printed object may be forced by the auxiliary support (e.g., by a mold). For example, a mark may be a point of discontinuity that is not explained by the geometry of the 3D object, which does not include any auxiliary supports. A mark may be a surface feature that cannot be explained by the geometry of a 3D object, which does not include any auxiliary supports (e.g., a mold). The two or more auxiliary features or auxiliary support feature marks may be spaced apart by a spacing distance of at least 1.5 millimeters (mm), 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of at most 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of any value between the aforementioned auxiliary support space values (e.g., from 1.5 mm to 500 mm, from 2 mm to 100 mm, from 15 mm to 50 mm, or from 45 mm to 200 mm). Collectively referred to herein as the "auxiliary feature spacing distance."

In some embodiments, the 3D object comprises a layered structure indicative of 3D printing process that is devoid of one or more auxiliary support features or one or more auxiliary support feature marks that are indicative of a presence or removal of the one or more auxiliary support features. The 3D object may comprise a layered structure indicative of 3D printing process, which includes one, two, or more auxiliary support marks. The supports or support marks can be on the surface of the 3D object. The auxiliary supports, or support marks can be on an external, on an internal surface (e.g., a cavity within the 3D object), or both. The layered structure can have a layering plane. In one example, two auxiliary support features or auxiliary support feature marks present in the 3D object may be spaced apart by the auxiliary feature spacing distance. The acute (e.g., sharp) angle alpha between the straight line connecting the two auxiliary supports or auxiliary support marks and the direction of normal to the layering plane may be at least about 45 degrees (°), 50°, 55°, 60°, 65°, 70°, 75°, 80°, or 85°. The acute angle alpha between the straight line connecting the two auxiliary supports or auxiliary support marks and the direction of normal to the layering plane may be at most about 90°, 85°, 80°, 75°, 70°, 65°, 60°, 55°, 50°, or 45°. The acute angle alpha between the straight line connecting the two auxiliary supports or auxiliary support marks and the direction of normal to the layering plane may be any angle range between the aforementioned angles (e.g., from about 45 degrees (°), to about 90°, from about 60° to about 90°, from about 75° to about 90°, from about 80° to about 90°, from about 85° to about 90°). The acute angle alpha between the straight line connecting the two auxiliary supports or auxiliary support marks and the direction normal to the layering plane may from about 87° to about 90°. An example of a layering plane can be seen in FIG. 10 showing a vertical cross section of a 3D object 1011 that comprises layers 1 to 6, each of which are substantially planar. In the schematic example in FIG. 10, the layering plane of the layers can be the layer. For example, layer 1 could correspond to both the layer and the layering plane of layer 1. When the layer is not planar (e.g., FIG. 10, layer 5 of 3D object 1012), the layering plane would be the average plane of the layer. The two auxiliary supports, or auxiliary support feature marks can be on the same surface. The same surface can be an external surface or an internal surface (e.g., a surface of a cavity within the 3D object). When the angle between the shortest straight line connecting the two auxiliary supports or auxiliary support marks and the direction of normal to the layering plane is greater than 90 degrees, one can consider the complementary acute angle. In some embodiments, any two auxiliary supports, or auxiliary support marks are spaced apart by at least about 10.5 millimeters or more. In some embodiments, any two auxiliary supports, or auxiliary support marks are spaced apart by at least about 40.5 millimeters or more. In some embodiments, any two auxiliary supports, or auxiliary support marks are spaced apart by the auxiliary feature spacing distance.

In some embodiments, the 3D object can be formed without one or more auxiliary features and/or without contacting a platform (e.g., a base, a substrate, or a bottom of an enclosure). The one or more auxiliary features (which may include a base support) can be used to hold or restrain the 3D object during formation. In some cases, auxiliary features can be used to anchor or hold a 3D object or a portion of a 3D object in a material bed. The one or more auxiliary features can be specific to a part and can increase the time needed to form the 3D object. The one or more auxiliary features can be removed prior to use or distribution of the 3D object. The longest dimension of a cross-section of an auxiliary feature can be at most about 50 nm, 100 nm, 200 nm, 300 nm, 400 nm, 500 nm, 600 nm, 700 nm, 800 nm, 900 nm, or 1000 nm, 1 μm, 3 μm, 10□μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension of a cross-section of an auxiliary feature can be at least about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension of a cross-section of an auxiliary feature can be any value between the above-mentioned values (e.g., from about 50 nm to about 300 mm, from about 5 μm to about 10 mm, from about 50 nm to about 10 mm, or from about 5 mm to about 300 mm). Eliminating the need for auxiliary features can decrease the time and cost associated with generating the three-dimensional part. In some examples, the 3D object may be formed with auxiliary features. In some examples, the 3D object may be formed with contact to the container accommodating the material bed (e.g., side(s) and/or bottom of the container).

In some examples, the diminished number of auxiliary supports or lack of one or more auxiliary support, will provide a 3D printing process that requires a smaller amount of material, produces a smaller amount of material waste, and/or requires smaller energy as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the aforesaid values (e.g., from about 1.1 to about 10, or from about 1.5 to about 5).

FIG. 1 depicts an example of a system that can be used to generate a 3D object using a 3D printing process disclosed herein. The system can include an enclosure (e.g., a chamber 107). At least a fraction of the components in the system can be enclosed in the chamber. At least a fraction of the chamber can be filled with a gas to create a gaseous environment (e.g., an atmosphere). The gas can be an inert gas (e.g., Argon, Neon, Helium, Nitrogen). The chamber can be filled with another gas or mixture of gases. The gas can be a non-reactive gas (e.g., an inert gas). The gaseous environment can comprise argon, nitrogen, helium, neon, krypton, xenon, hydrogen, carbon monoxide, or carbon dioxide. The pressure in the chamber can be at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or more. The pressure in the chamber can be at least 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at most $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at a range between any of the aforementioned pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The pressure can be measured by a pressure gauge. The pressure can be measured at ambient temperature (e.g., R.T.). In some cases, the pressure in the chamber can be standard atmospheric pressure. In some cases, the pressure in the chamber can be ambient pressure (e.g., neutral pressure). In some examples, the chamber can be under vacuum pressure. In some examples, the chamber can be under a positive pressure (e.g., above ambient pressure). The pressure may be maintained and/or adjusted by a pump. For example, the pressure in the area enclosing the processing chamber may be at a positive pressure with respect to the ambient pressure. At times, the gas flow pressure within the processing chamber and the pressure directly adjacent to the pump, may be different. The raised pressure may be at least about 0.5 psi, 1 psi, 2 psi, 3 psi, 4 psi, 5 psi, 6 psi, 7 psi, 8 psi, 9 psi, or 10 psi above the ambient pressure. The raised pressure may be any value between the afore-mentioned values, for example, from about 0.5 psi to about 10 psi, or from about 0.5 psi to about 5 psi. The raised pressure may be the pressure directly adjacent to the pump (e.g., behind the pump).

The concentration of oxygen and/or humidity in the enclosure (e.g., chamber) can be minimized (e.g., below a predetermined threshold value). For example, the gas composition of the chamber can contain a level of oxygen and/or humidity that is at most about 100 parts per billion (ppb), 10 ppb, 1 ppb, 0.1 ppb, 0.01 ppb, 0.001 ppb, 100 parts per million (ppm), 10 ppm, 1 ppm, 0.1 ppm, 0.01 ppm, or 0.001 ppm. The gas composition of the chamber can contain an oxygen and/or humidity level between any of the aforementioned values (e.g., from about 100 ppb to about 0.001 ppm, from about 1 ppb to about 0.01 ppm, or from about 1 ppm to about 0.1 ppm). The gas composition may be measured by one or more sensors (e.g., an oxygen and/or humidity sensor.). In some cases, the chamber can be opened at the completion of formation of a 3D object. When the chamber is opened, ambient air containing oxygen and/or humidity can enter the chamber. Exposure of one or more components inside of the chamber to air can be reduced by, for example, flowing an inert gas while the chamber is open (e.g., to prevent entry of ambient air), or by flowing a heavy gas (e.g., argon) that rests on the surface of the powder bed. In some cases, components that absorb oxygen and/or humidity on to their surface(s) can be sealed while the chamber is open.

The chamber can be configured such that gas inside of the chamber has a relatively low leak rate from the chamber to an environment outside of the chamber. In some cases, the leak rate can be at most about 100 milliTorr/minute (mTorr/min), 50 mTorr/min, 25 mTorr/min, 15 mTorr/min, 10 mTorr/min, 5 mTorr/min, 1 mTorr/min, 0.5 mTorr/min, 0.1 mTorr/min, 0.05 mTorr/min, 0.01 mTorr/min, 0.005 mTorr/min, 0.001 mTorr/min, 0.0005 mTorr/min, or 0.0001 mTorr/min. The leak rate may be between any of the aforementioned leak rates (e.g., from about 0.0001 mTorr/min to about, 100 mTorr/min, from about 1 mTorr/min to about, 100 mTorr/min, or from about 1 mTorr/min to about, 100 mTorr/min). The leak rate may be measured by one or more pressure gauges and/or sensors (e.g., at ambient temperature). The enclosure can be sealed such that the leak rate of gas from inside the chamber to an environment outside of the chamber is low (e.g., below a certain level). The seals can comprise O-rings, rubber seals, metal seals, load-locks, or bellows on a piston. In some cases, the chamber can have a controller configured to detect leaks above a specified leak rate (e.g., by using at least one sensor). The sensor may be coupled to a controller. In some instances, the controller is able to identify and/or control (e.g., direct and/or regulate). For example, the controller may be able to identify a leak by detecting a decrease in pressure in side of the chamber over a given time interval.

One or more of the system components can be contained in the enclosure (e.g., chamber). The enclosure can include a reaction space that is suitable for introducing precursor to form a 3D object, such as powder material. The enclosure can contain the platform. In some cases, the enclosure can be a vacuum chamber, a positive pressure chamber, or an ambient pressure chamber. The enclosure can comprise a gaseous environment with a controlled pressure, temperature, and/or gas composition. The gas composition in the environment contained by the enclosure can comprise a substantially oxygen free environment. For example, the gas composition can contain at most at most about 100,000 parts per million (ppm), 10,000 ppm, 1000 ppm, 500 ppm, 400 ppm, 200 ppm, 100 ppm, 50 ppm, 10 ppm, 5 ppm, 1 ppm, 100,000 parts per billion (ppb), 10,000 ppb, 1000 ppb, 500 ppb, 400 ppb, 200 ppb, 100 ppb, 50 ppb, 10 ppb, 5 ppb, 1 ppb, 100,000 parts per trillion (ppt), 10,000 ppt, 1000 ppt, 500 ppt, 400 ppt, 200 ppt, 100 ppt, 50 ppt, 10 ppt, 5 ppt, or 1 ppt oxygen. The gas composition in the environment contained within the enclosure can comprise a substantially moisture (e.g., water) free environment. The gaseous environment can comprise at most about 100,000 ppm, 10,000 ppm, 1000 ppm, 500 ppm, 400 ppm, 200 ppm, 100 ppm, 50 ppm, 10 ppm, 5 ppm, 1 ppm, 100,000 ppb, 10,000 ppb, 1000 ppb, 500 ppb, 400 ppb, 200 ppb, 100 ppb, 50 ppb, 10 ppb, 5 ppb, 1 ppb, 100,000 ppt, 10,000 ppt, 1000 ppt, 500 ppt, 400 ppt, 200 ppt, 100 ppt, 50 ppt, 10 ppt, 5 ppt, or 1 ppt water. The gaseous environment can comprise a gas selected from the group consisting of argon, nitrogen, helium, neon, krypton, xenon, hydrogen, carbon monoxide, carbon dioxide, and oxygen. The gaseous environment can comprise air. The chamber pressure can be at least about $10^{-7}$ Torr, $10^{-8}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 760 Torr, 1000 Torr, 1100 Torr, 2 bar, 3 bar, 4 bar, 5 bar, or 10 bar. The chamber pressure can be of any value between the afore-mentioned chamber pressure values (e.g., from about $10^{-7}$ Torr to about 10 bar, from about $10^{-7}$ Torr to about 1 bar, or from about 1 bar to about 10 bar). In some cases, the enclosure pressure can be standard atmospheric pressure. The gas can be an ultrahigh purity gas. For example, the ultrahigh purity gas can be at least about 99%, 99.9%, 99.99%, or 99.999% pure. The gas may comprise less than about 2 ppm oxygen, less than about 3 ppm moisture, less than about 1 ppm hydrocarbons, or less than about 6 ppm nitrogen.

The enclosure can be maintained under vacuum or under an inert, dry, non-reactive and/or oxygen reduced (or otherwise controlled) atmosphere (e.g., a nitrogen ($N_2$), helium (He), or argon (Ar) atmosphere). In some examples, the enclosure is under vacuum. In some examples, the enclosure is under pressure of at most about 1 Torr, $10^{-3}$ Torr, $10^{-8}$ Torr, or $10^{-8}$ Torr. The atmosphere can be provided by providing an inert, dry, non-reactive, and/or oxygen reduced gas (e.g., Ar) and/or flowing the gas through the chamber.

In some examples, a pressure system is in fluid communication with the enclosure. The pressure system can be configured to regulate the pressure in the enclosure. In some examples, the pressure system includes one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector. The pressure system can include valves; such as throttle valves. The pressure system can include a pressure sensor for measuring the pressure of the chamber and relaying the pressure to the controller, which can regulate the pressure with the aid of one or more vacuum pumps of the pressure system. The pressure sensor can be coupled to a control system. The pressure can be electronically or manually controlled.

The system and/or apparatus components described herein can be adapted and configured to generate a 3D object. The 3D object can be generated through a 3D printing process. A first layer of material can be provided adjacent to a platform. A base can be a previously formed layer of the 3D object or any other surface upon which a layer or bed of material is spread, held, placed, or supported. In the case of formation of the first layer of the 3D object the first material layer can be formed in the material bed without a base, without one or more auxiliary support features (e.g., rods), or without other supporting structure other than the material (e.g., within the material bed). Subsequent layers can be formed such that at least one portion of the subsequent layer melts, sinters, fuses, binds and/or otherwise connects to the at least a portion of a previously formed layer. In some instances, the at least a portion of the previously formed layer that is transformed and subsequently hardens into a hardened material, acts as a base for formation of the 3D object. In some cases, the first layer comprises at least a portion of the base. The material type of the material layer can be any material described herein. The material layer can comprise particles of homogeneous or heterogeneous size and/or shape.

The system and/or apparatus described herein may comprise at least one energy source (e.g., the energy source generating the scanning energy beam, and/or the tiling energy flux). The first energy source may project a first irradiating energy (e.g., a first energy beam). The first energy beam may travel (e.g., scan) along a path. The path may be predetermined (e.g., by the controller). The apparatuses may comprise at least a second energy source. The second energy source may comprise the tiling energy source and/or the second scanning energy source. The second energy source may generate a second irradiating energy (e.g., second energy beam). The first and/or the second energy may transform at least a portion of the pre-transformed material in the material bed to a transformed material. In some embodiments, the first and/or second energy beam/flux may heat but not transform at least a portion of the pre-transformed material in the material bed. In some cases, the system can comprise 1, 2, 3, 4, 5, 6, 7, 8, 9, 10, 30, 100, 300, 1000 or more energy fluxes (e.g., beams) and/or sources. The system can comprise an array of energy sources (e.g., laser diode array). Alternatively, or additionally the target surface, material bed, 3D object (or part thereof), or any combination thereof may be heated by a heating mechanism. The heating mechanism may comprise dispersed energy beams. In some cases, the at least one energy source is a single (e.g., first) energy source.

An energy source can be a source configured to deliver energy to an area (e.g., a confined area). An energy source can deliver energy to the confined area through radiative heat transfer. The energy source can project energy (e.g., heat energy, and/or energy beam). The energy (e.g., beam) can interact with at least a portion of the pre-transformed material (e.g., in the material bed). The energy can heat the material in the material bed before, during and/or after the material is being transformed. The energy can heat at least a fraction of a 3D object at any point during formation of the 3D object. Alternatively, or additionally, the material bed may be heated by a heating mechanism projecting energy (e.g., radiative heat and/or energy beam). The energy may include an energy beam and/or dispersed energy (e.g., radiator or lamp). The energy may include radiative heat. The radiative heat may be projected by a dispersive and/or diffusive energy source (e.g., a heating mechanism) comprising a lamp, a strip heater (e.g., mica strip heater, or any combination thereof), a heating rod (e.g., quartz rod), or a radiator (e.g., a panel radiator). The heating mechanism may comprise an inductance heater. The heating mechanism may comprise a resistor (e.g., variable resistor). The resistor may comprise a varistor or rheostat. A multiplicity of resistors may be configured in series, parallel, or any combination thereof. In some cases, the system can have a single (e.g., first) energy source (e.g., that may generate the energy flux and/or scanning energy source). An energy source can be a source configured to deliver energy to an area (e.g., a confined area). An energy source can deliver energy to the confined area through radiative heat transfer (e.g., as described herein).

The energy beam may include a radiation comprising an electromagnetic, or charged particle beam. The energy beam may include radiation comprising electromagnetic, electron, positron, proton, plasma, or ionic radiation. The electromagnetic beam may comprise microwave, infrared, ultraviolet, or visible radiation. The energy beam may include an electromagnetic energy beam, electron beam, particle beam, or ion beam. An ion beam may include a cation or an anion. A particle beam may include radicals. The electromagnetic beam may comprise a laser beam. The energy beam may comprise plasma. The energy source may include a laser source. The energy source may include an electron gun. The energy source may include an energy source capable of delivering energy to a point or to an area. In some embodiments, the energy source can be a laser source. The laser source may comprise a $CO_2$, Nd:YAG, Neodymium (e.g., neodymium-glass), an Ytterbium, or an excimer laser. The laser may be a fiber laser. The energy source may include an energy source capable of delivering energy to a point or to an area. The energy source (e.g., first scanning energy source) can provide an energy beam having an energy density of at least about 50 joules/$cm^2$ (J/$cm^2$), 100 J/$cm^2$, 200 J/$cm^2$, 300 J/$cm^2$, 400 J/$cm^2$, 500 J/$cm^2$, 600 J/$cm^2$, 700 J/$cm^2$, 800 J/$cm^2$, 1000 J/$cm^2$, 1500 J/$cm^2$, 2000 J/$cm^2$, 2500 J/$cm^2$, 3000 J/$cm^2$, 3500 J/$cm^2$, 4000 J/$cm^2$, 4500 J/$cm^2$, or 5000 J/$cm^2$. The energy source (e.g., first scanning energy source) can provide an energy beam having an energy density of at most about 50 J/$cm^2$, 100 J/$cm^2$, 200 J/$cm^2$, 300 J/$cm^2$, 400 J/$cm^2$, 500 J/$cm^2$, 600 J/$cm^2$, 700 J/$cm^2$, 800 J/$cm^2$, 1000 J/$cm^2$, 500 J/$cm^2$, 1000 J/$cm^2$, 1500 J/$cm^2$, 2000 J/$cm^2$, 2500 J/$cm^2$, 3000 J/$cm^2$, 3500 J/$cm^2$, 4000 J/$cm^2$, 4500 J/$cm^2$, or 5000 J/$cm^2$. The energy source (e.g., scanning energy source) can provide an energy beam having an energy density of a value between the afore-mentioned values (e.g., from about 50 J/$cm^2$ to about 5000 J/$cm^2$, from about 200 J/$cm^2$ to about 1500 J/$cm^2$, from about 1500 J/$cm^2$ to about 2500 J/$cm^2$, from about 100 J/$cm^2$ to about 3000 J/$cm^2$, or from about 2500 J/$cm^2$ to about 5000 J/$cm^2$). In an example a laser (e.g., scanning energy source) can provide electromagnetic (e.g., light) energy at a peak wavelength of at least about 100 nanometer (nm), 400 nm, 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, 400 nm, or 100 nm. The laser can provide light energy at a peak wavelength between any of the afore-mentioned peak wavelength values (e.g., from about 100 nm to about 2000 nm, from about 500 nm to about 1500 nm, or from about 1000 nm to about 1100 nm). The energy beam (e.g., laser) may have a power of at least about 0.5 Watt (W), 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy beam may have a power of at most about 0.5 W, 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy beam may have a power between any of the afore-mentioned laser power values (e.g., from about 0.5 W to about 100 W, from about 1 W to about 10 W, from about 100 W to about 1000 W, or from about 1000 W to about 4000 W). The first energy source (e.g., producing the first scanning energy beam) may have at least one of the characteristics of the second energy source (e.g., producing the second scanning energy beam). The energy flux may have the same characteristics disclosed herein for the energy beam. The energy flux may be generated from the same energy source or from different energy sources. The energy flux may be of a lesser power as compared to the scanning energy beam. Lesser power may be by about 0.25, 0.5, 0.75, or 1 (one) order of magnitude. The scanning energy beam may operate independently with the energy flux. The scanning energy beam and the energy flux may be generated by the same energy source that operates in two modules (e.g., different modules) respectively. The characteristics of the irradiating energy may comprise wavelength, power, amplitude, trajectory, footprint, intensity, energy, fluence, Andrew Number, hatch spacing, scan speed, or charge. The charge can be electrical and/or magnetic charge. Andrew number is proportional to the power of the irradiating energy over the multiplication product of its velocity (e.g., scan speed) by the its hatch spacing. The Andrew number is at times referred to as the area filling power of the irradiating energy.

An energy beam from the energy source(s) can be incident on, or be directed perpendicular to, the target surface. An energy beam from the energy source(s) can be directed at an acute angle within a value of from parallel to perpendicular relative to the target surface. The energy beam can be directed onto a specified area of at least a portion of the source surface and/or target surface for a specified time period. The material in target surface (e.g., powder material such as in a top surface of a powder bed) can absorb the energy from the energy beam and, and as a result, a localized region of the solid material can increase in temperature. The energy beam can be moveable such that it can translate relative to the source surface and/or target surface. The energy source may be movable such that it can translate relative to the target surface. The energy beam(s) can be moved via a scanner (e.g., as disclosed herein). At least two (e.g., all) of the energy sources can be movable with the same scanner. A least two (e.g., all) of the energy beams can be movable with the same scanner. At least two of the energy source(s) and/or beam(s) can be movable (e.g., translated) independently of each other. In some cases, at least two of the energy source(s) and/or beam(s) can be translated at different rates (e.g., velocities). In some cases, at least two of the energy source(s) and/or beam(s) can be comprise at least one different characteristic. The characteristics may comprise wavelength, power, amplitude, trajectory, footprint, intensity, energy, or charge. The charge can be electrical and/or magnetic charge.

The energy source can be an array, or a matrix, of energy sources (e.g., laser diodes). Each of the energy sources in the array, or matrix, can be independently controlled (e.g., by a control mechanism) such that the energy beams can be turned off and on independently. At least a part of the energy sources in the array or matrix can be collectively controlled such that the at least two (e.g., all) of the energy sources can be turned off and on simultaneously. The energy per unit area or intensity of at least two energy sources in the matrix or array can be modulated independently (e.g., by a control mechanism or system). At times, the energy per unit area or intensity of at least two (e.g., all) of the energy sources in the matrix or array can be modulated collectively (e.g., by a control mechanism). The energy source can scan along the source surface and/or target surface by mechanical movement of the energy source(s), one or more adjustable reflective mirrors, or one or more polygon light scanners. The energy source(s) can project energy using a DLP modulator, a one-dimensional scanner, a two-dimensional scanner, or any combination thereof. The energy source(s) can be stationary. The target and/or source surface can translate vertically, horizontally, or in an angle (e.g., planar or compound). Translation of the target and/or surface can be manual, automatic, or a combination thereof. Translation can be controlled by at least one controller which at least one controller can operate to maintain a selected focus (or de-focus) of an energy source at or near the target and/or surface. Translation control can be local or remote (e.g., controlled over a network connection). The selected focus can be a variable focus.

The energy source can be modulated. The energy flux (e.g., beam) emitted by the energy source can be modulated.

The modulator can include amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acousto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

An energy beam from the first and/or second energy source can be incident on, or be directed to, a target surface (e.g., the exposed surface of the material bed). The energy beam can be directed to the pre-transformed or transformed material for a specified time period. That pre-transformed or transformed material can absorb the energy from the energy source (e.g., energy beam, diffused energy, and/or dispersed energy), and as a result, a localized region of that pre-transformed or transformed material can increase in temperature. The energy source and/or beam can be moveable such that it can translate relative to the surface (e.g., the target surface). In some instances, the energy source may be movable such that it can translate across (e.g., laterally) the top surface of the material bed. The energy beam(s) and/or source(s) can be moved via a scanner. The scanner may comprise a galvanometer scanner, a polygon, a mechanical-stage (e.g., X-Y-stage), a piezoelectric device, gimble, or any combination of thereof. The galvanometer may comprise a mirror. The scanner may comprise a modulator. The scanner may comprise a polygonal mirror. The scanner can be the same scanner for two or more energy sources and/or beams. At least two (e.g., each) energy source and/or beam may have a separate scanner. The energy sources can be translated independently of each other. In some cases, at least two energy sources and/or beams can be translated at different rates, and/or along different paths. For example, the movement of the first energy source may be faster (e.g., at a greater rate) as compared to the movement of the second energy source. The systems and/or apparatuses disclosed herein may comprise one or more shutters (e.g., safety shutters). The energy beam(s), energy source(s), and/or the platform can be moved by the scanner. The galvanometer scanner may comprise a two-axis galvanometer scanner. The scanner may comprise a modulator (e.g., as described herein). The energy source(s) can project energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The scanner can be included in an optical system that is configured to direct energy from the energy source to a predetermined position on the target surface (e.g., exposed surface of the material bed). The controller can be programmed to control a trajectory of the energy source(s) with the aid of the optical system. The controller can regulate a supply of energy from the energy source to the material (e.g., at the target surface) to form a transformed material. The optical system may be enclosed in an optical enclosure. An optical enclosure may be any optical enclosure disclosed in patent application number PCT/US17/64474, titled "OPTICS, DETECTORS, AND THREE-DIMENSIONAL PRINTING" that was filed Dec. 4, 2017, which is incorporated herein by reference in its entirety.

The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acousto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

Energy (e.g., heat) can be transferred from the material bed to a cooling member (e.g., heat sink FIG. 1, 113). The cooling member can facilitate transfer of energy away from a least a portion of a pre-transformed material layer. In some cases, the cooling member can be a thermally conductive plate. The cooling member can be passive. The cooling member can comprise a cleaning mechanism (e.g., cleaning device), which removes powder and/or process debris from a surface of the cooling member to sustain efficient cooling. Debris can comprise dirt, dust, powder (e.g., that result from heating, melting, evaporation and/or other process transitions), or hardened material that did not form a part of the 3D object. In some cases, the cleaning mechanism can comprise a stationary rotating rod, roll, brush, rake, spatula, or blade that rotates when the cooling member (e.g., heat sink) moves in a direction adjacent to the platform (e.g., laterally). The cleaning mechanism may comprise a vertical cross section (e.g., side cross section) of a circle, triangle, square, pentagon, hexagon, octagon, or any other polygon. The vertical cross section may be of an amorphous shape. In some cases, the cleaning mechanism rotates when the cooling member moves in a direction that is not lateral. In some cases, the cleaning mechanism rotates without movement of the cooling member. In some cases, the cooling member comprises at least one surface that is coated with a layer that prevents powder and/or debris from coupling (e.g., attaching) to the at least one surface (e.g., an anti-stick layer).

Figure 13:
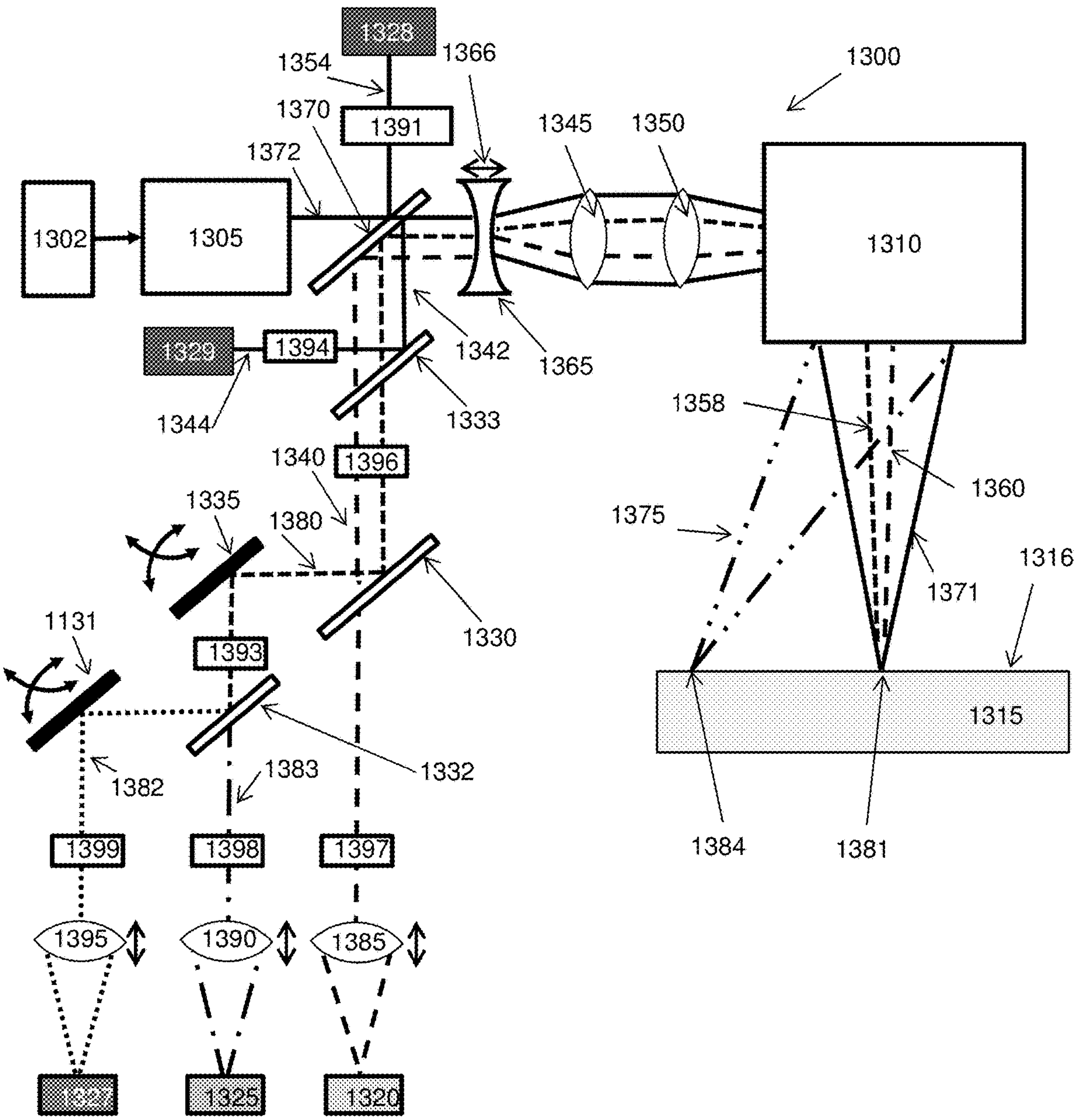
FIG. 13 schematically illustrates a detection system and its components.

In another aspect, the 3D printer comprises a detection system. In some embodiments, the detection system detects one or more characteristics and/or features of the irradiating energy. In some embodiments, the detection system detects one or more characteristics and/or features caused by the irradiating energy (e.g., on the target surface). In some embodiments, the detection system detects one or more characteristics and/or features of an electromagnetic radiation. In some embodiments, the detection system detects one or more characteristics and/or features of a black body radiation. FIG. 13 shows an example of a (e.g., optical) detection system (e.g., FIG. 13, 1300) as part of a 3D printer. The detection system may be operatively coupled to at least one component of the processing chamber. The at least one component of the processing chamber may comprise the irradiating energy, the controller, the target surface, or the platform. The detection system may be operatively coupled to the build module. The detection system may be a part of the optical system. The detection system may be separate from (e.g., different than) the optical system. The detection system may be operatively coupled to an energy source (e.g., FIG. 13, 1302). The energy source may be any energy source disclosed herein (e.g., tiling energy source and/or scanning energy source). The energy source may irradiate with a transforming energy (e.g., beam or flux). The irradiated transforming energy may heat (e.g., at transform) a material at the target surface, and subsequently emit an electromagnetic radiation of a different wavelength (e.g., a thermal radiation, e.g., a black body radiation) and/or be reflected back (e.g., away from the material). The different wavelength may be a larger wavelength as compared to the wavelength of the irradiating energy by the energy source. For example, a laser may emit laser energy towards the target surface at a position, which irradiation will cause the irradiated position to heat (e.g., at transform). The laser irradiation may be reflected back from the target surface (e.g., exposed surface of a material bed). The heating of the position at the target surface may cause emittance of heat radiation. The heat radiation may have a larger wavelength as compared to the laser irradiation wavelength. At times, the irradiating energy may illuminate the enclosure environment. At times, the target surface may be illuminated by the irradiating energy (e.g., direct or reflected) or the produced black body radiation. At times, the enclosure environment may include a separate illumination source (e.g., a light-emitting diode (LED)). The back reflected irradiating energy and/or the electromagnetic radiation of a different wavelength are referred to herein as "the returned energy beams." The returned energy beams may be detected via one or more detectors. The detection may be performed in real-time (e.g., during at least a portion of the 3D printing). For example, the real-time detection may be during the transformation of the pre-transformed material. The irradiating energy may be focused on a position at the target surface. The returned energy beams may be focused on their respective detectors. In some embodiments, the irradiating energy is focused on a position at the target surface as at least a portion of the returned energy beams are focused on at least one of their respective detectors. The returned energy beam can provide energy at a peak wavelength of at least about 100 nanometer (nm), 400 nm, 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, 2000 nm, 2100 nm, 2200 nm, 2300 nm, 2400 nm, 2500 nm, 2600 nm, 2700 nm, 2800 nm, 2900 nm 3000 nm, or 3500 nm. The returned energy beam can provide energy at a peak wavelength of at most about 3500 nm, 3000 nm, 2900 nm, 2800 nm, 2700 nm, 2600 nm, 2500 nm, 2400 nm, 2300 nm, 2200 nm, 2100 nm, 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, 400 nm, or 100 nm. The returned energy beam can provide energy at a peak wavelength between any of the afore-mentioned peak wavelength values (e.g., from about 100 nm to about 3500 nm, from about 1000 nm to about 1500 nm, from about 1700 nm to about 2600 nm, or from about 1000 nm to about 1100 nm). In some embodiments, the detection system may comprise aberration—correcting optics (e.g., spherical aberration correcting optics, chromatic aberration correcting optics, achromatic optics. apochromatic optics, superachromatic optics, f-theta achromatic optics, or any combinations thereof). In some embodiments, the aberration-correcting optics is devoid of an f-theta lens. In some embodiments, the aberration corrective optics is devoid of f-theta achromatic optics. The detector of the returned energy beam may detect the energy at the above mentioned peak wavelengths. The peak wavelength may be a wavelength at full width at half maximal of the energy profile of the returned energy beam.

In some cases, one or more optical elements of a detection system (e.g., comprising a lens, mirror, or beam splitter) is comprised of an optical material having high thermal conductivity (e.g., having any value of high thermal conductivity disclosed herein). The optical element may be any optical element disclosed in patent application serial number PCT/US17/64474, or in patent application serial number PCT/US17/60035, titled "GAS FLOW IN THREE-DIMENSIONAL PRINTING" that was filed on Nov. 3, 2017, each of which is incorporated herein by reference in its entirety. The optical material may have a thermal conductivity of at least about 1.5 W/m ° C. (Watts per meter per degree Celsius), 2 W/m ° C., 2.5 W/m° C., 3 W/m° C., 3.5 W/m° C., 4 W/m° C., 4.5 W/m° C., 5 W/m ° C., 5.5 W/m ° C., 6 W/m ° C., 7 W/m° C., 8 W/m ° C. 9 W/m° C., 10 W/m ° C., or 15 W/m° C., at 300 K (Kelvin). The optical material may have a thermal conductivity ranging between any of the afore-mentioned values (e.g., from about 1.5 W/m ° C. to about 20 W/m ° C., from about 1.5 W/m° C. to about 5 W/m° C., or from about 5 W/m° C. to about 20 W/m ° C.), at 300K. In some embodiments, the optical element (e.g., that includes the high thermally conductivity material) comprises sapphire, crystal quartz, zinc selenide (ZnSe), magnesium fluoride ($MgF_2$), or calcium fluoride ($CaF_2$). In some embodiments, the optical element comprises fused silica (e.g., UV fused silica), or fused quartz. The optical element may comprise sodium carbonate ($Na_2CO_3$), lime (CaO), magnesium oxide (MgO), aluminum oxide ($Al_2O_3$), boron trioxide ($B_2O_3$), soda ($Na_2O_3$), barium oxide (BaO), lead oxide (PbO), potassium oxide ($K_2O$), zinc oxide (ZnO), or germanium oxide ($GeO_2$).

In some embodiments, the optical element comprises a material having a higher thermal conductivity than that of fused silica (e.g., higher than about 1.38 W/m° C.), for example, Zerodur®. In some embodiments, the optical material comprises sapphire. In some embodiments, the optical element comprises a material having a lower thermal conductivity than that of fused silica and/or fused quartz (e.g., lower than about 1.38 W/m° C.), for example, borosilicate (e.g., BK 7), silicon fluoride (e.g., SF 2), or Pyrex®. In some embodiments, the optical material may have a thermal conductivity of at most about 20 W/m° C., 10 W/m ° C., 9 W/m° C., 8 W/m° C., 7 W/m° C., 6 W/m° C., 5.5 W/m° C., 5 W/m° C., 4.5 W/m° C., 4 W/m° C., 3.5 W/m° C., 3 W/m° C., 2.5 W/m° C., or 2 W/m° C., at 300K. An optical element having a high reflectivity may have a reflectivity of at least about 88% (e.g., percentage of incident radiative energy), 90%, 92%, 94%, 96%, 98%, 99%, 99.5%, or 99.9%, at a specified wavelength or wavelength range, for an incident radiative energy. The optical material having a high reflectivity may have a reflectivity ranging between any of the afore-mentioned values (e.g., from about 90% to about 99.9%, from about 90% to about 95%, or from about 95% to about 99.9%). An optical element having a high reflectivity can be comprised of any optical element material disclosed herein. In some embodiments, the optical element having a high reflectivity comprises a metallic coating. The metallic coating may comprise aluminum, UV enhanced aluminum, protected aluminum, silver, protected silver, gold, or protected gold. In some embodiments, the optical element (e.g., having a high reflectivity) comprises a dielectric coating or an (e.g., ion-beam) sputtered coating. In some embodiments, the optical element comprises a material with a linear coefficient of thermal expansion of at most about 10 ppm, 8 ppm, 6 ppm, 5 ppm, 3 ppm, 2 ppm, 1 ppm, or 0.5 ppm per degree Celsius. The optical element may comprise a material with a linear coefficient of thermal expansion between any of the afore-mentioned values (e.g., from about 10 ppm to about 0.5 ppm, from about 5 ppm to about 0.5 ppm, or from about 2 ppm to about 0.5 ppm per degree Celsius). In some embodiments, the optical element comprises a material with an optical absorption coefficient of at most about 10 ppm, 50 ppm, 100 ppm, 250 ppm, 500 ppm, 750 ppm, or 900 ppm per centimeter, at the wavelength of the laser. The optical element may comprise a material with an optical absorption coefficient of any value between the afore-mentioned values (e.g., from about 10 ppm to about 900 ppm, from about 10 ppm to about 500 ppm, from about 250 ppm to about 750 ppm, or from about 750 ppm to about 900 ppm per centimeter, at the wavelength of the laser). The material can be an optically transparent material.

In some embodiments, the irradiating energy is collimated (e.g., by a collimator). The energy source may be operatively coupled to a collimator (e.g., FIG. 13, 1305). The collimator may collimate (e.g., narrow, parallelize, and/or align along a specific direction) the irradiating energy (e.g., the energy beam or the energy flux). The collimator may be an optical collimator (e.g., may comprise a curved lens or mirror and a light source). The collimator may include a fiducial marker (e.g., an image) to focus on. The fiducial marker may assist in collimating the energy beam to a specific focus. The collimator may include one or more filters (e.g., wavelength filters, gamma ray filters, neutron filters, X-ray filters, and/or electromagnetic radiation filters). The collimator may comprise parallel hole collimator, pinhole collimator, diverging collimator, converging collimator, fanbeam collimator, or slanthole collimator.

The collimated irradiating energy may be directed in an optical path (e.g., FIG. 13, 1371, or 1375) to a position (e.g., 1381, or 1384) on the target surface (e.g., 1316). The optical path may diverge or converge the irradiating energy. The divergence or convergence of the irradiating energy may comprise a lens. The lens may be a converging lens or a diverging lens. At least one lens may be movable (e.g., laterally) relative to the target surface.

In some embodiments, the optical path from the energy source, passing the target surface, to the detector(s) comprises a variable focus mechanism (e.g., aberration-correcting optics, e.g., achromatic optics). The optical path (or the variable focus mechanism) may comprise one or more optical elements (e.g., FIG. 13, 1370, 1365, 1345, 1350). The optical path may be controlled manually and/or by a controller. The control may be real-time control during at least a portion of the 3D printing. The controller may control the positions of the optical elements to adjust the optical path. The controller may control the positions of the optical elements to adjust the focus of the beam on the target surface and/or on the detector(s). The one or more optical elements may be translatable. The one or more optical elements may be stationary. The optical element may be a negative optical element (e.g., a concave lens or a diverging lens). The optical element may be a positive optical element (e.g., a convex lens or a converging lens). The optical element may be a beam splitter (e.g., 1370). The optical elements in the optical path may be arranged achromatically (e.g., to allow simultaneous focus on at least one detector and on a position on the target surface). The achromatic optics may keep the optical detectors and an imaging device (e.g., a fiber optics coupled to a single detector) in focus. Optionally, a portion of the collimated energy beam may be deflected (e.g., 1354, through filter 1391) or reflected (e.g., 1342, reflected returning energy source radiation from a target surface). The deflected and/or reflected energy beam may be optionally filtered by a filter (e.g., FIG. 13, beam 1344 filtered by filter 1394). The deflected and/or reflected energy beam may be directed to a detector (e.g., FIGS. 13, 1328 and/or 1329 for deflected and reflected, respectively). The detector may be an optical detector. The detector may comprise a spectrometer. The detector can be an imaging detector. The detector may be an intensity reflection detector. The detector may allow analyzing (e.g., visual, and/or reflective analysis) of an irradiated position at the target surface (e.g., a melt pool).

In some examples, at least one optical element translates before, after, and/or during at least a portion of the 3D printing (e.g., in real time). In some examples, at least one optical element is stationary. In some examples, at least one optical element is controlled before, after, and/or during at least a portion of the 3D printing (e.g., in real time). The first optical element (e.g., FIG. 13, 1365) may be translatable (e.g., laterally, according to arrow 1366). The first optical element may be coupled to a movable element (e.g., a swivel mount, a gimbal, a motor, an electronic controller, a moving belt, or a scanner) that translates the first optical element. The first optical element may be coupled to an actuator (e.g., lateral actuator). The translation of the movable element may be before, after during and/or during at least a portion of the 3D printing. For example, the movable element may translate in real-time. The speed of translation of the first optical element may be correlated (e.g., coupled, and/or synchronized) with the translated transforming energy beam. The correlation may be in real-time. The second optical element (e.g., FIG. 13, 1345) and/or third optical element (e.g., FIG. 13, 1350) may be stationary. The second and/or third optical elements may be positioned to adjust the focus of at least one of (i) the irradiating energy, (ii) the back reflected irradiating energy, and (iii) the electromagnetic radiation of a different wavelength. For example, the second and/or third optical elements may be positioned to adjust the focus of the irradiating energy, and at least one of (i) the back reflected irradiating energy, and (ii) the electromagnetic radiation of a different wavelength. The focus may be adjusted before, during and/or after at least a portion of the 3D printing (e.g., in real-time). The focus may be adjusted before transforming, during transforming and/or after transforming a portion of the target surface (e.g., a layer of material bed).

One or more electromagnetic radiation beams (e.g., FIG. 13, 1358, 1360) having a different wavelength from the transforming energy beam (e.g., 1370) may be directed from the target surface to one or more optical elements (e.g., lens, mirror, beam splitter, beam filter) of the detection system. The optical element may be a wide field lens. The wide field lens may be placed in the path of the transforming energy beam (e.g., between the scanner and the target surface). The wide field lens may be placed in the optical path (e.g., between the optical elements and the detector). The wide field lens may have a focal length shorter than a normal lens. The shorter focal length allows the energy beam to cover a wider area of the target surface. The electromagnetic radiation beams having a different wavelength from the transforming energy beam may be a large wavelength energy beam (e.g., as they are of a larger wavelength than the transforming energy beam). The transforming energy beam may be the irradiating energy (e.g., energy flux and/or scanning energy beam). One or more of the optical element (e.g., mirror, FIG. 13, 1331, 1335) may be translatable (e.g., rotating). Translatable may be vertically, horizontal, and/or at an angle. The mirror may facilitate aligning the returned energy beams on the detector(s) (e.g., each respectively). In some examples, the image directed on the detector correlates to the transforming energy beam spot on the target surface. At times, the returned energy beams (e.g., large wavelength energy beams) originating from the target surface (e.g., 1380) are split into two wavelength ranges. The wavelength range split may utilize a filter (e.g., 1393) and/or beam splitter (e.g., 1332). Each of one or more returned energy beams may have a different energy beam characteristics (e.g., wavelength). Each of one or more detectors may be susceptible to (e.g., sensitive to detecting) different beam characteristics (e.g., wavelength range). The filter element may allow an energy beam with a particular characteristic (e.g., a polarity, wavelength range, intensity, profile). The filter may filter the returned energy beam based on at least one of its characteristic. For example, a first detector energy beam (e.g., FIG. 13, 1340) may be susceptible to a shorter wavelength as compared to a second detector energy beam (e.g., FIG. 13, 1380). At least two returned energy beams (or range groups thereof) may be separated by the same filter. At least two returned energy beams (or range groups thereof) may be separated by their respective and different filter (e.g., a first filter that filters shorter wavelength energy beam and a second filter that filters a longer wavelength energy beam). Each filter can isolate one or more wavelengths. Each filter may isolate a narrower range of wavelengths as compared to the returned energy beams. The filters can be optical, electronic, and/or magnetic filter. The filter may comprise a high pass filter, bandpass filter, a notch filter, a multi-bandpass filter or a low pass filter. The filter may comprise an absorption filter or a reflection filter. The filter elements may be fixed. At times, the filter elements may be translatable (e.g., before, after, and/or during at least a portion of the 3D printing). One or more filter elements may be coupled to a translatable element (e.g., a robotic arm, motor, gimbal, controller, a swivel mount, a moving belt, or a scanner). Optionally, a converging optical element (e.g., 1330, 1333) may be placed along the returned energy beam path. The converging optical element may focus one or more (e.g., all) detector energy beams on the detectors. In some embodiments, an optical fiber is connected to a detector. In some embodiments, at least one optical fiber is connected to a detector. For example, a plurality of optical fibers may be connected to a (e.g., one) detector. The (e.g., converging) optical element may focus one or more (e.g., all) detector energy beams on (e.g., onto) an optical fiber. A filter element may be selected such that the filter element may balance the spot size on the detector and/or optical fiber (e.g., that is coupled thereto). A narrow filter element may provide a narrow wavelength range (e.g., having a lower signal intensity relative to a wide filter). A wide filter element may provide a wide wavelength range (e.g., having a higher signal intensity relative to a narrow filter).

In some embodiments, the energy beam is operatively coupled to an optical system comprising one or more detectors. The returning energy beams may be directed by an optical system (e.g., component(s) thereof) to one or more detectors (e.g., FIG. 13, 1320, 1325, 1327). Each detector may detect a different wavelength range of the returning energy beams. Each detector may have a different gain pattern. The gain pattern of the detector may be susceptible (e.g., respond) to a wavelength (e.g., range) of the energy beam that is directed to it. The gain pattern of the detector may be susceptible to an intensity of the energy beam that is directed to it. In some cases, at least one of the detectors can be a charge-coupled device (CCD) camera. At least one of the detectors can be a pyrometer and/or a bolometer. At least one of the detectors comprise an In GaAs and/or Gallium sensor. At times, the detector may be coupled to at least one optical fiber (e.g., a fiber coupled to a detector). At times, the detector may comprise a multiplicity of detectors. Each of the multiplicity of detectors may be coupled to a different optical fiber respectively. At times, an optical fiber may be coupled to a single detector. At times, at least two detectors may be coupled to an optical fiber. At times, at least two optical fibers may be coupled to a detector. The different optical fibers may form an optical fiber bundle. The optical fiber detector may comprise a magnifier and/or a de-magnifier coupled to a fiber. The optical fiber bundle may be a coherent bundle of fiber. The optical fiber may split to two or more detectors. The optical fiber detector may be positioned prior to the detector and after the optical element (e.g., filter, mirror, or beam splitter, whichever disposed before the optical fiber). At times, the detector may be a single (e.g., pixel) detector. The detector may be devoid of (e.g., not include, or exclude) spatial information.

One or more optical elements (e.g., lenses, FIG. 13, 1390, 1385, 1395) may be placed preceding the one or more detectors, and along the path of the returning energy beam. Optionally, there may be one or more filter elements (e.g., 1397, 1398, 1399, 1396) placed before each of the optical element. The optical element may maintain the focus of the detector energy beam (e.g., 1382, 1383) on each detector (e.g., simultaneously with maintaining the focus of the transforming energy beam on the target surface). The optical element may remain in a fixed position while maintaining the focus of the detector energy beam. The optical element may be movable (e.g., translatable) for maintaining the focus of the detector energy beam. The optical element can move (e.g., according to arrows next to 1385, 1390, 1395) before, during, and/or after processing of the target material. The optical element may alter a focus of the returning energy beam on each detector. At times, the optical element may maintain and/or alter an image size of one or more detected images (e.g., perform chromatic aberration and/or correction). At times, the optical element may synchronize one or more images from the imaging sensor.

At least one optical element may direct the irradiating energy to a scanner (e.g., X-Y scanner, galvanometer scanner). FIG. 13 shows an example in which three lenses (1365, 1345, and 1350) direct the irradiating energy 1372 to the scanner 1310. The scanner may be any scanner disclosed herein. The irradiating energy may be directed to one or more scanners. The scanner may direct the irradiating energy on to a position at the target surface. The energy beam may travel through one or more filters, apertures, or optical windows on its way to the target surface (e.g., as depicted in FIGS. 1 and 9).

Figure 16:
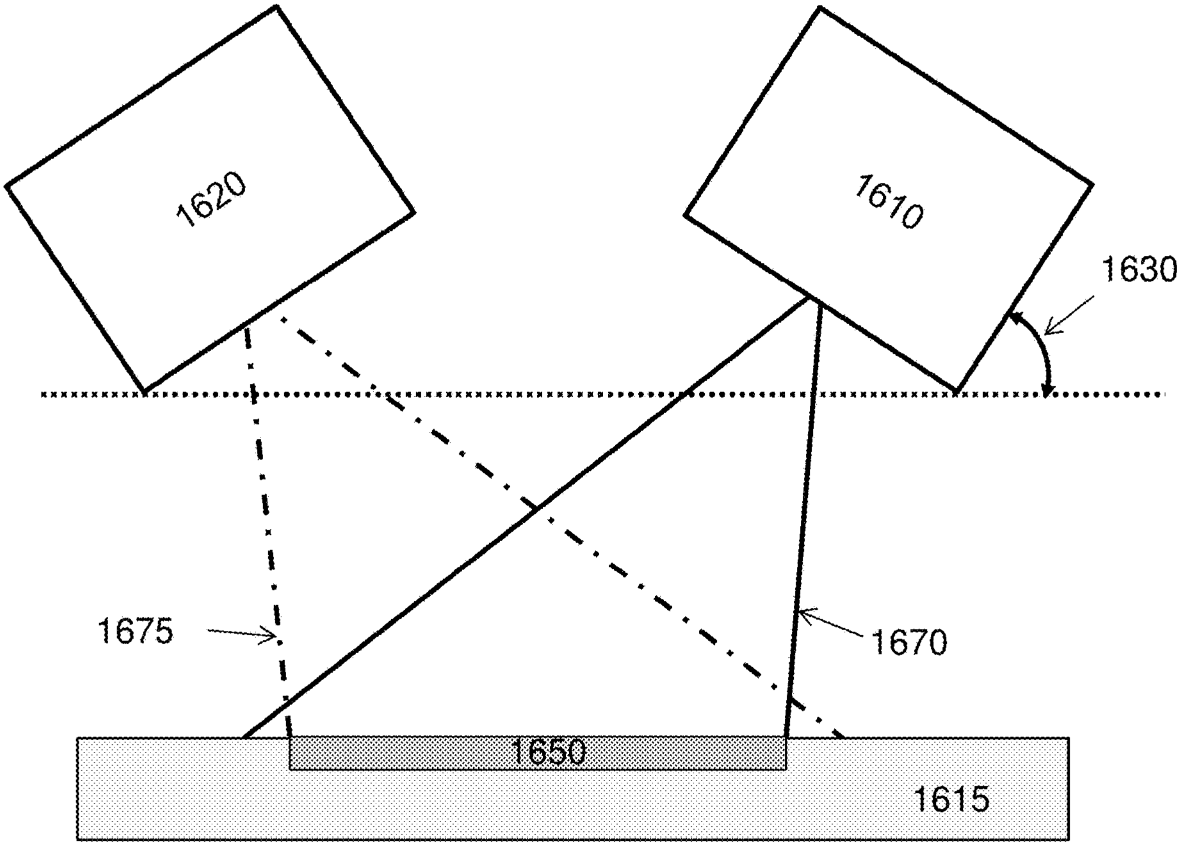
FIG. 16 schematically illustrates components of an optical system.

In some embodiments, a multiplicity of scanners directs a multiplicity of energy beams respectively to the target surface (e.g., to different positions of the target surface). The multiplicity of energy beams may be of different characteristics (e.g., large vs. small cross section) and/or functions (e.g., hatching vs. tiling) in the 3D printing process. The scanners may be controlled manually and/or by at least one controller. For example, at least two scanners may be directed by the same controller. For example, at least two scanners may be directed each by their own different controller. The multiplicity of controllers may be operatively coupled to each other. The multiplicity of energy beams may irradiate the surface simultaneously or sequentially. The multiplicity of energy beams may be directed towards the same position at the target surface, or to different positions at the target surface. The multiplicity of energy beams may comprise the energy flux, or scanning energy beam. The one or more scanners may be positioned at an angle (e.g., tilted) with respect to the material bed. The one or more sensors may be disposed adjacent to the material bed. The one or more sensors may be disposed in an indirect view of the target surface. The one or more sensors may be configured to have a field of view of at least a portion of an exposed surface of the material bed. A portion of the enclosure, that is occupied by the energy beam (e.g., the energy flux or the scanning energy beam) can define a processing cone. FIG. 16 shows an example of two scanners (e.g., 1620, 1610) that are tilted at an angle 1630 with respect to the target surface 1615. The scanner may be positioned such that the processing cones of the scanners (e.g., FIG. 16, 1675, 1670) may have a large overlap region (e.g., 1650) of potential irradiation of the target surface. Positioned may include angular position (e.g., 1630). In some embodiments one or more scanners may be positioned at a normal to the target surface. The target surface may be the exposed surface of a material bed. Large may include covering a maximum number of positions on the target surface. Large may include covering all the positions on the target surface. Each position on the target surface may receive exposure from each of the scanners. At times, the target surface may be translated to achieve a desired exposure from each of the scanners. The scanners may comprise high conductivity and/or high reflectivity mirrors (e.g., sapphire mirrors, beryllium mirrors, e.g., as disclosed herein).

A controller may be operatively coupled to at least one component of the detection system. The controller may control the amount of translation of the variable focus system. The controller may adjust the position of the optical elements to vary the cross-section of the transforming beam. The controller may adjust the position of the optical elements to vary a footprint of the transforming beam and/or its focus on the target surface. The controller may direct the one or more filters of the optical system to activate or de-activate. Activating or de-activating a filter may allow a specific type of energy beam (e.g., beam of a certain wavelength region) to radiate. The controller may adjust at least one characteristic of the irradiating energy (e.g., as disclosed herein). For example, the controller may adjust the power density and/or fluence of the energy beam. Adjustments by the controller may be static (e.g., not in real-time). Adjustments by the controller may be dynamic (e.g., in real-time). Static adjustments may be done before or after 3D printing. Dynamic adjustments may be done during at least a portion of the 3D printing (e.g., during transformation of the pre-transformed material). At times, static adjustments may be done before and/or after an optical detection. At times, dynamic adjustments may be done during optical detection.

Figure 14:
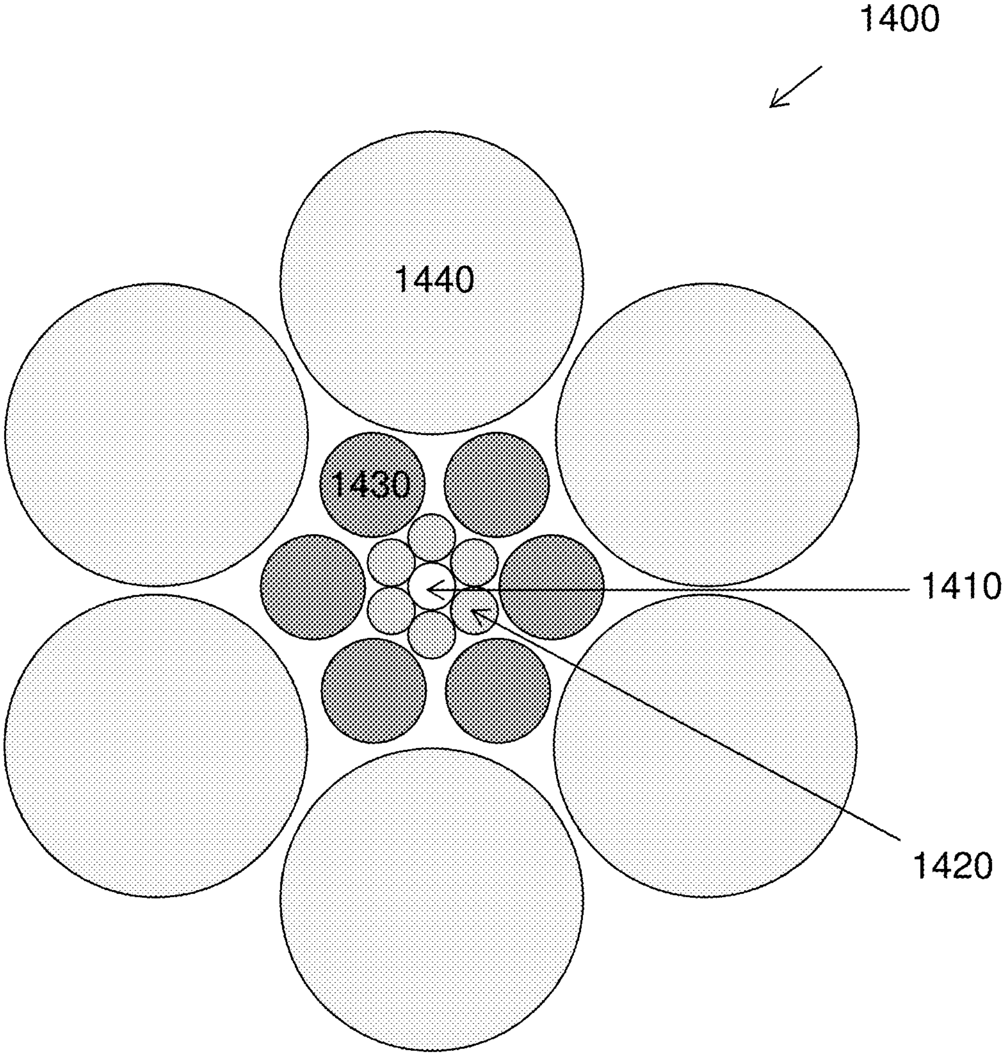
FIG. 14 schematically illustrates a vertical cross section of an optical fiber bundle.

FIG. 14 shows an example of an optical fiber bundle (e.g., 1400). The optical fiber bundle may include one or more single (e.g., pixel) detectors. Each pixel detector may be optionally coupled to an optical fiber. The optical fiber bundle may comprise a central fiber (e.g., 1410). One or more independent single detectors (e.g., at least 1, 2, 3, 4, 5, 6, 7, 8, 9 or 10 detectors) coupled to one or more independent optical fibers (e.g., at least 1, 2, 3, 4, 5, 6, 7, 8, 9 or 10 optical fibers) respectively may be disposed adjacent to the central fiber. For example, the one or more independent optical fibers may engulf (e.g., surround) the central fiber. The number of independent optical fibers that engulf the central fiber may vary (e.g., the central fiber may be engulfed by at least 1, 2, 3, 4, 5, 6, 7, 8, 9 or 10 optical fibers). The engulfed optical fibers may be engulfed by one or more independent optical fibers (e.g., the first one or more independent fibers adjacent to the central fiber may be engulfed by at least 1, 2, 3, 4, 5, 6, 7, 8, 9 or 10 optical fibers). Engulf may be in at least one cross-sectional circular arrangement (e.g., FIG. 14). In some embodiments, the optical fiber bundle comprises (i) another optical fiber that has a cross section that is (e.g., substantially) the same as the cross section of the central optical fiber, or (ii) another optical fiber that has a cross section that is different (e.g., smaller, or larger) from the cross section of the central optical fiber. In some embodiments, the one or more independent optical fibers have a cross section that is (e.g., substantially) the same (e.g., 1420) as the cross section of the central optical fiber (e.g., 1410). In some embodiments, the one or more independent optical fibers have a cross section that is different than the cross section of the central optical fiber. For example, the one or more independent optical fibers may have a cross section that is larger (e.g., 1430, 1440) than the cross section of the central optical fiber (e.g., 1410). The larger cross section of the optical fiber may facilitate detection of a returning energy beam striking a larger cross section of the optical fiber, and thus allowing for detection of a lower intensity energy beam. The adjacent one or more single detectors may allow detection of energy beam that strikes an area larger than the area detected by the central fiber. For example, the outermost single detector (e.g., 1440) may detect (e.g., collect irradiation from) an area that is larger than the area detected by the central fiber. Larger may comprise at least about 2, 3, 5, 10, 20, 25, 30, 35, 40, 45, 50, 55, 60, 65, 70, 75, 80, 85, 90, 95 or 100 times larger area than the area detected by the central fiber. Larger may comprise at most about 2, 3, 5, 10, 20, 25, 30, 35, 40, 45, 50, 55, 60, 65, 70, 75, 80, 85, 90, 95 or 100 times larger area than the area detected by the central fiber. The outermost single detector may detect an area larger than the area detected by the central fiber, wherein larger can be between any of the afore-mentioned values (e.g., 2 times to 100 times, from about 2 times to about 30 times, from about 35 times to about 70 times, or from about 75 times to about 100 times). The central fiber may detect a pixel at its highest resolution. As the detection area increases amongst the surrounding single detectors, the surrounding fiber may detect one or more lower resolution pixels. The at least one optical fiber in the bundle may be aligned with the portion of the energy beam that has the strongest signal intensity (e.g., radiation energy). The one optical fiber can be aligned (e.g., in real time) to be the central optical fiber. As the detection area of the fiber detectors increase, the signal intensity may drop. The increasing area of the detector may allow improvement of the signal (e.g., as the signal to noise ratio decreases). The fiber bundle may allow maximizing the collection rate of (e.g., optical) information (e.g., by selecting a sample of optical fiber detectors, by varying the sampling frequency of the detectors). The optical fiber bundle may be a lower cost alternative to thermal imaging detectors (e.g., In GaAs or Ge). The optical fiber bundle (e.g., having varied cross sectional optical fibers), may allow quicker focusing and/or signal detection.

The detector may be any detector disclosed in patent application number PCT/US15/65297, titled "FEEDBACK CONTROL SYSTEMS FOR THREE-DIMENSIONAL PRINTING" that was filed on Dec. 11, 2015, which is incorporated herein by reference in its entirety. The detectors can comprise the sensors. The detectors (e.g., sensors) can be configured to measure one or more properties of the 3D object and/or the pre-transformed material (e.g., powder). The detectors can collect one or more signals from the 3D object and/or the target surface (e.g., by using the returning energy beams). In some cases, the detectors can collect signals from one or more optical sensors (e.g., as disclosed herein). The detectors can collect signals from one or more vision sensors (e.g. camera), thermal sensors, acoustic sensors, vibration sensors, spectroscopic sensor, radar sensors, and/or motion sensors. The optical sensor may include an analogue device (e.g., CCD). The optical sensor may include a p-doped metal-oxide-semiconductor (MOS) capacitor, charge-coupled device (CCD), active-pixel sensor (APS), micro/nano-electro-mechanical-system (MEMS/NEMS) based sensor, or any combination thereof. The APS may be a complementary MOS (CMOS) sensor. The MEMS/NEMS sensor may include a MEMS/NEMS inertial sensor. The MEMS/NEMS sensor may be based on silicon, polymer, metal, ceramics, or any combination thereof. The detector (e.g., optical detector) may be coupled to an optical fiber.

The detector may include a temperature sensor. The temperature sensor (e.g., thermal sensor) may sense a IR radiation (e.g., photons). The thermal sensor may sense a temperature of at least one melt pool. The metrology sensor may comprise a sensor that measures the FLS (e.g., depth) of at least one melt pool. The transforming energy beam and the detector energy beam (e.g., thermal sensor beam and/or metrology sensor energy beam) may be focused on substantially the same position. The transforming energy beam and the detector energy beam (e.g., thermal sensor beam and/or metrology sensor energy beam) may be confocal.

The detector may include an imaging sensor. The imaging sensor can image a surface of the target surface comprising untransformed (e.g., pre-transformed) material and at least a portion of the 3D object. The imaging sensor may be coupled to an optical fiber. The imaging sensor can image (e.g. using the returning energy beam) a portion of the target surface comprising transforming material (e.g., one or more melt pools and/or its vicinity). The optical filter or CCD can allow transmission of background lighting at a predetermined wavelength or within a range of wavelengths.

The detector may include a reflectivity sensor. The reflectivity sensor may include an imaging component. The reflectivity sensor can image the material surface at variable heights and/or angles relative to the (target) surface. In some cases, reflectivity measurements can be processed to distinguish between the exposed surface of the material bed and a surface of the 3D object. For example, the untransformed (e.g., pre-transformed) material in the target surface can be a diffuse reflector and the 3D object (or a melt pool, a melt pool keyhole) can be a specular reflector. Images from the detectors can be processed to determine topography, roughness, and/or reflectivity of the surface comprising the untransformed (e.g., pre-transformed) material and the 3D object. The detector may be used to perform thermal analysis of a melt pool and/or its vicinity (e.g., detecting keyhole, balling and/or spatter formation). The surface can be sensed (e.g., measured) with dark-field and/or bright field illumination and a map and/or image of the illumination can be generated from signals detected during the dark-field and/or bright field illumination. The maps from the dark-field and/or bright field illumination can be compared to characterize the target surface (e.g., of the material bed and/or of the 3D object). For example, surface roughness can be determined from a comparison of dark-field and/or bright field detection measurements. In some cases, analyzing the signals can include polarization analysis of reflected or scattered light signals.

In some embodiments, measurements are made by a detector system (e.g., comprising an optical system) having an indirect view (e.g., devoid of a direct view) of one or more of (i) a target surface, (ii) a processing beam (e.g., a transforming energy beam or a scanning energy beam), (iii) a processing area (e.g., a position where an irradiating energy beam is incident on a surface, e.g., a footprint of the energy beam on the target surface), (iv) a calibration structure, and/or (v) a portion of a forming 3D object. In some embodiments, the indirect measurements can measure reflection of energy (e.g., in the form of light) from a target surface and/or at least one species (e.g., particles, gas, and/or plasma) within the enclosure, while the detector is situated outside of the enclosure. The detector system can comprise one or more detectors. The detector system can comprise one or more optical elements (e.g., mirror, beam splitter, wave guide or filter). The wave guide can comprise an optical fiber. Measurements can be taken before, during and/or after processing (e.g., transforming) one or more (e.g., pre-transformed) materials. In some embodiments one or more measurements can be taken before processing of a material (e.g., of a background level of radiation in an enclosure). The one or more measurements can be used as a baseline measurement (set) against which subsequent measurements are compared (e.g., measurements of radiation levels in an enclosure during processing). The detector can comprise one or more sensors (e.g., one or more photodiode ((s)), photoconductive detector, and/or cameras (e.g., CCD, IR), e.g., as described herein. The detector(s) can detect an intensity of illumination (e.g., electromagnetic radiation)) that is reflected and/or scattered (e.g., off the target surface). An indirect measurement as described herein can be a measurement of illumination that that is not (e.g., directly) emanating from a transformation region (e.g., a melt pool)) during a transformation process. For example, an indirect measurement can be a measurement of illumination emanating from a vicinity of a transformation region during a transformation process. The vicinity can extend to up to about 1, 2, 3, 4, 5, 6, or 7 melt pool FLS (e.g., diameters) beyond the transformation (e.g., melt pool formation) region. The detector systems can comprise one or more filters (e.g., a polarity filter, a high pass filter, a low pass filter, a notch filter, a bandpass filter, and/or a multibandpass filter). As non-limiting examples, the detector(s) can comprise (i) a UV bandpass filter, (ii) an IR bandpass filter, and/or (iii) a near-IR bandpass filter. The filter can be operable to reject electromagnetic wavelengths that correspond to illumination wavelengths that emanate from a transformation region (such as a melt pool) of a target material or from a vicinity thereof (e.g., an immediate vicinity thereof). Processing of measurements (e.g., generated by a gray field detector) can distinguish any (e.g., at least one) of the material characteristics as described herein, for example. The material characteristics may comprise a topography, roughness, or reflectivity of one or more materials (e.g., of pre-transformed material, transformed material, and/or target surface). The measurements can be processed to provide input data (e.g., to a control system, e.g., feedback data) regarding a processing state. For example, that a target surface is undergoing a (e.g., average, intense and/or abrupt) transformation, a (e.g., average or intense) temperature change, or any combination thereof. An intense and/or abrupt transformation may correspond to a material (e.g., surface) that is at a temperature at which vaporization of the material occurs. An average transformation may correspond to a material (e.g., surface) that is below a temperature at which vaporization of the material occurs. For example, that a chamber environment is undergoing a (e.g., average, intense and/or abrupt) temperature change. The change in the chamber environment can be averaged on the volume of the chamber. The change in the chamber environment can be at a volume in the chamber. For example, that a target surface is undergoing a welding transformation, (e.g., intense and/or abrupt) splatter, (e.g., average, intense and/or abrupt) temperature change, and/or that a target surface is undergoing keyhole formation. At least one element of the detector system may be controlled manually and/or automatically (e.g., using a controller). The control may be before, after, and/or during the operation of the energy beam. Controlling can be before, during, or after processing of the one or more materials. At times, measurements from a first detector (e.g., the system of FIG. 13, 1320) can be correlated with measurements of a second detector (e.g., FIG. 13, 1325) to determine at least one characteristic of, for example, the (i) a target material surface, (ii) a processing beam (e.g., a transforming energy beam or a scanning energy beam), (iii) a processing area (e.g., a position where an irradiating energy beam is incident on a surface), (iv) a calibration structure, and/or (v) a portion of a forming 3D object.

In some cases, one or more of the detectors can be movable. For example, the one or more detectors can be movable along a plane that is parallel to the target surface (e.g., to the exposed surface of the material bed. The one or more detectors can be movable horizontally, vertically, and/or in an angle (e.g., planar or compound). The one or more detectors can be movable along a plane that is parallel to a surface of the target surface. The one or more detectors can be movable along an axis this is orthogonal to the target surface and/or a surface of the material bed. The one or more detectors can be translated, rotated, and/or tilted at an angle (e.g., planar or compound) before, after, and/or during at least a portion of the 3D printing.

The one or more detectors can be disposed within the enclosure, outside the enclosure, within the structure of the enclosure (e.g., within a wall of the enclosure), or any combination thereof. The one or more detectors can be oriented in a location such that the detector can receive one or more signals in the field of view of the detector. A viewing angle and/or field of view of at least one of the one or more detectors can be maneuverable via a scanner. In some cases, the viewing angle and/or field of view can be maneuverable relative to an energy beam that is employed to additively generate the 3D object. In some cases, the variable focus mechanism may synchronize the movement of the transforming energy beam to be within the range of the detectors that may be detecting the detecting energy beam. In some cases, movement (e.g., scanning) of the energy beam and maneuvering of the viewing angle and/or field of view of one or more detectors can be synchronized.

A controller may receive signals from the detector. The controller may be a part of a high-speed computing environment. The computing environment may be any computing environment described herein. The computing environment may be any computer and/or processor described herein. The controller may control (e.g., alter, adjust) the parameters of the components of the 3D printer (e.g., before, after, and/or during at least a portion of the 3D printing). The control (e.g., open loop control) may comprise a calculation. The control may comprise using an algorithm. The control may comprise feedback loop control. In some examples, the control may comprise at least two of (i) open loop (e.g., empirical calculations), and (ii) closed loop (e.g., feed forward and/or feedback loop) control. In some examples, the feedback loop(s) control comprises one or more comparisons with an input parameter and/or threshold value. The setpoint may comprise calculated (e.g., predicted) setpoint value. The setpoint may comprise adjustment according to the closed loop and/or feedback control. The controller may use metrological and/or temperature measurements of at least one position of the target surface (e.g., melt pool). The controller may use porosity and/or roughness measurements (e.g., of the layer of hardened material). The controller may direct adjustment of one or more systems and/or apparatuses in the 3D printing system. For example, the controller may direct adjustment of the force exerted by the material removal mechanism (e.g., force of vacuum suction). For example, the controller may direct adjustment of a spot size and/or focus of a detected energy beam by adjusting the optical elements.

Figure 15:
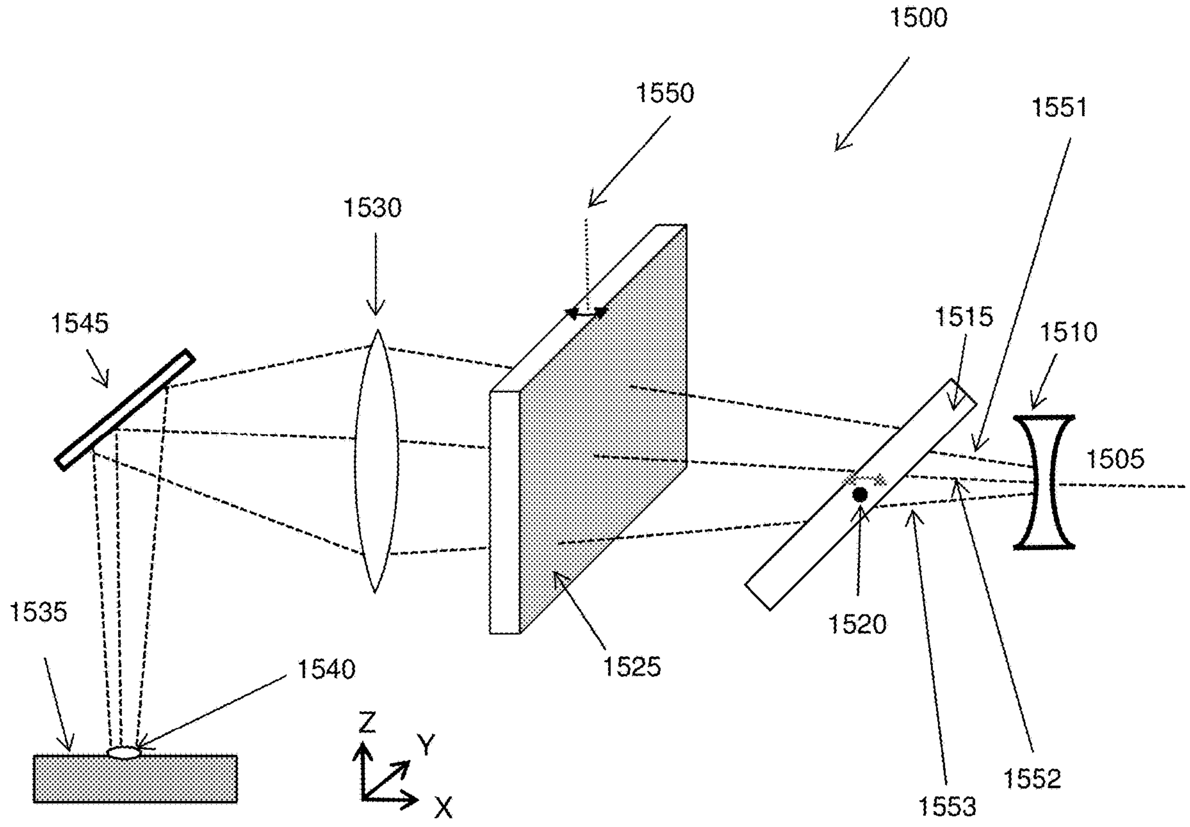
FIG. 15 schematically illustrates an optical system.

In some embodiments, an astigmatism system (e.g., FIG. 15, 1500) is coupled to the 3D printer. The astigmatism system may be disposed adjacent (e.g., in, or outside of) the processing chamber in which the irradiated beam generates the 3D object (e.g., FIG. 1, 126). The astigmatism system may be operatively coupled to an energy source, and/or to a controller. At least one element of the astigmatism system may be controlled before, after, and/or during at least a portion of the 3D printing (e.g., in real time). At least one element of the astigmatism system may be controlled manually and/or automatically (e.g., using a controller). The energy source may irradiate energy (e.g., FIG. 15, 1505 depicting an energy beam). The astigmatism system may be used to form an elongated cross-sectional beam (e.g., narrow, and/or long, FIG. 15, 1540) that irradiates the target surface (e.g., 1535). The energy beam may be elongated along the X-Y plane (e.g., FIG. 15). At times, the footprint of the energy beam may be elongated by an energy beam perforation (e.g., an elongated slit) that the energy beam may be allowed to pass through. At times, the movement of the energy beam may be controlled to perform a scan or a retro scan to form an elongated energy beam footprint.

In some embodiments, the astigmatism system includes two or more optical elements (e.g., lenses, FIG. 15, 1510, 1530). The optical elements may diverge or converge an irradiating energy (e.g., beam) that travels therethrough. The optical elements may have a constant focus. The optical elements may have a variable focus. At times, the optical element may converge the rays of the energy beam. At times, the optical element may diverge the rays of the energy beam. For example, the first optical element may be a diverging lens. The astigmatism system may comprise one or more media (e.g., 1515, 1525). The medium may have a high refractive index (e.g., a high refractive index relative to the wavelength of the incoming energy beam). At least one medium may be stationary, translating, or rotating (e.g., rotating along an axis, FIG. 15, 1520, 1550). Translating and/or rotating may be performed before, after, or during at least a portion of the 3D printing. The first medium may translate and/or rotate along a different axis than the second medium. The translating axes of the mediums may be different than (e.g., perpendicular to) the traveling axis of the irradiating energy. For example, the first medium (e.g., 1515) may translate and/or rotate along the Z axis (e.g., 1520), the second medium (e.g., 1525) may translate and/or rotate along the Y axis (e.g., 1550), and the irradiating energy (e.g., 1505) may travel along the X axis. The distance between the media may be such that they do not collide with each other when translating (and/or rotating) (e.g., when both media are rotating simultaneously). The irradiating energy may be directed to the second medium after it emerges from the first medium. The first optical element (e.g., 1510) may direct the energy beam to a medium (e.g., an optical window, e.g., 1515). The medium may (e.g., substantially) allow the energy beam to pass through (e.g., may not absorb a substantial portion of the passing energy beam). Substantially may be relative to the intended purpose of the energy beam (e.g., to transform the pre-transformed material).

In some embodiments, the optical astigmatism of the irradiating energy refers to an elliptical cross section of the irradiating energy that differs from a circle. Without wishing to be bound to theory, the different paths (e.g., lengths thereof) of the various irradiating energy rays (e.g., 1551-1553), interacting with various thicknesses of the media (having an effective refractive index), may lead to an elongated cross section of the irradiating energy, and subsequently to an elongated footprint of the irradiating energy on the target surface. The relative position of the first media (e.g., optical window) and the second media may lead to an optical astigmatism. The degree and/or direction of the astigmatism may vary (e.g., before, after, and/or during at least a portion of the 3D printing) in relation to the relative positioning of the two media. The degree and/or direction of the astigmatism may be due to the relative positioning of the two media. The angular position of the media may be controlled (e.g., manually, and/or automatically). For example, the angular position of the media may be controlled by one or more controllers. Controlling may include altering the angular position of the media relative to each other. Controlling may include altering the angular position not relative to each other (e.g., relative to the target surface and/or to the energy source). Controlling the degree of astigmatism may lead to controlling the length and/or width of the irradiating energy on the target surface. The irradiating energy may be directed to a second optical element (e.g., FIG. 15, 1530) from the (e.g., first or second) medium. The second optical element may be a converging lens. The converging lens may focus the irradiating energy after its emergence from the (e.g., first or second) medium. The converging lens may be translatable (e.g., to vary the focus). The focusing power of the lens (e.g., converging lens) may be variable (e.g., electronically, magnetically, or thermally). The second optical element may be placed after the (e.g., first or second) medium. The energy beam may be directed (e.g., converged) on to a reflective element (e.g., mirror, FIG. 15, 1545) and/or a scanner. The energy beam may be directed (e.g., converged) on to a beam directing element. The beam directing (e.g., reflective) element may be translatable. The beam directing element may direct the energy beam to the target surface (e.g., material bed, FIG. 15, 1535). The directed energy beam may be an elongated energy beam. The mirror may be highly reflective mirror (e.g., Beryllium mirror).

Figure 17:
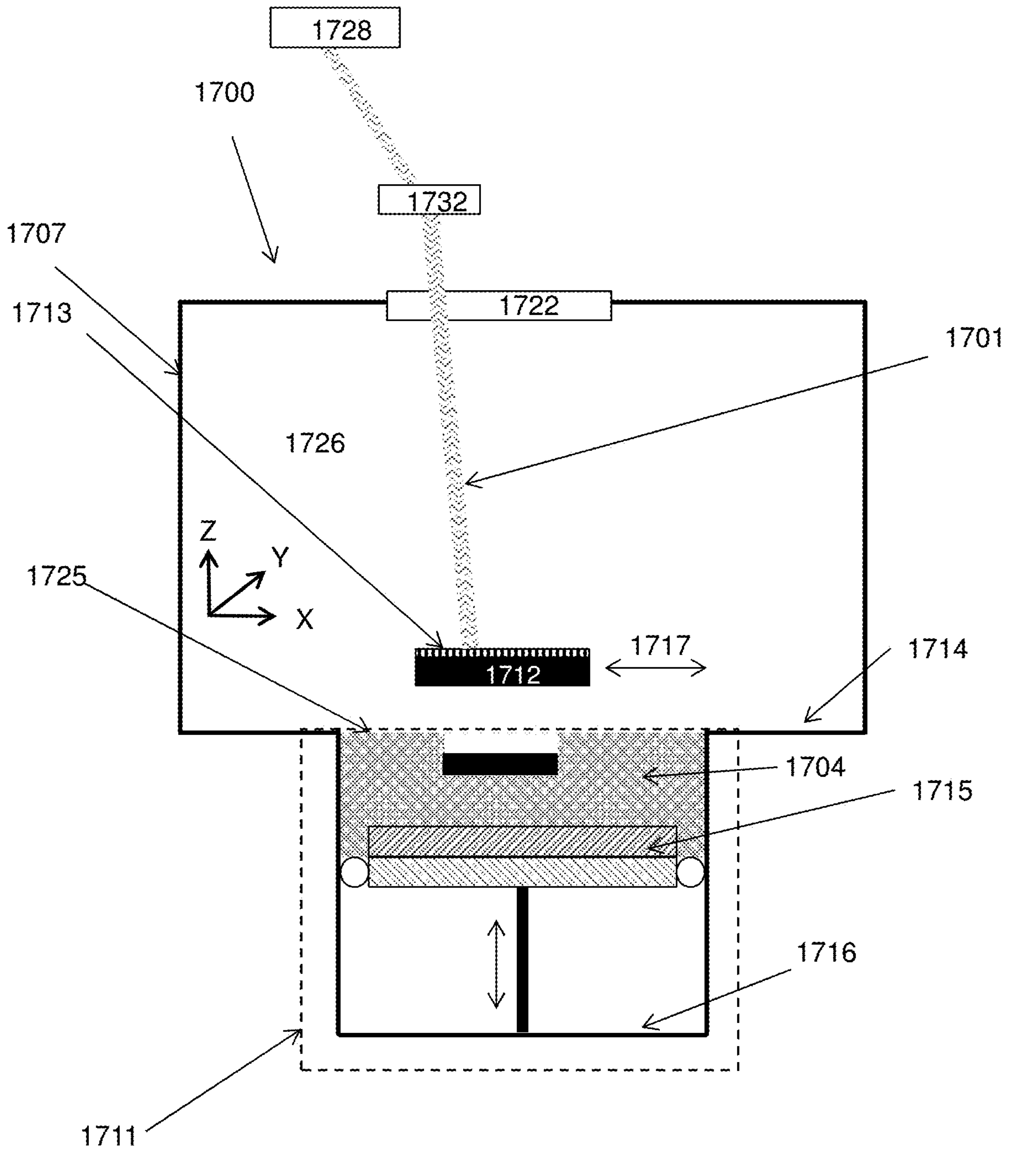
FIG. 17 shows a schematic side view of a 3D printing system and its components.

In some embodiments, a calibration system is operatively coupled to (e.g., included in) the 3D printer. The calibration system may comprise a calibration structure (e.g., FIG. 17, 1713), sensor, detector, or a control system. The sensor may be any sensor described herein. The detector may be any detector described herein. The calibration system may calibrate one or more components of the energy source and/or the optical system (e.g., the irradiating energy). The calibration system may calibrate one or more characteristics of the irradiating energy. For example, the calibration system may calibrate (i) the position at which the irradiating energy contacts a surface (e.g., the target surface), (ii) the energy beam footprint size, (iii) the shape of the footprint of the energy beam at the (e.g., target) surface, (iv) the energy density of the of the energy beam projected to the (e.g., target) surface, (v) the velocity of the irradiating energy relative to the (e.g., target) surface, (vi) the energy profile of the energy beam across its footprint at the (e.g., target) surface, and/or (vii) the XY offset of the energy beam with respect to the (e.g., target) surface. The characteristics of the irradiating energy may be calibrated along a field of view of the optical system (e.g., and/or detector). The field of view (e.g., FIG. 12, 1240) may be described as the maximum area of target surface that is covered (e.g., intersected, or accessed) by the optical system (e.g., by the irradiating energy). The field of view may be indirect (e.g., devoid of a direct view). The field of view may be constrained, constricted or otherwise limited, for example, to increase a resolution of an image, to reduce contrast, to exclude a portion of the field of view. The field of view may be substantially concentric with a location of the irradiating energy on a surface (e.g., a calibration structure, and/or the target surface) (e.g., FIG. 13, 1358, 1381). The field of view may include one or more dimensions (e.g., horizontal plane, XY plane). The field of view may include an angle of coverage.

In some embodiments, the enclosure comprises at least a portion of the calibration system. For example, the enclosure may comprise a calibration structure. The calibration structure may be disposed in a manner that allows interaction of the irradiating energy (e.g., energy beam) with the calibration structure. The calibration structure may be a part of the build module (e.g., FIG. 17, 1711). The calibration structure may be located within the processing chamber (e.g., having the internal volume 1726). The calibration structure may be disposed within the enclosure (e.g., FIG. 17, 1707). For example, the calibration structure may be disposed at the bottom of the build module (e.g., floor of the build module, e.g., 1716), at or adjacent to the platform (e.g., the base 1715). For example, the calibration structure may be disposed at the bottom of the processing chamber (e.g., 1714). Bottom may be in the direction of the gravitational center. Bottom may be in the direction away from the optical mechanism (e.g., 1732. e.g., comprising a scanner). The calibration structure may be located outside of the build module (e.g., in the processing chamber). The calibration structure may be located outside of the processing chamber (e.g., in the build module).

The calibration structure may be translatable (e.g., laterally 1717) or non-translatable (e.g., static). The calibration structure may be disposed on, or be a part of, a support (e.g., 1712). The support that may be referred herein as a "stage." The stage may be movable. The movable stage may translate horizontally and/or vertically. The movable support may be laterally translatable. The movable stage may be translatable before, after, or during at least a portion of the 3D printing. The translation of the movable stage may be controlled (e.g., manually and/or by a controller). The movable stage may translate and/or be controlled before, after, and/or during at least a portion of the 3D printing. The stage may move towards a stopper. The stage may engage (e.g., reversibly) with the stopper. The engagement may ensure that the stage is disposed (e.g., substantially) at the same position on each engagement. The stage and/or stopper may comprise a mechanism that ensures positional accurate engagement of the stage with the stopper. The positional accuracy may be in the vertical and/or horizontal direction. The mechanism for ensuring positional accuracy may comprise a kinematic mechanism. For example, the stage and/or stopper may comprise one or more kinematic support, or arrangement. The stopper and the stage may couple (e.g., to ensure accurate positional engagement). The coupling may comprise kinematic coupling. For example, the stage and/or stopper may comprise one or more complementary fixtures that are designed to (e.g., precisely) constrain each other on mutual engagement. The engagement of the complementary fixtures may trigger a signal. The signal may be an electronic, pneumatic, sound (e.g., acoustic), light (e.g., electromagnetic), or magnetic signal. The signal may be detectable. The signal may be (e.g., represent) an assertion of the engagement of the stage with the stopper.

The fixtures may comprise a protrusion and a complementary indentation. The engagement can comprise at least one protrusion that fits into at least one complementary indentation respectively. For example, the stage may comprise a first fixture and the stopper may comprise a second fixture that is complementary to the first fixture, which fit into each other on engagement of the stage with the stopper. The fitting into each other on engagement may prevent one or more degrees of freedom. For example, a horizontal and/or vertical degree of freedom of the stage. The fixture may comprise a cross section having a geometrical shape (e.g., any geometrical shape described herein, e.g., a polygon). The fixture may have a 3D shape. The 3D shape may comprise a cuboid (e.g., cube), or a tetrahedron. The 3D shape may comprise a polyhedron (e.g., primary parallelohedron), at least a portion of an ellipse (e.g., circle), a cone, or a cylinder. The polyhedron may be a prism (e.g., hexagonal prism), or octahedron (e.g., truncated octahedron). The fixture may comprise a Platonic solid. The fixture may comprise octahedra, truncated octahedron, or a cube. The fixture may comprise convex polyhedra (e.g., with regular faces). The fixture may comprise a triangular prism, hexagonal prism, cube, truncated octahedron, or gyrobifastigium. The fixture may comprise a pentagonal pyramid. The fixture may be an indentation of the 3D shape (e.g., a V-groove is an indentation of a cone). The portion of the ellipse may be a hemisphere. For example, the engagement (e.g., coupling) of the stopper with the stage may comprise engagement of one or more (e.g., three) radial v-grooves with one or more complementary hemispheres. One or more may comprise at least 1, 2, 3, 4, or 5. The engagement of the complementary fixtures may comprise at least one (e.g., two, or three) contact point. The contact point may constrain the degree of freedom of the stage. In some examples, the complementary fixtures may engage with each other, and not precisely fit into each other. In some examples, the complementary fixtures may engage with each other, and restrain at least one degree of freedom of at least one of the stage and the stopper. For example, the first fixture may be a V-groove and its complementary fixture may be a hemisphere. For example, the first fixture may be a tetrahedral dent, and its complementary fixture may be a hemisphere. For example, the first fixture may be a rectangular depression, and its complementary fixture may be a hemisphere. The kinematic coupling may comprise Kelvin or Maxwell coupling.

Figure 30A:
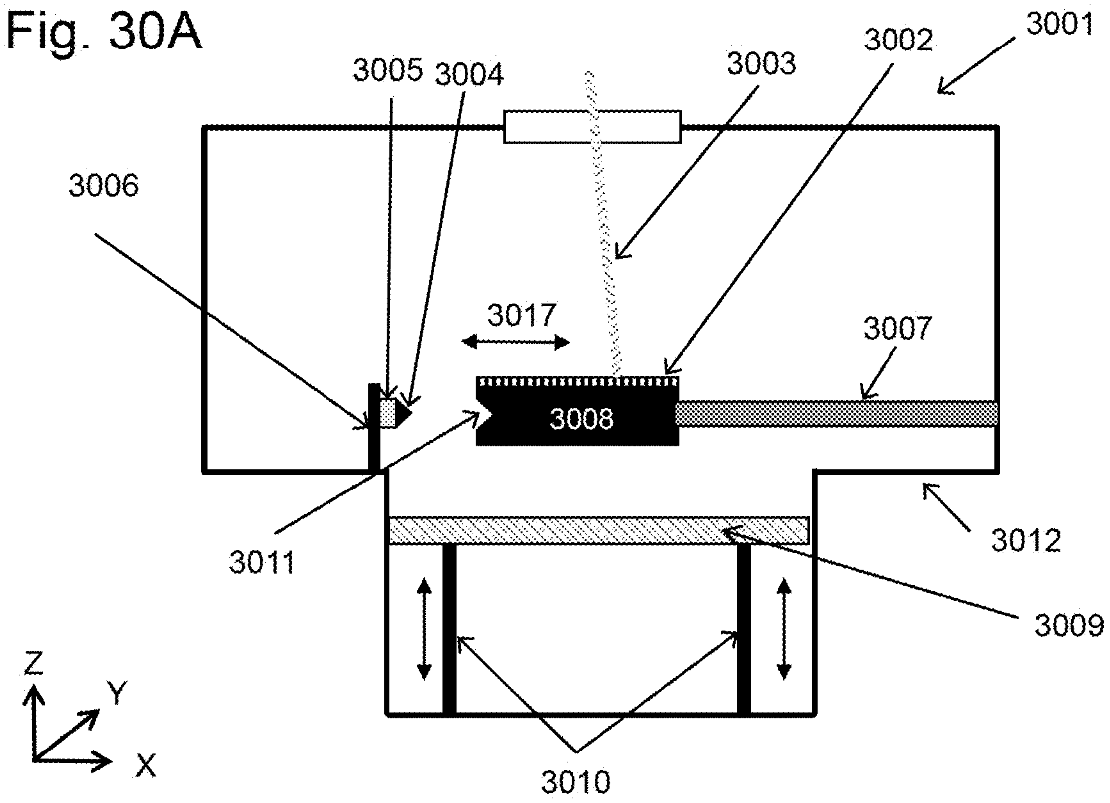
FIGS. 30A-30B schematically illustrate components of a calibration system.
Figure 30B:
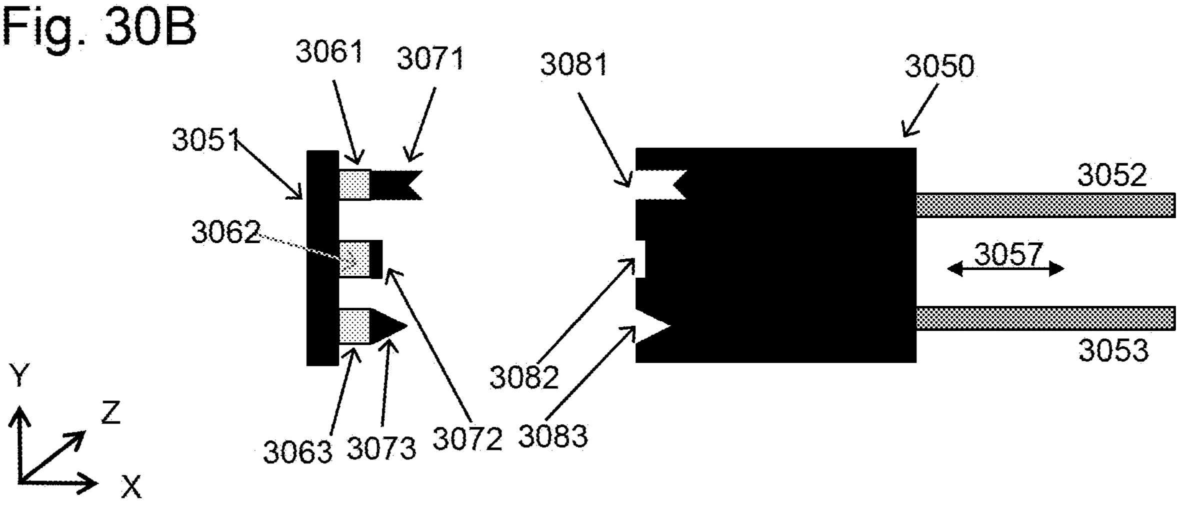

FIG. 30A shows a side view example of a 3D printer comprising an energy beam 3003 that is directed towards a platform 3009 that is supported by a plurality of vertically movable shafts 3010. The enclosure of the 3D printer 3001 comprises a stage 3008 on which a calibration structure 3002 is mounted. The stage 3008 is laterally movable (e.g., in the direction of 3017). When the 3D printing is in process, the stage 3008 is retracted from an area above the platform 3009 (e.g., towards an area to the side of the platform, e.g., 3012). The movement of the platform may be effectuated by one or more (e.g., two or three) shafts (e.g., 3007). The shafts may be constructed from a strong material that supports the stage without sagging, when the stage engages with the stopper 3006. The stage 3008 may comprise a fixture (e.g., indentation 3011) that at least restrains a degree of movement of the stage 3008 by engaging with a fixture of the stopper (e.g., 3004). The fixture on the stopper may comprise an optional pneumatic, electronic, magnetic, auditory, or optical mechanism (e.g., 3005). FIG. 30B shows a horizontal (e.g., plan) view of a stage 3050 having three (indentation) fixtures (e.g., 3081-3083) that complement three (protruding) fixtures (e.g., 3071-3073) respectively on engagement of the stage 3050 with the stopper 3051. The stage may be laterally movable (e.g., 3057) and mounted by one or more shafts (e.g., 3052 and 3053). The stopper 3051 may be stationary. One or more fixtures on the stopper (e.g., 3051) may comprise optional pneumatic, electronic, magnetic, auditory, or optical mechanism (e.g., 3061-3063). At least two of the plurality of the afore-mentioned mechanisms may be of the same type (e.g., all pneumatic). At least two of the plurality of the afore-mentioned mechanisms may be of different types (e.g., one electronic and one optical). The shafts may translate vertically and/or horizontally. The shafts and/or stage may translate before, after, and/or during the 3D printing (e.g., when the irradiated is not used to form the 3D object). The shafts and/or stage may be controlled before, after, and/or during the 3D printing (e.g., when the irradiated is not used to form the 3D object). The control may be manual and/or automatic (e.g., using a controller).

The calibration structure (e.g., FIG. 17, 1713) may be located at and/or adjacent to the load lock system (e.g., as part of a portion of the load lock system, e.g., FIG. 2A, 212, 224). The calibration structure may be placed adjacent to the platform. The calibration structure may be placed adjacent to the target surface (e.g., adjacent to the exposed surface of the material bed (e.g., 1704). The calibration structure may (e.g., 1713) be disposed parallel to the target surface (e.g., 1725). The calibration structure may be disposed on a shutter associated with the load lock mechanism (e.g., FIGS. 3, 371, and/or 351). The calibration structure may be disposed on a top surface of the shutter. Top may be in the direction opposite to the gravitational center. Top may be in the direction towards the optical mechanism (e.g., FIG. 2A, 230). Top may be in a direction that allows interaction of the irradiating energy (e.g., 211) with the calibration structure. For example, the calibration structure may be disposed on (or be a part of) the shutter of the processing chamber (e.g., 212). For example, the calibration structure may be disposed on (or be a part of) the shutter of the build module (e.g., 224).

The calibration structure may facilitate calibration of features such as average lateral (e.g., FIG. 17, 1717, XY) offset of the irradiating energy (e.g., energy beam), average velocity scale factor and/or average scale factor of the energy beam.

The calibration system may facilitate calibration of (i) locality of the footprint of the irradiating energy in the XY plane (e.g., FIG. 17), the fluence of energy of the irradiating energy (e.g., its power density per unit time and/or its Andrew number). The fluence of the irradiating energy may relate to its footprint on the exposed surface, to its power density, to its velocity, to the optical (e.g., variable) focus elements (e.g., position and sensitivity). The calibration system may comprise a calibration structure. The calibration structure may be stationary (e.g., passive) or modular (e.g., movable). The calibration structure may be a passive structure of a known shape. For example, it may be a map or an array (e.g., FIG. 18A-C, 19A-C, 20A-C, or 21A-C). The calibration structure may be formed by methods comprising machining (e.g., embossing) or lithography. The calibration structure may comprise a grid.

The calibration system may use an electromagnetic radiation. The electromagnetic radiation may be the same or different from the irradiating energy used to form the 3D object. The electromagnetic radiation used for the calibration may be a laser (e.g., a pilot laser, or a 3D printing laser). The electromagnetic radiation used for the calibration may comprise structured light (e.g., a pattern of light, e.g., comprising light or dark fringes). The calibration may take place during, after, or before printing a 3D object. For example, between at least two build cycles of the 3D printer.

The calibration system may comprise a detector, sensor, and/or image processor. For example, the calibration system may comprise a camera, a non-imaging sensor (e.g., performing a point measurement, e.g., a silicon detector, or a spectrometer). The calibration system may detect information pertaining to the power density of the energy beam, for example, by using the reflectivity/absorption of the energy beam from the calibration structure (e.g., from the calibration mark) and comparing to a reference reflectivity/absorption value, respectively.

In some embodiments, the resolution of the calibration is not limited by the resolution of the detector. In some embodiments, the resolution of the calibration is determined by the steps of the irradiating energy (e.g., pulse frequency, or translation step).

Calibration may be performed before, during, and/or after at least a portion of the 3D printing. For example, calibration may be performed after at least one (e.g., after every) 3D printing cycle. The calibration may be performed before, during, and/or after performing a load lock engagement of the build module with the processing chamber (e.g., on merging the processing chamber with the build module, on sealing the processing chamber with the load lock shutter, and/or on sealing the build module with the load lock shutter).

Figure 12:
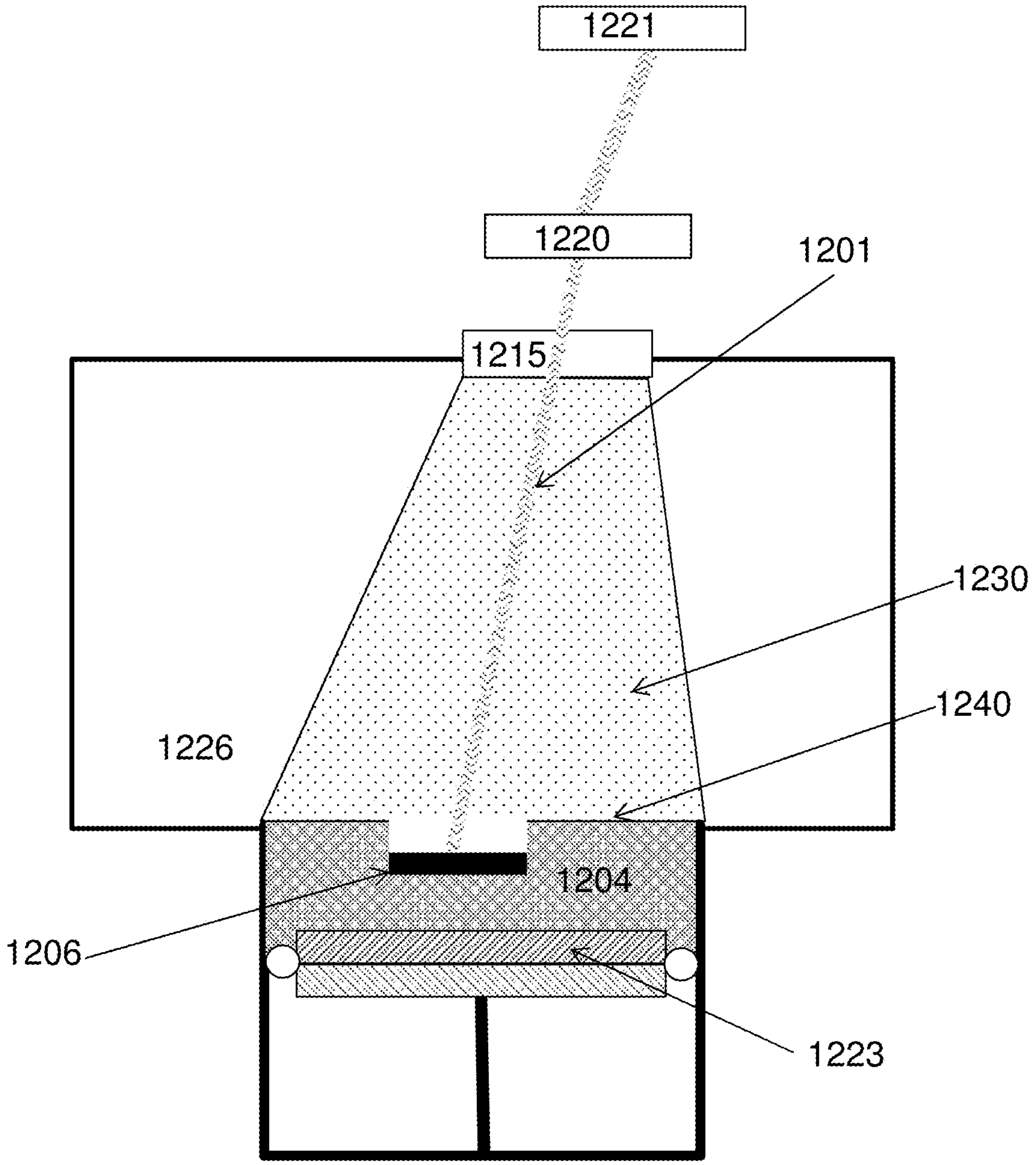
FIG. 12 schematically illustrates various 3D printer components.
Figure 18A:
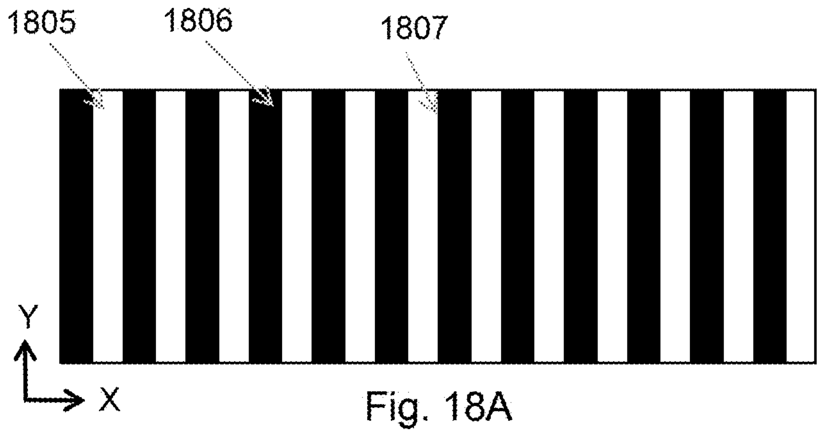
FIGS. 18A-18C schematically illustrate various bitmaps.
Figure 18B:
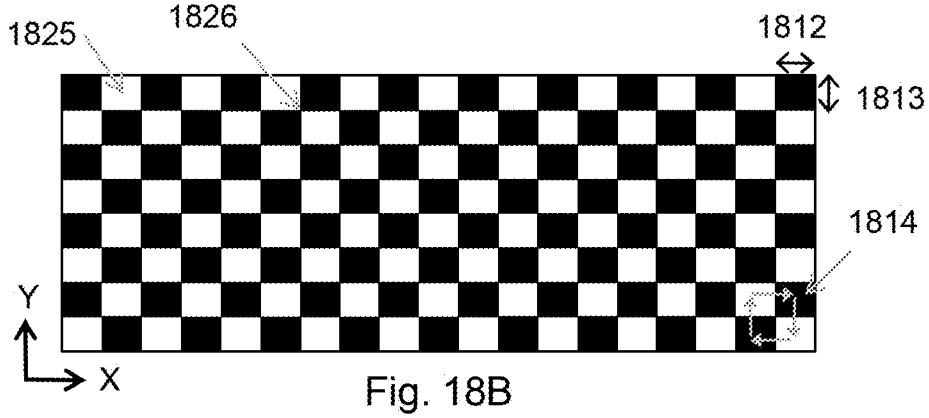

The calibration structure may comprise a mark (referred to herein as "calibration-mark"). The calibration-mark may be an area comprising an impression, embossing, depression, protrusion, line, point, abrasion, erosion, scar, polish, brilliance, glaze, sparkle, light, glossy surface, matte surface, dispersive surface, diffusive surface, or stain. The calibration structure may comprise a calibration-mark type having a detectable border. The calibration structure may comprise two or more calibration-marks. For example, the calibration structure may include a calibration-mark type, wherein the border between every two calibration marks (e.g., of the same type) is detectable. The calibration structure may include two different calibration-marks. The calibration structure may include two different mark types. The two different mark types may constitute a bitmap. The two different mark types may differ in at least one detectable property (e.g., reflective vs. diffusive (e.g., and dispersive) surfaces, black vs. white stain, depression vs. protrusion). The two calibration-mark types in the calibration structure (e.g., each of the two-bit types in the bitmap) may differ at least in their surface roughness, surface reflectivity, surface color, material density, material composition. The difference between the two calibration marks may be a difference in their surface. The calibration-marks may comprise surface marks. FIG. 18A shows an example of a bitmap in which the black tiles (e.g., 1806) represent a first mark type having a detectable property of a first value (or a first range of values), and the white tiles (e.g., 1805) represent a second mark type of the detectable property having a second value (or a second range of values), wherein the first value (range) differs from the second value (range) in a detectable manner. For example, the first value range may differ from the second value range in a threshold value (e.g., the first value range is above the threshold value, and the second value range is below the threshold value). The value range may at times constitute (e.g., substantially) a single value. The bitmap may comprise any bitmap image. For example, the bitmap may comprise an irregular bitmap image. The bitmap may comprise a repeating or non-repeating sequence. The bitmap may comprise a series. The series may be composed of the first mark type and the second mark type. The bitmap may comprise one or more pitches. For example, a pitch may be represented as a bit (e.g., mark type) on the bitmap, the pitch may have a detectable property such as an incline, a height, a gradient, a dip, a slope, an angle. The bitmap may have a coverage area that spans an area (e.g., substantially) equivalent to at least a portion of the target surface (e.g., the energy beam processing cone area that intersects the target surface). FIG. 12 shows an example of a processing cone (e.g., 1230). A maximal portion of the enclosure, that is occupied by the irradiating energy (e.g., during the 3D printing) can define a processing cone (e.g., FIG. 12, 1230). An intersection of the processing cone with a surface (e.g., of the calibration structure and/or material bed) can be defined as the field of view of the irradiating energy. The bitmap may span an area (e.g., substantially) equivalent to the target surface (e.g., exposed surface of the material bed, and/or platform). The calibration-mark may be regularly shaped (e.g., a line, rectangle (e.g., FIG. 18A, 1805), ellipse (e.g., FIG. 21A, 2101), or any other geometrical or non-geometric shape). The rectangle may comprise a square (e.g., FIG. 18, 1825). The ellipse may comprise a circle (e.g., FIG. 21B, 2121). The calibration-mark may be irregularly shaped. The calibration-mark may comprise a line. The line may comprise a curvature. The line may be straight. At least two of the lines in the calibration structure may be (e.g., substantially) equal in width, length, angle relative to an edge of the calibration structure, line-shape, or any combination thereof. At least two of the lines in the calibration structure may differ in width, length, angle relative to an edge of the calibration structure, line-shape, or any combination thereof. At least one line in the calibration structure may be straight. At least one line in the calibration structure may comprise a curvature. At least two lines in the calibration structure may intersect, and/or overlap. The intersecting lines may form a grid. The manhattan distance may be between two intersecting line points in the grid, based on a strictly horizontal and/or vertical path (e.g., the distance between two points measured along axes at right angles). At times, at least two manhattan distances in the grid is (e.g., substantially) equal. At times, at least two manhattan distances in the grid differ from each other. The calibration structure may comprise at least two manhattan lines. The calibration-mark lines may be arranged to provide a manhattan distance. Every two of at least three calibration marks may be placed equidistant to each other. The calibration-mark may have a regular surface (e.g., smooth surface). The calibration-mark may have an irregular surface (e.g., comprising a protrusion or indentation). The calibration-mark may have one or more colors (e.g., two tone colors). The calibration-mark may have at least one varied physical property that is measurable (e.g., varied reflectivity, variable roughness, specular reflection, diffuse reflection, diffused absorption). The varied physical property may comprise a range of the physical property. The calibration-mark may be of a small size (e.g., size of the smallest footprint and/or cross-section of the energy beam and/or energy flux). The calibration-mark may be passive. The calibration-mark may be an active calibration-mark (e.g., electrically, electronically, magnetically, chemically, and/or thermally active). The active calibration-mark may be activated (e.g., using a trigger and/or an agent) manually and/or by a controller before, after, and/or during at least a portion of the 3D printing. The trigger and/or agent may be electronic, magnetic, thermic, and/or chemical. The trigger and/or agent may activate using a processor (e.g., comprising a software).

Figure 18C:
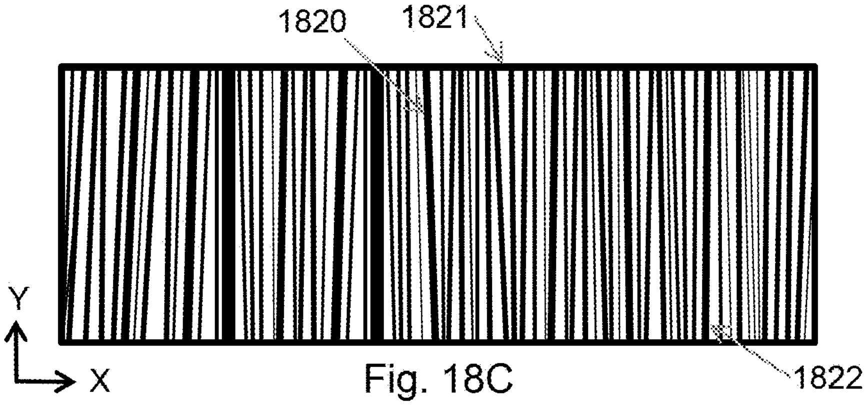
Figure 19A:
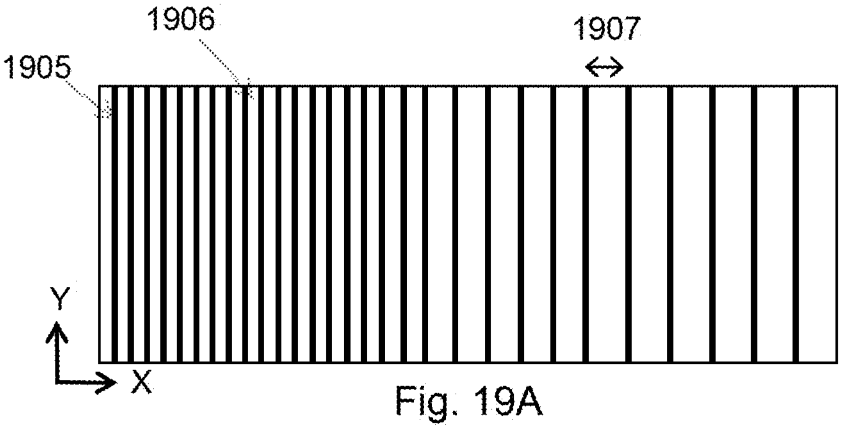
FIGS. 19A-19C schematically illustrate various bitmaps.
Figure 19B:
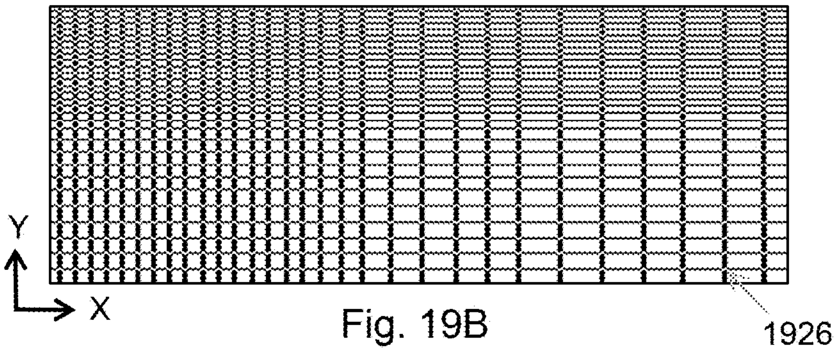
Figure 19C:
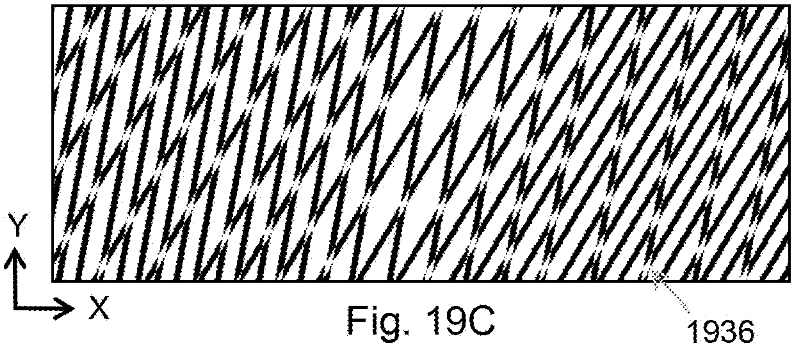
Figure 20A:
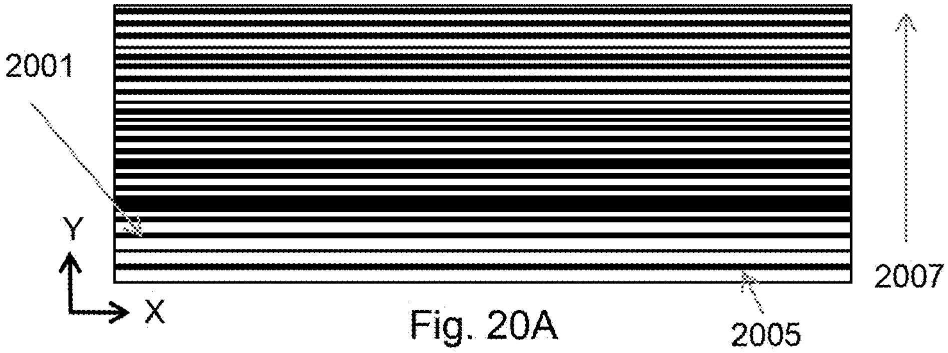
FIGS. 20A-20C schematically illustrate various bitmaps.
Figure 20B:
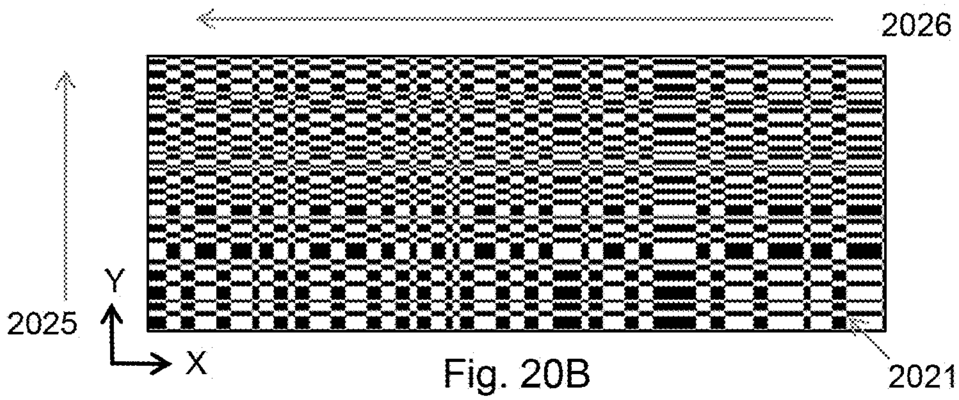
Figure 20C:
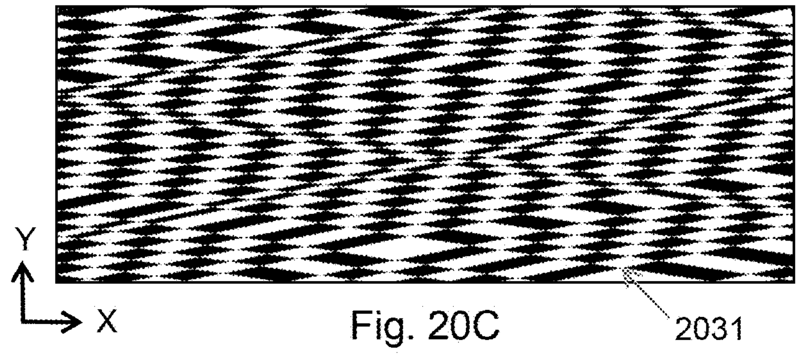
Figure 21A:
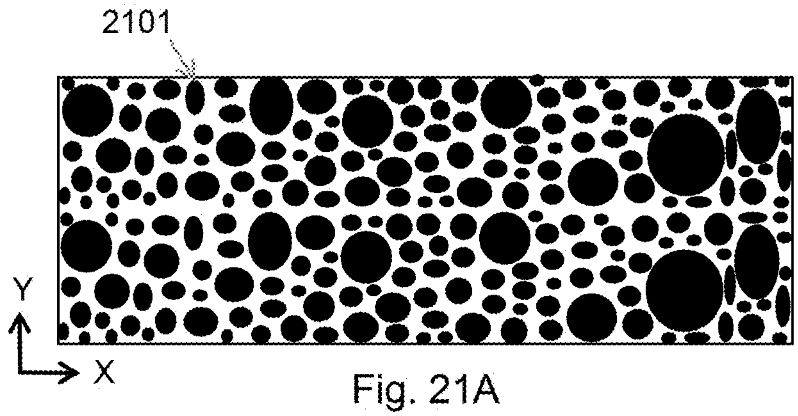
FIGS. 21A-21C schematically illustrate various bitmaps.
Figure 21B:
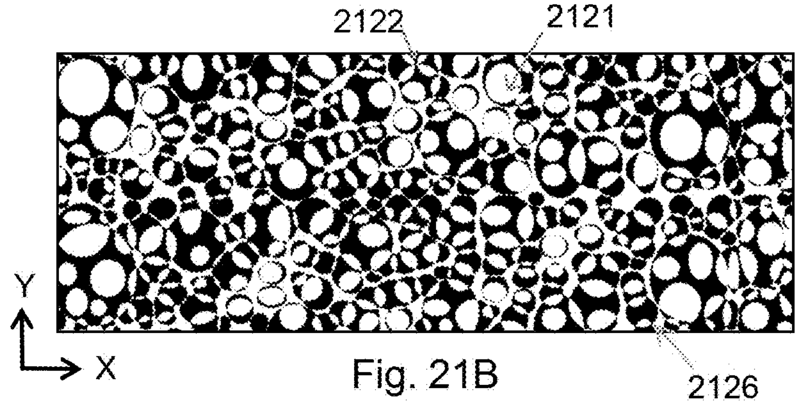
Figure 21C:
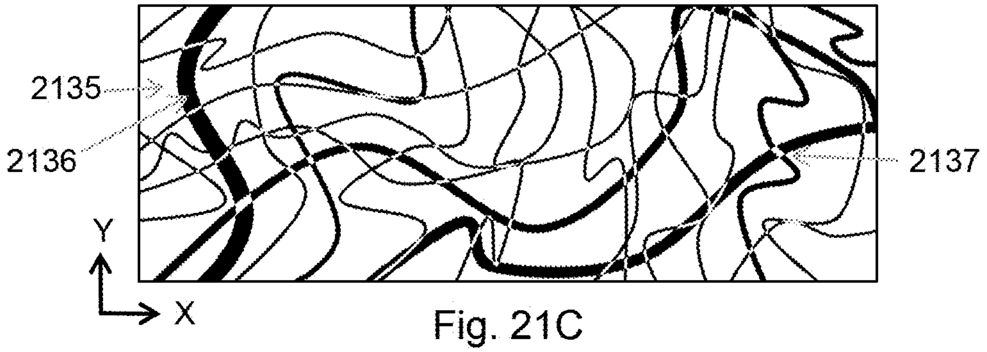

The calibration-marks may be arranged in a pattern (e.g., a checkerboard pattern, and/or a manhattan grid pattern). FIGS. 18A-18C, 19A-19C, 20A-20C, and 21A-21C show various top view examples of at least portion of various calibration structures, each of which comprises two calibration-mark types (represented as black and white areas) that are arranged in different patterns. For example, a parallel straight-line pattern (e.g., FIG. 18A), a checkerboard pattern (FIG. 18B), and a non-parallel straight-line pattern (e.g., FIG. 18C). The checkerboard pattern may be an example of (e.g., substantially) uniform calibration marks (e.g., FIG. 18A, 1805 and 1806). The pattern may include at least one calibration mark type having of uniform FLS (e.g., length 1813 and/or width 1812). The pattern may include at least one calibration mark type having of non-uniform FLS. FIG. 19A shows an example of at least a portion of a calibration structure including a first calibration mark type (e.g., 1905), and second calibration mark type (e.g., 1906), wherein the calibration marks belonging to the first (black) type are of a (e.g., substantially) equal width and length, and wherein the calibration marks of the second (white) type is of a (e.g., substantially) equal length and varied width (e.g., 1907).

In some embodiments, the (lateral) area of the calibration mark is at least equal to the cross section and/or footprint of the irradiating energy on the exposed surface. For example, the area of the calibration mark may be greater by at least 1.5*, 2*, 5*, 10*, 15* or 20* the cross-sectional area and/or footprint of the irradiating energy on the exposed surface. The area of the calibration mark may be of any value between the afore-mentioned values (e.g., from about 1.5* to about 20* the cross-sectional area and/or footprint of the irradiating energy on the exposed surface). The symbol "*" designates the mathematical operation "times". In some embodiments, the FLS (e.g., width and/or depth) of the calibration mark is at least equal to the cross section and/or footprint of the irradiating energy on the exposed surface. For example, the FLS of the calibration mark may be greater by at least 1.5*, 2*, 5*, 10*, 15* or 20* the FLS of the cross-section and/or footprint of the irradiating energy on the exposed surface. The FLS of the calibration mark may be of any value between the afore-mentioned values (e.g., from about 1.5* to about 20* the FLS of the cross section and/or footprint of the irradiating energy on the exposed surface). The pitch may have a minimum size. The pitch may have a maximum size. The pitch may have a FLS. For example, the pitch may be of a size (e.g., have a specific width, length or height) that can accommodate one or more errors (e.g., residual errors, bitmap pattern errors). For example, the pitch may be wide enough to accommodate errors that are smaller than or equal to half the size of the pitch. Accommodate may include detect. Accommodate may include adjust. The pattern may comprise irregular shaped lines and/or areas (e.g., FIG. 21C). The lines may intersect one or more lines. The lines (e.g., FIG. 18C, 1820) may be disposed at various angles (e.g., 1°, 2°, 3°, 4°, 5°, 10°, 15°, 20°, 30°, 40°, 50°, 60°, 70°, 80°, 90°, 100°, 120°, 140°, 160°, 180°) with respect to a side of the calibration structure (e.g., 1821).

The calibration mark may be space-filling polygons. The calibration structure may be filled with space-filling polygons. The calibration mark may comprise a polygon. The polygon may comprise at least 3, 4, 5, 6, 7, 8, 9, or 10 faces. The calibration mark may comprise any number of faces between the aforementioned number of faces (e.g., from 3 to 10). The polygon may comprise at least 3, 4, 5, 6, 7, 8, 9, or 10 vertices. The calibration mark may comprise any number of vertices between the aforementioned number of faces (e.g., from 3 to 10). The calibration mark may comprise a concave or, convex polygon. The polygon may be a closed polygon. The polygon may be equilateral, equiangular, regular convex, cyclic, tangential, edge-transitive, rectilinear, or any combination thereof. For example, the calibration mark may comprise a square, rectangle, triangle, pentagon, hexagon, heptagon, octagon, nonagon, octagon, circle, or icosahedron.

The calibration structure may comprise a tessellation. The calibration structure may be (e.g., substantially) planar. The tessellation may one or more calibration marks. The calibration marks may comprise geometric shapes. The calibration marks in the calibration structure may be arranged with without overlaps and without gaps. At least two of the calibration marks in the calibration structure may border each other. The tessellation may comprise a periodic repetition of the one or more calibration marks (e.g., calibration mark types). The tessellation may comprise edge-to-edge arrangement of the calibration marks (e.g., where adjacent calibration marks share one full side, or where the calibration marks do not share a partial side or more than one side with any other tile). For example, the sides of the calibration marks and the edges of the calibration marks (e.g., polygons) may be the same. The arrangement of the calibration marks in the tessellation may be normal, monohedral, regular (e.g., highly symmetric tessellation), semi-regular, or edge. The regular tessellation may comprise hequilateral triangular, regular hexagonal, or square calibration marks. The semi-regular tessellation may comprise more than one type of regular polygon in an isogonal arrangement. The tessellation may comprise non-edge-to-edge arrangement of Euclidean planes. For example, Pythagorean arrangement, tessellations that use two (parameterised) sizes of square, each square touching four squares of the other size. The tessellation may comprise an edge tessellation (e.g., in which each calibration mark can be reflected over an edge to take up the position of a neighboring calibration mark). For example, an array of equilateral or isosceles triangular calibration marks.

In some examples, at least a portion of the calibration structure is imprinted on a material. For example, at least a portion of the calibration structure may be imprinted on a surface (e.g., of the shutter, platform, moving structure, or enclosure floor). The enclosure floor may comprise the processing chamber floor or the build module floor. The material may comprise chrome or glass. The material may comprise any material disclosed herein (e.g., polymer, resin, elemental metal, metal alloy, ceramic, or an allotrope of elemental carbon). In some embodiments, only the first mark type is imprinted on the material, whereas the second mark type constitutes the non-imprinted material. In some embodiments, both the first mark type and the second mark type are imprinted on the material. Imprinting may comprise physical etching, chemical etching, blasting (e.g., sand blasting), carving, ablating, machining, abasing, or embossing. One or more topographical features (e.g., indentations, protrusions, roughness, smoothness, granular, or planar) may be imprinted on the material. Imprinting may comprise chemical imprinting. The chemical imprinting may comprise altering a material property and/or composition. The chemical alteration may comprise addition or subtraction of at least one element. The chemical alteration may comprise altering a chemical bond, material morphology, grain structure, and/or crystal structure. Imprinting may comprise thermal imprinting. The chemical and/or physical alteration may comprise altering the surface reflectivity. The calibration structure may comprise at least one detectable property. The detectable property may be a physically detectable property (e.g., protrusions, indentations, roughness, or smoothness). The detectable property may be an optically detectable property (e.g., reflectivity, absorption, or image analysis). The detectable property may be a thermally detectable property (e.g., heat conductivity, or heat intensity). The detectable property may be a magnetically detectable property (e.g., magnetic field intensity, or magnetic field direction). The detectable property may be an electrical and/or electronically detectable property (e.g., bits, voltage, current, resistance, or inductance). At times, the calibration structure may comprise more than one detectable properties.

The bitmap may comprise one or more bitmap subsets (e.g., a series of bitmaps, a geometric pattern, an array, a repeatable pattern). A bitmap subset may comprise a single dimension (e.g., a series of lines in one direction. e.g., FIG. 19A). A bitmap subset may comprise two dimensions (e.g., a series of lines in two directions. e.g., FIGS. 19B and 19C). At least a calibration mark of the calibration structure may be calibrated (e.g., by calibrating based on its at least one detectable property).

Figure 22A:
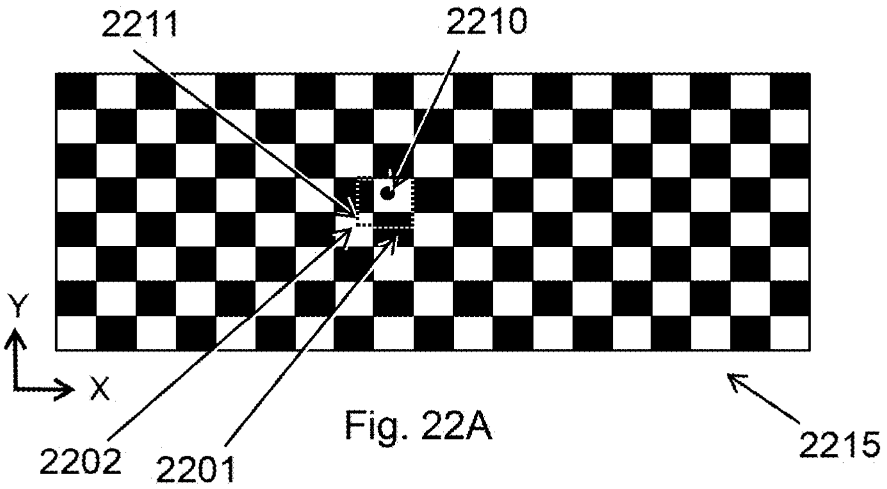
FIGS. 22A-22B schematically illustrate components of a calibration system.
Figure 22B:
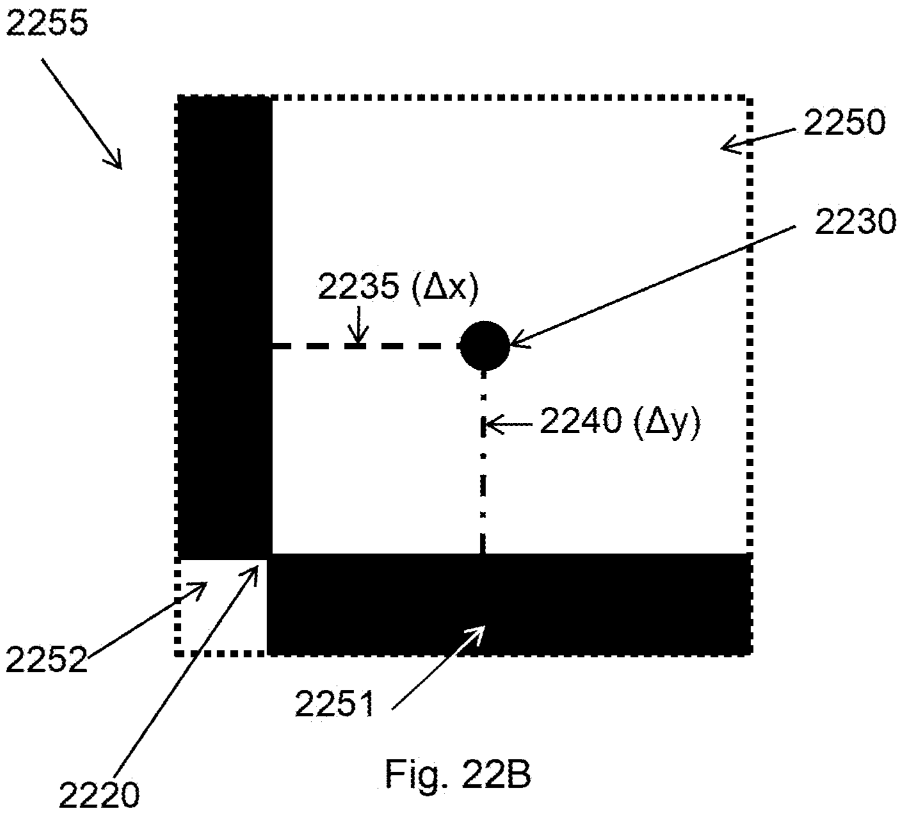

In some embodiments, the calibration structure is used to calibrate one or more properties of the optical system and/or the detection system. Calibrating may include benchmarking, certifying, and/or evaluating the detectable property. Additionally, or alternatively, calibrating may include ensuring operation of the optical system in conjunction with one or more components of the 3D printer. FIGS. 22A-22B show examples of calibrating an optical property (e.g., the locality of the energy beam footprint) of the optical system. FIG. 22A shows an example of a calibration structure of a checkerboard bitmap (e.g., 2215). The energy source may direct the irradiating energy (e.g., scanning energy beam, or energy flux) such that the irradiating energy interests with the calibration structure within a calibration mark (e.g., 2110). A portion of the calibration structure which the irradiating energy intersects, may be detected by a detector (e.g., an image detector). The detector may be any detector described herein. The detected portion (e.g., FIG. 22A, 2211) of the bitmap may include one or more portions of one or more calibration marks of the bitmap (e.g., including a portion of the black pitch 2201 and/or a portion of the white pitch 2202). FIG. 22B shows an example 2255 of a magnification of the calibration structure portion 2211, in which 2251 is a portion of a white calibration mark and 2252 is a portion of a black calibration mark, and 2230 is a footprint of the irradiating energy on another white calibration mark. The detected portion of the calibration structure may include a (e.g., pre-determined and/or known) central position. The central position (also herein "center position") may be any accurately detectable position of the calibration structure. For example, the central position may be indicated by an intersection of at least two calibration marks or portions thereof (e.g., FIG. 20A, 2001). For example, the central position may be an intersection of four calibration marks (e.g., FIG. 20B, 2021, FIG. 20C, 2031, or FIG. 22B, 2220). For example, the central position may be an intersection of eight calibration marks (e.g., FIG. 21B, 2122). The detected calibration structure portion (e.g., 2255, or 2211) may capture the position of the irradiating energy (e.g., 2230, or 2210). At times, the detected position may not coincide with the center position. A deviation (e.g., 2235, 2240) of the detected position of the energy beam (e.g., 2230) with respect to the center position (e.g., 2220) may be calculated. The deviation may be calculated in at least one dimension (e.g., horizontal direction (X), or vertical direction (Y)). The calculation may be done manually and/or automatically (e.g., by a controller), before, after and/or during at least a portion of the 3D printing. The calculation may be done in real-time (e.g., during build of at least a portion of the 3D object). The calculation may be done when performing calibration (e.g., before, and/or, after build of the 3D object). Based on the calculated deviation, the position at which the irradiating energy intersects the calibration structure and/or target surface may be adjusted (e.g., before, after and/or during the 3D printing; manually, and/or automatically). Adjusting may include coinciding (e.g., calibrating) (i) the footprint position of the irradiating energy on the calibration structure, with (ii) the center position (e.g., 2220). Adjusting may include altering the projection position and/or angle of the irradiating energy on the calibration structure and/or target surface. Adjusting may be done during, before, or after build of the 3D object. Adjusting may be performed manually or by a controller. At times, calculating and adjusting may be performed by the same controller. At times, calculating and adjusting may be performed by different controllers. At least one controller may be a control system. The controller may include a processing unit (e.g., CPU, GPU, and/or FPGA). Controller may be programmable. The controller may operate upon request. The controller may be any controller described herein.

In some embodiments, finding the center position comprises translating the irradiating energy (e.g., vectorially) through a plurality (e.g., at least four) transition lines of calibration marks, which calibration marks contact a point (e.g., FIG. 18, 1814). Translating may comprise translating around or at the central position. The translation may comprise a circular translation along an ellipse (e.g., circle), wherein the center position is disposed in the ellipse (including its circumference). The translation can be along a circumference of a rectangle (e.g., cube), wherein the center position resides in the rectangle (e.g., 1814) (including its circumference). Such circling translation may allow finding the center position, and/or the XY calibration offset (e.g., by comparing to a benchmark).

Figure 25A:
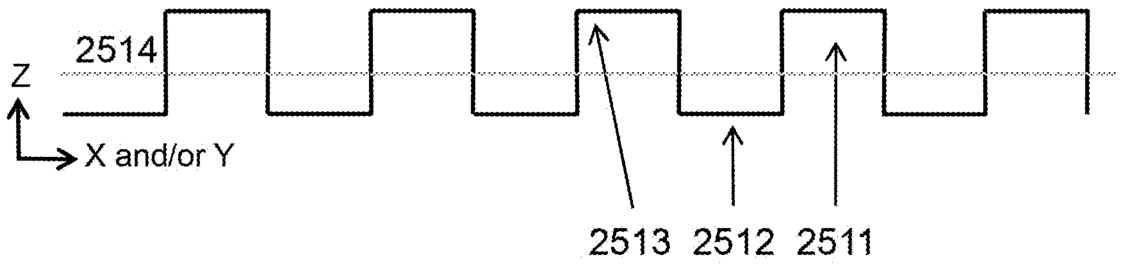
FIGS. 25A-25C schematically illustrate components of a calibration system.
Figure 25B:
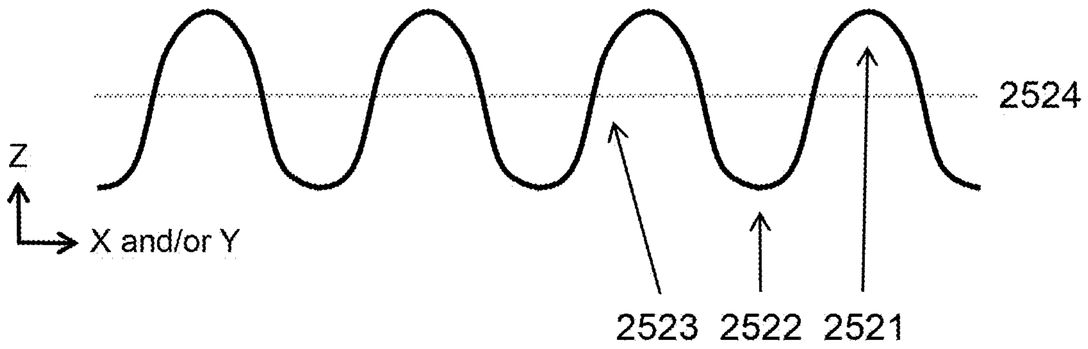
Figure 25C:
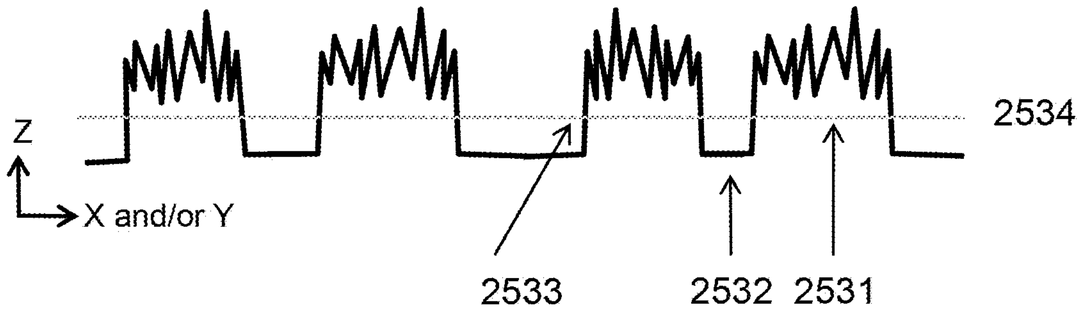

In some examples, the irradiating energy scans the calibration structure and transitions from one calibration mark type to another. The transition is through a transition line or point. FIG. 23C illustrates an example of a vertical cross section of a bitmap calibration structure that comprises a transition line (e.g., 2325) between a first calibration mark type (e.g., 2345) and a second calibration mark type (e.g., 2340). The transition line may be a line that transitions a property (e.g., reflectivity, intensity) of a calibration mark from a first side of the line (e.g., 2345) to a second side of the line (e.g., 2340). The bitmap may comprise one or more transition lines. The irradiating energy may scan across a portion of the bitmap (e.g., from the first side of the transition line to the second side) along a path. The path may be directional (e.g., vectorial). FIG. 23C shows an example of the direction of the irradiating energy path (e.g., 2315). The energy beam may irradiate (e.g., and heat) one or more positions (e.g., 2310) as it scans across the portion of the bitmap (e.g., across the transition line 2325). A detector may capture a detectable property (e.g., intensity of a reflected signal) at one or more spots along the scan path (e.g., 2315) of the irradiating energy. At times, the detector may detect an alteration in the detectable property (e.g., an alteration of the reflectivity, absorption, material composition, etc.) For example, the detector may detect a change in the reflected signal along a portion of the field of view of the detector. The change may be abrupt. The change may be gradual. The change may indicate a transition around the threshold value of the detectable property (e.g., from beneath the threshold value to above the threshold value, or from above the threshold value to beneath the threshold value). The transition around the threshold value may differentiate transit of the irradiating energy from one calibration mark type to the second calibration mark type. FIGS. 25A-25C show vertical cross sections of at least a portions of various calibration structures, in which the variation along the Z direction represents a variation in the detectable property, and the variation along the X and/or Y axis represents relative distances. FIG. 25A, shows an example of an abrupt variation in a detectable property value between one calibration mark type (e.g., 2511) having a (e.g., substantially) constant first detectable property value, and the second calibration mark type (e.g., 2512) having a (e.g., substantially) constant second detectable property value, as indicated by a straight transition line comprising the right angle 2513, which transition is relative to a threshold value 2514. In FIG. 25A, at least one of the width and length of the two calibration mark types is (e.g., substantially) identical. FIG. 25B, shows an example of gradual variation in a detectable property value between one calibration mark type (e.g., 2521) having a first detectable property value maximum peak, and the second calibration mark type (e.g., 2522) having a second detectable property value minimum peak, as indicated by the gradual transition line 2523, which transition is relative to a threshold value 2524. In FIG. 25B, at least one of the width and length of the two calibration mark types is (e.g., substantially) identical. FIG. 25C, shows an example of an abrupt variation in a detectable property value between one calibration mark type (e.g., 2531) having a variable first detectable property value (e.g., a rough surface), and the second calibration mark type (e.g., 2532) having a (e.g., substantially) constant second detectable property value (e.g., a planar and/or smooth surface), as indicated by a straight transition line comprising the right angle 2533, which transition is relative to a threshold value 2534. In FIG. 25C, at least one of the width and length of the two calibration mark types varies between the calibration marks.

In some embodiments, the detector detects the detectable property (e.g., the reflected optical signal) along at least a portion of (e.g., the entire) field of view of the detector. The detector may detect the location of the transition line, transition point, and/or central position. The detector may detect a change in the intensity of at least one signal (e.g., an optical signal that is reflected from the calibration structure). The intensity of the detected signal may be lower on a first side of the transition line than an intensity of the detected signal on a second side of the transition line (e.g., that opposes the first side). The detected position of the transition line may be compared to the central position on the control structure. The central position may (e.g., optically) be pre-determined, known, relatively determined, absolutely determined. The determination may comprise pattern recognition (e.g., picture recognition). The determination may comprise signal recognition. The signal may be optical, acoustic, thermal, electrical, magnetic, or any combination thereof. A deviation between the detected position of the transition line (or point) as compared to the expected position of the transition line may be calculated. The calculation may be done manually or automatically (e.g., by a controller). The calculation may be done in real-time (e.g., during build of the 3D object). The calculation may be done when performing calibration (e.g., before, and/or, after build of the 3D object). The position of the energy beam may be adjusted based on the calculated deviation. Adjusting may comprise coinciding (e.g., calibrating) the transition position of the irradiating energy with the expected position of the transition line. For example, adjusting may comprise adjusting the expected position of the transition line. Adjusting may comprise altering the position and/or angle of the irradiating energy. Adjusting may comprise altering the position at which the irradiating energy intersects with the calibration structure and/or target surface. Adjusting may be performed during, before, or after build of the 3D object. At times, calculating and adjusting may be performed by the same controller. At times, calculating and adjusting may be performed by different controllers. The controller may comprise a control system. The controller may be programmable. The controller may operate upon request. The controller may be any controller described herein. Control may comprise regulate, manipulate, restrict, direct, monitor, adjust, attenuate, maintain, or manage.

Figure 24A:
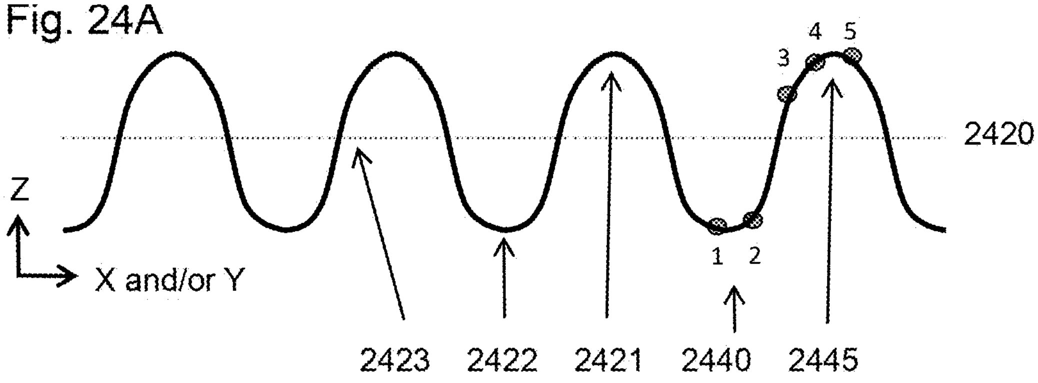
FIG. 24A schematically illustrates components of a calibration system, and FIG. 24B schematically illustrates a graph used in the calibration.
Figure 24B:
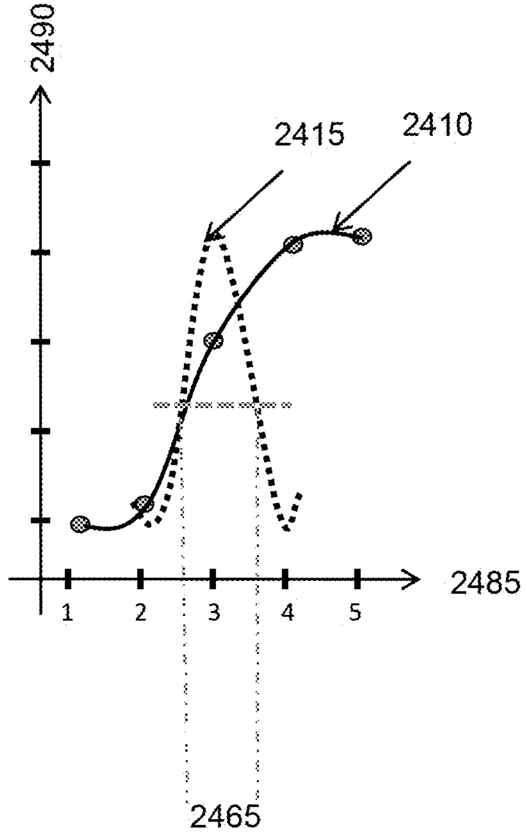

FIGS. 22A-22B illustrates examples of calibrating an optical property (e.g., the energy beam distribution and/or a spot size (e.g., footprint) of the irradiating energy). The irradiating energy may follow on a path (e.g., a predetermined path) along the calibration structure. The irradiating energy may be continuous or pulsing. The irradiating energy may be projected on one or more positions of the calibration structure. At times, each irradiated position may be equidistant from another irradiated position (e.g., a pulsing energy beam). During its progression along the path, the irradiating energy may project at a position on at least two (e.g., adjacent) calibration marks of the calibration structure. The path of the irradiating energy may be directed in a direction that is perpendicular relative to the alignment direction of a series of calibration marks (when such alignment is present. e.g., FIG. 20A, 2007). The path of the irradiating energy may be directed in a direction that is perpendicular relative to the alignment direction of a series of transition lines between the two calibration mark types when such alignment is present (e.g., FIG. 20B, 2025 and/or 2026). The irradiating energy may cause a detectable signal (e.g., reflected beam) from the irradiated position. The magnitude (e.g., intensity) of the detected signal (e.g., reflectivity) of at least two irradiated positions of the calibration structure may be different (e.g., FIG. 21C, 2135 and 2136). FIG. 24A shows a vertical cross section of at least a portion of a calibration structure, in which the variation along the Z direction represents a variation in the detectable property, and the variation along the X and/or Y axis represents relative distances between the calibration marks. In the example shown in FIG. 24A, there is a gradual variation in a detectable property value between one calibration mark type (e.g., 2421) having a first detectable property value maximum peak, and the second calibration mark type (e.g., 2422) having a second detectable property value minimum peak, as indicated by the gradual transition line 2423, which transition is relative to a threshold value 2420. In FIG. 24B, at least one of the width and length of the two calibration mark types is (e.g., substantially) identical. In the example shown in FIG. 24A, various positions of the irradiating energy on a surface of the calibration structure are indicated as circles numbered 1 to 5, wherein each circle designates an irradiation position of the irradiating energy on the calibration structure. The detected signal may be measured from at least two calibration mark types (e.g., that contact each other). One or more detected signals may be measured from one or more positions in a calibration mark (e.g., FIG. 24A, positions #1 and #2 irradiated in calibration mark 2440, or positions #4 and #5 irradiated in calibration mark 2445). The detected signal may be averaged amongst a plurality of irradiated positions within a calibration mark. The measurement may be done by a detector. The detector may be stationary or mobile. For example, the mobile detector may be a scanning detector. The scanning detector may be any detector disclosed in patent application number PCT/US15/65297, titled "FEEDBACK CONTROL SYSTEMS FOR THREE-DIMENSIONAL PRINTING" that was filed on Dec. 11, 2015, which is incorporated herein by reference in its entirety. The detected signal (e.g. FIG. 24B, 2490) may be graphically represented against the relative position of the irradiating energy (e.g., projected spot, FIG. 24B, 2485). The graphical representation may generate a detected signal curve (e.g., 2410). The detected signal curve may reveal the transition point between a first calibration mark type and a second calibration mark type (e.g., adjacent to irradiated position #3 in the example in FIG. 24A, which corresponds to plotted position #3 of FIG. 24B). For example, a derivative of the detected signal curve (e.g., 2415) may facilitate finding the transition position between a first mark type and a second mark type. One or more characterizations of the modified detected signal (e.g., the derivative of the detected signal curve) can be made. For example, a full width at half maximum (FWHM) measurement (e.g., FIG. 24B, 2465) can be indicative of a transition point between a first calibration mark and a second calibration mark.

Calibrating the optical property may comprise measuring (e.g., at least one) detected signal at varying irradiating energy beam values. For example, measuring a detected signal as a magnification, focus, and/or spot size of the irradiating energy beam (e.g., controllably and/or dynamically) varies. The spot size may be the size of the footprint of the energy beam on a target surface. One or more graphical representations of the varying irradiating energy beam value measurements may be generated. One or more graphical representations of the detected signal as a function of the varying irradiating energy beam value may comprise a curve representing (e.g., a maximum value of) a derivative of the detected signal. In some embodiments, a characteristic of the (e.g., derivative) curve (e.g., a maximum value thereof) may facilitate determination of one or more conditions of the varying irradiating energy beam (e.g., a magnification, focus, and/or spot size thereof).

In some embodiments, the calibration structure facilitates a measure of the power density (e.g., power per unit area) distribution. The power density distribution can be the irradiating energy across its projection (e.g., footprint) on the calibration structure. The measure of the power density distribution can be an integral of the power density distribution along a direction (e.g., X, and/or Y). The measure of the power density distribution can be derived from the detected signal curve. The measure of the power density distribution may comprise observing a change in the detectable property as the energy beam projection travels through a contact between one calibration mark and a second calibration mark (e.g., of a different type). The measure of the power density distribution may be obtained by at least one of (i) measuring the projection of the irradiating energy on the calibration structure, (ii) identifying at least one characteristic metric for the power density distribution, (iii) integrating the power density distribution across the contact point of a first calibration mark to a second calibration mark, or (iv) any combination or permutation thereof. Without wishing to be bound to theory, as the power density distribution does not depend on the power of the irradiating energy, a measure of the power density distribution may be obtained regardless of the actual detectable properties of the calibration marks. The power density distribution may be measured in one or more directions (e.g., horizontal, and/or vertical direction, e.g., FIG. 22A, X and Y). The measure of the power density distribution may be measured at different times and/or positions relative to the calibration structure. The measure of the power density distribution may use a (e.g., at least one) detected signal from a plurality of focusing positions of the irradiating energy with respect to the calibration structure. A focus shift may be calibrated using the measured power density distribution at different focus positions. One or more positions of the focus mechanism (e.g., FIG. 13, and/or FIG. 15) may be calibrated using the power density distribution measure. In some embodiments, the optical system comprises a variable focus mechanism. The motion of the variable focus mechanism may be calibrated using the power density distribution measure. The calibration of the focus mechanism may achieve a desired spot size for various locations in the field of view of the irradiating energy (e.g., intersection of the processing cone with the target surface and/or calibration structure surface). The power density distribution measure may be calibrated (e.g., substantially) identically, or differently, along the field of view of the irradiating energy. In some embodiments, different positions in the field of view may require different focus offsets and/or or footprint size.

FIG. 12 shows an example of an enclosure comprising an atmosphere 1226, in which an irradiating energy (e.g. energy beam) 1201 travels. The energy beam 1201 is generated by an energy source 1221, travels through an optical mechanism (e.g., a scanner) 1220, and an optical window 1215, towards a material bed 1204 disposed on a platform (e.g., base 1223). As the irradiative energy irradiates and travels along the material bed 1204, it may form at least a portion of a 3D object (e.g., 1206). The maximal portion of the enclosure, that may be occupied by the irradiating energy (e.g., during the 3D printing) is depicted as the processing cone 1230, having a field of view that is the exposed surface of the material bed (e.g., 1240).

In some embodiments, a calibration map is generated using the power density distribution measurements. The calibration map may comprise different positional offsets of the irradiating energy (e.g., beam). The calibration map may comprise different power density offsets of the irradiating energy. The calibration map may comprise different focus offsets of the optical system. For example, the calibration map may be used to find a selected focus (e.g., and/or spot size). For example, the calibration map may be used to find a required focus shift for a desired location in the field of view. The power density distribution measurement may be used to determine an effective footprint size, and/or shape. For example, the power density distribution measurement may be used to determine the circularity of the power density distribution, an astigmatism of the footprint, an optical deformation of the footprint, non-uniformity of the footprint and/or the energy profile across the footprint of the energy beam on the calibration structure.

Figure 27A:
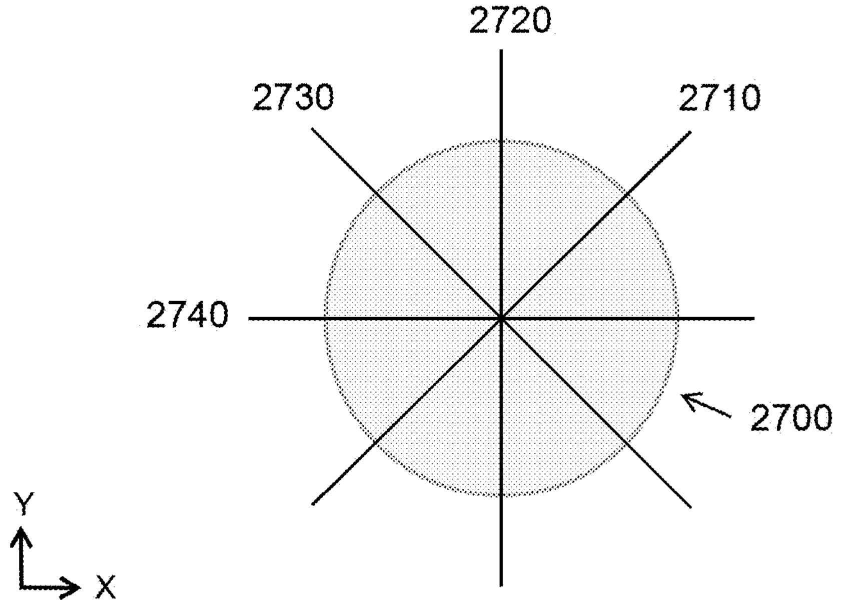
FIGS. 27A-27B schematically illustrate energy beam cross sections or footprints.

In some embodiments, the circularity (e.g., astigmatism) of the energy beam footprint is measured and/or adjusted using the calibration system (e.g., in conjunction with the astigmatism system, e.g., FIG. 15). The calibration structure may facilitate measurement of the power density distribution in at least one lateral direction (e.g., X and/or Y direction). FIG. 27A, shows an example of a top view of a footprint of an energy beam 2700 that is circular, an X direction 2740, a Y direction 2720, and angular directions 2710, and 2730.

Figure 27B:
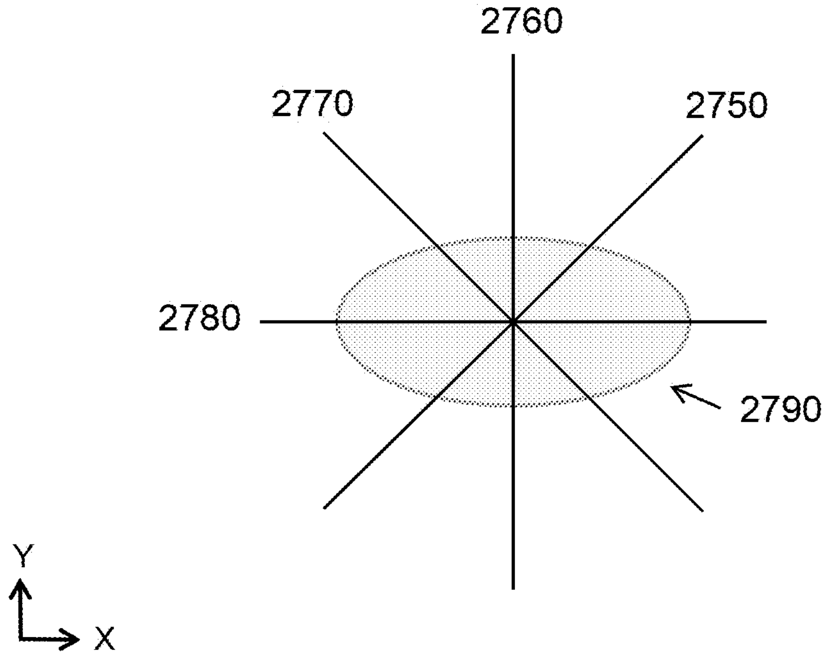

FIG. 27B, shows an example of a top view of a footprint of an energy beam 2790 that is elliptical, an X direction 2780, a Y direction 2760, and angular directions 2750, and 2770. The astigmatism calibration of the footprint may be performed using any of the calibration structures described herein. For example, the calibration structure may comprise one or more positions at which at least two marks of different types, meet at a line (e.g., FIG. 18A, 1807; FIG. 18C, 1822; FIG. 19A, 1906; or FIG. 20A, 2005). For example, the calibration structure may comprise one or more positions at which at least four marks, comprising two mark types, meet at a point (e.g., FIG. 18B, 1826; 19B, 1926; 19C, 1936, 20B, 2021; 20C, 2031; 21B, 2126; or 21C, 2137). For example, the calibration structure may comprise one or more elliptical calibration marks (e.g., FIG. 21A, 2101, or FIG. 21B, 2121). At times, the calibration marks may be elongated (e.g., elliptical, or oval). The elongated calibration marks may allow measurement of the power density distribution in any lateral XY direction (e.g., FIG. 27B). The calibration structure may allow measurement of the power density distribution in any XY direction.

The measured power density distribution across the footprint of the energy beam on the calibration structure (e.g., surface) may be compared to a respective actual power density distribution (e.g., pre-determined, known footprint size and/or shape at the position, and/or a power density distribution determined from the calibration map). A deviation of the power density distribution as compared to the actual power density distribution may be calculated. The calculation may be done manually and/or automatically (e.g., by a controller). The calculation may be done in real-time (e.g., during build of the 3D object, e.g., during the 3D printing when the irradiating energy is not used to transform the pre-transformed material). The calculation may be done when performing calibration (e.g., before, and/or, after build of the 3D object). Based on the calculated deviation, the position, power density (e.g., distribution thereof), footprint size, focus, and/or astigmatism of the footprint of the irradiating energy may be adjusted. Adjusting may include adjusting homogenously or heterogeneously at least across the X and Y axis (e.g., narrow or broaden the spot size by adjusting one or more optical elements). Adjusting may include adjusting the footprint astigmatically (e.g., by adjusting the degree of astigmatism, adjusting the position of one or more elements of the astigmatic system, e.g., FIG. 15). Adjusting may include adjusting the position of at least one optical medium (e.g., FIG. 15, 1525 by rotating around axis 1550, and/or 1515 by rotating around axis 1520). Adjusting may be done during, before, and/or after build of the 3D object. Adjusting may be performed manually and/or automatically (e.g., by a controller). At times, calculating and adjusting may be performed by the same controller. At times, calculating and adjusting may be performed by different controllers (e.g., that are operatively coupled). The controller may comprise a control system. The controller may comprise a processing unit. The controller may be programmable. The controller may operate upon request (e.g., by a user). The controller may be any controller described herein.

Figure 23A:
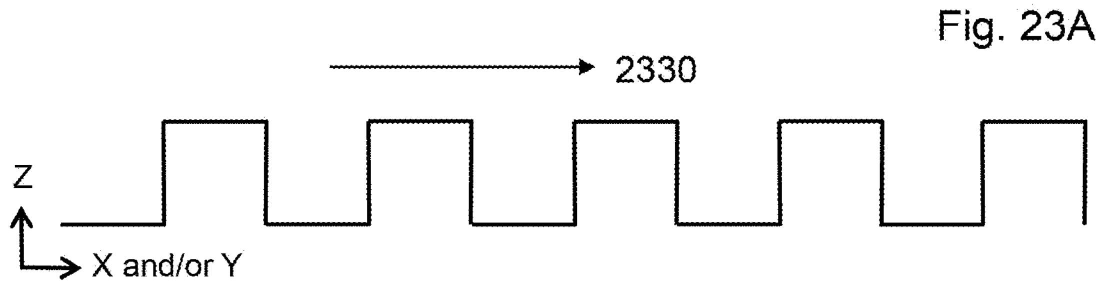
FIGS. 23A-23C schematically illustrate components of a calibration system.
Figure 23B:
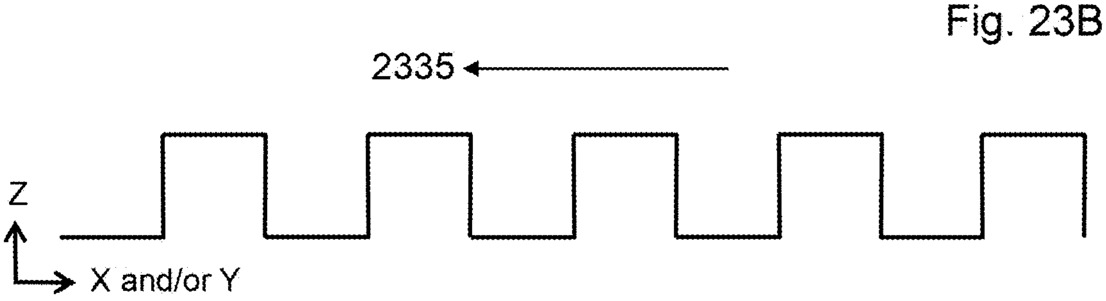
Figure 23C:
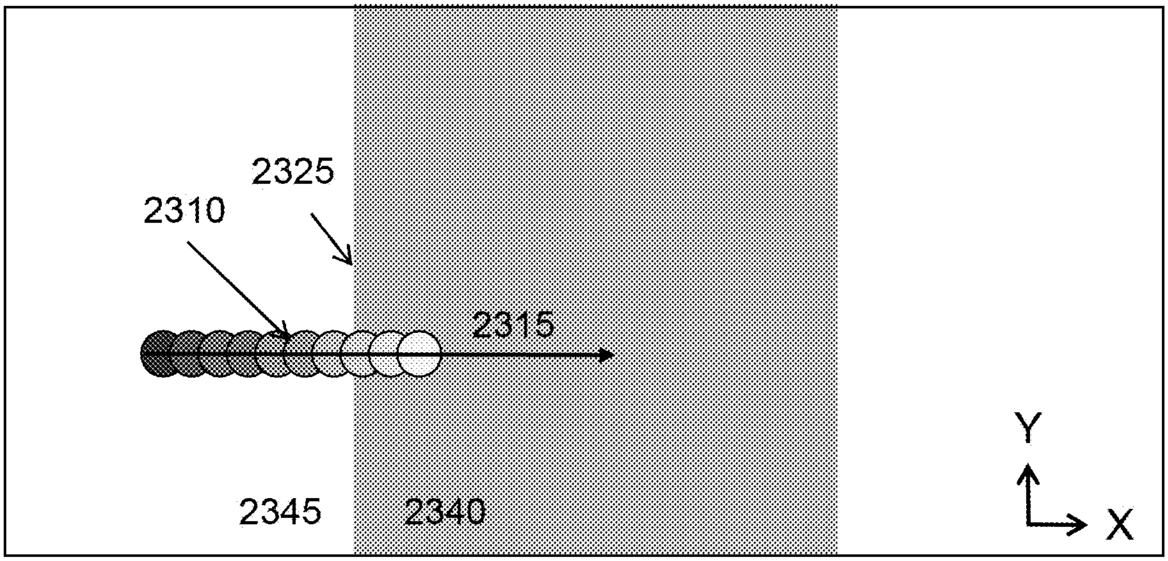

FIGS. 23A-23B illustrate examples of calibrating a property (e.g., the velocity of the footprint of the irradiating energy on the calibration structure). The irradiating energy may be projected on one or more positions across the calibration structure. Each position may be equidistant from another spot. The irradiating energy may be projected onto a calibration mark (e.g., including on an edge and/or corner of that calibration mark). The irradiating energy may be projected on at least two calibration marks that contact each other. The at least two calibration marks that contact each other may be of different types (e.g., a black mark and a white marks). Contacting each other may comprise bordering each other. Contacting each other may comprise a point of contact (e.g., the corners thereof contact each other). A sensor may be used to measure the velocity of the irradiating energy footprint (e.g., moving energy beam) across the at least one calibration mark (e.g., two different calibration mark types). A sensor may be used to measure the velocity of the irradiating energy footprint as it travels across at least one calibration mark edge and/or corner. The edge and/or corner may be identified by a transition from a first mark type to a second mark type. The sensor may comprise any sensor disclosed herein. For example, the sensor may be an imaging sensor. For example, the sensor may be a non-imaging sensor. The sensor may comprise a spectrometer. The sensor may comprise an optical sensor (e.g., as described herein). The sensor (e.g., imaging sensor) may sense the movement of the irradiating energy footprint across an edge and/or corner of at least one calibration mark (e.g., across two types of calibration marks that contact each other). Sensing of that movement may be used to measure the velocity, position, path, and/or direction across the calibration structure. The sensor (e.g., non-imaging sensor) may measure the reflected signal (e.g., reflectivity) emitted from the calibration structure position that the energy beam is directed to. The reflected (e.g., optical) signal may be used to measure the velocity, position, path, and/or direction across the calibration structure of the irradiating energy as it translates across at least a portion of the calibration structure. The sensor may be a single output device (e.g., a silicon (Si) detector). The sensor may be any sensor described herein. The velocity may be measured one or more times. At least two of a multiplicity of measurements may be in different directions with respect to each other. For example, FIG. 23A illustrates measuring velocity in a forward direction (e.g., left to right direction, 2330). FIG. 23B illustrates measuring velocity in the reverse direction (e.g., right to left direction, 2335). Measuring the velocity more than once may facilitate reduction (e.g., eliminate) in locality uncertainty.

In some embodiments, during the calibration process, a measured velocity, position, path, and/or direction across the calibration structure of the irradiating energy is compared to an expected velocity, position, path, and/or direction across the calibration structure respectively (e.g., pre-determined, or known velocity, position, path, and/or direction across the calibration structure, respectively). A deviation of the measured velocity, position, path, and/or direction across the calibration structure as compared to the expected velocity, position, path, and/or direction across the calibration structure, respectively, may be calculated from that comparison. The expected velocity, position, path, and/or direction across the calibration structure may serve as a benchmark (e.g., for comparison). The calculation may be done manually and/or automatically (e.g., using a controller). The calculation may be done in real-time (e.g., during build of the 3D object). The calculation may be done when performing calibration (e.g., before, and/or, after build of the 3D object). Based on the calculated deviation, the velocity of the energy beam may be adjusted. Adjusting may include adjusting a position of the galvanometer scanner. Adjusting may include adjusting a position of a mirror within the galvanometer scanner. Adjusting may be done during, before, or after build of the 3D object. Adjusting may be performed by a controller (e.g., automatic, computer, or manual). At times, calculating and adjusting may be performed by the same controller. At times, calculating and adjusting may be performed by different controllers. The controller may be any controller described herein.

At times, a calibration structure may be covered (e.g., at least partially) by a material (e.g., pre-transformed material and/or contaminant(s), such as soot). In some embodiments, the calibration process comprises cleaning a (e.g., to-be irradiated) calibration surface prior to directing the irradiating beam at the calibration structure. The calibration structure can be any calibration structure as disclosed herein. A cleaning process may comprise directing the irradiating beam onto the covered surface (e.g., ablating). Cleaning may comprise material removal by means of a moving apparatus (e.g., a translating blade, a squeegee, a grinder, a polisher, and/or a rolling wheel), by directing a flow of gas (e.g., gas jet), directing a flow of particulate matter (e.g., sputtering), by a chemical process (e.g., etching), and/or by suction (e.g., vacuum). The cleaning of the calibration structure may comprise a portion of the benchmarking and/or subsequent calibration measurement processes (e.g., may comprise an initial step thereof). The cleaning of the calibration structure may be performed before, during, and/or after a 3D printing process. The cleaning of the calibration structure may be performed in real time (e.g., during operation of the irradiating beam). The cleaning process may be performed by a controller (e.g., automatic, computer, or manual). At times, the cleaning process may be controlled by at least one controller and/or manually. At times, the cleaning process may be performed by different controllers. The controller may be any controller described herein.

In some embodiments, at least one characteristic of the irradiating energy (e.g., the power density distribution of the irradiating energy) is calibrated. The characteristics of the irradiating energy may comprise trajectory (e.g., path), footprint (e.g., its astigmatism, size, focus), power per unit area, fluence, Andrew Number, hatch spacing, scan speed, scan direction, or charge. The calibration system may be used to calibrate one or more optical elements (e.g., lenses) of the optical system. The calibration system may facilitate focus calibration, and focus sensitivity (e.g., resolution) study of the optical system. The calibration system may facilitate calibrating the one or more scanners of the 3D printer. For example, the angle (e.g., FIG. 16, 1630) of the scanner (e.g., 1610), e.g., with respect to the target surface. The characteristics of the irradiating energy may be any irradiating energy characteristics described herein. The power density of the irradiating energy may change over time and/or depending on a position in the field of view. The irradiating energy may be projected on one or more positions across the calibration structure. The plurality of positions may be equidistant from another spot. The irradiating energy may be projected on at least one calibration mark. The irradiating energy may be projected on at least one edge and/or corner position of a calibration mark. The irradiating energy may be projected on a position on two or more calibration marks across the calibration structure. The irradiating energy may be projected on a position on two or more calibration marks that contact each other (e.g., border each other) across the calibration structure. At least two of the contacting calibration marks may be of a different type (e.g., such that their contact position is identifiable). The projected position on the at least one calibration mark may exert a detectable signal (e.g., reflective radiation, e.g., reflective beam). The detectable signal may be sensed by the sensor. The detected signal may be measured for one or more positions of the calibration structure to which the irradiating energy is directed to. A detector may be used to detect the detectable signal. The detector may comprise an optical detector. The detector may be coupled to one or more optical fibers (e.g., fiber bundle, e.g., FIG. 14). The detector and/or optical fiber may be any detector and/or fiber optic described herein respectively. The measured characteristics of the irradiating energy (e.g., power density) may be compared to the expected respective characteristics of the irradiating energy (e.g., pre-determined, and/or known). The expected respective characteristics of the irradiating energy may be a benchmark (e.g., for comparison). A deviation of the measured characteristics of the irradiating energy as compared to the expected characteristics of the irradiating energy may be calculated. The calculation may be done manually and/or by a controller. The calculation may be done in real-time (e.g., during build of the 3D object). The calculation may be done when performing calibration (e.g., before, and/or, after build of the 3D object). Based on the calculated deviation, the characteristics of the irradiating energy may be adjusted. Adjusting may include adjusting one or more optical elements of the optical system and/or optical mechanism (e.g., lens, mirror, and/or optical medium, at least one element of the scanner and/or astigmatism system). Adjusting may be done during, before, or after build of the 3D object. Adjusting may be performed manually and/or by a controller. At times, calculating and adjusting may be performed by the same controller. At times, calculating and adjusting may be performed by different controllers. The controller may be any controller described herein.

Figure 29:
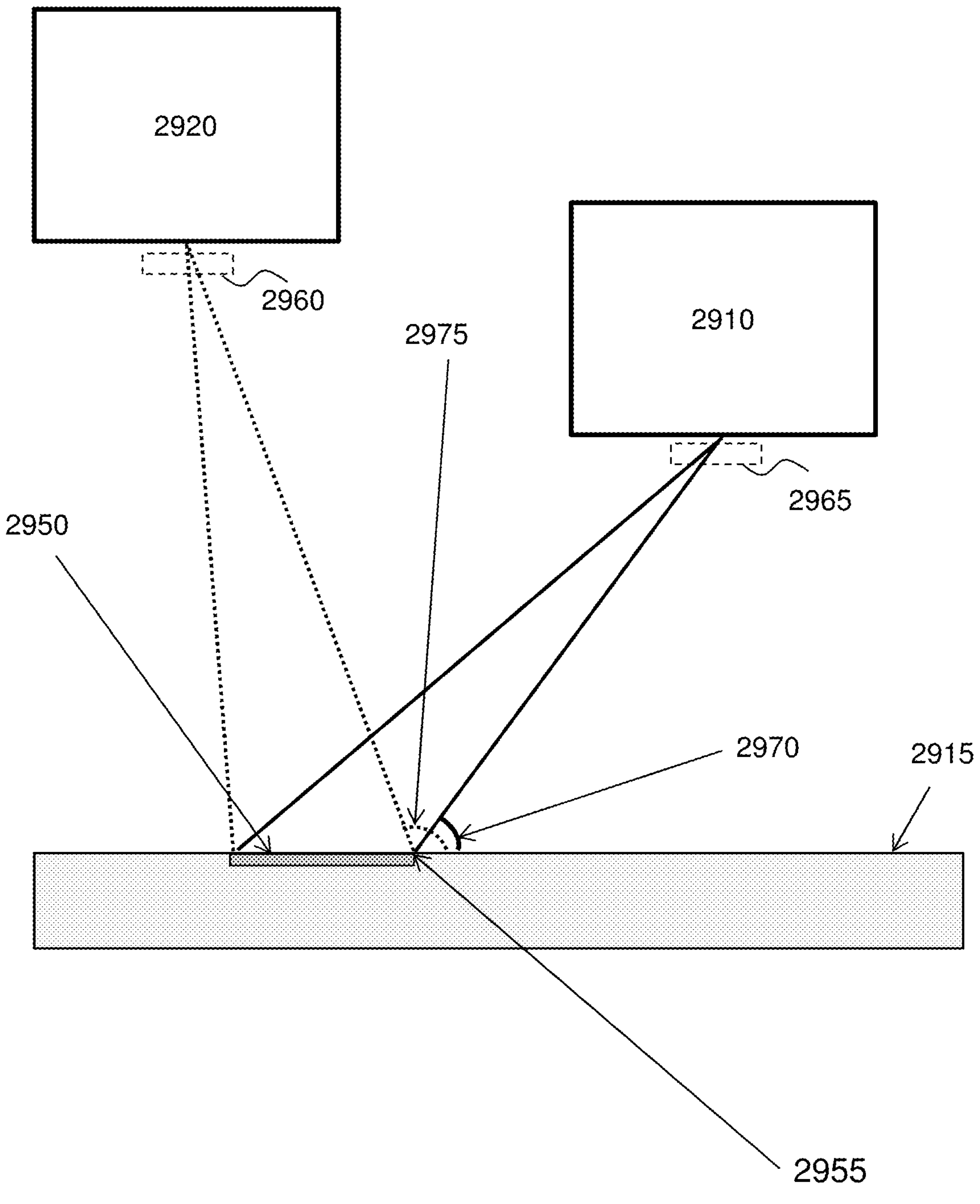
FIG. 29 schematically illustrates an example of systematic variation within a 3D printer.

FIG. 29 illustrates an example of systematic variation within a 3D printer. A portion (e.g., 2950) of the target surface (e.g., 2915) or a position therein (e.g., 2955), may be viewed at a different angle (or range of angles) from one or more components of the 3D printer (e.g., with respect to the target surface). For example, a portion in the field of view (e.g., FIG. 29, 2950) may be viewed at a first angle (e.g., FIG. 29, 2975) from the optical system (e.g., FIG. 29, 2920), and from a second angle (e.g., FIG. 29, 2970) from a detection system (e.g., FIG. 29, 2910). The first angle may be different from the second angle. The difference in the first angle and/or second angle may induce a systematic (e.g., instrumentation) variation when measuring within the field of view. The systematic variation may be pre-calculated and/or calibrated. The pre-calculated systematic variation may be considered when performing measurement of one or more optical properties (e.g., XY offset of the energy beam relative to the target surface, or velocity of the energy beam).

In some embodiments, a detection system that is operationally coupled to a 3D printing system (e.g., included as part of a 3D printer) comprises an apparatus configured to project structured electromagnetic radiation (e.g., structured light) within the 3D printing system (e.g., within its enclosure, e.g., within its processing chamber of). In some embodiments, an optical system may comprise a (e.g., structured) light projection apparatus (e.g., FIG. 29, 2920). The light projection apparatus may be configured to project (e.g., structured) light over a field of view of a surface, for example, a (e.g., portion and/or entirety of a) target surface (e.g., FIG. 29, 2915). The (e.g., structured light) detection system may comprise at least one detector (e.g., FIG. 29, 2910) configured to receive illumination (e.g., reflected, scattered, and/or a combination thereof) from the projected radiation, and to generate one or more signals therefrom (e.g., corresponding to an image). Examples of detection systems can be found in patent application serial number PCT/US2015/065297, that is incorporated herein by reference in its entirety. The structured light apparatus may comprise a projector, a laser, or a combination thereof. The structured light apparatus can project any suitable pattern onto a surface for detection by the detector. The structured light may form a projection on a target surface. The structured light may be devoid of a pattern. The structured light may comprise a map or an image. The structured light may comprise a known and/or predetermined projection. Examples of patterns are alternating light and dark shapes (e.g., stripes and/or fringes), a (e.g., pixelated) grid, a (e.g., solid line) grid, and/or a (e.g., plurality of) spiral(s). The pattern may (e.g., controllably) evolve (e.g., change) over time. The change may comprise a change in an orientation and/or scale of at least part of the pattern. The pattern may be static, or moving (e.g., dynamic), for example, during at least part of projection time on the target surface. The pattern may be projected (on the target surface) during at least part of the 3D printing. For example, the pattern may be projected during processing of the energy beam. For example, the pattern may be projected during formation of a planar surface adjacent to the platform. Adjacent may be above.

The target surface (e.g., comprising the pre-transformed material, transformed material, build platform, or enclosure floor) may comprise at least one detectable property. The detectable property may be a physically detectable property (e.g., protrusions, indentations, roughness, smoothness, regularity, or planarity). The detectable property may be an optically detectable property (e.g., via reflectivity, absorption, and/or image analysis).

Images from the structured light detector system may be processed to determine a topography, and/or reflectivity of at least a fraction of the target surface. The at least the fraction of the target surface may comprise a pre-transformed material or a transformed material (e.g., as part of the 3D object). The transformed material may be, or become, a hard material. For example, one or more topographical features (e.g., indentations, protrusions, roughness, smoothness, granular, or planar) may be detected on the at least the fraction of the target surface.

In some embodiments, a structured light detection system is used to monitor and/or calibrate one or more processes (e.g., in a 3D printing system). For example, a structured light detection system may be used to characterize a topography of a target surface and/or and adjacent build platform surface before, during and/or after a 3D printing process (e.g., formation of one or more layers of hardened material layer, and/or a building cycle). The 3D printing process may comprise printing one or more layers of hardened material. A building cycle, as understood herein, comprises printing all hardened material layers of a print job (which may comprise printing one or more 3D objects above a platform). Characterizing may include measuring protrusions, indentations, (e.g., average) roughness, planarity, reflectivity, or smoothness of a surface (and/or a portion of pre-transformed and/or transformed material thereon). At times, a target surface comprises at least two materials (e.g., pre-transformed and transformed material) having (e.g., substantially) different optical qualities. Different optical qualities can include specularity, reflectivity, absorptivity, and/or scattering. Substantially different optical qualities of materials within a field of view of a detector can create a contrast ratio condition for the detector that is (e.g., readily) detectable.

A contrast ratio condition may occur when a field of view of the detector (e.g., a subset of pixels of the detector) comprises regions having both relatively low and high (e.g., at least one region of each) of an optical quality. For example, a region of the field of view corresponding to a plurality of pixels may comprise both relatively low and high reflectivity. A resolution of the detector (e.g., pixel resolution) may determine a size of the region over which a contrast ratio condition may occur. A contrast ratio image may include one or more regions (e.g., corresponding to high and/or low reflective portions of a field of view) that are outside a threshold range of the image pixel values of the detector (e.g., clipped pixel data). This may lead to data loss within the image (e.g., pixels in the image that are set to a maximum brightness and/or darkness value) with regard to the field of view.

In some embodiments, a structured light detection system comprises a characterization of a contrast (e.g., a contrast characterization) of an image (e.g., captured from a portion of a field of view of the detector). A contrast characterization can measure the contrast of an image by any suitable measure, such as a Weber contrast, a Michelson contrast, or a root mean square (RMS) contrast. A contrast characterization may be based on a histogram of the image pixel data reflecting the physically detectable property (e.g., intensities of the pixels in the image). An image contrast may be characterized by a (e.g., at least one) threshold contrast value. A threshold contrast ratio value may an upper contrast ratio value (e.g., a threshold number of pixels at or near maximal brightness), a lower contrast ratio value (e.g., a threshold number of pixels at or near minimal brightness), or a combination thereof. The threshold contrast ratio value may correspond to a contrast level at which one or more regions of an image comprise data loss (e.g., clipped pixels, or redacted pixels). The threshold contrast ratio value may correspond to the one or more regions of the image having a threshold size (e.g., area of data loss with respect to a total area of the image). The threshold contrast ratio value may correspond to a locality of the one or more regions of the image, for example, position(s) of pixels having data loss with respect to one another, and/or a feature of interest in the image). The pixels qualified for data loss, may be configured to adopt an (e.g., average or mean) value of nearby pixels. The nearby pixels may be directly nearby and/or bordering pixels.

In some embodiments, the pre-transformed material and/or transformed material are diffusive (e.g., and dispersive). In some embodiments, the pre-transformed material and/or transformed material are specular. The pre-transformed material (e.g., in an exposed surface of a material bed) may be at least 50%, 60%, 70%, 80%, or 90% diffusive, relative to its total reflection. The pre-transformed material (e.g., in an exposed surface of a material bed) may be diffusive in any percentage between the afore-mentioned percentages, relative to its total reflection (e.g., from 50% to 90%). In some embodiments, the transformed material (e.g., an exposed surface thereof) is at least about 50%, 60%, 70%, 80%, 90%, or 95% specular, relative to its total reflection. The transformed material (e.g., an exposed surface thereof) may be specular in any percentage between the afore-mentioned percentages, relative to its total reflection (e.g., from 50% to 95%). The detected spatial (e.g., horizontal and/or vertical) deviation detected by the detector may be of at least 10 μm, 30 μm, 50 μm, 70 μm, 100 μm, or 150 μm. The detected spatial (e.g., horizontal and/or vertical) deviation detected by the detector may be of any value between the afore-mentioned values (e.g., from about 10 μm to about 150 μm, from about 10 μm to about 50 μm, or from about 50 μm to about 150 μm). The detected spatial deviation may correlate to the resolution of the detector, optical element(s), and/or detectable image.

In some embodiments, a filter is coupled to the detector that detects the structured light. The filter may be configured to alter an intensity and/or focus of at least a portion of the structured light received at the detector. The filter may be configured to average an intensity of at least a portion of the structured light received at the detector. The filter may be configured to lower the resolution of the detectable light image captured by the detector (e.g., to be closer to a resolution of the detector). The filter may comprise a frequency cut-off filter. The filter may comprise a low pass filter. The detector may be an optical detector (e.g., a camera).

In some embodiments, a structured light detection system comprises one or more polarizing filters (e.g., FIG. 29; 2960, 2965). In some embodiments, the polarizer is an optical filter that allows light waves of a polarization pass, and block light waves of other polarizations. The polarization filters may comprise linear or circular polarizing filters. The polarizers may comprise birefringent polarizers. The polarizers may comprise thin film, or wire-grid polarizers. The linear polarizer may comprise ab absorptive, beam splitting, or cartesian polarizer. The polarizer may comprise homogenous circular polarizer. The polarizing filter(s) may be coupled with the structured light source, the detector, or a combination thereof. The structured light source may be polarized. The structure light source may become polarized by operatively coupling it to a first polarizer (e.g., irradiating it through the first polarizer). When irradiating (e.g., shining) the structured light on a target surface, some of the light may reflect diffusively (e.g., and dispersively), e.g., from a rough surface. When irradiating the structured light on a target surface, some of the light may reflect specularly, e.g., from a low roughness (e.g., smooth) surface. A polarizer (e.g., second polarizer) may be configured to filter out the specularly reflected light from the target surface (e.g., and thereby reduce the amount of specular reflected light from reaching the field of view of a detector). The polarizing filter(s) may be configured to reduce a contrast ratio value within a detector field of view (e.g., by changing a polarization axis of light, via the filter). Reducing a contrast ratio value may include reducing a (e.g., detected) brightness of a region (e.g., highly reflective region), increasing a (e.g., detected) brightness of a region (e.g., a low reflective region), or a combination thereof. The reduction may be confined to above and/or below a threshold value. For example, the reduction may be confined to a threshold region, or to outside of a threshold region. The operation of the polarizing filter(s) may be controlled (e.g., before, after, and/or during the 3D printing). At times, the system may comprise one polarizing filter (e.g., when the generated structured light is polarized). The polarizer may be configured to at least partially cancel out (e.g., counter or neutralize) the polarization of the structured light. The polarization of the polarizer may be (e.g., about) normal to the polarization of the structured light. Varying the angle of polarization of the polarizers (e.g., polarization angle that is passed by the polarizer, e.g., not filtered out by the polarizer) relative to the polarization of the structured light may in turn vary the amount of specular reflection that reaches the detector. The polarization angle relative to the polarization of the structured light may be from about 70°, from about 80°, or from about 85°; to about 90° with respect to each other. At times, the system may comprise at least two polarizing filters (e.g., when the generated structured light is non-polarized). The second polarizer may be configured to at least partially cancel out (e.g., counter or neutralize) the first polarizer. The amount of neutralization may vary the amount of specular reflection that reaches the detector. The polarization angle of the first polarizer may be (e.g., about) normal to the polarization angle of the second polarizer. Varying the angle of polarization of the two polarizers may vary the amount of specular radiation that reaches the detector. The polarization of the two polarizers may be from about 70°, from about 80°, or from about 85°, to about 90° with respect to each other. The polarizing filter(s) may be controlled separately, or in coordination with one another. Control may be manual and/or automatic control. Control may be based on a threshold level of the image (e.g., a threshold contrast ratio level). At times, movement of (e.g., at least one) polarizing filter is controlled, e.g., when a detected threshold contrast ratio value (e.g., a high or low contrast ratio condition) of an image is present.

In some embodiments, the contrast ratio of an image is altered. A process (e.g., contrast optimization process) of alternating a contrast ratio of the image (e.g., of a field of view in a 3D printing system) may be performed before, during, and/or after a portion of a 3D printing process. Alteration of the image may comprise image processing. The contrast optimization process may comprise analyzing image data corresponding to (e.g., each of) a sequence of images captured of the field of view. The contrast optimization process may comprise determination of whether or not a threshold contrast ratio value is present in the image. The contrast optimization process may alter a position of one or more polarizing filters between image captures of the image capture sequence. The alteration in position may be pre-determined (e.g., a pre-determined rotation of the filter) and/or based on a (e.g., prior) image contrast value. The contrast optimization process may comprise analysis of a distribution of pixel data of the image (e.g., a distribution of pixel data in a luminance, intensity, and/or brightness histogram). The contrast optimization process may comprise analysis of altered (e.g., removed and/or averaged) pixels of an image. A selected (e.g., substantially optimal) position of the polarizer(s) may be determined based on the image contrast ratio value (e.g., having a value within an acceptable range thereof) (e.g., via a histogram of image pixels). The threshold value and/or range may be altered as part of the image processing. The alteration of the threshold value and/or range may comprise considering an average physical property of the pixels in the image, e.g., in a majority of the image or in an identifiable portion of the image. The identifiable portion may comprise a pre-transformed material, or a transformed material.

Figure 31A:
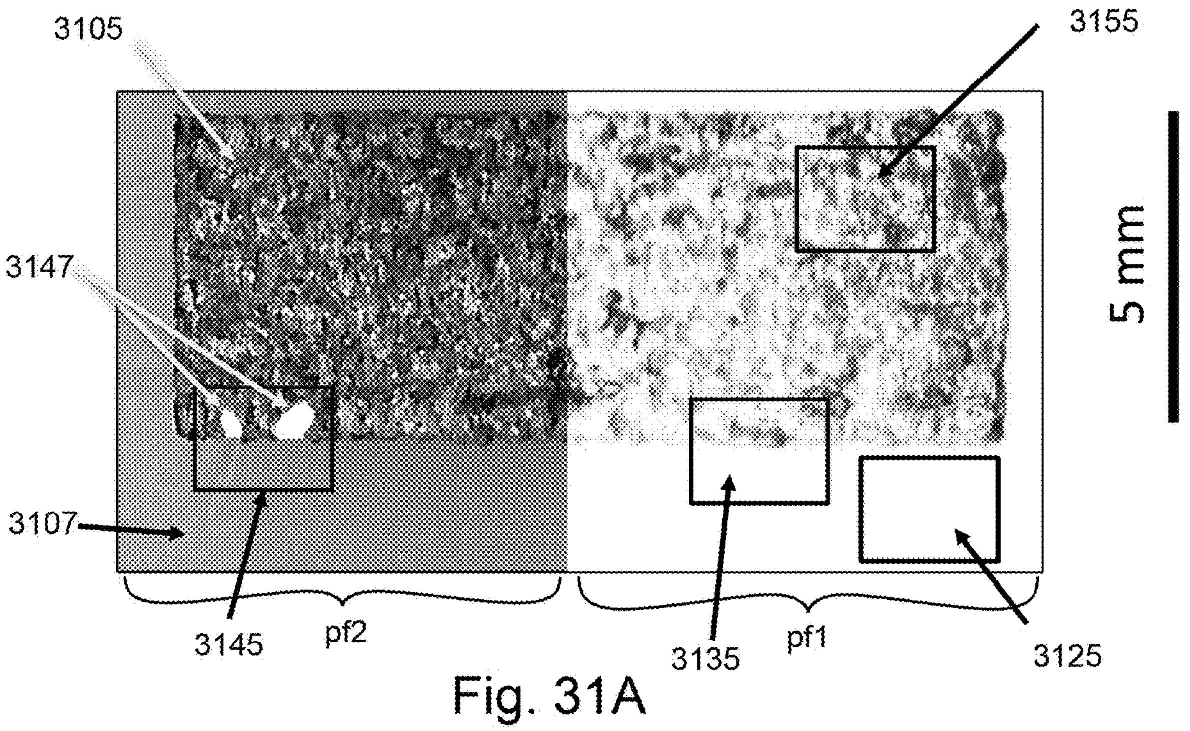
FIG. 31A schematically illustrates an image captured for calibration, and FIG. 31B schematically illustrates a graph corresponding to a calibration.
Figure 31B:
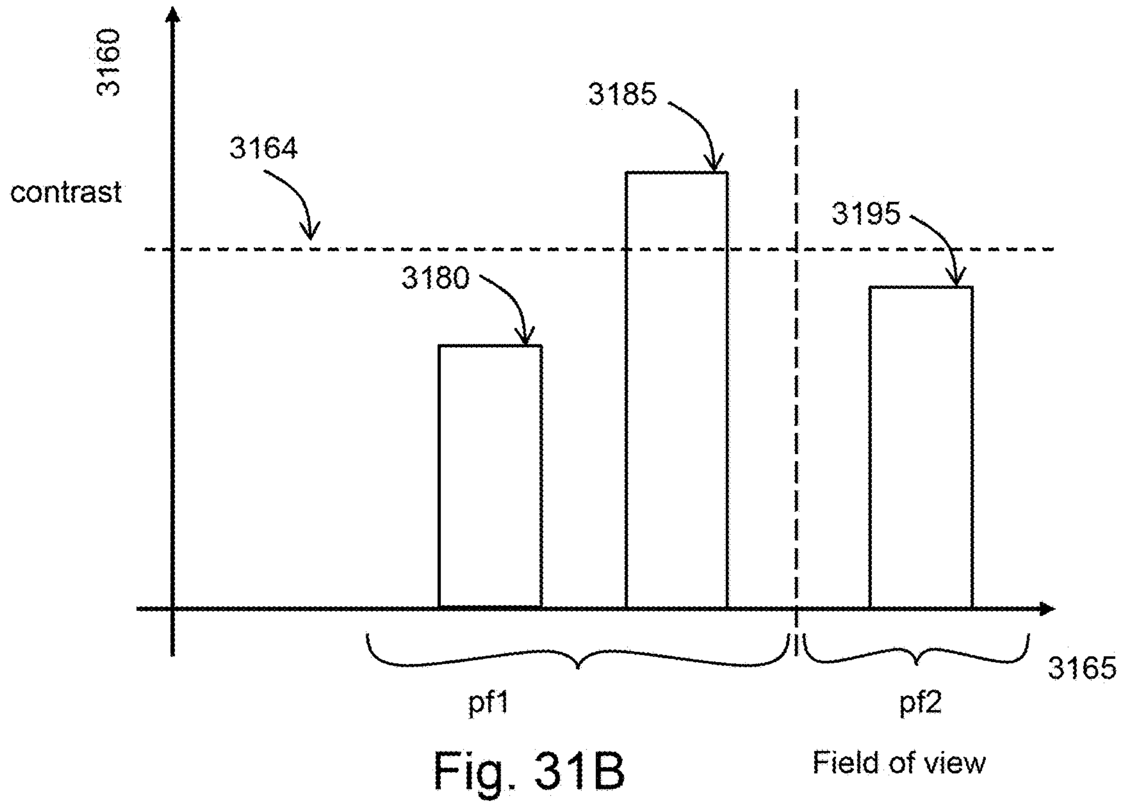

FIG. 31A depicts an example of a composition of images of a target surface comprising pre-transformed material 3107 and transformed material 3105, in a field of view of a detection system. The composition of images may correspond to different polarizing filter(s) position(s) and/or thresholds of the light projection apparatus, the detector, or a combination thereof. The composition of images in the example of FIG. 31A comprises an image portion captured at a polarizing filter condition pf1, and an image portion captured at a polarizing filter condition pf2. In the example of FIG. 31A, a region 3125 corresponds to a field of view comprising the pre-transformed material, a region 3155 corresponds to a field of view comprising the transformed material, and a region 3135 corresponds to a field of view comprising a portion of the pre-transformed material and a portion of the transformed material (e.g., an edge transition region). An image of a region of a field of view comprising pre-transformed material adjacent to transformed material (e.g., a melt pool) may comprise a contrast ratio. FIG. 31B depicts a relationship between a contrast ratio value 3160 and an image region 3165 (e.g., comprising one or more regions such as those corresponding to FIG. 31A, regions 3135, 3145, and 3155). The contrast ratio value 3160 comprises a threshold contrast ratio value 3164. In the example of FIG. 31B, the graphed column 3180 (e.g., corresponding to FIG. 31A, 3155) has a contrast ratio value below the threshold contrast ratio value, and the graphed column 3185 (e.g., corresponding to FIG. 31A, 3135) has a contrast ratio value above the threshold contrast ratio value. Regions of an image having contrast value(s) outside of a threshold level (e.g., above the threshold levels) may be challenging for detection of detectable properties (e.g., protrusions, indentations, roughness, or smoothness) of materials and/or surfaces in the field of view of the image. At times, an image determined to have a contrast ratio value beyond a threshold value (e.g., above a threshold) causes (e.g., a controller) performance of a contrast optimization process. The contrast optimization process may comprise capturing a sequence of images, with each image having a different (e.g., known) exposure settings, such as exposure time, and/or aperture size. The contrast optimization process may comprise capturing a sequence of images, with each image having a different (e.g., polarizing filter position) condition. In the example of FIG. 31A, the image portion pf2 corresponds to an altered position of one or more polarizing filter(s), which alteration causes a change in the overall contrast ratio of the image portion. FIG. 31A depicts a region 3145 corresponding to a field of view comprising a portion of the pre-transformed surface and a portion of the transformed surface (e.g., an edge transition region). FIG. 31B depicts a contrast ratio value of portion 3185 (as a graphed column) corresponding to region 3145 that is outside of the upper threshold value 3164, and a corresponding adjusted graphed column 3195 that is within an acceptable contrast ratio value range (e.g., is below the threshold contrast ratio value). Regions of an image having contrast ratio value(s) within of a threshold level may be beneficial for detection of detectable properties (e.g., protrusions, indentations, roughness, or smoothness) of materials and/or surfaces in the field of view of the image.

In some embodiments, one or more measurements based on image(s) taken by the structured light detection system may exhibit one or more measurement anomalies. A measurement anomaly may be a measurement data that does not correspond with the imaged surface. For example, a profile measurement of a (e.g., substantially planar, having at most about 10 μm Ra) surface having a measurement anomaly may include anomalous measurement values indicating a (e.g., non-existent) protrusion and/or a (e.g., non-existent) indentation on the surface. A measurement anomaly may be generated when an artifact (e.g., an edge artifact) is present in the image pixel data on which the measurement is made. An edge artifact may be present at (e.g., a portion of) an image having a (e.g., sharp, or abrupt) transition in a detectable signal. The detectable signal may comprise the detectable optical quality, e.g., as described herein. The detectable optical quality may correspond to a boundary between a pre-transformed material and transformed material (e.g., portions 3147 within region 3145 of FIG. 31A). An artifact may be present before, during and/or following a (e.g., controlled) contrast adjustment.

In some embodiments, an approach for generating a measurement (e.g., a feature height, protrusions, indentations, roughness, or smoothness) from a surface image comprising (e.g., at least one) image artifact includes modifying the image pixel data. Modifying image pixel data may comprise masking image pixel data. Masking pixel data may comprise excluding pixel data corresponding to pixels above and/or below threshold level(s), e.g., and performing the measurement(s) with the remaining pixel data. In some embodiments, masking pixel data comprises altering a value for the (e.g., edge) pixel(s). For example, an altered value may be generated from surrounding (e.g., average) pixel values. In some embodiments, masking pixel data may comprise generating a map of pixels to be excluded. The map may be generated from a different image (portion) of the field of view. For example, an image comprising a gradient map of the field of view can be captured. In some embodiments, the excluded pixels are selected using an edge filter (e.g., any suitable edge filter scheme). An image filter may operate along one image axis (e.g., one dimension), and/or along two image axes (e.g., two-dimensional). In some embodiments, an image filter may be applied along one image axis to detect features (e.g., edges) along that axis (e.g., an edge running generally perpendicular to the applied axis). Examples of edge and/or image gradient filters include a Canny edge detector, a Prewitt operator, a Sobel operator, a Scharr filter, and a Log Gabor filter). Pixels corresponding to regions of the map that satisfy a given condition (e.g., having a threshold change in color, e.g., change in intensity, brightness, shade, hue, or saturation of the color) may form a portion of a masking pixel image. The masking pixel image may be used to exclude selected portions of an image taken with the structured light detection system. For example, the excluded selected portions may correspond with one or more edges of a structure in the target surface and/or anomalies in the target surface. The edge may comprise a physical boundary (e.g., a change in material type and/or property) and/or a change in optical characteristic (e.g., reflectivity and/or specularity).

In some embodiments, a structured light detection system is used as an interlock aid in a 3D printing process. For example, the structured light detection system may be used to image a target surface and/or a build platform before, during, and/or after a print operation (e.g., within a printing cycle, or of a printing cycle). The structured light detection system may be used in the determination of a clearance between one or more components of the 3D printing system, for example, by measuring a height and/or topography of the an exposed layer of a material bed, a transformed material, a build platform and/or a test structure. The structured light detection system may be operable to detect other (e.g., unexpected) articles or components that are present in the field of view (e.g., on the target surface). The structured light detection system may be operationally coupled with one or more controllers of the 3D printing system. The structured light may provide one or more signals that causes the controller to alter a 3D printing process (e.g., pause and/or stop a printing operation, alter a function of a component of the 3D printing, generate a message and/or alert, and/or change a process parameter of the 3D printing process). For example, the structured light detection system may detect a protruding object from the exposed surface of the material bed that may damage the leveler (and optionally: facilitate directing halting of the planarization operation; lower the build platform to prevent damage of the leveler (e.g., upon projected contact with the protruding object); facilitate direction a change in at least one characteristic of the energy beam to adjust the printing procedure in light of the protruding object; or any combination thereof). For example, the structured light detection system may detect a deviation from requested planarity of the exposed surface prior to processing of the energy beam, and/or after a recoating operation (and optionally: facilitate directing a second planarization operation to correct the defective deviation).

In some embodiments, the projected pattern may be adjusted (e.g., in real time) to facilitate detecting an altered resolution of a target surface and/or altered topographic range of features of the target surface. A measurement range for the structured light detection system may depend on the projected pattern. For example, a projected pattern having (e.g., relatively) finely spaced elements (e.g., features such as fringes) may have a reduced measurement range (e.g., maximum-to-minimum height range detected, for example, 0.5-2 mm), with increased resolution (e.g., height resolution of 25-150 microns). Conversely, a structured light detection system having (e.g., relatively) widely spaced elements may have an increased measurement range (e.g., maximum-to-minimum height range detected, for example, 0.5-15 cm), with decreased resolution (e.g., height resolution 500-1000 microns). Determining a position of a target surface may include a combination of measurements taken at both low resolution (e.g., high range) settings and high resolution (e.g., low range) values. For example, locating a position of a top surface of a platform in the 3D printing system may comprise an initial (e.g., several) images captured by the structured light detection system in a high range setting, as the platform may be located relatively far (e.g., several millimeters or more) from a nominal position. Once the build plate is located (e.g., relative to its nominal position) it can be controlled to move (e.g., via an actuator, e.g., an elevator) toward a target position (e.g., height). The structured light detection system may be used in an iterative manner, e.g., with a controlled movement to position the platform at a nominal (e.g., controlled) position. As the platform approaches the nominal position, the structured light detection system may be operable to use different (e.g., ever-finer) spacing (e.g., higher resolution) projected light patterns to fine-tune the position of the platform. At times, portions of a platform comprise specularity and/or reflectivity outside of a (e.g., contrast ratio) threshold of the structured light detection system. In such cases, a surface (e.g., of the platform, and/or of a test structure) may be conditioned to be more diffusive (e.g., via sandblasting, etching, scribing, or any other method, e.g., as described herein) to produce a (e.g., relatively) improved surface quality.

In some embodiments, the calibration structure (e.g., test structure) does not include a bitmap. In some embodiments, the target surface serves as the calibration structure. In some embodiments, the calibration structure is formed (e.g., dynamically) at the target surface (e.g., by transforming pre-transformed material). A dynamically formed calibration structure can comprise one or more calibration marks, for example, a transition line (e.g., as in FIG. 23, 2325) between a first calibration mark type (e.g., comprising a pre-transformed material) and a second calibration mark type (e.g., comprising a transformed material). The transition line may be a line that transitions a property (e.g., reflectivity, intensity) of a calibration mark from a first side of the line to a second side of the line. At times, the calibration of properties of the optical system and/or the detector (e.g., power density distribution, spot size, irradiating energy footprint shape, and/or power of the energy beam) may be performed without a bitmap (e.g., and use the target surface as the calibration structure). In some embodiments, the exposed surface of the material bed (e.g., powder bed) may be used for calibration. The target surface may be the exposed surface of the material bed. The material bed may comprise particulate material of one or more sizes. The energy irradiated onto the surface of the material bed may be diffused and/or dispersed. Some of the diffused and/or dispersed energy may be detected by a detector (e.g., that is located at a known position). The known position may comprise a fixed position. The known position may alter in time. In some embodiments the larger the footprint of the irradiating energy, the smaller the changes that are detected as the energy beam scans the target surface. In some embodiments the smaller the footprint of the irradiating energy, the larger the changes that are detected as the energy beam scans the target surface. Without wishing to be bound to theory, the smaller the diameter of the irradiated beam projection (e.g., footprint), the higher a rate of variability in its detected intensity (e.g., amplitude of change) from the target surface may be (e.g., keeping the velocity of the scanning irradiating energy constant). The amplitude of the standard deviation of the change of intensity may be calculated. For example, for "I" being the detector signal, the normalized standard deviation (e.g., normalized change in detected intensity) may be calculated (e.g., by Std(I)/mean (I)). The normalized standard deviation may be calibrated for a certain particular material that constitutes the material bed (e.g., target surface thereof). The detection may allow derivation of the footprint size and/or shape (e.g., astigmatism), the focus of the footprint, and/or the measure of the power density distribution of the irradiating energy. For example, detection in different (e.g., X and Y) directions may be utilized to find an astigmatism of the footprint. For example, the measure of the power density distribution may be the integral of the power density distribution (e.g., along one or more specific directions). In some examples, using the target surface for locality calibration may not be effective.

In some embodiments, as a beam becomes more focused, higher variability is detected in the reflected radiation from an exposed surface which it irradiates during propagation (e.g., higher resolution image may be detected). In some embodiments, the variability range of the reflected radiation from the surface may be used to facilitate calibration of the spot size of the energy beam (e.g., whether it is in focus or out of focus, and how much out of focus it is). An exposed surface of the material bed may be used as a target surface. For example, the exposed surface of the material bed may be characterized with an energy beam having several known focal positions (e.g., spot sizes), which energy beam travels laterally along the exposed surface of the material bed (e.g., powder bed). The reflected radiation may be collected with a sensor (e.g., detector), e.g., a camera or a thermal detector. Once the surface has been characterized with known focal position, the beam may be characterized (e.g., in real time) with a known surface (e.g., known powder bed). The target surface may comprise a random pattern. The randomness may be characteristic of that surface or surface type.

Figure 28A:
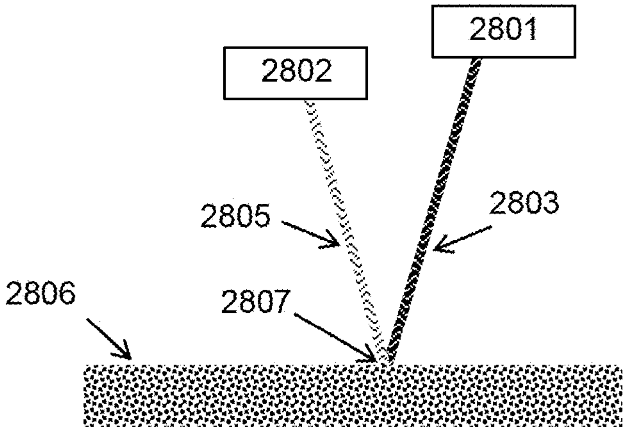
FIG. 28A schematically illustrates components of a calibration system, and FIG. 28B schematically illustrates a graph used in the calibration.
Figure 28B:
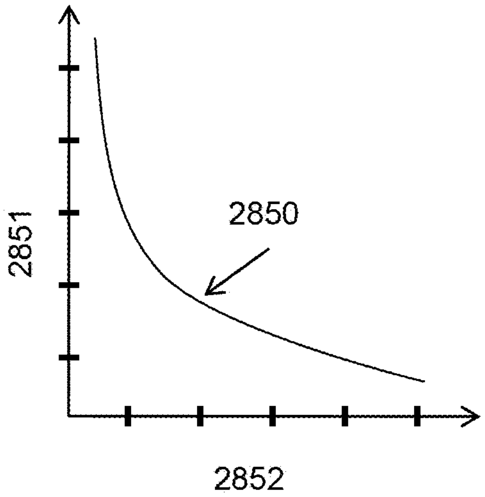

FIG. 28A shows an example of an irradiating energy (e.g., beam) 2803 that irradiates a target surface 2806 of a material bed (e.g., comprising a particulate material), which irradiating energy is generated by an energy source 2801; and a detector 2802 that detects the reflected irradiating energy 2805 having a footprint 2807 on the exposed surface (e.g., target surface) 2806. FIG. 28B shows an example of a change in the normalized standard deviation (e.g., Std(I)/mean(I), 2851) that is plotted as a function (e.g., 2850) of an area or FLS of the footprint (e.g., length, or width, 2852). The length or width of the footprint may be obtained by scanning the irradiating energy at different directions (e.g., X or Y) along the target surface. By calibrating a change in the normalized standard deviation of the irradiating energy amplitude change as a function of the FLS or area of the footprint (e.g., the graph in FIG. 28B) for a target surface comprising a certain particulate material, one may derive at least the area and/or FLS of the footprint.

Figure 26A:
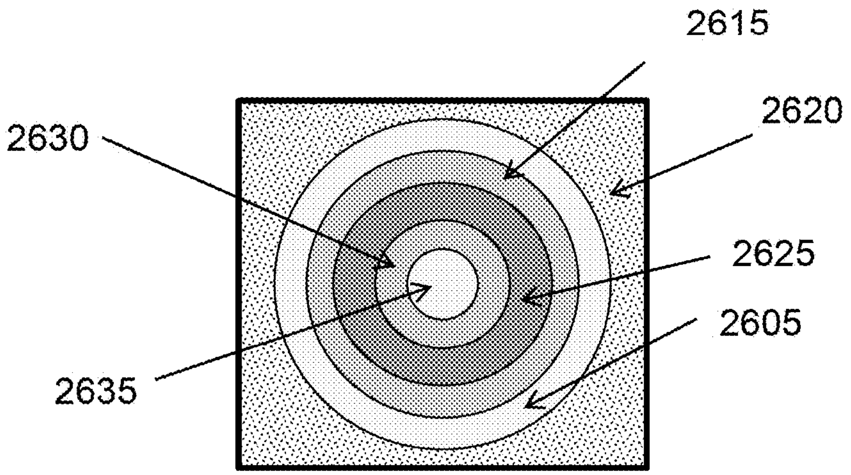
FIG. 26A schematically illustrates components of a calibration system, and FIG. 26B schematically illustrates a graph used in the calibration.

As an example, in order to calibrate a focus shift of the irradiating energy, the irradiating energy may be directed on one or more positions on the target surface. The target surface may exert a reflected signal. The reflected signal may include diffused signals (e.g., due to the particulate material). For example, the reflected signal may comprise a white noise signal. The reflected signal may comprise a spectral content. A focus shift of the irradiating energy footprint on the target surface at a given position may be measured based on an alteration in the spectral content of the reflected signal. Measuring the focus shift at different positions on the target surface (e.g., FIG. 26A, 2620) may be repeated for one or more focal offsets (e.g., FIG. 26A, 2635, 2630, 2625, 2615, and 2605).

Figure 26B:
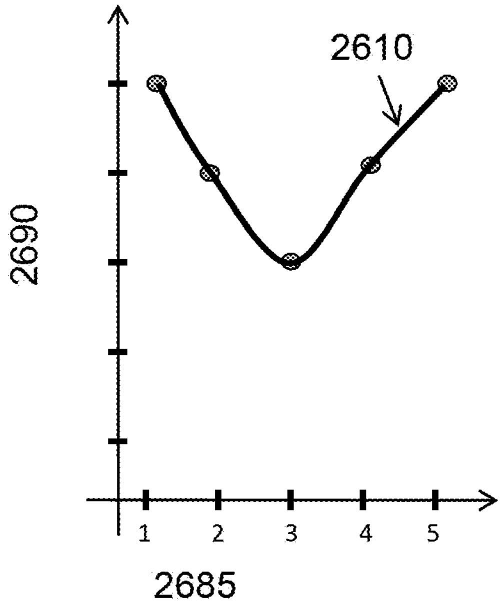

The reflected signal may comprise a frequency content. For example, the particulate material may contribute a particulate-specific frequency pattern to the reflected signal (e.g., high frequency). An amplitude of that particulate-specific frequency pattern may be utilized to determine the footprint FLS (when measured at different directions) and/or area. The reflected signal may be detected and analyzed. The analysis may comprise an optical transfer function (e.g., determining how different spatial frequencies are affected as they are reflected from the target surface). The optical transfer function (OTF) may or may not comprise considering phase effects. For example, the OTF may not consider phase effects. For example, the OTF may be a modulation transfer function (MTF). The OTF (e.g., MTF) for the reflected signal (e.g., FIG. 26B, 2690) at the different focal offsets (e.g., FIG. 26B, 2685) may be generated (e.g., FIG. 26B, 2610). The OTF may be a combination of the OTF of the one or more optical elements that generate the irradiating energy along with the OTF of the target surface (e.g., the particulate material in the exposed surface of the material bed). A selected focus shift (e.g., FIG. 26B, position #3 of 2685) may be determined from the one or more measured focus shifts at different focal offsets. The selected focus shift may be the region (e.g., spot) that has the highest intensity in the reflected signal. Similar to the focus shift, the process can be used to measure other characteristics of the irradiating energy (e.g., power density distribution, footprint position, footprint shape, scan direction, and/or scan velocity of the irradiating energy). A source of uncontrolled focus shift can be thermal lensing, that is addressed herein.

A calibration structure can comprise a heat sink. A calibration structure may comprise any material disclosed herein. A calibration structure can comprise two or more elemental metals, two or more metal alloys, two or more ceramics, and/or two or more allotropes of elemental carbon. For example, an elemental metal and a metal alloy, an elemental metal and a ceramic, an elemental metal and an allotrope of elemental carbon, a metal alloy and a ceramic, a metal alloy, and an allotrope of elemental carbon, a ceramic and an allotrope of elemental carbon. The calibration structure may comprise one or more salts or oxides. A calibration structure can be formed as a regular or irregular shaped solid. The calibration structure may have a 3D shape. The 3D shape may comprise a cuboid (e.g., cube), or a tetrahedron. The 3D shape may comprise a polyhedron (e.g., primary parallelohedron), at least a portion of an ellipse (e.g., circle), a cone, or a cylinder. The polyhedron may be a prism (e.g., hexagonal prism), or octahedron (e.g., truncated octahedron). The calibration structure may comprise a Platonic solid. The calibration structure may comprise octahedra, truncated octahedron, or a cube. The calibration structure may comprise convex polyhedra (e.g., with regular faces). The calibration structure may comprise a triangular prism, hexagonal prism, cube, truncated octahedron, or gyrobifastigium. The calibration structure may comprise a pentagonal pyramid. One or more (e.g., at least one) surfaces of the calibration structure may be substantially planar (e.g., smooth). A substantially planar surface of a calibration structure can be disposed (e.g., adjacent to the target surface) in a field of view of a detector. A substantially planar surface of a calibration structure can be disposed away from a field of view of a detector (e.g., having an indirect view of the detector). At times, a process of monitoring the optical element(s) condition can comprise directing the irradiating energy beam at one or more calibration marks of a calibration structure, prior to (e.g., in a benchmark condition) and following the heating irradiation and/or transforming the pre-transformed material into a transformed material as part of the 3D printing. The path of the irradiating energy may be directed in a direction that is perpendicular relative to the alignment direction of a series of transition lines between (e.g., two) calibration mark types when such alignment is present (e.g., FIGS. 32, 3220 and 3230). A detector (e.g., gray field detector) may produce a detected signal (e.g., optical signal) that may be measured from at least two calibration mark types (e.g., that contact each other), as described herein. The detected signal may be averaged amongst a plurality of irradiated positions within a calibration mark. The detected signal may be used to generate one or more graphical representations (e.g., as in FIG. 33). The graphical representations can depict one or more changes in the irradiating energy beam over time (e.g., as in curves 3320, 3330, 3340 of FIG. 33), which one or more changes can be correlated to an onset of and/or change in a thermal lensing condition of an optical element (e.g., of a 3D printing system).

In another example for calibrating locality of the irradiating energy footprint, the irradiating energy may be directed to a position in the enclosure (e.g., build module and/or the processing chamber). The enclosure may have a fixed size. The edge and/or corner of the enclosure may be pre-determined and/or know. For example, the edge and/or corner may be fixed. The one or more positions may serve as a calibration mark. A detector may detect the footprint of the irradiating energy on the edge and/or corner. A sensor may sense the footprint of the irradiating energy on the edge and/or corner. The detector may indicate a deviation of the footprint position relative to the corner and/or edge of the enclosure. The deviation may be calculated. The calculation may be done by a controller. The controller may be any controller described herein. Based on the calculated deviation, at least one characteristic of the irradiating energy may be adjusted. Adjustment may include aligning (e.g., bringing into coincidence) the location of the irradiating energy footprint with the fixed location of the enclosure, (e.g., edge and/or corner).

At times, a sensor array (e.g., a camera, an imaging calibration sensor) may be pre-calibrated as a calibration structure (e.g., bitmap). The sensor array may be a detecting unit (e.g., camera). The sensor array may act in a similar manner to a calibration mark of the calibration structure. The sensor array may be a pixel. The sensor array may border each other. For example, to pre-calibrate a camera as a bitmap (e.g., virtual bitmap), the camera may be used to measure one or more locations of a calibration mark (e.g., a transition between the pixels may act as the detectable transition between the calibration marks). In some embodiments, finding the center position comprises translating the irradiating energy (e.g., vectorially) through a plurality (e.g., at least four) of transition lines between the pixels, which pixels contact a point (e.g., in a similar manner to FIG. 18, 1814). The pixels may be (e.g., substantially) identical. The transition between pixels may be detectable. The detection unit (e.g., camera) may record the detected reflected signals (e.g., the picture of the reflected signal may be recorded by the camera). In some embodiments, the irradiating energy translates with respect to the target surface, causing the reflected signal to travel between pixels. The transition between pixels may be detectable, which detection may allow calibration of the position and/or at least one characteristic of the irradiating energy (e.g., a measure of the power per unit area distribution), as disclosed herein for the calibration surface. The sensor array (e.g., pixel array) may function as the calibration structure. The sensor array (e.g., camera) may be calibrated in terms of image scaling, position, position offset (e.g., shift), or any combination thereof. In some embodiments, the irradiating energy does not translate, and the pixels that detect the reflected signals are collectively analyzed, facilitating the positioning and/or at least one characteristic of the irradiating energy, as disclosed herein for the calibration surface. For example, the focal point of the beam may be determined by analyzing the pixels which detect the reflected signal. In an example, the measured location may be compared to the expected location of the calibration mark. The measured location may deviate from the expected location. The camera may comprise an imaging sensor, a row of the imaging sensor, a line of the imaging sensor, a pixel of the imaging sensor, or a set of pixels of the imaging sensor.

To calibrate the properties of the irradiating energy, the irradiating energy may be directed to move (e.g., scan) in a direction that crosses at least one connection point of two pixels (e.g., border). For example, the irradiating energy may be directed to travel in a direction parallel to two or more (e.g., a row or line of) sensors. The travel of the irradiating energy along the target surface may be continuous or in steps (e.g., pulses). The travel (e.g., scan) of the irradiating energy may be performed at a higher resolution than the resolution of the sensor (e.g., using smaller travel steps than the pixel size). The translation of the irradiating energy may be performed at a lower resolution than the resolution of the detecting unit sensor(s). The translation of the irradiating energy may be at a resolution (e.g., substantially) equal to the resolution of the imaging sensor. A detector and/or sensor may detect and/or sense the reflected signal of the irradiating energy (e.g., from a target surface). The deviation may be calculated based on comparing the detected and/or sensed signal with an expected signal (e.g., pre-determined, or known). The comparison may be as to a position of the irradiating energy footprint on the surface (e.g., target surface), and/or to any other characteristics of the irradiating energy. The position and/or at least one irradiating energy characteristics may be adjusted based on the calculated deviation. For example, the distribution of the power density measure across the footprint of the irradiating energy (e.g., on the calibration structure surface) may be calibrated in a similar method. For example, to calibrate the velocity and/or the locality of the energy beam, the size of the target surface may be measured (e.g., by measuring from one edge to the second edge of the material bed) by the sensor(s) and/or detector(s). The measured size of the target surface may be compared to the expected size (e.g., predetermined, known) of the target surface. The deviation of the measured size to the expected size may be calculated. The position of the energy beam may be adjusted, based on the calculated deviation.

One or more sensors (at least one sensor) can detect the topology of the exposed surface of the material bed and/or the exposed surface of the 3D object or any part thereof. The sensor can detect the amount of material deposited in the material bed. The sensor can be a proximity sensor. For example, the sensor can detect the amount of powder material deposited on the exposes surface of a powder bed. The sensor can detect the physical state of material deposited on the target surface (e.g., liquid, or solid (e.g., powder or bulk)). The sensor can detect the crystallinity of material deposited on the target surface. The sensor can detect the amount of material transferred by the material dispensing mechanism. The sensor can detect the amount of material relocated by a leveling mechanism. The sensor can detect the temperature of the material. For example, the sensor may detect the temperature of the material in a material (e.g., powder) dispensing mechanism, and/or in the material bed. The sensor may detect the temperature of the material during and/or after its transformation. The sensor may detect the temperature and/or pressure of the atmosphere within an enclosure (e.g., chamber). The sensor may detect the temperature of the material (e.g., powder) bed at one or more locations. The at least one sensor can be operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise a measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material. The layer of material may be a pre-transformed material (e.g., powder), transformed material, or hardened material. The metrology sensor may measure at least a portion of the 3D object. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensors, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor.

The weight of the material bed can be monitored by one or more weight sensors in, or adjacent to, the material. For example, a weight sensor in the material bed can be at the bottom of the material bed. The weight sensor can be between the bottom of the enclosure (e.g., FIG. 1, 111) and the substrate (e.g., FIG. 1, 109) on which the base (e.g., FIG. 1, 102) or the material bed (e.g., FIG. 1, 104) may be disposed. The weight sensor can be between the bottom of the enclosure and the base on which the material bed may be disposed. The weight sensor can be between the bottom of the enclosure and the material bed. A weight sensor can comprise a pressure sensor. The weight sensor may comprise a spring scale, a hydraulic scale, a pneumatic scale, or a balance. At least a portion of the pressure sensor can be exposed on a bottom surface of the material bed. In some cases, the weight sensor can comprise a button load cell. The button load cell can sense pressure from powder adjacent to the load cell. In another example, one or more sensors (e.g., optical sensors or optical level sensors) can be provided adjacent to the material bed such as above, below, or to the side of the material bed. In some examples, the one or more sensors can sense the powder level. The material (e.g., powder) level sensor can be in communication with a material dispensing mechanism (e.g., powder dispenser).

Alternatively, or additionally a sensor can be configured to monitor the weight of the material bed by monitoring a weight of a structure that contains the material bed. One or more position sensors (e.g., height sensors) can measure the height of the material bed relative to the substrate. The position sensors can be optical sensors. The position sensors can determine a distance between one or more energy beams (e.g., a laser or an electron beam.) and a surface of the material (e.g., powder). The one or more sensors may be connected to a control system (e.g., to a processor, to a computer).

The systems and/or apparatuses disclosed herein may comprise one or more motors. The motors may comprise servomotors. The servomotors may comprise actuated linear lead screw drive motors. The motors may comprise belt drive motors. The motors may comprise rotary encoders. The apparatuses and/or systems may comprise switches. The switches may comprise homing or limit switches. The motors may comprise actuators. The motors may comprise linear actuators. The motors may comprise belt driven actuators. The motors may comprise lead screw driven actuators. The actuators may comprise linear actuators. The systems and/or apparatuses disclosed herein may comprise one or more pistons.

The exit opening of the material dispenser can comprise a mesh or a plane with holes (collectively referred to herein as “mesh”). The mesh comprises a hole (or an array of holes). The hole (or holes) can allow the material to exit the material dispenser. The hole (e.g., opening can have a FLS of at least about 0.001 mm, 0.01 mm, 0.03 mm, 0.05 mm, 0.07 mm, 0.09 mm, 0.1 mm, 1 mm, 2 mm, 3 mm, 4 mm, 5 mm, or 10 mm. The hole can have a FLS of at most about 0.001 mm, 0.01 mm, 0.03 mm, 0.05 mm, 0.07 mm, 0.09 mm, 0.1 mm, 1 mm, 2 mm, 3 mm, 4 mm, 5 mm, or 10 mm. The hole can have a FLS between any of the aforementioned values (e.g., from about 0.001 mm to about 10 mm, or from 0.1 mm to about 5 mm). In some embodiments, the hole can have a FLS of at least about 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm 950 μm, or 1000 μm. The hole in the mesh can have a FLS of at most about 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm 950 μm, or 1000 μm. The hole in the mesh can have a FLS of any value between the afore-mentioned fundamental length scales (e.g., from about 30 μm to about 1000 μm, from about 10 μm to about 600 μm, from about 500 μm to about 1000 μm, or from about 50 μm to about 300 μm). The FLS of the holes may be adjustable or fixed. In some embodiments, the opening comprises two or more meshes. At least one of the two or more meshes may be movable. The movement of the two or more meshes may be controlled manually or automatically (e.g., by a controller). The relative position of the two or more meshes with respect to each other may determine the rate at which the material passes through the hole (or holes). The FLS of the holes may be electrically controlled. The fundamental length scale of the holes may be thermally controlled. The mesh may be heated or cooled. The may vibrate (e.g., controllably vibrate). The temperature and/or vibration of the mesh may be controlled manually or by the controller. The holes of the mesh can shrink or expand as a function of the temperature and/or electrical charge of the mesh. The mesh can be conductive. The mesh may comprise a mesh of standard mesh number 50, 70, 90, 100, 120, 140, 170, 200, 230, 270, 325, 550, or 625. The mesh may comprise a mesh of standard mesh number between any of the aforementioned mesh numbers (e.g., from 50 to 625, from 50 to 230, from 230 to 625, or from 100 to 325). The standard mesh number may be US or Tyler standards. The two meshes may have at least one position where no material can pass through the exit opening. The two meshes may have a least one position where a maximum amount of material can pass through the exit opening. The two meshes can be identical or different. The size of the holes in the two meshes can be identical or different. The shape of the holes in the two meshes can be identical or different. The shape of the holes can be any hole shape described herein.

The methods described herein may comprise vibrating at least part of the material, or at least part of the material dispensing mechanism. The at least part of the material dispensing mechanism may comprise vibrating at least part of the exit opening of the material dispensing mechanism. The method may comprise vibrating the material in the material bed to level the top surface of the material bed. The method may comprise vibrating the enclosure, the substrate, the base, the container that accommodates the material bed, or any combination thereof, to level the material (e.g., at the top surface of the material bed). The vibrations may be ultrasonic vibrations. The leveling may be able to level the top surface of the material with a deviation from the average plane created by the top surface. The deviation from the average plane may be of any deviation from average plane value disclosed herein. The material dispensing method may utilize any of the material dispensing mechanism described herein. The material dispensing method may utilize gravitational force, and/or one that uses gas flow (e.g., airflow).

In some examples, the pressure system includes one or more pumps. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump, or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valveless pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump.

The systems, apparatuses, and/or methods described herein can comprise a material recycling mechanism. The recycling mechanism can collect unused pre-transformed material and return the unused pre-transformed material to a reservoir of a material dispensing mechanism (e.g., the material dispensing reservoir), or to the bulk reservoir that feeds the material dispensing mechanism. Unused pre-transformed material may be material that was not used to form at least a portion of the 3D object. At least a fraction of the pre-transformed material removed from the material bed by the leveling mechanism and/or material removal mechanism can be recovered by the recycling system. At least a fraction of the material within the material bed that did not transform to subsequently form the 3D object can be recovered by the recycling system. A vacuum nozzle (e.g., which can be located at an edge of the material bed) can collect unused pre-transformed material. Unused pre-transformed material can be removed from the material bed without vacuum. Unused pre-transformed (e.g., powder) material can be removed from the material bed manually. Unused pre-transformed material can be removed from the material bed by positive pressure (e.g., by blowing away the unused material). Unused pre-transformed material can be removed from the material bed by actively pushing it from the material bed (e.g., mechanically or using a positive pressurized gas). A gas flow can direct unused pre-transformed material to the vacuum nozzle. A material collecting mechanism (e.g., a shovel) can direct unused material to exit the material bed (and optionally enter the recycling mechanism). The recycling mechanism can comprise one or more filters to control a size range of the particles returned to the reservoir. In some cases, a Venturi scavenging nozzle can collect unused material. The nozzle can have a high aspect ratio (e.g., at least about 2:1, 5:1, 10:1, 20:1, 30:1, 40:1, or 100:1) such that the nozzle does not become clogged with material particle(s). In some embodiments, the material may be collected by a drainage mechanism through one or more drainage ports that drain material from the material bed into one or more drainage reservoirs. The material in the one or more drainage reservoirs may be re used (e.g., after filtration and/or further treatment).

In some cases, unused material can surround the 3D object in the material bed. The unused material can be substantially removed from the 3D object. Substantial removal may refer to material covering at most about 20%, 15%, 10%, 8%, 6%, 4%, 2%, 1%, 0.5%, or 0.1% of the surface of the 3D object after removal. Substantial removal may refer to removal of all the material that was disposed in the material bed and remained as material at the end of the 3D printing process (e.g., the remainder), except for at most about 10%, 3%, 1%, 0.3%, or 0.1% of the weight of the remainder. Substantial removal may refer to removal of all the remainder except for at most abbot 50%, 10%, 3%, 1%, 0.3%, or 0.1% of the weight of the printed 3D object. The unused material can be removed to permit retrieval of the 3D object without digging through the material bed. For example, the unused material can be suctioned out of the material bed by one or more vacuum ports (e.g., nozzles) built adjacent to the material bed, by brushing off the remainder of unused material, by lifting the 3D object from the unused material, by allowing the unused material to flow away from the 3D object (e.g., by opening an exit opening port on the side(s) or on the bottom of the material bed from which the unused material can exit). After the unused material is evacuated, the 3D object can be removed, and the unused material can be re-circulated to a material reservoir for use in future builds.

In some embodiments, the platform may comprise a mesh. The base and/or substrate may comprise a mesh. The 3D object can be generated on a mesh. The mesh holes can be blocked. The mesh holes can be openable (e.g., by a controller and/or manually). A solid platform (e.g., base or substrate) can be disposed underneath the mesh such that the material stays confined in the material bed and the mesh holes are blocked. The blocking of the mesh holes may not allow a substantial amount of material to flow through. The mesh can be moved (e.g., vertically or at an angle) relative to the solid platform by pulling on one or more posts connected to either the mesh or the solid platform (e.g., at the one or more edges of the mesh or of the base) such that the mesh becomes unblocked. The one or more posts can be removable from the one or more edges by a threaded connection. The mesh substrate can be lifted out of the material bed with the 3D object to retrieve the 3D object such that the mesh becomes unblocked. Alternatively, or additionally, the platform can be tilted, horizontally moved such that the mesh becomes unblocked. The platform can include the base, substrate, or bottom of the enclosure. When the mesh is unblocked, at least part of the pre-transformed material flows from the material bed through the mesh while the 3D object remains on the mesh. In some instances, two meshes may be situated such that in one position their holes are blocked, and in the other position, opened. The 3D object can be built on a construct comprising a first and a second mesh, such that at a first position the holes of the first mesh are completely obstructed by the solid parts of the second mesh such that no material can flow through the two meshes at the first position, as both mesh holes become blocked. The first mesh, the second mesh, or both can be controllably moved (e.g., horizontally or in an angle) to a second position. In the second position, the holes of the first mesh and the holes of the second mesh are at least partially aligned such that the material disposed in the material bed is able to flow through to a position below the two meshes, leaving the exposed 3D object.

In some cases, cooling gas can be directed to the hardened material (e.g., 3D object) for cooling the hardened material during and/or following its retrieval. The mesh can be of a size such that the unused material will sift through the mesh as the 3D object becomes exposed from the material bed. In some cases, the mesh can be coupled (e.g., attached) to a pulley or other mechanical device such that the mesh can be moved (e.g., lifted) out of the material bed with the 3D part.

In some embodiments, one or more optical elements in the optical path may be susceptible to thermal lensing. The optical elements may comprise an optical window, lens, beam-splitter, or mirror. The power density of the energy beam may be measured after passing through the one or more optical elements, and at the target surface (e.g., exposed surface of the material bed). The power density of the energy beam may be measured at the surface of the one or more optical element. The power density of the energy beam at the surface of the one or more optical element and/or target surface may be at least about 10 W/cm$^2$, 50 W/cm$^2$, 100 W/cm$^2$, 500 W/cm$^2$, 1000 W/cm$^2$, 1500 W/cm$^2$, or 2000 W/cm$^2$. The power density value of the energy beam at the surface of the one or more optical element and/or target surface may be between any value between the afore-mentioned power density values (e.g., from about 10 W/cm$^2$ to about 2000 W/cm$^2$, from about 10 W/cm$^2$ to about 1000 W/cm$^2$, or from about 1000 W/cm$^2$ to about 2000 W/cm$^2$).

Figure 38:
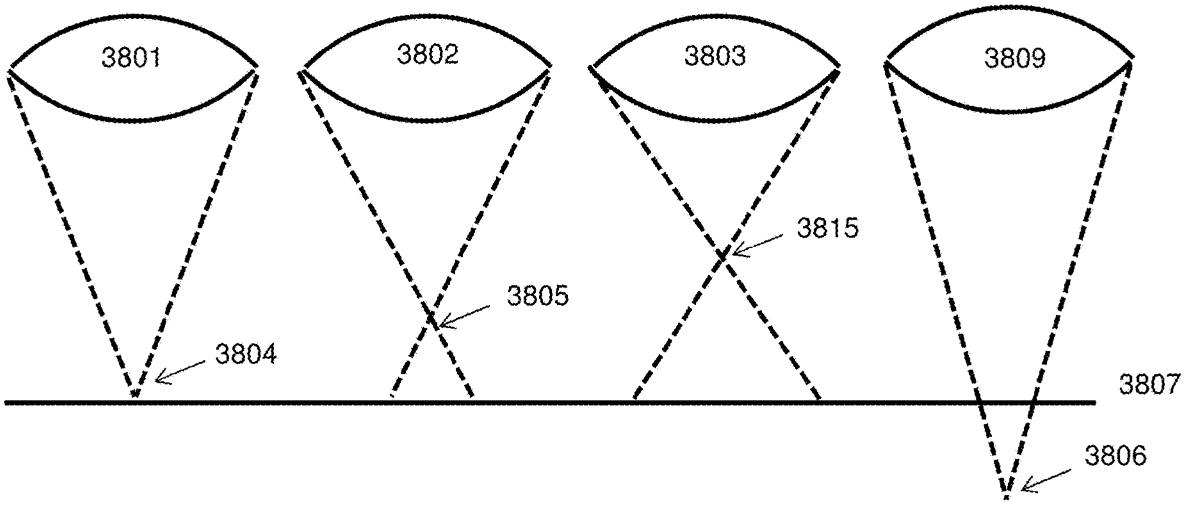
FIG. 38 schematically illustrates beams shining through lenses.

A source of uncontrolled focus shift can be thermal lensing. The thermal lensing can result in a positive or negative shift in an optical property of an optical element experience thermal lensing. For example, the thermal lensing can result in an increase or decrease in the optical power of the one or more optical element (e.g., in case of a lens). As understood herein, thermal lensing is an effect wherein one or more optical properties of an optical element (e.g., a lens, window, mirror, and/or beam splitter) is altered in response to heating. The change in the optical property may be (e.g., manifested as) a change in the (e.g., nominal) focal length of the optical element. FIG. 38 shows an example of a first optical element 3801 that does not experience thermal lensing, having a first beam traveling therethrough with a focal point 3804 at a target surface 3807; a second optical element 3802 that experiences thermal lensing (e.g., resulting in an increased optical power with respect to 3801) and a second beam traveling therethrough having a focal point 3805 above the target surface 3807; a third optical element 3803 that experiences more thermal lensing (e.g., a further increase in optical power with respect to 3802) and a third beam traveling therethrough having a focal point 3815 above the target surface 3807; and a fourth optical element 3809 that experiences thermal lensing (e.g., resulting in a decreased optical power with respect to 3801) and a fourth beam traveling therethrough having a focal point 3806 below the target surface 3807. The thermal lensing may result in a negative or positive effect (e.g., retracting or expanding the distance of the focal point from the optical element). In some embodiments, the optical setup is configured such that the focal point of the optical element devoid of thermal lensing is at the target surface. The heating can be induced by incident energy radiation (e.g., an energy beam) that interacts with the optical element. The change may be an intrinsic change in at least one material property of the optical element. The at least one material property may comprise an internal or a surface material property of the optical element. For example, an index of refraction of the optical element can change in response to heating. For example, the volume and/or shape of the optical element may change. For example, a surface property of the optical element may change (e.g., reflectivity). The change can be either an increase or a decrease in the at least one property. The change can include an aberration. The change may comprise a loss in the amount of radiation transmitted through the optical element. The change may comprise an alteration of (i) a position of a focal point of the energy beam, (ii) focus of the energy beam on the exposed surface, or (iii) spot size of the energy beam on the exposed surface. Once the incident energy is removed from contacting the optical element, the optical element may return to a non-thermal lensing condition. At times, once the incident energy is removed the optical element does not return to a non-thermal lensing condition. For example, one or more contaminants (e.g., soot, dirt, atmospheric particles, silicon-based compounds, organic compounds, and/or hydrocarbons) can be present (e.g., introduced) on a surface of the optical element (e.g., during lensing). A contaminant can cause a temporary, semi-permanent, or permanent thermal lensing effect in the optical element. Semi-permanent can refer to a contamination condition that persistently exhibits thermal lensing in an optical element, which thermal lensing subsides when the contamination is removed. Permanent can refer to a contamination condition that persistently exhibits thermal lensing in an optical element, which thermal lensing does not (e.g., completely) subside due to an inability to (e.g., completely) remove the contamination.

A timescale of thermal lensing cycling (e.g., time between introduction of incident energy and initiation of thermal lensing) can be dependent on one or more characteristics of the energy beam (e.g., a power and/or a power density) and/or one or more characteristics of a material of the optical element (e.g., thermal conductivity, temperature coefficient of the refractive index, absorption coefficient, and/or thermal expansion). A timescale for onset of thermal lensing in the optical element can be approximately from about 0.005 seconds (sec) to about 30 sec, from about 0.01 sec to about 0.5 sec, from about 0.1 sec to about 10 sec, or from about 10 sec to about 30 sec. For example, a Metallic mirror may exhibit complete (e.g., settled) thermal lensing after about 0.2 sec. A timescale for an ending of a thermal lensing condition in the optical element (e.g., once incident energy is no longer present) can be at least about 10 sec, 20 sec, 30 sec, 40 sec, 50 sec or 60 sec; at least about 2 minutes (min), 3 min, 4 min, 5 min, 10 min, 30 min, or 60 min; or at least about 2 hours (h), 3 h, 4 h, 5 h, 10 h, or 24 h. A timescale for an initiation and ending of a thermal lensing condition in the optical element may be material dependent.

Without wishing to be bound by theory, to an extent, the optical elements exhibit some amount of thermal lensing (e.g., depending on the material makeup). For example, impurities within the optical element can absorb energy from the incident radiative energy. For example, optical elements can be coated with one or more coatings (e.g., anti-reflective), which coatings can absorb a portion of incident radiative energy. For example, particulates present in an atmosphere in which the optical element is present can adsorb and/or adhere to a surface of the optical element, forming a coating. A coating can absorb radiation from an irradiative energy source and thereby heat a surface of the optical element. A change in temperature at the surface and/or within the bulk volume of an optical element can change the at least one material property of the optical element (e.g., refractive index thereof). A change in the at least one material property can induce a change in a focus of the optical element, e.g., acting as a (e.g., thermal) lens. A change in the focus comprises an alteration of (i) a position of a focal point of the energy beam, (ii) focus of the energy beam on the exposed surface, or (iii) spot size of the energy beam on the exposed surface. The magnitude of the change in focus can change in a manner that is correlated to the temperature change in the optical element. Thermal lensing may occur during at least a portion of 3D printing. For example, thermal lensing can occur after a total energy density (measured in kilowatt-hours per square centimeter (kWh)/$cm^2$)) incident upon (e.g., through) an optical measurement is at least about $2.8*10^{-6}$ kWh/$cm^2$, $1*10^{-5}$ kWh/$cm^2$, $5*10^{-5}$ kWh/$cm^2$, $1*10^{-4}$ kWh/$cm^2$, $10*10^{-4}$ kWh/$cm^2$, $100*10^{-4}$ kWh/$cm^2$, or $417*10^{-4}$ kWh/$cm^2$. Thermal lensing can occur after a total energy density is about $5*10^{-2}$ kWh/$cm^2$, $1*10^{-1}$ kWh/$cm^2$, $5*10^{-1}$ kWh/$cm^2$, 1 kWh/$cm^2$, or 1.25 kWh/$cm^2$. The thermal lensing can occur after a total energy density is at most about 1.25 kWh/$cm^2$, $5*10^{-1}$ kWh/$cm^2$, $1*10^{-1}$ kWh/$cm^2$, $5*10^{-2}$ kWh/$cm^2$, $417*10^{-4}$ kWh/$cm^2$, $100*10^{-4}$ kWh/$cm^2$, $10*10^{-4}$ kWh/$cm^2$, $1*10^{-4}$ kWh/$cm^2$, $5*10^{-5}$ kWh/$cm^2$, $1*10^{-5}$ kWh/$cm^2$, or $2.8*10^{-6}$ kWh/$cm^2$. Thermal lensing can occur after a total energy density incident on an optical element between any of the afore-mentioned values. For example, the total energy density incident on the optical element can be from about $2.8*10^{-6}$ kWh/$cm^2$ to about 1.25 kWh/$cm^2$, from about $2.8*10^{-6}$ kWh/$cm^2$ to about $5*10^{-2}$ kWh/$cm^2$, or from about $5*10^{-2}$ kWh/$cm^2$ to about 1.25 kWh/$cm^2$. For example, thermal lensing can occur after radiative energy through the optical element is at least about $1*10^{-3}$ kilowatt hour (kWh), $2*10^{-3}$ kWh, $1*10^{-2}$ kWh, $2*10^{-2}$ kWh, $1*10^{-1}$ kWh, $5*10^{-1}$ kWh, 1 kWh, 2 kWh, 5 kWh, 10 kWh, 20 kWh, 30 kWh, 40 kWh, 50 kWh, 60 kWh, 70 kWh, 80 kWh or 90 kWh. The symbol "*" designates the mathematical operation of "multiplied by" or "times." The thermal lensing can occur after radiative energy through the optical element of at most about 90 kWh, 80 kWh, 70 kWh, 60 kWh, 50 kWh, 40 kWh, 30 kWh, 20 kWh, 10 kWh, 5 kWh, 2 kWh, 1 kWh, $5*10^{-1}$ kWh, $1*10^{-1}$ kWh, $2*10^{-2}$ kWh, $1*10^{-2}$ kWh, $2*10^{-3}$ kWh, or $1*10^{-3}$ kWh. Thermal lensing can occur with an amount of radiative energy through the optical element between any of the afore-mentioned values. For example, the amount of radiative energy causing thermal lensing can be from about $1*10^{-1}$ kWh to about 90 kWh, from about $1*10^{-1}$ kWh to about 50 kWh, or from about 50 kWh to about 90 kWh. Thermal lensing may occur after a volume of material transformed (e.g., from a pre-transformed material) is at least about 200 $cm^3$, 225 $cm^3$, 250 $cm^3$, 275 $cm^3$, 300 $cm^3$, 350 $cm^3$, 400 $cm^3$, 450 $cm^3$, 500 $cm^3$, 600 $cm^3$, 700 $cm^3$, 800 $cm^3$, 900 $cm^3$, 1000 $cm^3$, or 1100 $cm^3$. Thermal lensing may occur after a volume of material transformed is at most about 1100 $cm^3$, 1000 $cm^3$, 900 $cm^3$, 800 $cm^3$, 700 $cm^3$, 600 $cm^3$, 500 $cm^3$, 450 $cm^3$, 400 $cm^3$, 350 $cm^3$, 300 $cm^3$, 275 $cm^3$, 250 $cm^3$, 225 $cm^3$, or 200 $cm^3$. Thermal lensing may occur between any of the afore-mentioned values, for example, a volume of material transformed may be from about 200 $cm^3$ to about 1100 $cm^3$, from about 200 $cm^3$ to about 700 $cm^3$, or from about 700 $cm^3$ to about 1100 $cm^3$.

The one or more optical elements (e.g., lens and/or mirror) may comprise a coating. The coating may comprise anti-reflective or high reflectivity coating. The coating may dissipate heat into the interior of the optical element. The coating may dissipate projected heat towards an exterior of the element (e.g., sideways with respect to the radiation direction). The coating may not dissipate heat into the interior of the optical element.

The one or more optical elements may be resistant to damage (e.g., withstand operating conditions) up to a power density threshold without substantial thermal lensing. Substantial thermal lensing may be detectable and/or detrimentally affects the 3D printing. For example, the thermal lensing detrimentally affects the building of the 3D object. For example, the thermal lensing detrimentally affects the dimensions and/or surface roughness of the 3D object. For example, the thermal lensing detrimentally affects the material properties of the 3D object (e.g. increases defects such as cracks and/or pores). For example, the thermal lensing detrimentally affects the printing of the 3D object such that it cannot be used in for its intended purpose. The one or more optical elements may be rated to operate at one or more conditions (of the 3D printing) at or below a power density threshold. The power density threshold for the one or more optical elements can be at least about 0.5 kilowatt-hours per square centimeter (kWh)/$cm^2$), 1 kWh/$cm^2$, 2 kWh/$cm^2$, 5 kWh/$cm^2$, 10 kWh/$cm^2$, or 15 kWh/$cm^2$. The power density threshold can be at most about 15 kWh/$cm^2$, 10 kWh/$cm^2$, 5 kWh/$cm^2$, 2 kWh/$cm^2$, 1 kWh/$cm^2$, or 0.5 kWh/$cm^2$. The power density threshold can be between any of the afore-mentioned values. For example, the power density threshold may be from about 0.5 kWh/$cm^2$ to about 15 kWh/$cm^2$, from about 0.5 kWh/$cm^2$ to about 5 kWh/$cm^2$, or from about 5 kWh/$cm^2$ to about 15 kWh/$cm^2$. A power density threshold may be reduced for an optical element operating out of a nominal condition (e.g., affected by one or more contaminants). The power density threshold may be reduced, e.g., when the one or more optical elements are coated by a contaminant, and can be from about 0.1 kWh/$cm^2$.

Figure 32:
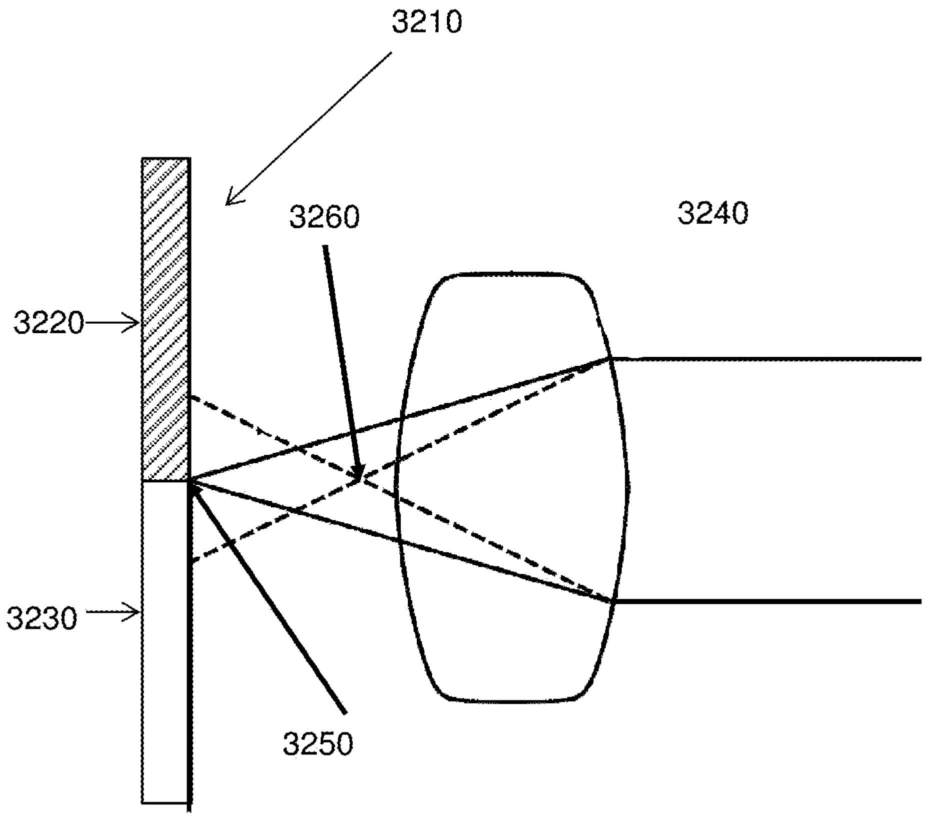
FIG. 32 schematically illustrates components of an optical setup.
Figure 33:
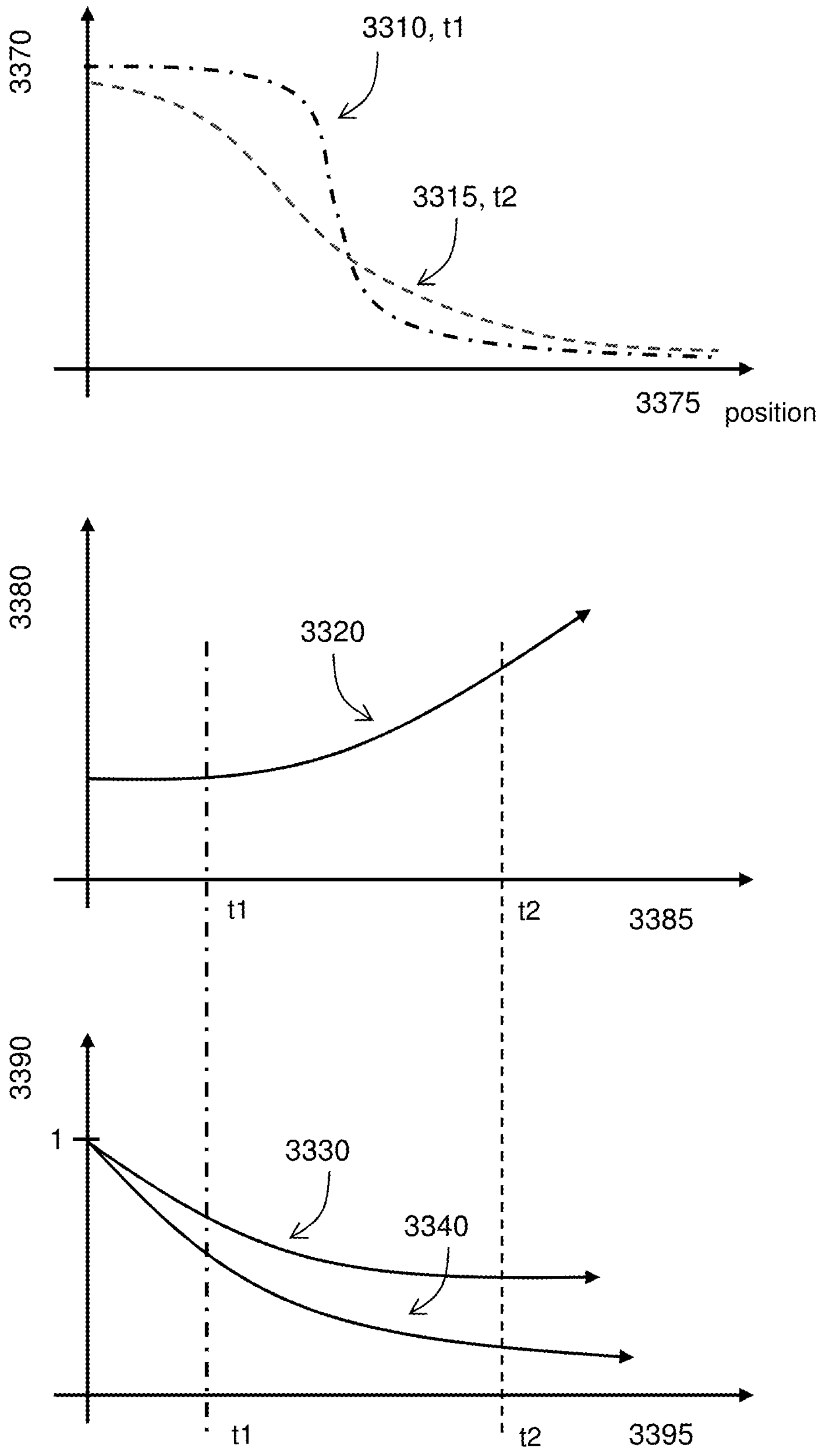
FIG. 33 schematically illustrates graphs used for calibration.

FIG. 32 shows an example of an optical element (e.g., lens 3240) having a focus 3250 (e.g., devoid of thermal lensing). In the example of FIG. 32 the focal point of the lens is incident upon a (e.g., target) surface 3210, the surface comprising a dark portion 3220 (e.g., a first calibration-mark) and a light portion 3230 (e.g., a second calibration-mark). In the example of FIG. 32, the dark portion and light portion signify a detectable difference in a material property at the target. In the example of FIG. 32 the optical element possesses a different focus when thermal lensing is present (e.g., 3260), which causes a beam passing through the optical element to be out of focus at the surface 3210. The surface can include one or more calibration surfaces and/or structures, as described herein. A detector (e.g., an optical detector) can generate a signal based upon incident (e.g., irradiating) energy reflected and/or scattered off of the surface. A detected signal intensity (e.g., FIG. 33, 3370) may be graphically represented against the relative position (e.g., FIG. 33, 3375) of the irradiating energy on the target (e.g., FIG. 32, 3210). The graphical representation may comprise a detected signal curve as a function of position. The detected signal curve may reveal the transition point between a first calibration-mark type (e.g., dark portion, FIG. 32, 3220) and a second calibration-mark type (e.g., light portion, FIG. 32, 3230). The transition point may be an inflection point on the detected signal curve, and/or a point (e.g., midpoint) between adjacent inflection points on the detected signal curve. The detected signal curve can have a different (e.g., characteristic) shape for a lens that is (e.g., substantially) properly focused on the target than for a lens that exhibits thermal lensing. In the example of FIG. 33, curve 3310 corresponds with a substantially properly focusing (e.g., in-focus, e.g., recorded at time t1) lens, while curve 3315 corresponds with a lens exhibiting (e.g., some degree of) thermal lensing (e.g., recorded at time t2).

Thermal lensing can occur during and/or after at least a portion of a 3D printing process. The thermal lensing may occur (timewise) in close to the proximity of the 3D printing. For example, thermal lensing may occur (e.g., initiate) after at least about 0.05 second (sec), 0.1 sec, 0.3 sec, 0.5 sec, 0.7 sec, or 1.0 sec. of irradiation of the transforming energy beam through the one or more optical element (e.g., as part of the 3D printing). Thermal lensing may not be (e.g., no longer) present at the outset of a 3D printing process, and/or after a sufficient time has lapsed (e.g., $10^{-600}$ seconds) following reduction (e.g., in power) or removal of incident energy on the optical element. Thermal lensing can cause one or more characteristics of the 3D printing process to vary. For example, (i) the position at which the (e.g., irradiating) energy beam contacts a target (e.g., the target surface), (ii) the energy beam footprint on the target surface, (iii) the energy density of the of the energy beam projected to the surface, (iv) the energy profile of the energy beam across its footprint at the surface, (v) the XY offset of the energy beam with respect to the surface, and/or (vi) the focus of the energy beam at the surface, may vary due to thermal lensing of the at least one optical element. A change in the energy beam footprint on the target may comprise change in the footprint area, FLS, or shape.

In some embodiments, a detector (e.g., such as described herein) generates one or more signals, which can be graphically represented to characterize and/or monitor (e.g., a thermal lensing condition) one or more characteristics of the energy beam. At times, during a 3D printing process an elapse of time leads to an increase in the energy beam footprint (e.g., due to thermal lensing), e.g., comprising footprint area, FLS, or shape. At times, during a 3D printing process an elapse of time leads to a decrease in the energy beam footprint (e.g., due to thermal lensing), e.g., comprising footprint area, FLS, or shape. Taking a plurality of measurements at different points in time (e.g., at least two), with one or more detectors, can serve to monitor and/or characterize one or more optical elements (e.g., a thermal lensing condition) via the one or more characteristics of the energy beam. For example, a first measurement of the energy beam corresponding with the optical element at a given condition (e.g., before a 3D printing process, before beginning a layer build) can serve as a benchmark (e.g., calibration) measurement, against which subsequent (e.g., at least one subsequent) measurements of the energy beam that correspond with the optical element at a subsequent condition (e.g., during and/or after a 3D printing process) can be compared. FIG. 33, 3320 shows an example of a graphical representation of an energy beam footprint size 3380 as a function of time 3385. At time "t1" (corresponding to, for example, no thermal lensing) the energy beam footprint has a first (e.g., nominal) characteristic. At time "t2" corresponding to a time following "t1," for example, following a portion of a 3D printing process during which thermal lensing occurs, the energy beam footprint has a second (e.g., increased) characteristic. The footprint characteristic can comprise FLS, or area.

FIGS. 33, 3330 and 3340 shows examples of a graphical representations of Peak Intensity Ratio (PIR) 3390 of an energy beam as a function of time 3395 for two energy beams (e.g., two different energy beam, or of the same energy beam irradiating at different conditions). A PIR comprises a ratio of a measurement of an energy beam intensity (e.g., peak intensity) at an initial time (e.g., before commencement of a 3D printing process), to a measurement of the energy beam intensity at a later time (e.g., during or after a 3D printing process, during or after a layer build). The peak intensity can be detected (e.g., by a gray field detector) by directing the energy beam at one or more calibration marks (e.g., as described herein, for example, the surface 3210). In the example of FIG. 33, two curves are present, a curve 3330 corresponding to a relatively low power (e.g., 150 W) energy beam, and a curve 3340 corresponding to a relatively high power (e.g., 700 W) energy beam. At an initial time (e.g., t=0), the PIR has a value of 1. After some time has elapsed the PIR can be below 1, for example, once thermal lensing is generated in one or more optical elements and causes a reduction in the peak intensity of the energy beam. In the example of FIG. 33, after time "t1" the PIR of curve 3340 has decreased to a greater extent than the curve 3330. After time "t2" the PIR of curve 3340 has continued to decrease, which decrease is greater than the decrease depicted for curve 3330. The PIR curve of an optical element can change over time, for example, as contamination accumulates. That is, the PIR curve for an optical element can decrease at a first rate for less contaminated optics (e.g., having less debris adhered to the optical element(s)), and at a second rate for the optical element at a more contaminated condition. The term "PIR reduction" can refer to a comparison of (e.g., at least two) PIR curves for the same optical element, one curve generated at an earlier (e.g., relatively low contamination) state and a second curve generated at a later (e.g., relatively more contaminated) state. A difference between these (e.g., at least two) PIR curves is the "PIR reduction."

The energy beam footprint (e.g., 3380), the PIR (e.g., 3390), or a combination thereof can be correlated to the presence of (e.g., a degree of) thermal lensing. An optical element that is has (e.g., substantially) stable thermal lensing conditions over the 3D printing period, can have a well-maintained (e.g., nominal) focus, which can direct an energy beam to have a relatively small cross-sectional footprint at the surface. An optical element that is (e.g., substantially) devoid of thermal lensing can have a well-maintained (e.g., nominal) focus, which can direct an energy beam to have a relatively small cross-sectional footprint at the surface. An energy beam having a (relatively small) well defined cross-sectional footprint directed at a calibration-mark (e.g., 3210) can produce a relatively sharp transition in a signal generated at a detector (e.g., 3310), as the energy beam moves across an edge of the calibration-mark (e.g., from 3220 to 3230). Conversely, an optical element that exhibits a thermal lensing condition can have a less well-maintained and/or well-defined focus (e.g., a fuzzy and/or fluctuating focus). Such an optical element can alter an energy beam to become relatively unstable and/or out-of-focus (e.g., defocused), which defocused and/or unstable focused energy beam can produce a relatively gradual transition in a signal generated at a detector (e.g., 3315), as the energy beam moves across an edge of the calibration-mark. In the example of FIG. 33, the curve 3310 can correspond to the time "t1," where little or no thermal lensing is present. The curve 3315 can correspond to the time "t2," where (e.g., at least some) thermal lensing is present in one or more optical elements.

The surface (e.g., FIG. 32, 3210) can be used in the calibration of one or more characteristics of the energy beam. The calibration can comprise (i) the position at which the (e.g., irradiating) energy beam contacts a target (e.g., the target surface), (ii) the energy beam footprint on the target surface, (iii) the energy density of the of the energy beam projected to the surface, (iv) the energy profile of the energy beam across its footprint at the surface, (v) the XY offset of the energy beam with respect to the surface, (vi) the Z offset of the energy beam focus with respect to the target surface, and/or (vii) the focus of the energy beam at the surface, may vary due to thermal lensing of the at least one optical element. The calibration of the footprint may comprise calibration of the footprint area, FLS, or shape.

In some embodiments, a discrepancy in the optical setting of the optical arrangement is compensated in the 3D printing system. A discrepancy in the optical setting can be a deviation from a requested optical setting (e.g., due to thermal lensing). The requested optical setting can be a requested focal distance and/or cross section of an energy beam emerging out of the optical arrangement. The compensation may comprise: (i) adjusting one or more components of the optical arrangement (e.g., adjusting the resulting focal distance thereof), (ii) adjusting the power of the energy source, (iii) adjusting at least one characteristic of the energy beam (e.g., cross section, and/or power density), or (iv) adjusting a relative gap distance between the target surface and the optical arrangement. The gap distance may be from the last component of the optical arrangement before the target surface. Adjusting a relative gap distance may comprise adjusting a height of the target surface. For example, adjusting the height of the platform. For example, adjusting the height of an exposed surface of the material bed. For example, adjusting the height of the optical arrangement. The gap may comprise a vertical distance. The gap may be an atmospheric gap. The compensation may be controlled (e.g., manually or automatically, e.g., using a controller). The control may be before, or in real time during the 3D printing. The control may be during the 3D printing when the transforming energy beam is idle (e.g., not processing).

The presence of contaminants (e.g., as described herein) on one or more surfaces of an optical element may increase a likelihood of a thermal lensing condition for the optical element. Approaches for reducing and/or preventing a thermal lensing condition of the optical element may address the source(s) of contaminants in an environment near the optical element, and/or removal of contaminants that are already present (e.g., on the optical element). Factors that can mitigate (or conversely, aggravate) a thermal lensing condition of one or more optical elements (e.g., of a 3D printing system) comprise (i) material composition(s) of the optical element(s), (ii) environmental condition(s) in an optical path of the optical element(s), (iii) the degree of thermal variance, and/or (iv) environmental condition(s) in a vicinity of (e.g., at or near the surface of) the optical element(s). The degree of thermal variance may be correlated to the power density of the energy beam and/or time of irradiation through the optical element. Optical materials that can be characterized as having a (e.g., relatively) high thermal conductivity, a (e.g., relatively) low optical absorption coefficient, and/or a (e.g., relatively) low temperature coefficient of the refractive index (dn/dT), may exhibit a reduced thermal lensing effect (e.g., over the time required for 3D printing). A reduced thermal lensing effect can refer to a reduced change in optical behavior (e.g., compared with another optical element), and/or an increased throughput of energy prior to onset of a (e.g., measurable) thermal lensing condition.

An optical element having high thermal conductivity can be any high thermal conductivity value disclosed herein. An optical element having a low optical absorption coefficient can be at most about 10 ppm, 50 ppm, 100 ppm, 250 ppm, 500 ppm or 600 ppm per centimeter at the wavelength of the irradiating energy beam. A low temperature coefficient of refractive index can refer to an optical element that has a refractive index deviation (e.g., at the wavelength of the irradiating energy beam) of at most 2%, 5%, 8%, 10%, 12% or 15%, in a temperature range at least about 10° C. to at most about 140° C. A low temperature coefficient of refractive index can be a relative change in refractive index, for example at a temperature change from 20° C. to 100° C. at the irradiating wavelength (e.g., 1060 nm, or 1080 nm), from about $1.2*10^{-6}$/Kelvin (K) to about $2.2*10^{-6}$/K, from about $1.5*10^{-6}$/K to about $3*10^{-6}$/K, or from about $3*10^{-6}$/K to about $4.5*10^{-6}$/K, around ambient pressure (e.g., in a range from about 398 Torr to about 1182 Torr). In some embodiments, the one or more optical elements comprise a low temperature coefficient of refractive index, around ambient pressure (e.g., in a range from about 398 Torr to about 1182 Torr) and at a wavelength of the energy beam. The low temperature coefficient of refractive index may be of at most about $1.2*10^{-6}$/Kelvin, $1.5*10^{-6}$/Kelvin, $1.8*10^{-6}$/Kelvin, $2*10^{-6}$/Kelvin, $3*10^{-6}$/Kelvin, $4*10^{-6}$/Kelvin, $5*10^{-6}$/Kelvin, $6*10^{-6}$/Kelvin, $7*10^{-6}$/Kelvin, $8*10^{-6}$/Kelvin, $9*10^{-6}$/Kelvin, $10*10^{-6}$/Kelvin, $13*10^{-6}$/Kelvin, $15*10^{-6}$/Kelvin, or $20*10^{-6}$/Kelvin. The low temperature coefficient of refractive index may be of any value between the afore-mentioned values (e.g., from about $1.2*10^{-6}$/Kelvin to about $20*10^{-6}$/Kelvin, from about $1.2*10^{-6}$/Kelvin to about $5*10^{-6}$/Kelvin, or from about $5*10^{-6}$/Kelvin to about $20*10^{-6}$/Kelvin). The refractive index may be measured at a standard measurement condition (e.g., at ambient temperature, and/or R.T.). The low temperature coefficient of refractive index may be measured at ambient pressure (e.g., of one (1) atmosphere). Materials that may exhibit a reduced thermal lensing effect include calcium fluoride ($CaF_2$), magnesium fluoride ($MgF_2$), crystal quartz, sapphire, zinc selenide (ZnSe), zinc sulfide (ZnS), potassium fluoride (KF), barium fluoride ($BaF_2$), gallium arsenide (GaAs), germanium, lithium fluoride (LiF), magnesium fluoride ($MgF_2$), potassium bromide (KBr), potassium chloride (KCl), and/or crystalline silicon. The optical element having the reduced thermal lensing effect can be an optical window, a mirror, a lens, and/or a beam splitter. The optical element (having the reduced thermal effect) can comprise any of the materials exhibiting the reduced thermal lensing effect.

At times, it may be useful to define a Thermal Lensing Figure of Merit (TLFoM) measure, which is equal to dn/dT, the rate of change of refractive index with temperature (measured in units of 1/Kelvin) divided by the thermal conductivity of this material, often denoted k (measured in units of Watt/(Meter*Kelvin)) (TLFoM=(dn/dT)/k). TLFoM has units of meter/Watt. The thermal conductivity referred herein is at room temperature. The dn/dT can be at standard temperature and pressure, and at the operating wavelength of the energy beam. The at least one optical element may have a TLFoM value of at most about $0.025*10^{-6}$ meter/Watt (m/W), $0.5*10^{-6}$ m/W, $1*10^{-6}$ m/W, $2*10^{-6}$ m/W, $3*10^{-6}$ m/W, $4*10^{-6}$ m/W, $5*10^{-6}$ m/W, $6*10^{-6}$ m/W, or $7*10^{-6}$ m/W. The at least one optical element may have a TLFoM value between any of the afore-mentioned values (e.g., from about $0.25*10^{-6}$ m/W to about $7*10^{-6}$ m/W, from about $0.25*10^{-6}$ m/W to about $4*10^{-6}$ m/W, or from about $0.25*10^{-6}$ m/W to about $2*10^{-6}$ m/W).

In some embodiments, the one or more optical elements are configured to experience insignificant thermal lensing during transformation of a pre-transformed material to a transformed material. The transformation may be of at least about 100 cubic centimeters ($cm^3$), 500 $cm^3$, 1000 $cm^3$, 1500 $cm^3$, 2000 $cm^3$, 5000 $cm^3$, or 10000 $cm^3$ of pre-transformed material to a transformed material. The transformation may be of any volume between the afore-mentioned volumes (e.g., from about 100 $cm^3$ to about 10000 $cm^3$, from about 500 $cm^3$, to about 1500 $cm^3$, from about 1000 $cm^3$ to about 10000 $cm^3$) of pre-transformed material to a transformed material. The insignificant thermal lensing may be during at least a 10 second (sec), 20 sec, 30 sec, 60 sec, 90 sec, or 120 sec irradiation of the energy beam through the optical element(s). The insignificant thermal lensing may be during any period between the afore-mentioned periods (e.g., from about 10 sec to about 120 sec, from about 10 sec to about 60 sec, or from ab out 60 sec to about 120 sec) irradiation of the energy beam through the optical element(s). The power density of the energy beam (at a nominal power of the energy source) may diminish by at most about 20%, 10%, 5%, 3%, 1% or 0.5% percent relative to the power density at a beginning of the irradiation period (e.g., of 30 seconds). The power density of the energy beam (at a nominal power of the energy source) may diminish by any percentage value between the afore mentioned percentage values (e.g., from about 0.5% to about 20%, from about 0.5% to about 10%, or from about 10% to about 20%) relative to the power density at a beginning of the irradiation period (e.g., of 30 seconds). The energy density may be measured at the target surface. In some embodiments, the (e.g., peak) power density changes by at most about 30%, 20%, 10%, 5% or 1% (e.g., during the irradiation). The (e.g., peak) power density may change by any percentage value between the afore-mentioned percentage values (e.g., by from about 1% to about 30%, from about 1% to about 10%, or from about 10% to about 30%), e.g., during the irradiation. In some embodiments, the FLS of the spot size changes by at most about 20%, 15%, 10%, 5%, 3%, or 1%. The FLS of the spot size may change by any percentage value between the afore-mentioned percentage values (e.g., from about 1% to about 20%, from about 1% to about 10%, or from about 10% to about 20%). In some embodiments, the focal point of optical element(s) may shift by at most about 15 mm, 10 mm, 7 mm, 5 mm, 3 mm, 1 mm, 0.7 mm, 0.5 mm, 0.2 mm, or 0.1 mm. The shift may be in the direction along the propagation direction of the energy beam (e.g., in a direction normal to the target surface). The focal point of the optical element(s) may shift by any value between the afore-mentioned values (e.g., from about 0.1 mm to about 15 mm, from about 0.1 to about 5 mm, or from about 5 mm to about 15 mm). A wave-front distortion of the energy beam may be at most about 0.05, 0.1, 0.2, 0.25, 0.5, 0.75, or 1 wavelength of the energy beam. A wave-front distortion of the energy beam may be of any wavelength fraction between the afore-mentioned energy beam wavelength fractions (e.g., from about 0.05 to about 1, from about 0.05 to about 0.5, or from about 0.5 to about 1).

An approach to mitigating a thermal lensing condition (e.g., reducing a magnitude and/or onset thereof) may comprise heating a portion of the optical element. Heating one or more portions of the optical element may maintain the heated optical element at an optically stable lensing condition. Heating one or more portions of the optical element may reduce optical fluctuations of the heated optical element during lensing. Heating one or more portions of the optical element may decrease a temperature gradient within a bulk of or at the surface of an optical element. In some embodiments, a (e.g., secondary) heating (e.g., irradiation) source is operatively coupled to (e.g., contacts or directed at) the optical element, such that heat and/or irradiation from the secondary heating source heats one or more portions of the optical element that are adjacent to a (e.g., central) portion through which the irradiating energy beam (e.g., transforming energy beam) travels. In some embodiments, a heating element is operably coupled with the optical element, the heating element configured to heat the optical element (via direct or indirect contact) to raise an overall temperature thereof. The heating element may be passive or active. The active heating element can comprise a fluid-filled body (e.g., a coil) disposed adjacent to the optical element. A heating element can comprise heated (e.g., filtered) gas directed at the optical element. The heating element may heat by conduction and/or convection. The (e.g., passive) heating element can comprise a (e.g., resistive) heating plate or coil disposed adjacent to the optical element. The overall temperature of the optical element may be raised to at least about 45° C., 60° C., 75° C., 90° C., 110° C., or 125° C. In some embodiments the optical element is raised to at most about 125° C., 110° C., 90° C., 75° C., 60° C., or 45° C. The optical element may be raised to a temperature between (inclusive) any of the afore-mentioned values, for example, between 45° C.-125° C., between about 45° C.-90° C., or between about 90° C.-125° C.

Contaminants in the vicinity (e.g., on a surface) of the optical element can lead to an onset of and/or increase in a thermal lensing condition for the optical element. As described herein, contaminants (e.g., debris comprising reactive gas, oxidizing agent, atmospheric dust, silicon-based compounds, organic compounds (e.g., hydrocarbons), pre-transformed material, or soot,) can form a coating on one or more surfaces of the optical element. A coating can absorb radiation from an irradiative energy source and thereby heat a surface and/or bulk material of the optical element, leading to (e.g., onset of) a thermal lensing condition.

In some embodiments, an optical path environment that is maintained to be (e.g., substantially) free from contaminants (e.g., clean optical path) reduces the incidence of a thermal lensing condition in one or more optical elements. One manner of maintaining a clean optical path (e.g., cleaner than in a processing chamber) can be to isolate the optical elements (and any ancillary structures, such as support structures) along the optical path from an exterior (e.g., external) atmosphere. An exterior atmosphere can be an ambient atmosphere. An exterior atmosphere can be an atmosphere in a processing chamber of a 3D printing system (e.g., when the optical elements are comprised in an enclosure). Isolation can comprise disposing the optical element(s) in an optical chamber. Isolation can take the form of (e.g., enclosure) channel(s) that surround and enclose the elements along the optical path, e.g., in the optical chamber. The channels can be covered channels (e.g., tubes). Isolation can take the form of a sealed optical chamber. The sealed optical chamber can isolate the optical element in terms of gas and/or radiation. Isolation can comprise maintaining a positive pressure in the isolation component(s) (e.g., the enclosure channel(s), the optical chamber). For example, the pressure in the area enclosing the isolation component(s) may be at a positive pressure with respect to the ambient pressure. At times, a gas flow pressure within the isolation component(s) and the pressure directly adjacent to the isolation component(s), may be different. The raised pressure may be at least about 0.5 pounds/inch$^2$ (psi), 1 psi, 2 psi, 3 psi, 4 psi, 5 psi, 6 psi, 7 psi, 8 psi, 9 psi, or 10 psi above the ambient pressure. The raised pressure may be any value between the afore-mentioned values, for example, from about 0.5 psi to about 10 psi, or from about 0.5 psi to about 5 psi. The raised pressure may be the pressure directly adjacent to the isolation component(s). The raised pressure may be the average pressure in the isolation component(s). Isolation can comprise maintaining an atmosphere that is filtered (e.g., using one or more filtration devices coupled to intake and/or exit outlets). The gas intake and/or exit outlets may be coupled to the optical chamber and/or to the channel(s). Gas flow exiting a gas outlet of the optical chamber can include solid and/or gaseous contaminants such as debris. In some embodiments, a filtration system filters out at least some of the solid (e.g., debris) and/or gaseous contaminants, thereby providing a clean gas (e.g., cleaner than gas flow outside of the optical path environment). The filtration system can include one or more filters. The filters may comprise oil filters, particulate filters (e.g., HEPA filters), humidity filters or chemical filters (e.g., column). Monitoring filter performance can include one or more sensors (e.g., an optical sensor, and/or a chemical sensor,) configured to detect a corresponding sensate (e.g., particulates, humidity, carbohydrates and/or silicates) present in the optical path environment. The optical sensor may comprise optical density sensor, spectroscopy sensor, IR sensor, Visible light sensor, or UV light sensor). The chemical sensor may sense metal, oxygen, humidity, carbohydrates, or silicates. The chemical sensor may sense oil. Isolation can comprise maintaining an atmosphere of a (e.g., substantially inert and/or clean) gas composition (e.g., comprising clean air, argon gas, or nitrogen gas).

In some embodiments, enclosure channel(s) that surround and enclose the elements along the optical path comprise at least one of opening (e.g., holes, slits, vents, perforations). The opening may allow gas from within the enclosure channel(s) to exit therethrough (e.g., via positive pressure maintained within the enclosure channel(s) with respect to outside the enclosure channel(s)). The holes may be disposed at locations along the enclosure channel(s) that are removed from (e.g., not adjacent to) an optical element. Thus, (I) the gaseous atmosphere in a vicinity of the optical element(s) may be maintained at a condition of lower turbulence with respect to the atmosphere in the vicinity of the opening and/or (II) any contaminants that are present within the enclosure channel(s) may be less likely to contact and/or adhere to the optical element(s).

In some embodiments, enclosure channel(s) comprise (e.g., at least two) segments joined by a (e.g., at least partially) mis-fitting seal, which mis-fitting seal comprises at least one seal surface having a controlled leak path. The (controlled leak path) mis-fitting seal may be referred to herein as "leaky" (e.g., a leaky seal). The leaky seal may allow gas from within the enclosure channels to exit therethrough (e.g., via positive pressure maintained within the enclosure channels with respect to outside the enclosure channels). The mis-fitting seal(s) may be disposed at locations along the enclosure channels that are remove from (e.g., not adjacent to) the optical element(s). In this manner the gaseous atmosphere in a vicinity of the optical element(s) may be maintained at a condition of lower turbulence with respect to the atmosphere in the vicinity of the leaky seal(s). Any contaminants that are present within the enclosure channels may be less likely to contact and adhere to the optical element(s) when a path of travel to an exit of the enclosure tubes (e.g., a leaky seal) is not adjacent to an optical element. Clean gas may be provided to the enclosure (e.g., to a sealed optical enclosure, and/or to enclosure channels comprising the opening and/or the leaky seals). Clean gas may be provided by means of an inlet and/or outlet port, one or more filters, a pump, inert gas(es), or a combination thereof. "Clean gas" may refer to a gas that is cleaner (e.g., has a lower concentration of contaminants) than an exterior of the enclosure tube.

FIG. 34A depicts an example of a portion of a 3D printing system comprising an optical system 3410 configured to direct irradiating energy from an energy source 3406 to travel between mirrors 3405 and 3408 along a beam path 3407, the beam path continuing down 3417 through an optical window 3404. FIG. 34B depicts an example of an energy beam following a beam path 3418 in an optical system, through an optical window 3414, to a position on a target surface 3402 (e.g., exposed surface of a material bed). The optical window may comprise a coating and/or a filter, forming a modified irradiating energy beam (e.g., FIG. 34B, along path 3413). In the example of FIG. 34A, an enclosure channel 3409 surrounds and/or encloses the optical elements (e.g., 3404, 3405, and 3408), including the entry point of the irradiating energy beam from the energy source. In the example of FIG. 34A, the enclosure tube 3409 comprises a section 3411 having a plurality of openings 3421, and a mis-fitting seal 3412 comprising a leaky region 3422. In the example FIG. 34A, magnified regions corresponding to 3411 and 3412 depict arrows representing a flow of gas within the enclosure tube (e.g., exit flow out of the openings and leaky seal, respectively).

Figure 35A:
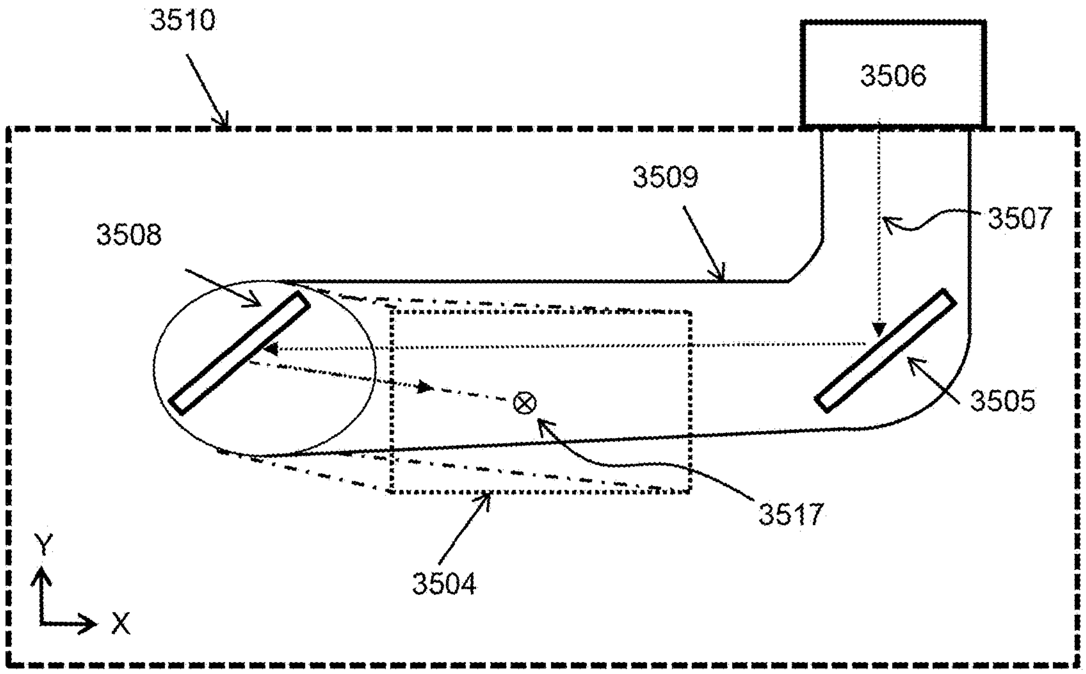
FIG. 35A-35B schematically illustrate various 3D printer components.
Figure 35B:
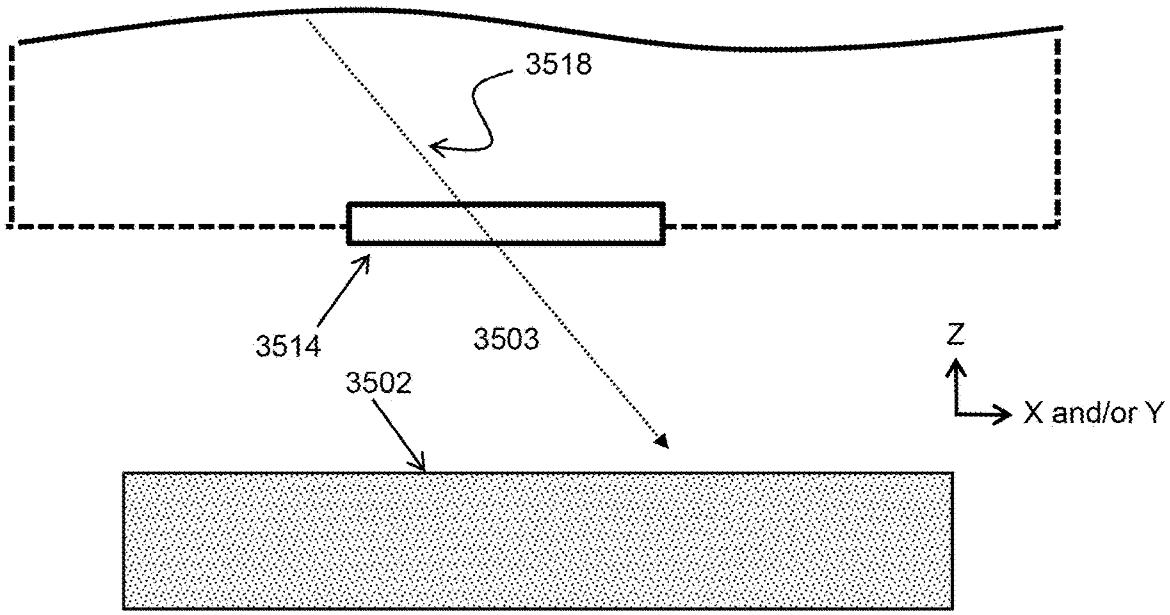

In some embodiments, an optical enclosure (e.g., fully) encompasses an optical system of a 3D printing system. FIG. 35A depicts an example of (e.g., a portion of) a 3D printing system comprising an optical system configured to direct irradiating energy from an energy source 3506 to travel between mirrors 3505 and 3508 along a beam path 3507 (e.g., enclosed by tube 3509), the beam path continuing down 3517 through an optical window 3504. FIG. 35B depicts an example of an energy beam following a beam path 3518 in an optical system, through an optical window 3514, to a position on an exposed surface 3502 (e.g., of a material bed). The optical window may comprise a coating and/or a filter, forming a modified irradiating energy beam (e.g., FIG. 35B, along path 3503). In the example of FIG. 35A an optical enclosure 3510 surrounds and/or encloses the optical elements (e.g., 3504, 3405, 3508 and 3409), including the entry point of the irradiating energy beam from the energy source. The optical enclosure can completely enclose and/or surround the (e.g., totality of) optical elements of the optical system, forming a (e.g., substantially) isolated environment within the optical enclosure. The optical enclosure can be maintained at a positive pressure, such that atmospheric gases at a surrounding area of the optical enclosure (e.g., within a processing chamber and/or within an ambient environment) do not enter the environment of the optical enclosure. The optical enclosure can include an (e.g., at least one) inlet port and an (e.g., at least one) outlet port configured for gas exchange. The optical enclosure can comprise any filtration system, e.g., as described herein. One or more filters of the filtration system can be disposed adjacent to the inlet port, the outlet port, or a combination thereof. The optical enclosure can comprise one or more sensors, e.g., configured to detect particulates and/or other material (e.g., contaminants). The sensors can be any sensors described herein. One or more contaminant sensors can be disposed at the inlet port, the outlet port, in proximity (e.g., adjacent) to one or more optical elements, or a combination thereof. The gas flow, filtration system, or any components thereof (e.g., pumps, sensors, filters, and controllers) can be any of those described in patent application serial number PCT/US17/60035 that is incorporated herein by reference in its entirety.

A source of contaminants may be the processing chamber of the 3D printing system. While optical elements in an optical system may be isolated (e.g., via a sealed enclosure, and/or enclosure tubes) and maintained in a substantially clean environment, one or more optical elements (e.g., an optical window) may remain at least partially exposed to an external environment (e.g., with respect to the optical system environment, for example, a processing chamber). An optical window may serve as an interface between an optical system and a processing chamber in a 3D printing system. A processing chamber of a 3D printing system may comprise contaminants (e.g., debris), which contaminants can travel and adhere to an optical element (e.g., an optical window), increasing a likelihood of a thermal lensing condition for the optical element. In some embodiments a (e.g., clean) gas can be directed toward an optical element, to provide gas purging (i) of optical element area and/or (ii) to protect the optical element area from debris. Systems for gas flow and/or gas purging can be any systems as disclosed in patent application number PCT/US17/60035 that is incorporated herein by reference in its entirety. Gas purging of an optical element (e.g., optical window) can dislodge particles (e.g., contaminants) that are present at a surface of the optical element, and/or form a (e.g., moving gas) barrier to contaminants that would otherwise be coming into contact with the optical element. In some embodiments, a pressurized clean gas is filtered through a filter (e.g., one or more HEPA filters), e.g., prior to reaching the optical element (e.g., optical window). In some embodiments, the one or more filters are configured to filter out particles having nanometer-scale (e.g., from about 10 nanometers (nm) to about 2000 nm) diameters.

Figure 36:
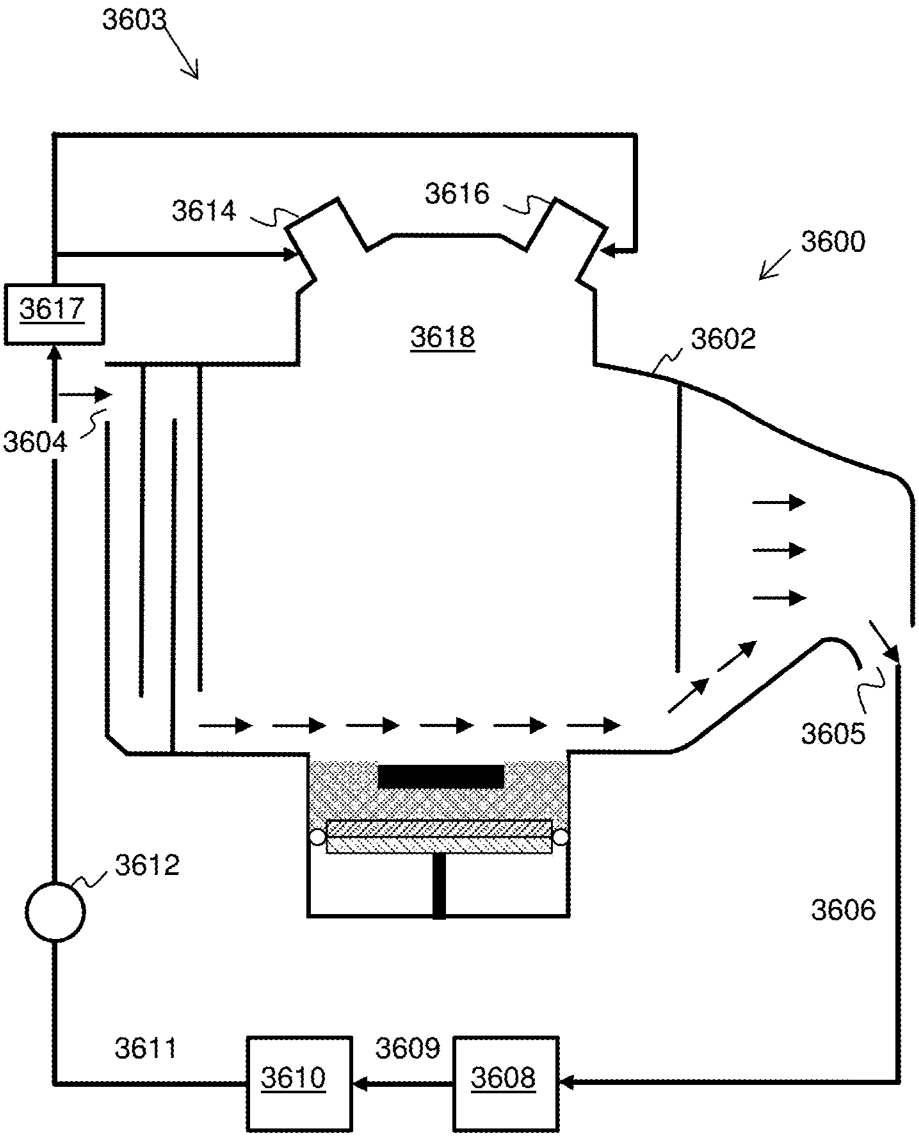
FIG. 36 schematically illustrates a side view of various 3D printer components.

In some embodiments, a 3D printing system includes, or is operationally coupled to, one or more gas recycling systems. FIG. 36 shows a schematic side view of an example 3D printing system 3600 that is coupled to a gas recycling system 3603 in accordance with some embodiments. 3D printing system 3600 includes processing chamber 3602, which includes gas inlet 3604 and gas outlet 3605. The gas recycling system (e.g., 3603) of a 3D printing system can be configured to recirculate the flow of gas from the gas outlet (e.g., 3605) back into the processing chamber (e.g., 3602) via the gas inlet (e.g., 3604). Gas flow (e.g., 3606) exiting the gas outlet can include solid and/or gaseous contaminants. In some embodiments, a filtration system (e.g., 3608) filters out at least some of the solid and/or gaseous contaminants, thereby providing a clean gas (e.g., 3609) (e.g., cleaner than gas flow 3606). The filtration system can include one or more filters. The filters may comprise HEPA filters or chemical filters. The clean gas (e.g., 3609) exiting the filtration system can be under relatively low pressure, and therefore can be directed through a pump (e.g., 3610) to regulate (e.g., increase) its relative pressure prior to entry to the processing chamber and/or optical chamber. Clean gas (e.g., 3611) with a regulated pressure that exits the pump can be directed through one or more sensors (e.g., 3612). The one or more sensors may comprise a flow meter, which can measure the flow (e.g., pressure) of the pressurized clean gas. The one or more sensors may comprise temperature, humidity, oil, or oxygen sensors. In some cases, the clean gas can have an ambient pressure or higher. The higher pressure may provide a positive pressure within the processing chamber (see example values of positive pressure described herein). A first portion of the clean gas can be directed through an inlet (e.g., 3604) of a gas inlet portion of the enclosure, while a second portion of the clean gas can be directed to first and/or second window holders (e.g., 3614 and 3616) that provide gas purging of optical window areas, as described herein. That is, the gas recycling system can provide clean gas to provide a primary gas flow for the 3D printing system, as well as a secondary gas flow (e.g., window purging). In some embodiments, the pressurized clean gas is further filtered through a filter (e.g., 3617 (e.g., one or more HEPA filters)) prior to reaching one or both of the window holders. In some embodiments, the one or more filters (e.g., as part of filters 3617 and/or filtration system 3608) are configured to filter out particles having nanometer-scale (e.g., about 10 to 500 nm) diameters. In some embodiments, the gas recycling system alternatively or additionally provides clean gas to a recessed portion (e.g., 3618) of the enclosure.

In some embodiments, a 3D printing system comprises a controller configured to generate an alert, message, and/or to initiate a purging and/or cleaning cycle in response to detecting a thermal lensing condition. A thermal lensing condition can be determined (e.g., to be present) based on one or more characteristics of the irradiating energy beam. The alert, message, initiated cleaning cycle and/or purging cycle may be based on a threshold level of thermal lensing. A threshold level of thermal lensing may correspond with a (e.g., change in) spot size of the beam at the target surface. The change may be referenced against a nominal (e.g., benchmark, controlled) value. For example, a threshold change in a spot size of the irradiating energy beam at the target surface may be a change of 50 microns, 100 microns, or 150 microns. The optical element may be maintained at a requested temperature by purging gas. For example, a cooling gas or heating gas. For example, a gas at a high temperature, or a gas at a low temperature.

In some embodiments, a 3D printing system comprises an apparatus (e.g., coupled with an optical element) to perform a cleaning cycle. The apparatus may be configured for dislodging and/or preventing contaminants from being adhered to a surface of the optical element. The apparatus for dislodging can comprise an ultrasonic transducer, an ionized gas flow, or a combination thereof. An ultrasonic transducer may induce a vibration in the optical element such that a contaminant particle has a reduced likelihood of binding to a surface of the optical element. For example, a vibration of the optical element may reduce a time (e.g., duration) in which the contaminant particle comes into contact with a surface of the optical element. For example, a vibration of the optical element may increase a binding energy required for the contaminant particle to bind to a surface of the optical element. An ionized gas flow can ionize the debris and/or surface of the optical element to prevent adhesion of the debris to the surface of the optical element (e.g., by mutual repulsion that is induced by the ionized gas). An ultrasonic transducer can be controlled to operate at one or more frequencies, and/or one or more magnitudes (e.g., amplitudes) of vibration. An electrical bias circuit can be controlled to generate one or more electric field magnitudes (e.g., a voltage at a surface at an optical element), at one or more electric field polarities. Control can be manual and/or automatic control. The control can be in response to a detected contaminant condition (e.g., based on one or more contaminant sensor measurements, as described herein). A detected contaminant condition may comprise contaminants detected at a surface of the optical element, in the optical chamber, and/or in the channel(s) (e.g., via an optical density measurement). A detected contaminant condition may comprise contaminants detected (e.g., at a threshold level) within an environment in a vicinity of the optical element (e.g., in a processing chamber, and/or an optical enclosure).

Figure 37:
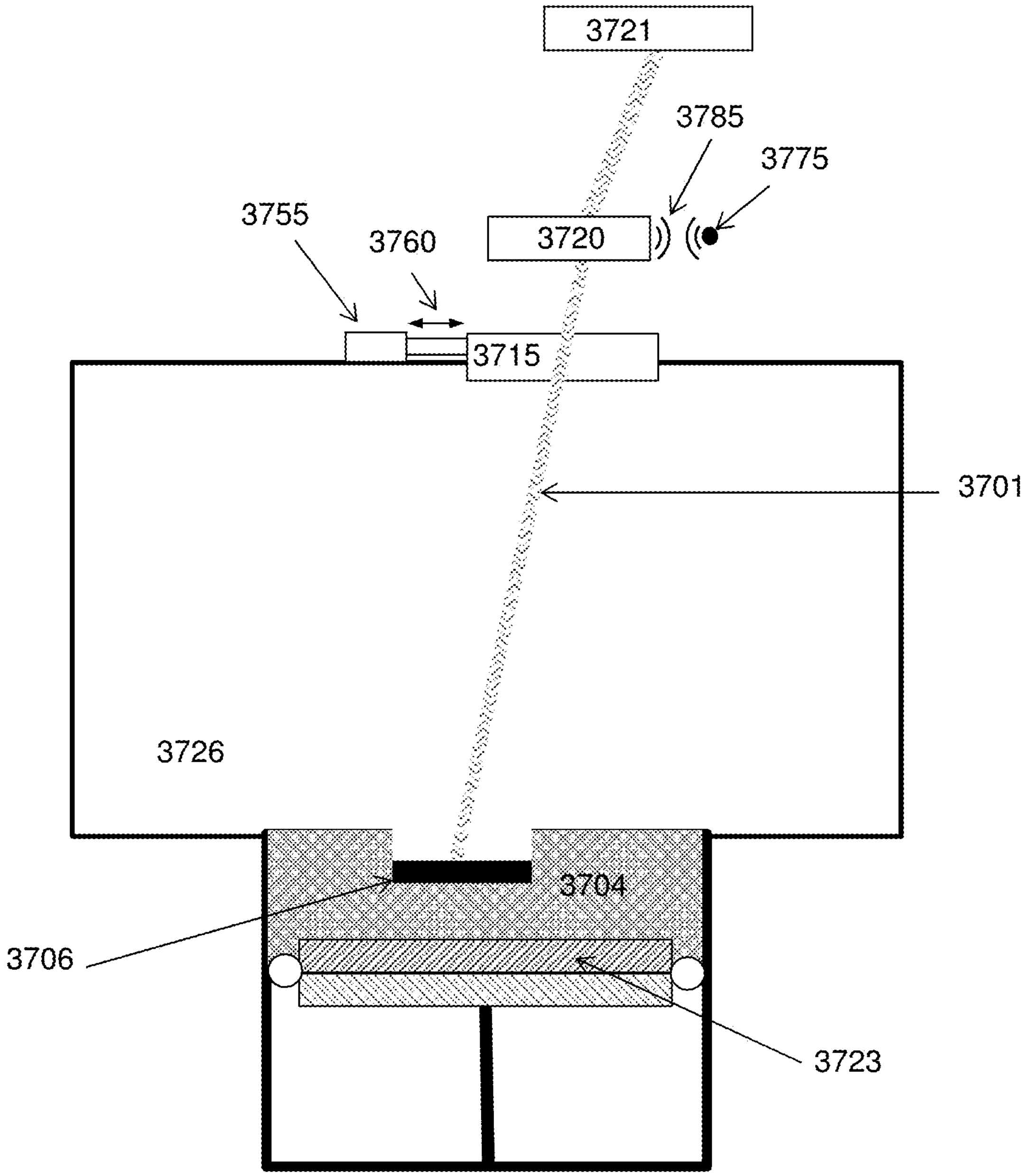
FIG. 37 schematically illustrates a side view of various 3D printer components.

FIG. 37 shows an example of an (e.g., processing chamber) enclosure comprising an atmosphere 3726, in which an irradiating energy (e.g. energy beam) 3701 travels. The energy beam 3701 is generated by an energy source 3721, travels through an optical mechanism (e.g., a scanner) 3720, and an optical window 3715, towards a material bed 3704 disposed on a platform (e.g., base 3723). As the irradiative energy irradiates and travels along the material bed 3704, it may form at least a portion of a 3D object (e.g., 3706). In the example of FIG. 37, an ultrasonic transducer 3755 is coupled with (e.g., via vibrational element 3760) the optical window 3715. In some embodiments, an optical window may be induced to vibrate via activation of the ultrasonic transducer (e.g., mediated by a vibrational element). In the example of FIG. 37, an ionized gas flow ionizes (i) an exposed surface of an optical element of the scanner 3720 to generates an electric charge (schematically show as) 3785 and (ii) an exposed surface of a debris particle 3775 with a similar electrical charge type, which repel each other (being of the same type). At times, a vibrating optical element (e.g., optical window) and/or an optical element having an electric charge (due to ionization) may repel contaminant particles.

At times, it is beneficial to characterize at least one component of an optical setup. For example, it may be beneficial to characterize the thermal response of the at least one component of the optical setup (e.g., thermal lensing characteristics). The thermal response of the at least one component of the optical setup may affect the focal point of the energy beam traveling through the at least one component of the optical setup. In some embodiments, the characterization of the at least one component of the optical setup may be used as a benchmark to ascertain a status of the optical setup at a given time (e.g., in terms of thermal lensing). Ascertaining the status of the at least one component of the optical setup may be in real time during the printing, e.g., during operation of the transforming energy beam.

In some embodiments, a detector is configured to measure the footprint of an energy beam traveling through the at least one component of the optical setup, which footprint is on a target surface. The detector may measure the footprint directly (e.g., using an imaging technique, e.g., a high-resolution (e.g., CCD) camera), or indirectly. Indirect measurement of the footprint may comprise (i) measuring the thermal signal of the energy beam on the target surface, (ii) measuring the power density of the energy beam at the target surface, or (iii) measuring the beam profile at the target surface. The detector may have direct or indirect view of the footprint. The detector may use the optics of the transforming energy beam (e.g., a bore-sight detector). The detector may use a different optical path (e.g., non-direct imaging), for example, by using an imager such as a camera.

In some embodiments, a characterization of the at least one component of the optical setup in non-thermal lensing regime comprises irradiating a steady pulse (e.g., a tile) on a position on a target surface (e.g., on a target structure) at several known focal positions (e.g., various beam spot sizes) and measuring the signal (e.g., intensity thereof). Such a measurement may result in a relationship between beam intensity and spot size that is characteristic for the at least one component of the optical setup, which may be represented in a graph form (e.g., FIG. 39A). The steady pulse may comprise a stationary or a substantially stationary irradiation at a position for a period. Substantially stationary may comprise a back and forth movement of the energy beam (e.g., a pendulum movement) about a position, which movement span is smaller than the FLS of the energy beam footprint. The period can be at least about 50 microseconds (μsec), 100 μsec, 500 μsec, 1 milliseconds, 50 msec, or 90 msec. The period can be at most about 100 μsec, 500 μsec, 1 milliseconds (msec), 10 msec, 25 msec, 50 msec, or 100 msec. The period can be between any of the aforementioned period time spans (e.g., from about 50 μsec to about 100 msec, from about 50 μsec to about 25 msec, or from 10 msec to about 90 msec). The power density of the energy beam may be chosen to not invoke (e.g., substantial) thermal lensing in the at least one component of the optical setup. The power density of the energy beam may be any power density described herein. The target structure may comprise any geometric shape (e.g., as described herein).

In some embodiments, thermal response of the at least one component of the optical setup may be characterized. The characterization of the at least one component of the optical setup may comprise choosing a known focal point (corresponding to a known spot size), and inducing a thermal response in the at least one component of the optical setup in a controlled manner. The characterization may further comprise measuring the spot size of the energy beam on the target surface as a function of time (e.g., as the thermal effect progresses in the at least one component of the optical setup). Inducing the thermal response may comprise irradiating a first area (e.g., serpentine starting from position 3925) for a first period that is sufficient to induce a thermal response. Measuring the spot size may comprise moving the energy beam to a second area (e.g., 3927) distant from the first area, and detecting the footprint of the energy beam on the second area. In some embodiments, the distant between the second area and the first area should be sufficiently large that the second area is not (detectibly) thermally affected by heating of the first area during irradiation by the energy beam. In some embodiments, irradiating to induce a thermal response in the optical element(s) is on a first calibration structure, and measuring the spot size is on a second calibration structure that is different from the first calibration structure. The power of the energy source may be held constant during the measurement. The first measurement may be when the at least one component of the optical setup is cold (e.g., devoid of thermal lensing). The second measurement onwards may be when the at least one component of the optical setup experiences thermal lensing. FIG. 39B shows an example of an experimental setup comprising an energy source 3921 irradiating an energy beam 3923 on a target structure 3926 at position 3925 following a serpentine path, and a measurement position 3927, from which radiation 3924 is emanating and captured by a detector 3922. FIG. 39B shows also an example of an optional target structure 3929 having a measurement position 3928, and an irradiation position around it (e.g., 3931). The target structure may be in a material bed (e.g., 3930). In some embodiments, the thermal lensing status of the at least one component of the optical setup may be measured and identified in real time, once it characterized optically (in terms of spot size and power density) and thermal response. In response to the identification, measures may be taken in response to a deviation from the requested spot size and power density. The identification may be used by quality assurance. A maintenance procedure may be initiated (e.g., cooling the at least one component of the optical setup). At least one characteristic of the energy beam may be altered (e.g., increase energy source power, alter focus, alter translation speed). The alteration may be a dynamic alteration (e.g., dynamic compensation for the thermal lensing). The measure taken may be controlled (e.g., manually and/or automatically, e.g., by at least one controller), during and/or after the 3D printing.

In some embodiments, one or more calibration structures are used in conjunction with a (e.g., thermal) detector to characterize one or more optical elements at varied conditions (e.g., energy density, power, focus, pulse frequency, wavelength) of an energy source. The relative positions of the calibration structures may vary among each other, relative to the center of the platform (e.g., to calibrate the energy beam along the platform. The characterization can include a trajectory (e.g., path), footprint (e.g., its area, shape (e.g., astigmatism), size, and/or focus), power per unit area, fluence, Andrew Number, hatch spacing, scan speed, scan direction, charge, and/or an irradiating energy beam. Characterization of the one or more optical elements can be based on (i) the measured irradiating energy beam characteristics, and/or (ii) when the energy source and the irradiating energy beam are operated in a controlled manner for calibration (e.g., compared against a benchmark). An optical element benchmark operation can occur before, during and/or following a 3D printing process (e.g., a build cycle). An optical element benchmark operation can comprise irradiating one or more calibration structures for a predetermined time. Irradiating for a predetermined time can comprise a plurality of times (e.g., at least about 1 second (sec), 2 sec, 4 sec, 8 sec, 16 sec, 32 sec, 64 sec, 128 sec or 256 sec). Irradiating for a predetermined multiplicity of times can comprise at most about 256 sec, 128 sec, 64 sec, 32 sec, 16 sec, 8 sec, 4 sec, 2 sec, or 1 sec. Irradiating for a predetermined time can be in between any of the aforementioned times (from about 1 sec to about 256 sec, from about 1 sec to about 64 sec, or from about 64 sec to about 256 sec).

The irradiating energy may be continuous or pulsing. The irradiating energy may be projected onto one or more positions of the one or more calibration structures. The irradiating energy beam may follow on a path (e.g., a predetermined path) along the one or more calibration structures. The path may be confined to one calibration structure. The path may include several (e.g., at least two) calibration structures. For example, a first irradiation can be made on a first calibration structure, a second irradiation (e.g., following the first) can be made on a second calibration structure, and a third irradiation can be made on a third calibration structure. There can be at least 1, 2, 3, 4, 5, 6, 7, 8, 9, or 10 calibration structures. In some embodiments, at least two of the calibration structures are different. In some embodiments, at most two of the calibration structures are similar. One or more (e.g., at least one) calibration structure may be maintained at a (e.g., substantially) controlled condition (e.g., benchmark condition). The controlled condition can be different from an ambient condition. The controlled condition can comprise a controlled temperature and/or pressure. The controlled condition can be maintained before, during and/or after irradiation from the irradiating energy beam. The controlled condition can be maintained by limiting the energy flux transmitted from the irradiating energy beam. Limiting the energy flux can include controlling a dwell time, average energy density, pulse duration, and/or cross-sectional footprint of the irradiating energy beam on the benchmark calibration structure. The irradiation can be for a specified time (e.g., a dwell time) at a given (e.g., at least one) location of the calibration structure. The dwell time on the benchmark calibration structure can be fixed (e.g., the same for multiple irradiated positions). The dwell time on the benchmark calibration structure can vary (e.g., varied for multiple irradiated positions). The irradiating can be at a controlled focus. The controlled focus can (e.g., controllably) change during the plurality of times (e.g., at different irradiated positions). A dwell time for the (e.g., at least two) different calibration structures can be the same. A dwell time for the different calibration structures can be different. At least one (e.g., two or more) calibration structures can vary from the controlled condition. Varying from the controlled condition can comprise a temperature and/or pressure that is at, above, or below an ambient temperature and/or pressure. The one or more calibration structures varying from the controlled condition can be caused by the irradiating energy beam (e.g., via heating).

In some embodiments, the thermal lensing characteristic of an optical element may be characterized using a benchmark structure. In some embodiments, the characteristics of the energy beam (as affected by thermal lensing) may be characterized using a benchmark structure. The characterization may be done before a printing operation (e.g., before formation a layer of transformed material), or before a print cycle. The characterization may be done in real-time during the printing. A detector can generate one or more signals, which can characterize (e.g., via a graphical representation) one or more characteristics of the energy beam. The characteristics may (in turn) correspond to one or more benchmark condition(s) of the benchmark calibration structure. The calibration can include characterization of one or more (e.g., calibration structure) thermal emissions captured by a detector before, during, and/or after directing the irradiating energy at one or more calibration structures. For example, a benchmark calibration curve can be generated, which curve represents a magnitude (e.g., intensity) of the detected (e.g., thermal) signal of irradiated positions of the benchmark calibration structure as a function of the irradiating energy beam spot size. At times, each irradiated position may be equidistant from another irradiated position (e.g., when using a pulsing energy beam). The detector may have a field of view such that only one irradiated position is measured at a given time. A focal plane of the detector may coincide with a surface (e.g., a top surface) of the calibration structure. The detector may be stationary or mobile (e.g., having a known trajectory). A timing of the detector signal capture, and a spacing of the irradiated position(s), may be coordinated such that a detector measurement does excludes a signal from more than one irradiated position. For example, irradiated positions may be spaced such that heat diffusing from a first irradiated position does not have sufficient time to reach a (e.g., thermal) detector field of view of a second irradiated position, prior to the detector measurement of the second irradiated position. A spacing between irradiated positions can depend upon one or more characteristics of the irradiating energy beam (e.g., energy source power, energy beam spot size), and/or material properties (e.g., thermal diffusion coefficient) of the benchmark structure. For example, a benchmark dwell time of an irradiated position may be 0.5-2 ms, a benchmark spot size may be 500 microns (e.g., in diameter), a (e.g., benchmark) spacing between irradiated positions on the benchmark calibration structure may be 2000 microns, and an interval between successive irradiated positions on the benchmark calibration structure can be 2 ms, for a benchmark structure made of a high melting temperature metal, such as Tungsten and/or Tantalum. The benchmark structure and/or target structure may be formed from a high melting point material. The high melting point material may have a melting temperature of at least about 1500° C., 2000° C., 2500° C., 3000° C., 3200° C., 3400° C., or 3500° C., at ambient pressure. The high melting point material may have a melting temperature between any of the afore-mentioned melting temperatures, at ambient pressure (e.g., from about 1500° C. to about 3500° C., from about 2000° C. to about 3500° C., or from about 2500° C. to about 3500° C.). The benchmark and/or target structure may comprise an elemental metal, metal alloy, ceramic, salt, or an allotrope of elemental carbon. The benchmark and/or target structure may comprise an oxide. In this manner a plurality of the irradiated position(s) can be isolated (e.g., experience no heating effect) from prior irradiated positions of the benchmark calibration structure, and detected measurements thereof may be solely representative of the state of the optical element and/or the energy imparted by the irradiating energy beam at a given irradiated position.

Figure 39A:
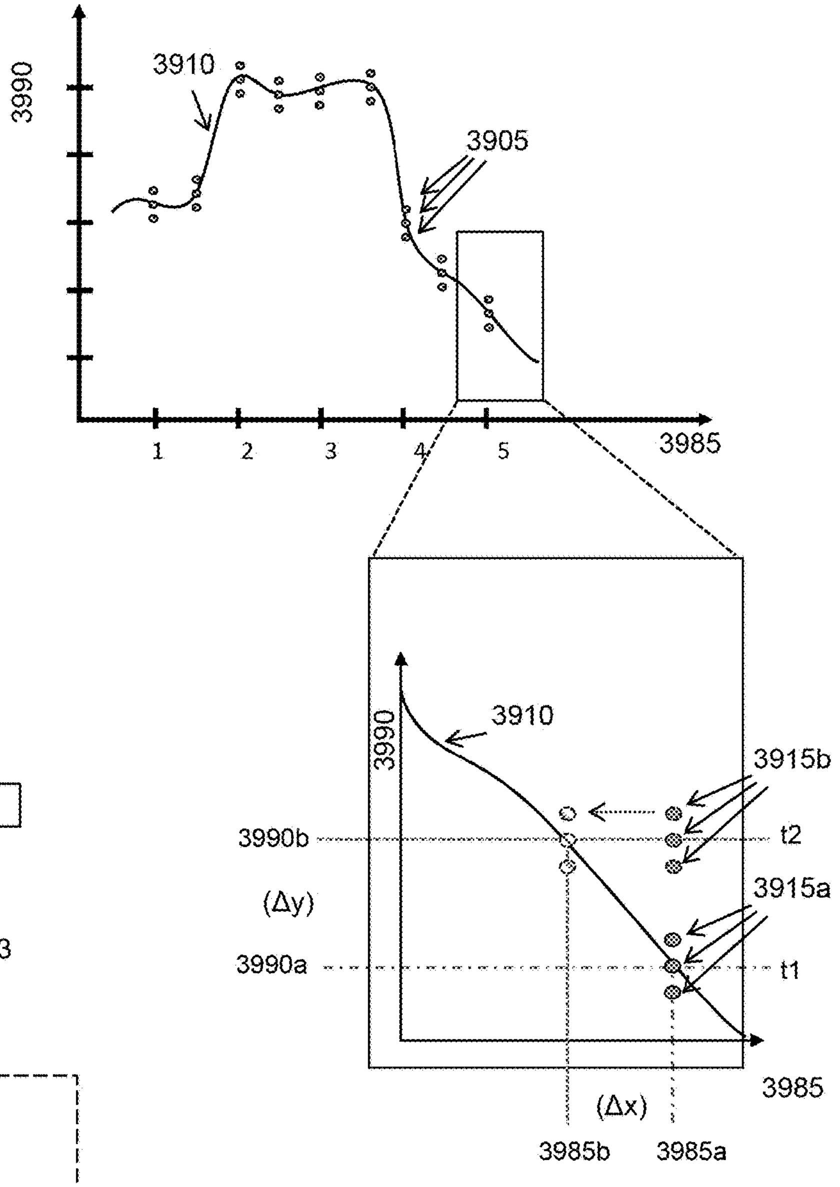
FIG. 39A schematically illustrates a graph used for calibration.
Figure 39B:
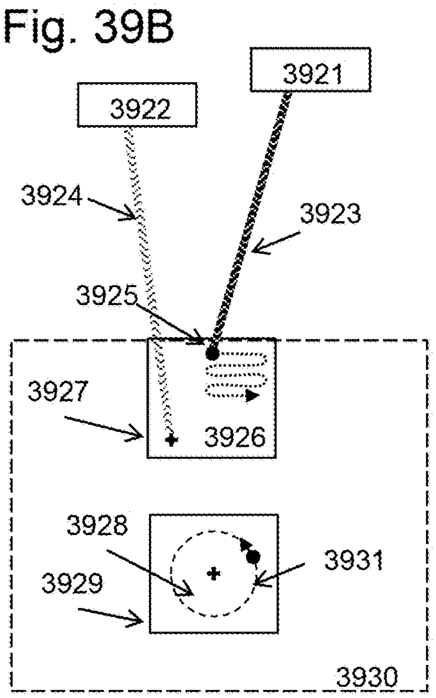
FIG. 39B schematically illustrates a setup used for calibration.

FIG. 39A shows an example of a calibration curve 3910 having detected intensity 3990 as a function of irradiating energy beam spot size (e.g., cross-sectional area at the benchmark calibration structure surface) 3985. Irradiating energy beam spot sizes (e.g., a diameter thereof) can range from maximally focused (e.g., a minimal waist of the energy beam) to maximally defocused. For example, irradiating energy beam spot size can range from about 50 microns to about 1500 microns. The benchmark detector intensity value for a given spot size can be generated by (e.g., an average value of) a plurality of measurements of the benchmark calibration structure in the benchmark condition(s). In the example of FIG. 39, three measurements 3905 are taken at each of spot sizes 1-5, with curve 3910 passing through the average value of the measurements at each spot size.

The benchmark calibration curve can provide a baseline operation characterization of one or more (e.g., all) optical elements in an optical system (of a 3D printing system). The baseline characterization can represent the performance of the optical element(s) at one or more nominal conditions (e.g., a condition devoid of thermal lensing). The benchmark calibration curve can be used in a process of monitoring a state (e.g., a condition thereof, for example, a magnitude of thermal lensing) of the optical element(s) via the measured one or more irradiating energy beam characteristics, for example, during, before, and/or after a 3D printing process. For example, one or more measurements of the irradiating energy beam using the benchmark calibration structure and the heating irradiation structure(s) can be used to monitor a (e.g., measured) spot size of the irradiating energy beam compared against a controlled (e.g., nominal) spot size of the irradiating energy beam. As described herein, an optical element in a thermal lensing condition will focus radiation passing therethrough in an altered manner (e.g., will have an altered focus). By comparing (i) a (e.g., thermal) detected signal generated by the irradiating energy beam at a given condition incident on the benchmark calibration structure (e.g., during and/or after a 3D printing process), against (ii) a benchmark calibration curve comprising the expected signal from the irradiating energy beam at the given condition, any change in the irradiating energy beam (e.g., from a nominal, benchmark condition) may be monitored (e.g., in real time). The measurement rate may be from about 0.1 KHz to about 10000 KHz, from about 0.1 KHz to about 1000 KHz, or from about 1000 KHz to about 10000 KHz. The change may be a change in the focal distance of a (e.g., at least one) optical element. The change may be quantified, for example, by the magnitude of change in the detected signal at the given condition, with respect to the expected signal at the benchmark calibration condition. The (e.g., quantified) change may be used to control one or more characteristics of the irradiating energy beam (e.g., in real time or before the printing), such as the beam spot size at the target surface. A thermal lensing condition can be determined (e.g., to be present) based on the quantified change in the detected signal. A thermal lensing condition can be qualified as a variance from a requested energy beam characteristic, e.g., a change in a requested beam spot size at the target surface (e.g., a threshold level change in beam spot size, e.g., as described herein). Based on the detected change in the irradiating beam, a position of one or more optical elements may be adjusted to vary the cross-section of the transforming beam. For example, the position of one or more optical elements may be adjusted to vary a footprint of the transforming beam and/or its focus on the target surface. The thermal condition can be controlled (e.g. mitigated). For example, by varying at least one parameter of the printing. For example, by varying at least one component of the printer. For example, by varying the temperature and/or position of the at least one optical element, varying the power of the energy source, and/or varying at least one characteristic of the energy beam.

Real time as understood herein may be during at least part of the printing. Real time may be during a print operation. Real time may be during a print cycle. Real time may comprise: during formation of a 3D object, a layer of hardened material as part of the 3D object, a hatch line, or a melt pool.

In the example of FIG. 39A, a magnified box of the benchmark calibration curve 3910 depicts (e.g., three) benchmark calibration measurements 3915*a*, taken at benchmark conditions (e.g., irradiating energy dwell time, energy source power, controlled irradiating energy spot size 3985*a*) on the benchmark calibration structure at time "t1." In the example of FIG. 39 the calibration measurement 3915*a* have corresponding (e.g., average) detector signal value 3990*a*. FIG. 39A depicts a time "t2" (e.g., during and/or after a 3D printing process) benchmark calibration measurements 3915*b*, at (e.g., the same) benchmark conditions (e.g., irradiating energy dwell time, energy source power, controlled irradiating energy spot size 3985*a*) on the benchmark calibration structure. FIG. 39 depicts that while the benchmark conditions are the same in time "t2" as at time "t1," including the controlled irradiating energy spot size, the measured (e.g., average) detector signal value is higher (e.g., by Δy, 3990*b*). By comparing the measured detector signal value against a benchmark calibration curve (e.g., determining Δy), a corresponding spot size of the irradiating energy beam on the calibration surface can be determined. As shown in the example of FIG. 39, the corresponding spot size is 3985*b* is smaller than the controlled (e.g., nominal, or commanded) spot size 3985*a*, by a value Δx. In this manner a change in a condition (e.g., a focal length) of an optical element can be detected and/or monitored. The change in the condition of the optical element can be due to thermal lensing. A magnitude of the effect (e.g., a magnitude of thermal lensing, a change in a spot size of the irradiating energy beam) can be detected and/or monitored (e.g., by correlating measurement(s) against a benchmark calibration curve). The detected change in the optical element may be used to control (e.g., regulate and/or direct) at least one characteristic of the irradiating energy (e.g., such as described herein). Controlling at least one characteristic of the irradiating energy may comprise its power density, dwell time, translational speed, focus, or cross section. The detected change in the optical element may be used to adjust at least one characteristic of the irradiating energy. Adjusting at least one characteristic of the irradiating energy may comprise the position at which the irradiating energy intersects the calibration structure and/or target surface. Controlling may be done during, before, or after a build of the 3D object. Controlling may be performed manually and/or by a controller. At times, controlling may be performed by the same controller. At times, controlling may be performed by different controllers (e.g., that are operatively coupled). Controlling may comprise calibrating, monitoring, or adjusting. At least one controller may be a control system. The controller may include a processing unit (e.g., CPU, GPU, and/or FPGA). Controller may be programmable. The controller may operate upon request. The controller may be any controller described herein.

A sensitivity of thermal lensing detection can vary according to one or more calibration conditions. For example, thermal lensing detection sensitivity can be (e.g., relatively) high when performing (e.g., calibration) measurements corresponding to a portion (or portions) of the benchmark calibration curve that are substantially linear. Substantially linear can correspond to (i) a substantially linear change in a detected signal intensity for (ii) a substantially linear change in irradiating energy spot size on the benchmark calibration structure. For example, calibration measurements can be taken at a (e.g., substantially maximal) defocus (e.g., rightmost portion of FIG. 39, 3910). In this manner a change in a spot size of the irradiating energy beam on the benchmark calibration structure (e.g., by Δx on FIG. 39A, 3985) can be readily detected and/or quantified according to a change in the detected signal (e.g., by Δy on FIG. 39A, 3990) during a calibration measurement. At times, calibration measurements can be taken at conditions corresponding to a portion (or portions) of the benchmark calibration curve that are substantially nonlinear (e.g., the portion between locations 2 and 4 of FIG. 39, 3985). At times, calibration measurements can be taken at conditions corresponding to a portion (or portions) of the benchmark calibration curve that are substantially flat (e.g., the region between locations 3 and 4 of FIG. 39A, 3985). At times calibration measurements are taken at conditions corresponding to at least 2, 3, or 5 regions of the benchmark calibration curve.

The calibration can comprise directing an irradiating energy at the one or more calibration structures in a sequence. The calibration structures may vary with respect to each other in position and/or material. In some embodiments, the calibration structures are made of (e.g., substantially) the same material. The sequence can comprise an initial irradiated position (e.g., at benchmark dwell time, energy source power, irradiating energy beam spot size) on the benchmark calibration structure, a subsequent (e.g., second, heating) irradiation position (and/or hatch) on a (e.g., different, at least one or more) calibration structure (e.g., a heating irradiation), and a further subsequent (e.g., third) irradiation position on the benchmark calibration structure. A heating irradiation can comprise an irradiation pulse and/or hatch on a calibration structure that is not a benchmark calibration structure (e.g., a heat sink). A heating irradiation can comprise a relatively high power (e.g., compared with a benchmark power, for example greater than 200 W) energy source setting, and/or a relatively high dwell time (e.g., from about 1 second to about 60 seconds). At times, a heating irradiation can be of sufficient power and/or duration to induce a thermal lensing condition in an optical element. At times a heating irradiation can fail to induce a thermal lensing condition in an optical element. The irradiation on the benchmark calibration structure can be an irradiated position by the irradiating energy beam on the benchmark calibration structure. The irradiation on the different calibration structure(s) (e.g., heating irradiation) can be before, during, and/or after a 3D printing process. The initial irradiated position can comprise more than one position (e.g., 2, 3, 5, 8, or 10 positions). At least two of the irradiated positions may comprise irradiation from irradiating energy beams having different cross-sectional area (e.g., spot size) at the surface of the benchmark calibration structure. In some embodiments, irradiating energy beams of different cross-sectional area can provide different detector sensitivities in a calibration process. For example, in the example of FIG. 39A a detector sensitivity (e.g., of 3990) is higher with respect to the curve 3910 at a region near position 4 than at a region near position 5. In some embodiments, a lower detector sensitivity can provide an improved measurement sensitivity (e.g., improved resolution regarding the spot size of the irradiating energy beam). An energy source power and/or a dwell time of the irradiating energy may be controlled (e.g., manually and/or automatically, e.g., using a controller) to remain substantially constant for each irradiated position of the benchmark calibration structure. The controlled power (e.g., benchmark power) can be of at least about 50 W, 100 W, 135 W, 150 W, 185 W, 200 W, 400 W, 750 W, or 1000 W. The controlled power can be of at most about 1000 W, 750 W, 400 W, 200 W, 185 W, 150 W, 135 W, 100 W, or 50 W. The controlled power can be in between any of the aforementioned powers (from about 50 W to about 1000 W, from about 500 W to about 1000 W, or from about 50 W to about 500 W). The controlled dwell time (e.g., benchmark dwell time) can be about 0.1 milliseconds (ms), 0.3 ms, 0.8 ms, 1 ms, 2 ms, or 5 ms. The controlled dwell time can be at most about 5 ms, 2 ms, 1 ms, 0.8 ms, 0.3 ms, or 0.1 ms. The controlled dwell time can be in between any of the afore-mentioned dwell times (from about 0.1 ms to about 5 ms, from about 2 ms to about 5 ms, from about 0.1 ms to about 2 ms).

In some cases, a layer of the 3D object can be formed within at most about 1 hour (h), 30 minutes (min), 20 min, 10 min, 5 min, 1 min, 40 seconds (s), 20 s, 10 s, 9 s, 8 s, 7 s, 6 s, 5 s, 4 s, 3 s, 2 s, or 1 s. A layer of the 3D object can be formed within at least about 30 minutes (min), 20 min, 10 min, 5 min, 1 min, 40 seconds (s), 20 s, 10 s, 9 s, 8 s, 7 s, 6 s, 5 s, 4 s, 3 s, 2 s, or 1 s. A layer of the 3D can be formed within any time between the aforementioned time scales (e.g., from about 1 h to about 1 s, from about 10 min to about 1 s, from about 40 s to about 1 s, from about 10 s to about 1 s, or from about 5 s to about 1 s).

The final form of the 3D object can be retrieved soon after cooling of a final material layer. Soon after cooling may be at most about 1 day, 12 hours (h), 6 h, 5 h, 4 h, 3 h, 2 h, 1 h, 30 minutes, 15 minutes, 5 minutes, 240 s, 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s. Soon after cooling may be between any of the aforementioned time values (e.g., from about 1 s to about 1 day, from about 1 s to about 1 hour, from about 30 minutes to about 1 day, or from about 20 s to about 240 s). In some cases, the cooling can occur by method comprising active cooling by convection using a cooled gas or gas mixture comprising argon, nitrogen, helium, neon, krypton, xenon, hydrogen, carbon monoxide, carbon dioxide, or oxygen. Cooling may be cooling to a temperature that allows a person to handle the 3D object. Cooling may be cooling to a handling temperature. The 3D object can be retrieved during a time period between any of the aforementioned time periods (e.g., from about 12 h to about 1 s, from about 12 h to about 30 min, from about 1 h to about 1 s, or from about 30 min to about 40 s).

The generated 3D object can require very little or no further processing after its retrieval. In some examples, the diminished further processing or lack thereof, will afford a 3D printing process that requires smaller amount of energy and/or less waste as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the aforementioned values (e.g., from about 1.1 to about 10, or from about 1.5 to about 5). Further processing may comprise trimming, as disclosed herein. Further processing may comprise polishing (e.g., sanding). For example, in some cases the generated 3D object can be retrieved and finalized without removal of transformed material and/or auxiliary features. The 3D object can be retrieved when the three-dimensional part, composed of hardened (e.g., solidified) material, is at a handling temperature that is suitable to permit the removal of the 3D object from the material bed without substantial deformation. The handling temperature can be a temperature that is suitable for packaging of the 3D object. The handling temperature a can be at most about 120° C., 100° C., 80° C., 60° C., 40° C., 30° C., 25° C., 20° C., 10° C., or 5° C. The handling temperature can be of any value between the afore-mentioned temperature values (e.g., from about 120° C. to about 20° C., from about 40° C. to about 5° C., or from about 40° C. to about 10° C.).

The methods and systems provided herein can result in fast and efficient formation of 3D objects. In some cases, the 3D object can be transported within at most about 120 min, 100 min, 80 min, 60 min, 40 min, 30 min, 20 min, 10 min, or 5 min after the last layer of the object hardens (e.g., solidifies). In some cases, the 3D object can be transported within at least about 120 min, 100 min, 80 min, 60 min, 40 min, 30 min, 20 min, 10 min, or 5 min after the last layer of the object hardens. In some cases, the 3D object can be transported within any time between the above-mentioned values (e.g., from about 5 min to about 120 min, from about 5 min to about 60 min, or from about 60 min to about 120 min). The 3D object can be transported once it cools to a temperature of at most about 100° C., 90° C., 80° C., 70° C., 60° C., 50° C., 40° C., 30° C., 25° C., 20° C., 15° C., 10° C., or 5° C. The 3D object can be transported once it cools to a temperature value between the above-mentioned temperature values (e.g., from about 5° C. to about 100° C., from about 5° C. to about 40° C., or from about 15° C. to about 40° C.). Transporting the 3D object can comprise packaging and/or labeling the 3D object. In some cases, the 3D object can be transported directly to a consumer.

Systems and methods presented herein can facilitate formation of custom or stock 3D objects for a customer. A customer can be an individual, a corporation, organization, government, non-profit organization, company, hospital, medical practitioner, engineer, retailer, any other entity, or individual. The customer may be one that is interested in receiving the 3D object and/or that ordered the 3D object. A customer can submit a request for formation of a 3D object. The customer can provide an item of value in exchange for the 3D object. The customer can provide a design or a model for the 3D object. The customer can provide the design in the form of a stereo lithography (STL) file. The customer can provide a design where the design can be a definition of the shape and dimensions of the 3D object in any other numerical or physical form. In some cases, the customer can provide a 3D model, sketch, or image as a design of an object to be generated. The design can be transformed in to instructions usable by the printing system to additively generate the 3D object. The customer can provide a request to form the 3D object from a specific material or group of materials (e.g., a material as described herein). In some cases, the design may not contain auxiliary features or marks of any past presence of auxiliary support features.

In response to the customer request the 3D object can be formed or generated with the printing method, system and/or apparatus as described herein. In some cases, the 3D object can be formed by an additive 3D printing process. Additively generating the 3D object can comprise successively depositing and melting a powder comprising one or more materials as specified by the customer. The 3D object can subsequently be delivered to the customer. The 3D object can be formed without generation or removal of auxiliary features (e.g., that is indicative of a presence or removal of the auxiliary support feature). Auxiliary features can be support features that prevent a 3D object from shifting, deforming, or moving during formation.

The 3D object (e.g., solidified material) that is generated for the customer can have an average deviation value from the intended dimensions of at most about 0.5 microns (μm), 1 μm, 5 μm, 10 μm, 30 μm, 100 μm, 300 μm, or less. The deviation can be any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions in a specific direction, according to the formula $D_v+L/K_{Dv}$, wherein $D_v$ is a deviation value, L is the length of the 3D object in a specific direction, and $K_{Dv}$ is a constant. $D_v$ can have a value of at most about 300 μm, 200 μm, 100 μm, 50 μm, 40 μm, 30 μm, 20 μm, 10 μm, 5 μm, 1 μm, or 0.5 μm. $D_v$ can have a value of at least about 0.5 μm, 1 μm, 3 μm, 5 μm, 10 μm, 20 μm, 30 μm, 50 μm, 70 μm, 100 μm, or 300 μm. $D_v$ can have any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the aforementioned values (e.g., from about 3000 to about 500, from about 1000 to about 2500, from about 500 to about 2000, from about 1000 to about 3000, or from about 1000 to about 2500).

The intended dimensions can be derived from a model design. The 3D part can have the stated accuracy value immediately after its formation, without additional processing or manipulation. Receiving the order for the object, formation of the object (e.g., comprising 10,000 layers), and delivery of the object to the customer can take at most about 7 days, 6 days, 5 days, 3 days, 2 days, 1 day, 12 hours, 6 hours, 5 hours, 4 hours, 3 hours, 2 hours, 1 hour, 30 min, 20 min, 10 min, 5 min, 1 min, 30 seconds, or 10 seconds. In some cases, the 3D object can be additively generated in a period between any of the afore-mentioned time periods (e.g., from about 10 seconds to about 7 days, from about 10 seconds to about 12 hours, from about 12 hours to about 7 days, or from about 12 hours to about 10 minutes). The time can vary based on the physical characteristics of the object, including the size and/or complexity of the object.

In some applications, the rate of printing (e.g., transforming) is at least about 5 cubic centimeters per hour ($cm^3/hr$), 10 $cm^3/hr$, 20 $cm^3/hr$, 30 $cm^3/hr$, 40 $cm^3/hr$, 50 $cm^3/hr$, 100 $cm^3/hr$, 150 $cm^3/hr$, 200 $cm^3/hr$, 250 $cm^3/hr$, 300 $cm^3/hr$, 400 $cm^3/hr$, 500 $cm^3/hr$ or 1,000 $cm^3/hr$. The rate of printing (e.g., transforming) may range between any of the afore-mentioned values (e.g., from about 5 $cm^3/hr$ to about 1,000 $cm^3/hr$, from about 5 $cm^3/hr$ to about 200 $cm^3/hr$, from about 200 $cm^3/hr$ to about 1,000 $cm^3/hr$, or from about 5 $cm^3/hr$ to about 200 $cm^3/hr$).

The system and/or apparatus can comprise a controlling mechanism (e.g., a controller). The methods, systems, and/or apparatuses disclosed herein may incorporate a controller mechanism that controls one or more of the components described herein. The controller may comprise a computer-processing unit (e.g., a computer) coupled to any of the systems and/or apparatuses, or their respective components (e.g., the energy source(s)). The computer can be operatively coupled through a wired and/or through a wireless connection. In some cases, the computer can be on board a user device. A user device can be a laptop computer, desktop computer, tablet, smartphone, or another computing device. The controller can be in communication with a cloud computer system and/or a server. The controller can be programmed to selectively direct the energy source(s) to apply energy to the at least a portion of the target surface at a power per unit area. The controller can be in communication with the scanner configured to articulate the energy source(s) to apply energy to at least a portion of the target surface at a power per unit area.

The controller may control the layer dispensing mechanism and/or any of its components. The controller may control the platform. The control may comprise controlling (e.g., directing and/or regulating) the speed (velocity) of movement. The movement may be horizontal, vertical, and/or in an angle. The controller may control the level of pressure (e.g., vacuum, ambient, or positive pressure) in the material removal mechanism material dispensing mechanism, and/or the enclosure (e.g., chamber). The pressure level (e.g., vacuum, ambient, or positive pressure) may be constant or varied. The pressure level may be turned on and off manually and/or by the controller. The controller may control the force generating mechanism. For example, the controller may control the amount of magnetic, electrical, pneumatic, and/or physical force generated by force generating mechanism. For example, the controller may control the polarity type of magnetic, and/or electrical charge generated by the force generating mechanism. The controller may control the timing and the frequency at which the force is generated. The controller may control the direction and/or rate of movement of the translating mechanism. The controller may control the cooling member (e.g., external, and/or internal). In some embodiments, the external cooling member may be translatable. The movement of the layer dispensing mechanism or any of its components may be predetermined. The movement of the layer dispensing mechanism or any of its components may be according to an algorithm. The control may be manual and/or automatic. The control may be programmed and/or be effectuated a whim. The control may be according to an algorithm. The algorithm may comprise a printing algorithm, or motion control algorithm. The algorithm may take into account the model of the 3D object.

Figure 7:
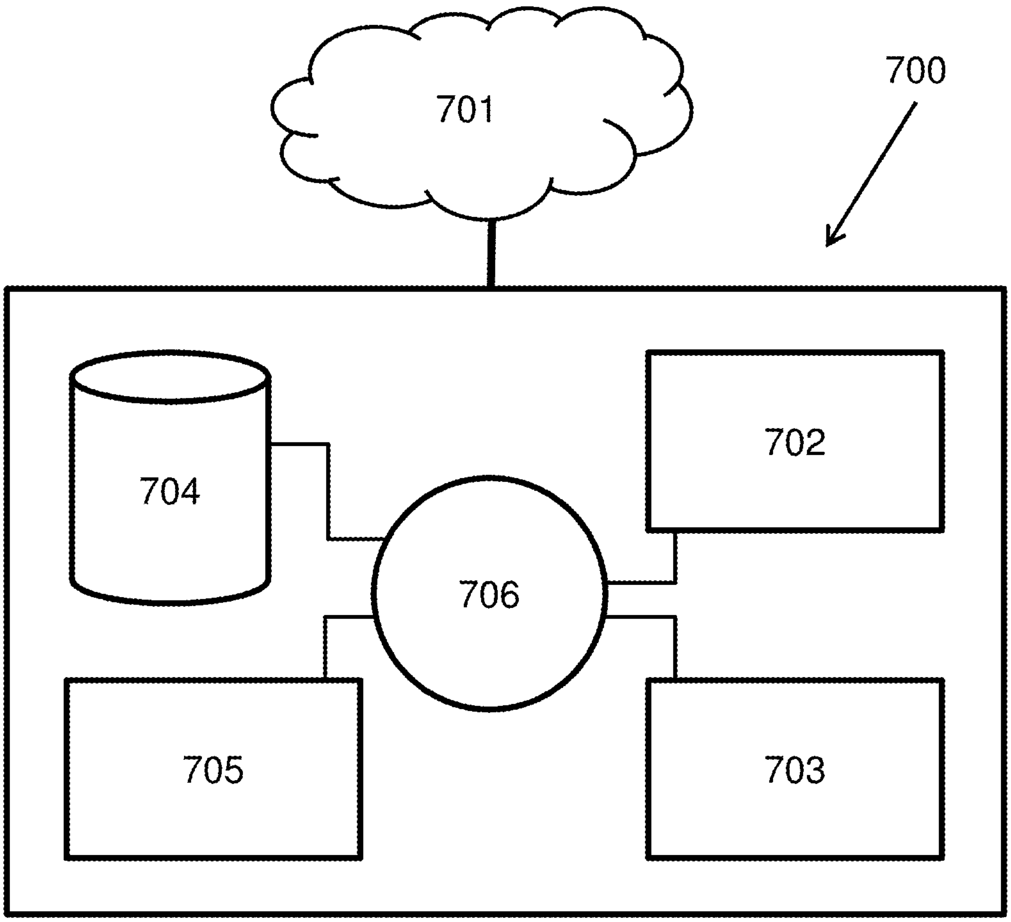
FIG. 7 schematically illustrates a computer control system that is programmed or otherwise configured to facilitate the formation of one or more 3D objects.

The controller may comprise a processing unit. The processing unit may be central. The processing unit may comprise a central processing unit (herein "CPU"). The controllers or control mechanisms (e.g., comprising a computer system) may be programmed to implement methods of the disclosure. The controller may control at least one component of the systems and/or apparatuses disclosed herein. FIG. 7 is a schematic example of a computer system 700 that is programmed or otherwise configured to facilitate the formation of a 3D object according to the methods provided herein. The computer system 700 can control (e.g., direct and/or regulate) various features of printing methods, apparatuses and systems of the present disclosure, such as, for example, regulating force, translation, heating, cooling and/or maintaining the temperature of a powder bed, process parameters (e.g., chamber pressure), scanning route of the energy source, position and/or temperature of the cooling member(s), application of the amount of energy emitted to a selected location, or any combination thereof. The computer system 700 can be part of, or be in communication with, a printing system or apparatus, such as a 3D printing system or apparatus of the present disclosure. The computer may be coupled to one or more mechanisms disclosed herein, and/or any parts thereof. For example, the computer may be coupled to one or more sensors, valves, switches, motors, pumps, or any combination thereof.

The computer system 700 can include a processing unit 706 (also "processor," "computer" and "computer processor" used herein). The computer system may include memory or memory location 702 (e.g., random-access memory, read-only memory, flash memory), electronic storage unit 704 (e.g., hard disk), communication interface 703 (e.g., network adapter) for communicating with one or more other systems, and peripheral devices 705, such as cache, other memory, data storage and/or electronic display adapters. The memory 702, storage unit 704, interface 703, and peripheral devices 705 are in communication with the processing unit 706 through a communication bus (solid lines), such as a motherboard. The storage unit can be a data storage unit (or data repository) for storing data. The computer system can be operatively coupled to a computer network ("network") 701 with the aid of the communication interface. The network can be the Internet, an Internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 702. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 700 can be included in the circuit.

The storage unit 704 can store files, such as drivers, libraries, and saved programs. The storage unit can store user data, e.g., user preferences and user programs. The computer system in some cases can include one or more additional data storage units that are external to the computer system, such as located on a remote server that is in communication with the computer system through an intranet or the Internet.

The computer system can communicate with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory 702 or electronic storage unit 704. The machine executable or machine-readable code can be provided in the form of software. During use, the processor 706 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The processing unit may include one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least 0.2 billion transistors (BT), 0.5 BT, 1BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 $mm^2$, or 800 $mm^2$. The integrated circuit chip may have an area of at most 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 $mm^2$, or 800 $mm^2$. The integrated circuit chip may have an area of any value between the afore-mentioned values (e.g., from about 50 $mm^2$ to about 800 $mm^2$, from about 50 $mm^2$ to about 500 $mm^2$, or from about 500 $mm^2$ to about 800 $mm^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The multiplicity of cores can be parallel cores. The multiplicity of cores can function in parallel. The multiplicity of cores may include at least 2, 10, 40, 100, 400, 1000, 2000, 3000, 4000, 5000, 6000, 7000, 8000, 9000, or 10000 cores. The multiplicity of cores may include at most 1000, 2000, 3000, 4000, 5000, 6000, 7000, 8000, 9000, 10000, or 40000 cores. The multiplicity of cores may include cores of any number between the afore-mentioned numbers (e.g., from 2 to 40000, from 2 to 400, from 400 to 4000, from 2000 to 4000, or from 4000 to 10000 cores). The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 1 Tera Flops (T-FLOPS), 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, or from about 0.1 T-FLOP to about 10 EXA-FLOPS). The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance LINPACK, matrix multiplication (e.g., DGEMM), sustained memory bandwidth to/from memory (e.g., STREAM), array transposing rate measurement (e.g., PTRANS), RandomAccess, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK refers to a software library for performing numerical linear algebra on a digital computer. DGEMM refers to double precision general matrix multiplication. STREAM. PTRANS. MPI refers to Message Passing Interface.

The computer system may include hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by Nvidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

The computer system may include an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

The computer system may include configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration.

The computing system may include an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most 0.1 microsecond (μs), 1 is, 10 μs, 100 μs, or 1 millisecond (ms). The physical unit may produce the algorithm output in any time between the above-mentioned times (e.g., from about 0.1 μs, to about 1 ms, from about 0.1 μs, to about 100 μs, or from about 0.1 μs to about 10 μs). In some instances, the controller may use calculations, real time measurements, or any combination thereof to regulate the energy beam(s). In some instances, the real-time measurements (e.g., temperature measurements) may provide input at a rate of at least about 0.1 KHz, 1 KHz, 10 KHz, 100 KHz, 1000 KHz, or 10000 KHz). In some instances, the real-time measurements may provide input at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may any value between the aforementioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s).

Aspects of the systems, apparatuses, and/or methods provided herein, such as the computer system, can be embodied in programming. Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

The memory may comprise a random-access memory (RAM), dynamic random-access memory (DRAM), static random-access memory (SRAM), synchronous dynamic random-access memory (SDRAM), ferroelectric random-access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. The memory and/or storage may comprise a storing device external to and/or removable from device, such as a Universal Serial Bus (USB) memory stick, or a hard disk. Many of these forms of computer readable media may be involved in carrying one or more sequences of one or more instructions to a processor for execution.

The computer system can include or be in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms that have been pre-programmed. The feedback mechanisms may rely on input from sensors (described herein) that are connected to the control unit (e.g., control system or control mechanism e.g., computer). The computer system may store historical data concerning various aspects of the operation of the 3D printing system. The historical data may be retrieved at predetermined times and/or at a whim. The historical data may be accessed by an operator and/or by a user. The historical and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (e.g., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

The system and/or apparatus described herein (e.g., controller) and/or any of their components may comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen. The system and/or apparatus described herein (e.g., controller) and/or any of their components may comprise Bluetooth technology. The system and/or apparatus described herein (e.g., controller) and/or any of their components may comprise a communication port. The communication port may be a serial port or a parallel port. The communication port may be a Universal Serial Bus port (i.e., USB). The system and/or apparatus described herein (e.g., controller) and/or any of their components may comprise USB ports. The USB can be micro or mini USB. The USB port may relate to device classes comprising 00 h, 01 h, 02 h, 03 h, 05 h, 06 h, 07 h, 08 h, 09 h, 0Ah, 0Bh, 0Dh, 0Eh, 0Fh, 10 h, 11 h, DCh, E0h, EFh, FEh, or FFh. The system and/or apparatus described herein (e.g., controller) and/or any of their components may comprise a plug and/or a socket (e.g., electrical, AC power, DC power). The system and/or apparatus described herein (e.g., controller) and/or any of their components may comprise an adapter (e.g., AC and/or DC power adapter). The system and/or apparatus described herein (e.g., controller) and/or any of their components may comprise a power connector. The power connector can be an electrical power connector. The power connector may comprise a magnetically coupled (e.g., attached) power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

The systems, methods, and/or apparatuses disclosed herein may comprise receiving a request for a 3D object (e.g., from a customer). The request can include a model (e.g., CAD) of the desired 3D object. Alternatively, or additionally, a model of the desired 3D object may be generated. The model may be used to generate 3D printing instructions. The 3D printing instructions may exclude the 3D model. The 3D printing instructions may be based on the 3D model. The 3D printing instructions may take the 3D model into account. The 3D printing instructions may be based on simulations. The 3D printing instructions may use the 3D model. The 3D printing instructions may comprise using an algorithm (e.g., embedded in a software) that takes into account the 3D model.

EXAMPLES

The following are illustrative and non-limiting examples of methods of the present disclosure.

Example 1

In a 28 cm diameter by 30 cm height container at ambient temperature, Inconel 718 powder of average particle size 35 μm was deposited to form a powder bed. The container was disposed in an enclosure to separate the powder bed from the ambient environment. The enclosure was purged with Argon gas for 30 minutes. Two rectangular targets having dimensions of 15 mm by 12 mm were formed from the Inconel 718 powder. An 800 W fiber laser beam irradiating through an optical window was used to perform a sequence of irradiations on a first one of the targets, the sequence including irradiation times of 0.5, 1, 2, 4, 8, and 16 seconds. In between each irradiation of the first target of the sequence, two irradiations of the second target were performed, the two irradiations having nominal spot sizes at a surface of the second target of 75-100 μm, and 500 μm, respectively. Each irradiation had a duration of 5 ms. An InGaAs detector, comprising optical filters limiting detected radiation to a wavelength band of 1400-1700 nanometers, was used to detect each irradiation of the rectangular target during the irradiation duration. A detector signal was generated that was plotted as a function of the nominal spot size (e.g., as in FIG. 39A).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing at least one three-dimensional (3D) object comprising at least one controller configured to:

(a) couple to an electrical power source and operatively couple to (i) an energy source configured to generate an energy beam that transforms at least a portion of a material bed to print the at least one 3D object, the material bed having an exposed surface having a roughness, (ii) a scanner configured to propagate the energy beam along the exposed surface, and (iii) a detector configured to detect a reflected radiation from the exposed surface;

(b) direct the energy source to generate the energy beam configured to irradiate at least a portion of the exposed surface and form a footprint on the exposed surface, the footprint emitting the reflected radiation from the exposed surface;

(c) direct the scanner to propagate the energy beam along the exposed surface to cause the footprint of the energy beam to propagate along the exposed surface while emitting the reflected radiation from the exposed surface;

(d) direct the detector to detect the reflected radiation from the footprint at the exposed surface during propagation of the energy beam along the exposed surface, to generate associated signals; and (e) direct a signal analysis of the associated signals to determine an exposed surface signal component, the signal analysis comprising determining an optical variability of the associated signals from the reflected radiation, the optical variability indicating at least in part a degree of focus of the energy beam such that the optical variability increases as the focus of the energy beam increases, wherein the optical variability is determined by analyzing variations in the reflected radiation signals from the footprint of the energy beam on the exposed surface.

2. The apparatus of claim 1, wherein (I) the optical variability comprises a spatial frequency variability and/or (II) the signal analysis comprises (a) using an optical transfer function or (b) using a modulation transfer function.

3. The apparatus of claim 1, wherein the footprint of the energy beam has an energy profile comprising a lower energy in a middle of the footprint as compared to edges of the footprint, the edges having similar energy.

4. The apparatus of claim 1, wherein the at least one controller is programmed to direct translation of the energy beam at a rate that operable to (a) retain information regarding roughness of the exposed surface and (b) hinder transformation of the exposed surface by the energy beam.

5. The apparatus of claim 1, wherein the at least one controller is programmed to (a) irradiate the energy beam at a power density that operable to retain information regarding the roughness of the exposed surface and (b) hinder transformation of the exposed surface by the energy beam.

6. The apparatus of claim 1, wherein the higher variability in the associated signals is further correlated with a smaller cross section of the energy beam.

7. The apparatus of claim 1, wherein the at least one controller is configured to direct the signal analysis comprising a response to a wave pattern of the energy beam emitted from the footprint, as a function of the roughness of the exposed surface.

8. The apparatus of claim 7, wherein the at least one controller is configured to direct the signal analysis comprising analyzing a wave pattern of the energy beam emitted from the footprint in real time during its translation.

9. The apparatus of claim 1, wherein the energy beam has a first cross section after irradiation through an optical arrangement, wherein the at least one controller is configured to direct altering the first cross section of the energy beam to a second cross section of the energy beam before impinging at the exposed surface.

10. The apparatus of claim 9, wherein (I) the at least one controller is configured to alter an optical setting of the optical arrangement and/or (II) the optical arrangement comprises the scanner.

11. The apparatus of claim 9, wherein altering the first cross section comprises altering the focus of the energy beam on the exposed surface.

12. The apparatus of claim 1, wherein the at least one controller is configured to direct detection of an astigmatism (a) of the footprint and/or (b) of a cross section of the energy beam.

13. The apparatus of claim 12, wherein the at least one controller is configured to direct the detection of the astigmatism during translation of the energy beam along the exposed surface.

14. The apparatus of claim 1, wherein the at least one controller is configured to direct a calibration of the energy beam at least in part by comparing a deviation of the optical variability at a given energy beam cross section with a benchmark optical variability value of the energy beam at the given energy beam cross section.

15. The apparatus of claim 14, wherein the benchmark optical variability value is generated using a known roughness of the exposed surface, and (i) a focal setting of an optical arrangement and a varying height of the exposed surface or (ii) a height of the exposed surface and a varying focal setting of the optical arrangement.

16. The apparatus of claim 1, wherein the detector comprises one or more sensors configured to detect debris generated during the printing; and optionally wherein the 3D object is being disposed in an enclosure during the printing, the enclosure having an atmosphere filtered by a High Efficiency Particulate Arrestance (HEPA) filter.

17. The apparatus of claim 1, wherein the material bed comprises an elemental metal or a metal alloy, and wherein during the printing, an internal atmosphere of an enclosure in which the material bed is disposed compress oxygen and humidity.

18. The apparatus of claim 1, wherein the material bed comprises elemental metal, metal alloy, ceramic, or an allotrope of elemental carbon.

19. A method of the printing of the 3D object, the method comprising: (a) providing the apparatus of claim 1, and (b) using the apparatus to print the 3D object.

20. Non-transitory computer readable program instructions that, when read by one or more processors operatively coupled to the apparatus of claim 1 cause the one or more processors to execute one or more operations associated with the apparatus to print the 3D object, the program instructions being inscribed on at least one non-transitory computer readable medium; and optionally wherein the at least one controller comprises the one or more processors.

* * * * *